US007707987B2

(12) United States Patent
Guthrie

(10) Patent No.: US 7,707,987 B2
(45) Date of Patent: May 4, 2010

(54) HYDROGEN G-CYCLE ROTARY INTERNAL COMBUSTION ENGINE

(75) Inventor: Barry R. Guthrie, Corfu, NY (US)

(73) Assignee: Prime Mover International, LLC, Corfu, NY (US)

( * ) Notice: Subject to any disclaimer, the term of this patent is extended or adjusted under 35 U.S.C. 154(b) by 0 days.

(21) Appl. No.: 12/088,648

(22) PCT Filed: Sep. 29, 2006

(86) PCT No.: PCT/US2006/037868

§ 371 (c)(1),
(2), (4) Date: Mar. 28, 2008

(87) PCT Pub. No.: WO2007/041224

PCT Pub. Date: Apr. 12, 2007

(65) Prior Publication Data

US 2008/0247897 A1 Oct. 9, 2008

Related U.S. Application Data

(60) Provisional application No. 60/721,521, filed on Sep. 29, 2005.

(51) Int. Cl.

| | |
|---|---|
| ***F02B 53/00*** | (2006.01) |
| ***F02B 53/04*** | (2006.01) |
| ***F02B 47/02*** | (2006.01) |
| ***F02M 25/00*** | (2006.01) |
| ***F01P 9/02*** | (2006.01) |
| ***F01P 9/04*** | (2006.01) |
| ***F01C 21/04*** | (2006.01) |
| ***F01C 21/06*** | (2006.01) |
| ***F01C 1/00*** | (2006.01) |
| ***F01C 19/00*** | (2006.01) |
| ***F04C 15/00*** | (2006.01) |
| ***F04C 2/00*** | (2006.01) |
| ***F04C 27/00*** | (2006.01) |
| ***F04C 29/04*** | (2006.01) |
| ***F04C 18/00*** | (2006.01) |

(52) U.S. Cl. ...................... 123/241; 123/243; 123/236; 123/231; 123/227; 123/41.25; 123/25 R; 123/25 Q; 123/25 P; 418/83; 418/101; 418/113; 418/140; 418/146; 418/263; 418/266

(58) Field of Classification Search ................ 123/241, 123/243, 247, 231, 235–236, 227, 25 R, 25 P, 123/25 Q, 41.25, 41.57; 418/83, 101, 104, 418/113, 140, 142, 146, 262–264, 266; *F02B 53/00, F02B 53/04, 47/02; F02M 25/00; F01P 9/02, F01P 9/04; F01C 21/04, 21/06, 1/00, 19/00; F04C 15/00, F04C 2/00, 27/00, 29/02, 29/04, 18/00*

See application file for complete search history.

(56) References Cited

U.S. PATENT DOCUMENTS 2,382,259 A 8/1945 Rohr .......................... 418/262

(Continued)

FOREIGN PATENT DOCUMENTS

DE 2521597 A * 12/1975

(Continued)

*Primary Examiner*—Thai Ba Trieu
(74) *Attorney, Agent, or Firm*—Thomas T. Aquilla

(57) ABSTRACT

A hydrogen G-cycle rotary vane internal combustion engine has a sodium vapor chamber transferring excess combustion heat into combustion chambers. An active water cooling system captures heat from the engine housing stator, rotor, and sliding vanes and transfers it back into the combustion cycle by premixing it with hydrogen to reduce peak combustion temperature and with an early an late stage combustion chamber injection to help transfer heat from the sodium vapor chamber, to control chamber temperature, and to increase chamber vapor pressure. A combustion chamber sealing system includes axial seals between the rotor and the stator, vane face seals, and toggling split vane seals between the outer perimeters of the sliding vanes and the stator. Sliding vanes reciprocate laterally in and out of the rotor assisted by a vane belting system. A thermal barrier coating minimizes heat transfer and thermal deformation. Solid lubricants provide high temperature lubrication and durability.

132 Claims, 67 Drawing Sheets

U.S. PATENT DOCUMENTS

| | | | | | |
|---|---|---|---|---|---|
| 3,254,489 | A | | 6/1966 | Eickmann | 123/235 |
| 3,429,301 | A | * | 2/1969 | Sandidge | 123/227 |
| 3,745,979 | A | * | 7/1973 | Williams | 123/231 |
| 3,892,206 | A | * | 7/1975 | Kobayashi | 123/231 |
| 3,995,421 | A | | 12/1976 | Kuroiwa | 123/25 P |
| 5,634,783 | A | | 6/1997 | Beal | 418/264 |
| 5,711,268 | A | | 1/1998 | Holdampf | 123/243 |
| 7,055,327 | B1 | | 6/2006 | Pekrul et al. | 60/651 |
| 2006/0102139 | A1 | | 5/2006 | Garcia | 123/200 |

FOREIGN PATENT DOCUMENTS

| | | | | |
|---|---|---|---|---|
| DE | 2927973 | A | * | 1/1981 |
| DE | 3045569 | A | * | 7/1982 |
| DE | 10058738 | A | * | 5/2002 |
| FR | 2299509 | A | * | 10/1976 |

* cited by examiner

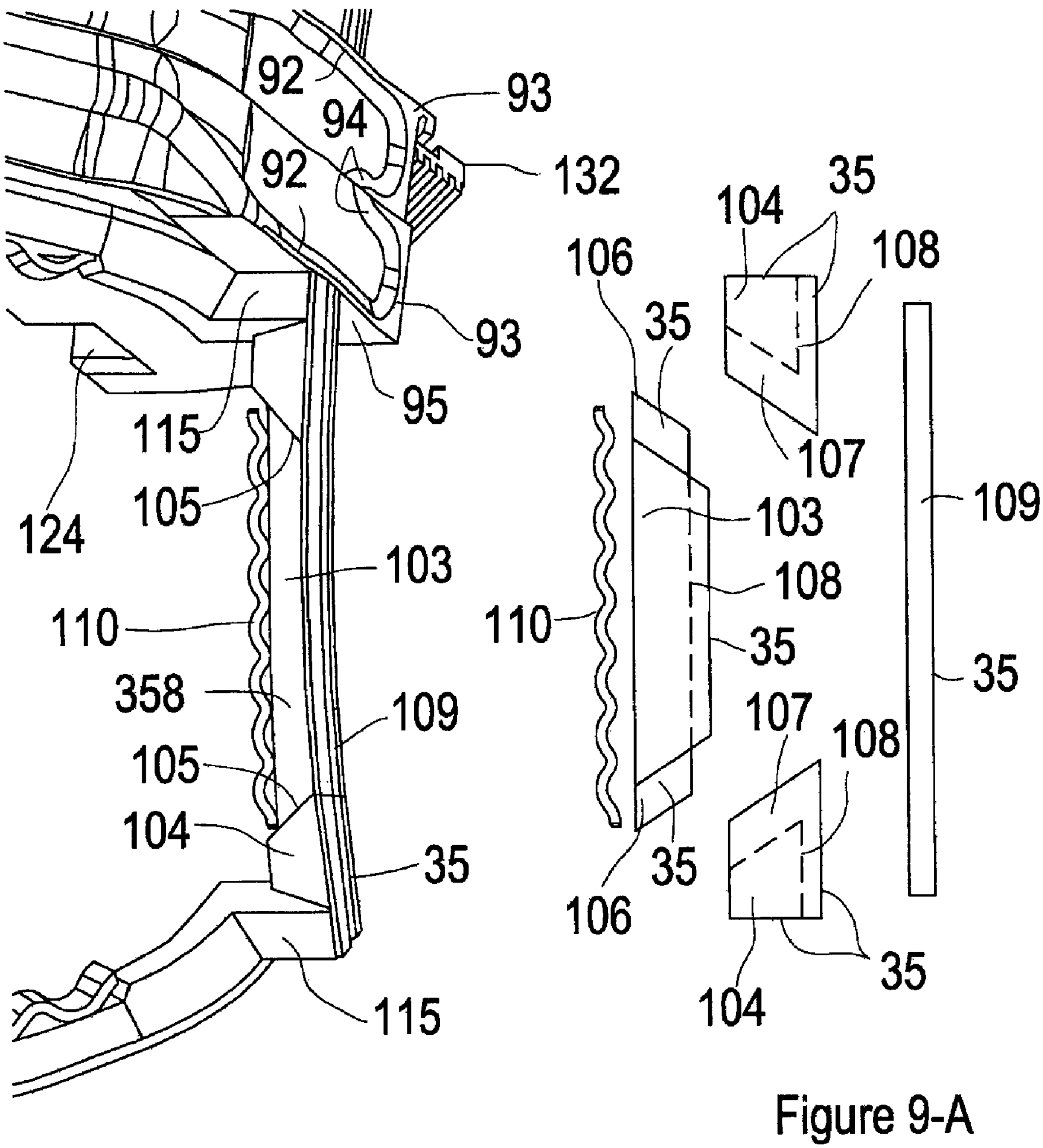
Figure 9-A

E-E

C-C

SECTION E-E

Rotate 180

Figure 3 G-cycle Rotary Vane Engine processes.

HYDROGEN G-CYCLE ROTARY INTERNAL COMBUSTION ENGINE

This application claims the benefit of U.S. Provisional Application Ser. No. 60/721,521, filed Sep. 29, 2005, the entire contents of which are incorporated herein by reference.

This invention relates to internal combustion engines, and more specifically to rotary vane engines using a hydrogen fuel thermodynamic G-cycle.

BACKGROUND OF THE INVENTION

The growing demand for oil from various nations around the world is resulting in higher energy prices that have the potential to increase inflation and geopolitical tensions between the nations competing for the same limited oil reserves. Even if the supply of oil could be increased to meet the demand, doing so has the further potential of producing higher $CO_2$ emissions with the possibility of more rapid global warming.

Currently many transportation, oil, and energy companies and governments are investing billions of dollars in hydrogen related research and development programs to produce a fuel source that will gradually replace fossil fuels. For example, many car companies have been developing hydrogen fuel cell vehicles. However, fuel cell durability, efficiency, fuel purity requirements, hydrogen storage, and cost limitations are major implementation barriers.

Automakers are also developing hybrid electrical/internal combustion engine propulsion systems as a transition stage between current internal combustion engine vehicles and future fuel cell vehicles. It is unclear, however, whether hybrid electrical propulsions systems provide high enough value added efficiency benefits to consumers to justify their higher cost.

Converting existing internal combustion engine systems to operate on hydrogen is also not without problems. The combustion temperature for hydrogen is much higher than for gasoline, resulting in high amounts of NOx emissions being formed. Using lean hydrogen fuel mixtures to reduce potential NOx emissions, but also greatly reduces the power output performance levels. Direct hydrogen injection can improve this problem, but the injectors are very expensive and require high pressures and tolerances. The injection pulse provides limited amount of hydrogen fuel making it insufficient for larger power applications. The dryness of the hydrogen gas also makes it more difficult for the pulsing injectors to work and increases injector wear. Moreover, the high diffusiveness of hydrogen gas often results in the hydrogen gas passing through engine sealing systems into crank shaft regions, resulting in very undesirable combustion that can damage the engine and/or ignite the oil lubricant.

BRIEF DESCRIPTION OF THE INVENTION

A high efficiency hydrogen G-cycle, rotary vane internal combustion engine maximizes thermodynamic energy benefits to provide improved thermal brake efficiency for higher fuel economy, higher power-density to engine weight and volume, with lower NOx. The engine is also optimized to maximize mechanical benefits of the rotary vane engine to complement the operation of the G-cycle with improved sealing, rotor, and housing systems to minimize heat losses, exergy energy destruction, and reduce friction to improve reliability, operating life and noise, vibration, and harshness (NVH).

The thermodynamic heat losses in the G-cycle and rotary vane internal combustion engine are controlled by removing heat and re-inserting it using a sodium vapor chamber, chamber water injections, and geometric chamber over-expansion, to thereby make use of the heat and exhaust gas enthalpy that otherwise would be lost to the cooling system and atmosphere. An active water cooling system captures heat from the housing and exhaust and injects it back into the engine cycle. Combining all these heat transfer flows produces an engine with very high power density and overall brake thermal efficiency at 65 to 85% that is ideally suited to power generation and propulsion applications.

The hydrogen engine of the present invention accomplishes the aforementioned objectives using a hydrogen high efficiency thermodynamic G-cycle from improved combustion process, improved heat transfer cooling, and lower heat rejection losses using an improved hydrogen fuel delivery, variable water compression ratio, wider fuel/air equivalence operating range, improved hydrogen ignition, expanded combustion/expansion chamber, longer combustion duration, energy reversible sodium vapor chamber heat transfer system with early and late stage water injections.

The hydrogen engine of the present invention has an improved sealing system comprised of split vane seals, snub nose tip, dynamic axial split vane seals, vane seal gas passages, dynamic rotor axial seals, vane face seals, vane structure, vane heat pipe channel cooling/heat transfer, and vane anti-centrifugal belting system. The engine has an improved rotor structure with rotor thermal control using a water vapor chamber cooling/heat transfer and reduced vane friction from an improved vane tangential bearing system. The engine has an improved housing with distorted oval inner housing stator geometry for larger expansion, higher housing operation temperatures, solid lubricants, active water cooling/heat transfer reduce hydrogen leaking, outer water vapor chambers, and insulation cover.

The present invention further provides an improved direct electrical power from an alkali metal thermal electrical converter (AMTEC) located in the sodium vapor chamber.

It is a further object of the present invention to provide an improved thermodynamic cycle with lower exhaust heat loss, cooling system heat loss, and lower friction heat loss resulting in increased overall thermal brake efficiency over existing internal combustion engines.

Following the second law of thermodynamics, any conversion of heat to work is maximized by the Carnot cycle efficiency, and some amount of heat has to be sent to a cold sink. However, Carnot cycle efficiency is only valid in single chamber reactions. The G-Cycle overcomes the Carnot cycle efficiency limitations by using a multi-chamber reaction cycle that uses the whole engine's combined thermodynamic and mechanical systems as the reaction thermodynamic cycle. A sodium vapor chamber ties or overlaps the multiple chamber reactions together along the combustion/expansion zone. The sodium vapor chamber allows excess heat from the combustion zone to be transfer back into the combustion chambers along the expansion zone.

The G-Cycle engine is an automatic, dynamically balanced system that controls and maintains the thermodynamic heat transfer attributes across the combustion/expansion cycle to achieve maximum power and efficiency performance. The engine uses a larger combustion/expansion zone than the intake/compression zone where combustion gases can expand and perform maximum work until chamber pressures equal rotation friction losses. A sodium vapor chamber located along the combustion/expansion zone is used to ignite a hydrogen/water premix and remove excess combustion heat from the combustion zone and transfer it back into the combustion cavities of rotating chambers along the over-expanded expansion zone. Early stage water injection along the combustion/expansion path into the combustion chambers further absorbs excess combustion heat and heat from the sodium vapor chamber along the extended combustion/expansion zone. Late stage water injection along the combustion/expansion lowers combustion gas temperatures to minimize exhaust heat losses and cool the combustion chamber surface for the next intake cycle.

The water from the active cooling system is used in the early and late stage water injection into the combustion cavities. Heat absorbed into the active cooling system raises the water temperature to about 250 to 350 degrees C. or 523 to 623 degrees K. This temperature is just below water's vapor boiling point, and allows the water to be pumped at high pressure as a hydraulic liquid into the combustion cavities. With combustion temperatures around 1,800 degrees K., injecting water dramatically lowers the combustion gas temperature. This accelerates the heat transfer from the sodium vapor chamber back into the combustion chamber until temperature equilibrium is achieved.

The G-cycle engine has great potential to improve fuel economy and reduce exhaust emissions of the state-of-the-art Internal Combustion Engines (ICE). The great potential for fuel economy improvement comes from using otherwise wasted heat from the cylinder walls and exhaust gas to produce heated water and inject it into the cylinder where the heated water phase changes from a liquid to steam for additional expansion power. The cycle efficiency of the G-cycle engine is not limited to the Carnot cycle efficiency due to the fact that, in the G-cycle the mass of the working media to produce expansion power increases during the cycle, together with additional benefit of higher expansion ratio (generates power) than compression ratio (consumes power), while in the Carnot cycle the mass of the working medium and the compression ratio/expansion ratio is fixed. Also, the high cycle efficiency in the G-cycle engine does not rely on high combustion temperature (as the Carnot cycle recommends), but on shifting or transferring heat energy around the cycle. In this way the NOx/smoke/engine cycle efficiency trade-off barrier in a conventional ICE is a break through.

Not only does the G-Cycle utilize the entire combustion engine heat, but it also uses the mechanical friction heat that is captured in the cooling system and transferred back into the combustion chamber, resulting in a reversible energy system.

The following are the main G-cycle process events, as depicted in FIG. 71:

1. The rotor chamber rotates past the intake port where it takes a full charge of fresh air that is naturally aspirated or preferably turbo boosted.

2. Once the rotor chamber has passed the intake and reached its maximum intake charge, the housing geometry will begin to compress the intake air. A variable amount of heated water at about 250 C to 350 C or 523 K to 623 K from active cooling system is injected into the chamber cavity during the compression stage. This is the first variable water injection. The heated water is stratified in the combustion chamber along the sides and back half of the rotor chamber, increasing the effective chamber compression ratio. The heated water is considered an incompressible fluid, and the amount of heated water can be varied to control and adjust the chamber compression ratio. The rotor chamber is stratified with fresh air in the front half and injected water in the back half.

3. Heated hydrogen gas is directly injected into a rotor chamber cavity during the late stage compression. By using the direct injection of hydrogen into a rotor chamber cavity, the problem of pre-ignition knock is eliminated. The hydrogen is less dense than the air and water mass and will tend to stratify near the font half of the rotor chamber keeping a relatively homogenous concentration of hydrogen that is easily mixed with fresh intake air that is also stratified toward the front half of the chamber. The generating of a homogeneous hydrogen/air concentration mixture is easily ignited.

4. A spark plug can ignite the hydrogen, or, depending on the effective compression ratio, controlled auto-ignition can occur. The hydrogen auto-ignition temperature is 585 C or 858 K.

5. As the rotor chamber rotates past top dead center (TDC), combustion heat above 600 C or 873 K passes through a peroskvite thermal barrier coating (TBC) protection on the inner surface of the outer stator housing and is transferred into the Sodium Vapor Chamber (SVC). The peroskvite TBC protects the housing from constant combustion ignition at 1,800 K. The sodium in the SVC changes phase from a liquid to a gas and flows along the expansion path.

6. The surface temperature of the of the peroskvite TBC can match the peak gas temperature of 1,800 K. This high temperature surface area is well above the hydrogen autoignition temperature of 585 C or 858 K and will further improve the complete combustion reaction.

7. A second water injection of heated water at about 250 C to 350 C or 523 K to 623 K from active cooling system is injected into early-stage of combustion/expansion reaction to partially quench or cool combustion reaction to control the peak temperature at about 1,800 K and lower the chamber gas and water temperature to about 600 C or 783 K temperature to accelerate the heat transfer from higher temperature sodium vapor chamber back into the rotor chambers along the expansion path. The heated water will change phase from a liquid to a super heated steam vapor that greatly expands increasing the chamber's mean effective pressure (MEP) to perform work.

8. The Sodium Vapor Chamber will continue to transfer heat back into the rotating chambers keeping the chamber temperature at about 600 C or 873 K. As the rotor chambers gases and water cool, centrifugal forces will force cooler and heavier water droplets against the outer housing surface wall that will help to absorb heat from the SVC and accelerate heat transfer back into the rotor chamber from the SVC and further maintain high vapor pressure and MEP for performing work.

9. In the third water injection cooler, water from the active cooling system at 30 C or 303 K is injected into late-stage combustion/expansion just before the exhaust port to cool combustion reaction and combustion chamber rotor, vane, and seal components and to prevent thermal throttling on the next intake charge. The cool water helps increase chamber vapor pressure and density. The cool water also helps to condense the water vapor, making it easier to recover.

10. High pressure, high velocity, lower temperature, and water dense exhaust gases then go through a variable geometry turbo charger turbine and drive an intake compressor.

11. Water from the exhaust is condensed, filtered, and re-circulated back into the active cooling system.

Low Heat Loss Thermal Management

In the G-Cycle engine the heat sink is sent to the sodium vapor chamber and active cooling system with early and late stage water injection. These systems are reversible and capable of recycling heat flows back into engine chambers to improve the thermodynamic efficiency. Water from the active cooling system that would normally have no exergy value or ability to perform work is injected back into the engine chamber where it can perform positive exergy work. Heat absorbed into the SVC is deabsorbed or transferred back into the engine chambers to perform exergy work. Heat from both the active water cooling system and SVC will interact synergistically and can transfer heat to and from each other's system. This allows a large portion of heat to be continually transferred back through the engine to provide positive exergy work benefit. Albeit, some portion of heat is lost during each transfer.

It is quite easy to reduce the combustion gas temperature by regulating the amount of water injected back into the rotor combustion chamber. The key is to balance the water injection to also maximize the engine's work and enthalpy in the chamber and engine system. If too much water is added, the reaction will quench or cool too early and not have enough enthalpy to exhaust the airflow properly. If too little water is injected, all the heat potential will not be recovered and may have high exhaust heat losses and/or cooling heat losses.

Sodium Vapor Chamber and Heat Transfer

In the G-cycle engine, a Sodium Vapor Chamber (SVC) works like a two phase heat pipe, absorbing heat from the hot zone of combustion and transferring it back to the rotating chambers during the expansion stroke.

The SVC uses sodium as a working fluid. Heat released by the engine combustion is transferred into the evaporator zone of the SVC, where the liquid sodium absorbs the transferred heat and changes phase from a liquid to gas vapor. The sodium gas vapor then moves at sonic speeds along the SVC towards the condenser zone where the sodium gas transfers its heat back into the rotating combustion chambers along the expansion zone and the sodium changes phase from a gas vapor to a liquid. A series of wicking meshes provide capillary activity to evenly wick the liquid sodium back up towards the SVC evaporator zone where the sodium is evaporated again and the cycle is repeated.

There is a heat flow lag in the time that the heat is absorbed into the active cooling and sodium vapor chamber system and the time that it is transferred back into the engine's expansion cycle. However, this lag is insignificant to the working G-Cycle due to the continuous heat flows. The lag is only apparent during startup when combustion heat is primarily be absorbed into the SVC and active cooling system to charge them up to their operating temperature ranges.

As the engine changes rpm speeds, the transient heat loading proportionally changes. This changes the heat transfer lag ratio with the rotation chambers. However, the SVC is a self balancing system that automatically adjusts to higher load conditions. As rpm speeds increase, the thermal heat transfer loading into the SVC increases and the rotor motion also increases the lag potential to transfer the heat back to the rotor chambers. The higher the SVC sodium temperature the larger the temperature differential from the hot sodium evaporator zone to the condenser zone. This increases the heat transfer inside the SVC. As combustion heat loading continues, the SVC average operating temperature of both the evaporator and condenser zones may increase. This results in a condition where there is a larger temperature differential between the SVC and rotating chambers along the expansion path so that more heat is transferred back at much higher rates. Also at higher rpm there is a shorter duration of heat transfer to and from the SVC. This will limit excessive heat loading into the SVC.

Sodium is highly reactive with water and can generate heated hydrogen gas that can ignite. To reduce sodium water interaction and reaction: first, the amount of sodium is kept relatively small to do limited damage, even with very large sized engines; second, the engine cover is made from a super alloy material that is very strong so as to not rupture easily; third, curvature of the SVC cover geometry design also provides tremendous strength to transfer impact forces to prevent rupture; fourth, the outer cover is further protected by a very thick layer of metal foam insulation or blanket material that also protects the sodium vapor chamber from impact; fifth, an internal SVC pressure regulator system is used that helps optimize the internal sodium operation heat flows, absorb high impact pressures, and reduce the chance of a rupture; and sixth, in the case of a rupture, the sodium water interaction is typically very localized and the reaction speed slow so there is some fire potential, but not necessarily an explosion that would result in metal flying.

Outer SVC Insulation Cover

The outer SVC surface is covered with an Insulation cover that helps reduce heat losses through the SVC to the ambient environment. The insulation cover also helps significantly reduce the G-cycle engines noise level. The insulation cover can be made from an insulation blanket of ceramic materials or foam metal or ceramic materials. These materials also greatly protect the SVC from impact damage from an accident that might rupture the SVC.

Alkali Metal Thermal Electrical Converter

It is yet a further object of the present invention to provide a direct source of electricity. The present invention provides sodium vapor chamber systems for removing excess heat from along the combustion zone and transferring it along the expansion zone. The circulation heat transfer profile of the sodium working fluid is identical for using an alkali metal thermal electrical converter (AMTEC) to generate electricity. The AMTEC uses sodium as a working fluid that is heated and pressurized against a beta alumina solid electrode (BASE) where the sodium is converted from a liquid to gas and the ions of the sodium pass through the BASE generating electricity.

Rotor Cooling

The rotor surface is covered with a defect cluster TBC that is capable of operating at up to 1,400 C. The TBC helps protect the rotor from combustion heat damage and minimizes surface heat transfer into the rotor. Heat from the rotor chamber that passes through the rotor's TBC will be absorbed into a water vapor chamber located underneath the rotor surface. The rotor's top water vapor chamber is an evaporator zone where water working fluid changes phase from a liquid to a gas and transfers the heat inside the water vapor chamber to condensers located at both sides of the rotor. An active water cooling system sprays water across the rotor condensers as the rotor rotates to absorb the condenser heat, whereby the rotor vapor chamber water cools and changes phase from a gas to a liquid and is then re-circulated back towards the evaporator zone by high-G centrifugal forces. The rotor water vapor chamber also helps isothermalize the heat distribution across the entire rotor surface. This helps to improve even combustion throughout the chamber and prevent thermal hot spots and deformations in the rotor structure.

High Brake Thermodynamic Efficiency

Because of its sodium vapor heat transfer, water injection, and extended expansion stroke, the G-cycle engine can achieve higher brake thermodynamic efficiency. Heat that might be lost to the housing and cooling system is recovered from the sodium vapor chamber system. Heat that is transferred into the active cooling system is recycled back into the combustion/expansion cycle. The expanded combustion/expansion chamber with water injection allows for maximum amount of combustion heat to be converted into MEP and work, reducing the exhaust temperature losses. Friction losses from compression stroke and heat from the sliding vanes and rotor are captured in the water of the active cooling system and injected back into the combustion chambers and operation cycle. Using the whole engine as the cycle reduces overall heat loses from combustion, heat transfer cooling, exhaust, and friction that boosts maximum power and brake thermodynamic efficiency to levels reaching 65-80%.

The G-Cycle can be adapted for use with Wankel and other rotary engines, but the preferred embodiment is specifically designed for the present invention G-Cycle engine having a number of unique mechanical systems designed to optimize the thermodynamic and mechanical operation of the G-Cycle.

High Balanced Power Density

It is a further object of the present invention to provide a better balanced power distribution that also has higher engine power to volume and weight performance.

An object of this engine is to optimize each of the four engine cycle strokes and synthesize their operation into a completely integrated engine system achieving high engine efficiency, as well as, high power to engine volume and mass weight density. The preferred engine configuration is a rotary vane type engine wherein the rotor is centered on the drive shaft. The rotary style engine is ideal in that it can separate each of the four engine cycles independently. It also allows all the combustion and mechanical forces to work continuously and be aligned to rotate in only one direction as opposed to reciprocating engines. This creates a smoother, more balanced rotation with less vibration and stress forces. The chambers used in the engine of the present invention are relatively smaller, which allows the combustion reaction to be better controlled so that the engine can operate smoothly with just one rotor.

The engine can also have a variable number of rotors linked onto the same driveshaft to increase the engine system's overall power capability. The number of rotors is limited to the length and strength of the driveshaft to handle all the rotors' operational loads. The engine of the present invention can also have six, eight, nine or twelve combustion chambers. However, the preferred embodiment is an eight-chambered engine. With six, eight, nine, twelve or more chambers, depending on engine scale per 360 degrees CA rotation, the engine can generate very high displacement power and torque within a small engine volume and mass weight.

For example, for an engine with eight combustion chambers in the rotor, the engine will provide eight power pulses per 360 degrees crank rotation.

Variable Water Injection Compression Ratio

Although the use of a SVC in the hydrogen G-cycle engine would allow a combustion cavity to be completely eliminated from the engine, such a cavity does help control hydrogen and water stratification properties to improve ignition and generate turbulence for enhanced combustion reaction mixing. However, the use of a combustion cavity recess generates more chamber volume that negatively impacts the chamber compression ratio by adding chamber volume that can not be easily compressed based on the rotor geometry interaction with the outer housing stator surface. In the G-cycle engine, the water injection is geometrically separated from the fuel injection. Two water injections are located earlier in the compression stroke at the point when a trailing rotor chamber vane clears the intake port. This allows for a full charge of fresh intake air before water injections occurs. At this point heated water from the active cooling system is injected into the rotor chamber by two water injectors on the sides of the rotor stator housing. The water injection is directed forward with the direction of rotor rotation with each injector injecting water on each side of the rotor and rotor chamber near the axial seals. The water temperature is 250 to 350 degrees C. near vapor point. As the rotor revolves in the inner housing stator the injected water stratifies into the back half of the rotor chamber from centrifugal and inertia forces. The rotor chamber is then stratified with fresh air in the front half and injected water in the back half. At this point, the water is treated as an incompressible fluid and greatly reduces the effective chamber volume. The hydrogen fuel is then directly injected into the center front half of the rotor chamber. The added water helps control the peak combustion temperature and also increases the effective compression ratio to helps ignite the fuel. The stratification of the water and fuel in the chamber also helps the fuel to ignite faster without water dilution improving the combustion performance. The water and fuel stratification also keeps the combustion reaction in the front section of the rotor chamber. This further improves the forward leveraging of the combustion forces. Without this stratification the fuel would also tend to stratify in the chamber toward the back half of the rotor chamber, minimizing the desired combustion vectored forces. Once the hydrogen fuel is ignited, a very small amount of combustion heat is needed to vaporize the water into super heated steam. This super heated steam flashes forward in the direction of rotation with very strong blast motion generating tremendous chamber turbulence to mix with the combusting fuel. This superheated highly turbulent fuel/water reaction then passes over the combustion surface of the sodium vapor chamber with a surface temperature of 1,800 K or 1,526 degrees C. This geometric section of the G-cycle engine has a very high housing surface area to chamber volume and helps to improve the combustion rate and complete combustion of the fuel. The amount of water injected into the compression stroke can be varied to change the effective compression ratio to optimize engine performance and efficiency under different rpm conditions.

For example a geometric intake volume of 400 cc could compress down to 40 cc with a compression ratio of 10:1. However, if 20 cc of incompressible water is injected the effective gas compression volume is 20 cc with a 20:1 compression ratio. The amount of water can be regulated to adjust the effective compression ratio to ideal engine operating conditions.

Combustion Losses Reversed

The compression ratio is adjusted so that the hydrogen/water/air premix temperature is very close to 585 degrees C., i.e., the auto-ignition temperature. Hydrogen is a very diffuse fuel and quickly forms a homogeneous charge with the water. Heat from the sodium vapor chamber ignites the hydrogen/water/air mixture. By using the housing surface area to ignite the mixture, the whole combustion chamber is ignited simultaneously. Little combustion energy is lost due to the hydrogen/water/air premix temperature being in equilibrium with the auto-ignition temperature. Since the entire housing is used to ignite the mixture there is very little combustion energy lost from flame front exchange with unreacted fuel and air. Since the combustion mixture is only hydrogen, water, and air the products and reactants are limited to just these elements. This reduces the combustion kinetic energy losses associated with breaking the molecular bonds of larger hydrocarbon chained fuels. With a homogeneous hydrogen/water/air mixture the water in close proximity to the hydrogen and will help to restrain the combustion reaction converting the heat energy into high vapor pressure energized energy to perform work.

Heating the water vapor in the combustion reaction is a more reversible reaction where the combustion heat can be transferred or conducted between other water molecules with little energy destruction.

Improved Hydrogen Fuel Delivery

It is a further object of the present invention to provide improved hydrogen fuel delivery and ignition performance over existing engines. The G-cycle engine not only utilizes and recycles all the combustion reaction heat, but it also uses an active water cooling system that captures heat from the engine's mechanical friction, cycle compression, and exhaust gas flow. Heated water from the active cooling system is used to premix with the hydrogen gas before injection, early and late stage water injection into the combustion/expansion zones. Compressed hydrogen storage systems are using tanks capable of 10,000 to 15,000 psi pressures. The G-cycle engine uses regulators to pressure inject the hydrogen into the rotating combustion cavities. When a compressed gas goes from high pressure to low pressure there is a heat is absorbed from gas expansion. If the pressure difference and rate of gas usage is high enough, it can result in icing and the regulators and system failure. The G-cycle engine uses heated water from the active cooling system premixed with the hydrogen gas before it enters the engine's combustion chamber, and supply heat needed in the gas expansion to prevent the regulators from icing. With hydrogen having a high auto-ignition temperature of 585 degrees C. it is important to quickly raise its temperature higher for proper combustion.

High Compression

It is also a further object of the present invention to provide an engine with a higher operating intake compression. Hydrogen is capable of very high compression ratios that can be as high as 33:1. By premixing hydrogen with water, the engine of the present invention can produce higher compression ratios of >14:1, with reduced potential for the occurrence of knock or pre-ignition. The present invention uses a compression ratio that brings the hydrogen/water/air premix up to a temperature close to 585 degrees C., near the autoignition temperature. This combustion equilibrium helps reduce kinetic combustion reaction heat losses to ignite the fuel premix.

Wider Fuel/Air Equivalence Operating Range

It is a further object of the present invention to provide a hydrogen engine that is capable of operating successfully with a wider range of Phi fuel to air mixtures that can be adjusted from very lean to stoichiometric or (>=0.4 to <=1.0) to optimize the combustion reaction for high fuel efficiency or high power performance. The hyrdrogen and intake air are concentrated together for excellent ignition even at low equivalence ratios. The water injection can create high compression which can improve ignition performance. The high temperature of the inner stator surface will further improve lean fuel mixture ignition and complete combustion.

Lower NOx Emissions

It is a further object of the present invention to provide improved lower NOx emissions with higher power output performance over existing internal combustion engines. Premixing the hydrogen with water dilutes the fuel mixture and reduces and control the peak temperature to about 1,800 degrees K., at which very little NOx emissions are formed.

Hydrogen Ignition, Combustion Duration, and Mean Effective Pressure

It is another further object of the present invention to provide an ignition system that uses less electrical energy and provides more instantaneous and complete combustion over existing engine systems.

It is a further object of the present invention to provide a combustion reaction that improves the complete combustion performance, improves the combustion reaction turbulence, improves combustion reaction rate, and increase combustion duration over existing internal combustion engines.

It is a further object of the present invention to provide a combustion cycle with a higher mean effective pressure (MEP) over existing engine systems.

Hydrogen has a low quenching threshold and the combustion reaction will quench or go out if it loses too much heat through the housing surface area. The rotary vane engine of the present invention is designed with an expanded combustion/expansion zone that results in a combustion cavity with a high surface to volume ratio. In typical engines this will generate high combustion heat loses through the housing surface resulting in combustion reaction quenching with incomplete combustion, poor fuel efficiency, and pure fuel emissions. In the engine of the present invention, a high surface area to volume is a great benefit due to the integration of the sodium vapor chamber along the combustion/expansion zone. One or two spark plugs ignite the hydrogen/air/water premix during startup. Once the engine surfaces have reached operating temperature, the spark plugs are turned off to save electrical power, and the heat from the sodium vapor chamber through the inner housing surface is used to ignite the fuel mixture. Hydrogen has an auto-ignition temperature of 585 degrees C. and the sodium vapor chamber has an operational temperature of 600 degrees C. Once the hydrogen/air/water premix rotates into combustion/expansion zone where the sodium vapor chamber is, it will instantly ignite the fuel mixture. The high surface to volume ratio also creates high gas turbulence due to shearing forces with the inner housing stator surface. This results in further improved complete combustion performance and heat transfer with the sodium vapor chamber. The water vapor has a higher density than air and with high rotation centrifugal forces tend to migrate along the surface of the inner housing stator where the sodium vapor chamber resides. The water moving along the high surface area of the inner housing stator improves the heat transfer from the sodium vapor chamber into the combustion cavities. This also continues to maintain the high water vapor pressures and MEP work across the entire length of the expanded combustion/expansion zone. The high water vapor pressure also helps prevent hydrogen from penetrating behind the sealing system into the internal compartment of the engine.

Combustion Chamber Sealing System

It is also an object of the present invention to provide a means for sealing the combustion chambers of rotary vane internal combustion engines that achieves increased sealing performance, decreased frictional wear, decreased frictional heat buildup, and increased strength and durability over existing seals.

It is a further object of the present invention to provide a combustion chamber seal that reacts with the thermal deformation size changes of the inner housing stator, utilizes combustion chamber gases to maintain sealing forces, reacts quickly to air/gas pressures, and independently maintains ideal front and back combustion chamber sealing under different dynamic combustion chamber forces to provide improved sealing performance over existing seals.

It is a further object of the present invention to provide an improved combustion chamber sealing interface system that provides improved sealing interfaces between the sliding split vane seals, axial seals, and vane face seals over existing seals.

It is a further object of the present invention to provide an improved combustion chamber seal that reduces vane flexing deformation over existing seals.

It is a further object of the present invention to provide an improved combustion chamber seal that minimizes seal chattering mark damage to inner housing stator surface and decreases operational vibrations and harshness stresses over existing seals.

It is a further object of the present invention to provide an improved combustion chamber seal that creates combustion chamber gas turbulence to improve combustion reactions over existing seals.

Combustion chamber sealing is an important aspect of the present invention. The sliding vanes must sustain high compression and combustion pressure to prevent leaking through their forward and backward flexing deformations through all the cycles. Sealing friction also plays a critical role in the engine efficiency of the present invention. However, creating more sealing force usually also generates higher frictional energy losses and wear. The design of the combustion chamber sealing solves complex geometric surface interfaces associated with continuous varying chamber sizes. The combustion chamber sealing system is made up of three main sealing subsystems: seals between the sliding vane and the engine housing, between the sliding vane and the rotor, and between the rotor and the engine housing. The quality of this sealing system is essential to the engine power, efficiency, durability, and emissions.

The G-cycle engine system uses a special vane split seal system where each vane contains two split seals. Rotation centrifugal forces and gas pressure helps to force the seal against the inner housing stator surface. Each vane split seal has gas passage perforations that allow small amounts of gas to penetrate underneath the seals to force the seals outward against the inner housing stator surface. The gas loading of the vane seals allows the sealing force from each chamber to balance the sealing forces without generating excess friction. Using two seals per each vane provides a double sealing system that further reduces chamber blow-by losses. However, chamber blow-by between chambers is not parasitic to the engine cycle. Any gas blow-by that occurs will still be used positively in that chamber.

The Vane split seals are interfaced by vane face curved seals that seal between the vane face surface and the rotor and side axial seals that seal between the rotor and side housing. All together, the vane split seals, face seals, and axial seals seal each of the rotor chambers.

The vane face and axial seals are also preloaded with a corrugated spring. Once the engine begins operation chamber gases will also pressurize the seals. The vane face and axial seals also contain a small seal strip along their sealing surfaces. Any strong combustion vibrations that vibrate these seals may result in gas leaks. These small seal strips will provide additional sealing protection.

Split Vane Seals

In further accordance with the aforementioned objectives, the present invention provides split vane seals slidably fastened along the outer perimeters of generally semi-circular U-shaped sliding vanes within a rotary vane internal combustion engine. Each split vane seal contains two vane seals that are contoured to maximize the surface area contact with the inner surface of the stator housing of the engine. The large contoured surface of each seal ring provides a larger surface area of contact sealing versus existing thin edged apex seal systems. Thus, it provides better sealing performance under high combustion pressures and rotation speeds. The large contoured surface of each vane seal also distributes the sealing contact forces across the entire front, top, and back surfaces of each vane seal as the split vane seal sweeps around the inner surface of the stator. This distribution of sealing contact forces minimizes the constant friction wear at any one point and helps to greatly extend the life span, durability, and sealing performance of the vane seals.

It is a further object of the present invention to provide vane seals that toggle back and forth to provide optimum sealing contact with the changing surface contact angles of the inner housing stator.

The toggling motion of each vane seal is facilitated by roller bearings located inside vane bearing channels sandwiched between the two vane seals within each split vane seal, as well as between each vane seal and its adjacent section of rotor. These small roller bearings embedded in the inner and outer surfaces of the vane seals help toggle the vane seals back and forth as they rotate around inside the stator.

Snub Nose Seal Tip

A vane seal tip includes a snub nose tip that provides a small contoured rounded tip on the top of the vane seal that can slide smoothly across profile the inner housing stator surface. The small snub nose tip is more concentrated like a piston ring to minimize excessive surface sealing contact. During combustion large stress and vibration forces are created. The seal gas passages will help absorb and compensate for these forces. However, the snub nose seal may be vibrated off the inner housing stator surface. This action may result in chattering mark damage to the stator surface. However, by making the snub nose seal slightly wider the impact forces will be distributed over a slightly larger surface area and will be less likely to result in chattering mark damage. The snub nose tip is also coated with oxide lubricant and the rest of the extended seal tip surface is coated with a thermal barrier coating. Another advantage of the snub nose seal tip is that it can transition from the top center of the vane to the outer sides of the lower section vane section that make for an ideal flat contact interface surface with the axial and vane face seals.

Extended Tip edge

Additionally, the side surfaces of each vane split seal edge flares out or extend near the top, providing a surface for the combustion gases to push each vane seal outward toward the inner surface of the stator. This extended tip will act as a steel "I" beam vane tip structure reinforcement to help prevent the vane seal from twisting or deforming as it rotates around the inner housing stator profile and is influenced by combustion forces.

Vane Seal Gas Passages

Each of the vane seals will ride over the top of a vane ridge that helps prevent each vane seal from torquing out of position as it moves across the inner housing stator surface. Each vane seal can also move in and out perpendicularly to the axis of the rotor along the sides of each sliding vane in a toggling motion. This provides improved surface contact with the inner housing stator surface as it moves around the inner housing stator surface with a changing point of contact. As the vane seals toggle in and out on top of each sliding vane, gas passage channels located within each vane seal allow gas from combustion chambers to flow underneath portions of each vane seal over the vane ridge, thereby forcing each vane seal into closer contact with the inner surface of the stator, as well as, balancing the needed sealing forces with the combustion chamber's gas pressure. A vane ridge spring seal will be placed near the bottom of the lower seal side section to help maintain proper gas passage pressures and prevent gas from leaking out the bottom of the vane seal.

Dynamic Axial Split Vane Seals

Another dynamic aspect of the vane seal is that it is split into an upper semi-circular center section and two lower straight side segments, with each side segment having the freedom of motion in particular directions such that the combustion chambers remain tightly sealed. Both segments are free to move in and out radially along the plane of rotation of the rotor. The lower side segments are also free to move in and out axially, in a direction somewhat parallel to the axis of the rotor. A small gas channel runs down the inside of each of the lower side segments. The gas channels connect with the gas passages in the upper semi-circular center section. Gas from the combustion chamber goes through the vane seal gas passage to help pressure equalize sealing radially along the inner housing surface. The gas then flows along the lower side gas channels to pressure equalize sealing axially along the side inner housing stator surfaces. A gas channel spring seal helps to maintain proper gas channel pressures and prevent gases from leaking out the bottom of the vane seal. The dynamic motion of the center and side vane seal segments provides additional sealing range of motion and ability to react to thermal expansion changes of a thermally unsymmetrical housing profile. These novel designs provide the means to effectively seal each combustion chamber.

Dynamic Rotor Axial Seals

Dynamic rotor axial seals seal along the side of the rotor and the inner housing stator surface. Each dynamic rotor axial seal comprises a major axial seal and a minor seal strip that resides in a small groove in the major axial seal along the sealing contact surface with the inner housing stator. The major axial seal is split into a center section and two end sections. They are interfaced together along an angled surface where the center axial seal section uses a tongue extension and the end axial sections use a grooved recess. The center axial seal section is biased outward from the rotor by combustion chamber gas pressure and a corrugated spring to make sealing contact with the inner housing stator surface. As the gas pressure and corrugated spring bias the major seal outward they also bias the axial end segments outward or coradially to apply sealing pressure both on the inner housing stator surface and on the lower section of the sliding vane seal. A small minor seal strip fits into a small groove running across the face of the major axial center and end segments. The minor seal strip provides a continuous sealing surface across the major axial seal segments and helps prevent any gas blow-by around the major axial seal. The sealing face surfaces of the major axial seals are coated with a solid lubricant to reduce friction and sealing wear.

Vane Face Seals

In further accordance with the aforementioned objectives, the present invention provides vane face seals that create a tight seal between the rotor and the face of each sliding vane, as well as provide support to the major axial end seals. The vane face seals are structured as a two stage combined major seal and minor seal strip. The major vane face seals are biased outward against the vane face surface from combustion chamber gas pressure and a corrugated spring located behind them to press the major seal. The minor seal strip provides a continuous sealing surface across the major vane face seal segments and helps prevent any gas blow-by past the major vane face seal. The sealing face surface of the major vane face seal are coated with a solid lubricant to reduce friction and sealing wear.

Vane Structure

It is a further object of the present invention to provide a lighter and stronger vane structure that is less susceptible to thermal stresses and mechanical deformations.

The radial inner housing stator, rotor, and vanes use a semi-circular geometric profile instead of typical square geometric profile. This allows the vane to extend from the rotor and have the rotor provide strong support to the center of the vane that matches the semi-circular curvature profile of the vane. This provides excellent support for the perimeter of the vane where the seals press against the inner housing stator surface. This rotor support on the vane helps minimize vane and seal deformations from combustion and sealing forces.

Reducing the vane's mass greatly reduces the centrifugal sliding forces along the inner housing stator that can result in deformations. The shape of the vane is an inverted U-shaped structure with a semi-circular top edge where the vane seals reside for sealing along the inner housing stator surface. The center of the vane is cut out with just a vertical and horizontal interfaced support cross bar. Large holes are placed in the horizontal support bar section to further reduce the material mass of the vane.

The vane is preferably made from a high strength light weight material that is also high temperature resistant, like Haynes 230. The front and back face of the vane are preferably coated with a thermal barrier coating to prevent thermal damage to the vane structure that could result in excessive thermal expansion or deformation.

Vane Heat Pipe Cooling/Heat Transfer

The vanes also contain a heat pipe channel system underneath the perimeter seal surface. The heat pipe channel is preferably an upside down U-shaped like the vane profile and preferably uses water as the working fluid. The heat pipe operates primarily by high-G centrifugal forces. The centrifugal forces cause the water to move toward the tip of the vane underneath the seals in the evaporator zone. Heat from the seals is transferred into the heat pipe channel and the water is heated and changes phase from a liquid to a gas. The gas then flows through he heat pipe channel to one of the two side ends where it transfers the heat into the condensers and changes phase again from a gas to a liquid. The liquid then circulates back to the tip of the vane or the evaporator zone to start the cycle again. The active cooling system sprays water into the rotor and across the outer vane condensers to transfer the vane's heat into the water of the active cooling system. The heated water is then injected and recycled back into the engine cycle. A porous upside down U-shaped wick structure is preferably in the heat pipe channel to help wick or transfer the water and gas inside the heat pipe and also provide cold temperature protection of water expansion from freezing. The vane heat pipe channel greatly reduces the temperature of the vane and seal structures, allowing them to maintain their structural integrity and optimum performance.

Vane Anti-Centrifugal Belting System

In yet further accordance with the aforementioned objectives, the present invention provides vane anti-centrifugal systems to decrease friction generated between the split vane seals on the sliding vanes and the inner surface of the stator. The vane centripetal force systems include a vane belt system that applies centripetal force to counteract the centrifugal force generated by the rapidly rotating sliding vanes. Arched vane belt plates may be used to reduce stresses on the vane belts.

It is a further object of the present invention to provide an improved sliding vane anti-centrifugal force belting system having increased operational range of movement and increased range of operational rpm speed over existing vane centripetal systems.

It is a further object of the present invention to provide an improved sliding vane anti-centrifugal force belting system having decreased frictional wear, decreased frictional heat buildup, and decreased operational vibrations, and improved strength and durability over existing sliding vane centripetal systems.

As the vanes rotate around the inner housing stator centrifugal forces force the vanes and seals against the inner housing stator surface. As rpm speeds increase the centrifugal forces magnify and result in high friction forces that are so large that the friction forces may equal or become bigger than the combustion chamber pressure forces that drive the engine. This condition greatly limits the engine's power density and brake thermal efficiency. There are a number of ways to counter vane centrifugal friction. One way is to reduce the mass weight of the vane and seals. This reduces the overall force loading of the centrifugal forces. Another way is to use rings and connecting rods that connect the vanes to the main driveshaft. This allows the vanes to rotate at a fixed or constant distance from the inner housing stator surface. This method helps solve the vane and seal centrifugal friction problem but only works with oval shaped inner housing stator geometrical profiles. This limits the combustion/expansion duration to only 90 degrees CA rotation from TDC ignition. Another method uses a rhombic linkage that is connected to the bottoms of the vanes. The advantage of the rhombic linkage system is that the vane and seal centrifugal forces are transformed to centripetal forces through the linkage to balance or offset the centrifugal forces. The rhombic linkage operates like a scissoring system that automatically adjusts as the vanes rotate around the inner housing stator profile. As two opposite vanes follow the profile and extend outward they cause the other two vanes to retract inward. The problem with the rhombic linkage is again the inner housing stator must be have an oval profile resulting in only 90 degrees of combustion/expansion duration. The rhombic linkage also uses a large number of pins and links that are prone to friction and wear. They also can not be adjusted or re-tensioned when wear occurs resulting in system failure. Another method is to add large cams to the bottoms of the vanes and cut a cam groove in the inner housing that follows the rotation profile. The centrifugal friction is transferred from the tips of the vanes and seals to the cams in the cam channel. The vane cams and cam channel are well oil lubricated and can even use elaborate roller bearing systems. This allows the vanes to use an extended geometry profile with combustion/expansion duration larger than 90 degrees CA from TDC. The problem with this system is that it is difficult to seal and oil the cam channel. This cam channel system also does not allow for any type of adjustments, due to system wear. It only slightly improves the centrifugal friction problem by transferring the load forces to a cam and cam channel that are designed to lower the high friction loads. The vane cam adds mass weight to the vane and additional friction in the cam channel that offset the friction levels they were trying to reduce.

The vane and seal anti-centrifugal system of the present invention uses a series of belts that are connected to a toggling system attached to the bottom of each of the vanes. Two series of belts are formed where the two belts are split between alternating vanes. One belt runs along the radial center of the engine and around the driveshaft and the other belt is spit in half and runs on the outside of the center belt. Each of the outer belts is one half the width of the center belt. The operation of the belt system works similarly to the string/finger cat's cradle game where players use a string loop to make creative string shapes by distorting the loop with their fingers. To keep the creative string shape, the players must use both hands and pull them apart to apply tension on the string. The players can change sting shape or position by adjusting the string with their fingers, but must maintain a constant tension to the string with all fingers. The present invention operates in a similar way. In an eight vane engine system, four alternating vanes are connected to the center belt system, and four vanes are connected to the outer belt system. In each belt system, as two vanes follow the inner housing stator profile and begin to extend from the rotor's center they pull the other two vanes back into the rotor. This system also operates much like the rhombic linkage system by balancing the centrifugal vane and seal forces with centripetal forces of the other vanes and seals. The advantage of the present invention is that it also uses a vane belt toggling system and profile belt that allows the vanes and seals to follow asymmetrical inner housing profiles where the combustion/expansion is greater than 90 degrees CA from TDC. The toggles allow the vane segments to be extended or shortened to adjust to the inner housing profile distortions. A profile belting system is a third belting system comprised of two smaller belts that go on the outside perimeter of the two inner belting systems. The profile belting system connects both the center and outer belting system together as a unified system and acts like a dynamic cam channel to help keep the vanes and seals in proper position with the inner housing stator surface as they rotate around an asymmetrical or distorted oval inner housing stator profile. Another advantage of the proposed invention is that each of the vane toggle systems is connected to an adjustable tension bar that can adjust the belt tension from any system wear or belt stretching.

By using an active cooling system to spray water into the rotor center the temperature around the belting system can be maintained at around 100 degrees C. or 212 degrees F. At this temperature, a wide variety of different materials can be used as belting material. These materials include woven Nextel 610 and AGY's 933-S2 glass, fiberglass, carbon fibers, or stainless steel wire. The preferred belting material is high tensile strength fibers that are woven into flat belt segments and connected to the vane toggles. The vane belts will ride over belt arches located in between two connected vanes. The belt arches will contain roller bearings to further assist the movement of the belts across the vane arches. The roller bearings are also connected to a spring system that compresses at high rpm speeds greater than 1,000 rpm. At these speeds, the roller bearings break contact with the vane belts and the belts slide across small rounded surfaces of the belt arch that have been coated with a solid lubricant. The solid lubricant allows very high vane belt motion across the belt arch with very low friction and wear. The belts themselves can also be coated with a solid lubricant to further reduce friction and wear.

Rotor Structure

It is a further object of the present invention to provide an improved rotor structure that is lighter and stronger than other rotor systems.

The engine rotor is made up of eight or six segments depending on the size and engine configuration. The driveshaft preferably is octagon or hexagon in shape to match eight or six rotor segments, respectively. The bottom of each of the rotor segments preferably rests on one of the flat surfaces of the driveshaft. Round lock plates slide over each of the ends of the driveshaft and lock all the different rotor segments together to form a single rotor. The rotor preferably has a top semi-circular shape that matches the inner housing profile. The rotor top is connected to two side plates that make the rotor into an upside down U-shape like the vane and from a large open space under the rotor surface. The top semi-circular shape acts like a strong arch and provides great strength to the rotor and allows the large open space underneath. This reduces the weight of the engine and the material cost of manufacturing the rotor. It also provides space for the operation of the vane anti-centrifugal belting system to operate.

Combustion Cavity Vortex Turbulence

The combustion cavity forms a crescent shape and is narrower than typical combustion chambers. Hydrogen has a much higher flame speed than gasoline and diesel fuels. This generates surface shear with the chamber gases and water with the outer housing surface to generate mixing turbulence to improve flame front propagation throughout the entire chamber. With a high inner housing surface temperature the sear turbulence across this heated surface will further accelerate combustion and flame front propagation.

The combustion recess is primarily to slightly stratify the hydrogen and water. This helps provide a slight hydrogen homogeneous combustion section separate from the water that will be on the sides and back. The curvature of the combustion recess also helps generate chamber turbulence to improve hydrogen combustion and then mixing with water.

Once the hydrogen is ignited in the front part of the chamber, the water is stratified towards the back section of the chamber. As the rotor rotates through 90 CA degrees TDC, the curvature of the combustion recess allows the water to squish and squirt through this compression point more easily and smoothly without being in a compression locked position in the back of the chamber. The water is also traveling forward at high velocity to improve gas turbulence and mix with the combusting hydrogen.

Rotor Thermal Control and Water Vapor Chamber Cooling/Heat Transfer

A further object of the present invention is to minimize heat penetration into the rotor and to provide an improved rotor cooling system to remove any such heat penetration.

The top surface of the rotor and the surface of the three combustion cavity recesses are preferably coated with a thermal barrier coating (TBC) like yttrium stabilized zirconium YSZ. The TBC prevents heat due to combustion from penetrating the rotor surface and into inner rotor components. A water vapor chamber located underneath the rotor surface captures any heat that passes through the surface TBC and penetrates into the rotor. The rotor water vapor chamber helps isothermalize the surface to the rotor and provide a more uniform heat distribution across the surface to help stabilize the combustion reaction. The rotor vapor chamber operates similarly to the vane heat pipe system. The rotor vapor chamber uses water as a working fluid up to a temperature of 202 degrees C. The vapor chamber is a gravity circulation system that uses high G-rotation forces to circulate the water between the evaporator section which is under the rotors outer combustion cavity surface and two side condensers. The rotor vapor chamber also uses preferably a fine and coarse layer of wicking mesh to improve water distribution across the entire surface area of the rotor and improve water circulation between the evaporator and condenser. Two porous wick tubes are also placed in the rotor vapor chamber to improve working fluid circulation and help prevent water freezing expansion damage to the rotor and/or water vapor chamber. One porous wick wraps around the semi-circular section of the rotor axially from one side condenser to the other side condenser. The other porous wick runs across the center of the water vapor chamber radially. Water from the active cooling system is sprayed into the engine housing from both sides and across the rotor side condensers. Heat from the rotor water vapor chamber is transferred through the condenser in the water from the active cooling system. The heated water is then circulated out of the engine's housing and injected back into the combustion cavity or mixed with the hydrogen as premix.

Vane Tangential Bearing System

It is a further object of the present invention to provide an improved sliding vane tangential bearing system having increased operational speed, decreased frictional wear, decreased frictional heat buildup, and improved strength and durability over existing sliding vane tangential bearing systems.

In the rotor vane passage along the rotor face surface small raised zigzag surfaces preferably coated with an oxide lubricant are used to help the vanes slide against and transfer their captured combustion force into the rotor. The raised zigzag surfaces minimize contact surface area and the oxide lubricant minimizes sliding friction. The raised zigzag surfaces also act as small steam channels. Water from the inner rotor cooling system enters the zigzag channels and is converted into high pressure steam from the vanes as they are retracted back into the rotor through the vane passage. The steam creates pressure that forces some of the vane load off of the raised surface to minimize vane sliding friction. With the steam exerting pressure equally in all directions it also transfers some of the vane's combustion forces into the rotor to drive the engine. Small roller bearings located in recesses in the rotor vane passages transfer the vane's combustion forces into the rotor and minimize vane sliding friction. The roller bearings are primarily used during lower rpm operations at or less than 1,000 rpm. At higher rpm speeds, the roller bearings are connected to small bearing springs that compress due to rotation centrifugal forces, retracting the roller bearing into the rotor bearing passage. At this point, the vane is extending and retracting from the rotor so fast that the roller bearings would only be adding inertial friction and reducing the engine's efficiency. As the engine rpm speeds lower than 1,000 rpm, the roller bearing springs uncompress and press the roller bearing to make direct contact with the sliding vane surface and make positive efficiency benefits to reduce sliding vane friction and transferring vane combustion forces into the rotor.

It is a further object of the present invention to provide an improved sliding vane tangential bearing damping system having improved vibration absorption capacity over existing sliding vane tangential bearing damping systems.

The combination of the raised zigzag water/steam channels and roller bearings not only reduces the vane sliding friction and transfers vane combustion forces to the rotor, it also greatly reduces harsh vibrations from the combustion pulses and the vanes' extension and retraction motions. This minimizes NVH stresses to all the other engine components and improves engine operation and durability.

Engine Housing

As the engine of the present invention operates at much higher temperatures than standard engines, it incorporates the following unique combination of elements to minimize heat buildup in critical areas: oxide lubricants, thermal barrier coatings, vapor chamber systems, and an active water cooling system to efficiently transport excess heat for isothermalization of the outer engine housing. The engine housing and components are fabricated using high temperature alloys and thermal barrier coatings that are resistant to thermal stresses and deformations. The outer engine housing is preferably covered with a thick thermal blanket to minimize heat loss and reduce engine noise.

Distorted Oval Inner Housing Stator Geometry

It is a further object of the present invention to provide a geometry profile that maximizes or over-expands the combustion/expansion zone and minimizes the intake/compression zone, while achieving optimum thermodynamic cycle performance over existing engine systems.

It is a further object of the present invention to provide an improved inner housing stator geometry that minimizes vane and seal deformations over existing engine systems.

The present invention uses an inner housing stator geometry profile where the combustion/expansion zone gradually expands from TDC to a maximum size at about 145 crank angle degrees from TDC, which is also the end of expansion point. This provides 61% more combustion/expansion duration over existing rotary vane engines and allows more of the kinetic thermodynamic heat to be converted into mechanical work. The exhaust port will be located by the front chamber sliding vane when the same chamber's back vane reaches the end of expansion point. By having the combustion/expansion zone gradually expand it greatly reduces the combustion stresses on the vane and seal components. Just after the TDC location, the combustion forces and pressures are at their highest. At this location, the vanes and seals are recessed into the rotor so as to not be greatly exposed to the strong forces that can result in vane and seal deformation and damage. As the vanes rotate around the combustion/expansion zone, they gradually extend from the rotor to seal along the inner housing stator surface. The vanes reach their maximum extension from the rotor when they reach the end of expansion point. At this point the combustion chamber pressures are much less and the risk of vane and seal deformation is much lower. After the end of the expansion point, the inner housing geometry rapidly shrinks to improve exhaust scavenging. The exhaust ports are located radially along the engine's axis to allow the rotation centrifugal forces to be used to easily and completely exhaust the heavier water vapor gases through the exhaust port. There is a single combustion chamber length gap between the chamber's back vane by the exhaust port and the front vane by the intake port. The intake port is also located radially along the engine's axis to allow fresh intake air to enter directly into the rotating combustion chambers. During the intake stroke the front chamber vane will reach its maximum intake expansion point when the same chamber's back vane finishes passing through the intake port. Once this point is reached, the inner housing stator profile is quickly reduced along the compression zone. As the compression stroke starts, and combustion chamber pressures begin to rise, the vanes begin to retract back into the rotor. This helps minimize vane and seal deformations from compression forces.

Higher Housing Operation Temperatures

It is yet a further object of the present invention to provide a combustion reaction that operates at higher combustion operating temperatures over existing internal combustion engines. Although the combustion gas temperature of different engines may be similar to that in the engine of the present invention, the engine materials used need to be cooled to a temperature of 350 to 450 degrees F. This cooling results in about 27% of the thermodynamic heat from combustion being lost to the cooling system. Diesel engines lose only about 20% of their combustion heat to the cooling system due to a much larger cylinder volume to surface area ratio, and more of the combustion heat energy is converted into work. The engine of the present invention uses high temperature resistant alloys, like Haynes 230, that allow peak housing temperatures up to 900 degrees C. Nevertheless, housing expansion operating temperatures of around 600 degrees C. are used to optimize thermodynamic cycle performance with the sodium vapor chamber. At temperatures greater than 600 degrees C. there is a higher amount of heat transfer through the outer housing and sodium vapor chamber and potentially lost to the ambient environment. There is also a higher amount of thermal stress exerted into the engine housing and mechanical components that can result in thermal deformations, wear, and damage.

Solid Oxide and Superhard Nanocomposite Lubricants

It is yet a further object of the present invention to eliminate the use of oil lubrication and to completely make use of solid lubricants. Binary oxide lubricants, self lubricating solid lubricants, diamond like coatings, and near frictionless carbon coatings will be used on various engine components to reduce friction, improve component durability, and reduce HC emissions over engines using oil.

The G-cycle engine does not use oil lubricants. All of the seal contact surfaces are preferably coated with an oxide lubricant, such as Plasma Spray PS 304 developed at NASA Glenn. The PS 304 oxide lubricant provides the same level coefficient of friction as an oiled surface for temperatures of up to 900 degrees Celsius. Alternatively, a Superhard Nanocomposite (SHNC) lubricant coating being developed at Argonne National laboratory could be used. Both the PS 304 and SHNC offer low coefficient of friction, plus exceptional durability of millions of slides cycles.

Layers of either the PS 304 or SHNC are preferably plasma sprayed onto all of the sealing contact surfaces. For the vane split seals, a special thick later of PS 304 or SHNC is preferably build up to create a rounded snub nose seal surface. The outer surface of the vane split seals encounter the highest sealing and friction forces. This thicker rounded snub nose seal provides a concentrated seal surface to minimize friction and longer sealing operational performance against seal wear.

Active Water Cooling/Heat Transfer

It is a further object of the present invention to provide improved lower outer housing heat loss over existing internal combustion engines.

It is a further object of the present invention to provide improved rotor and vane cooling/heat transfer over existing internal combustion engine rotor cooling/heat transfer systems.

An active water cooling/heat transfer system is used to cool the outer housing from compression stroke, the main driveshaft bearing zone, and the inside of the engine housing for the rotor and vanes. Heat from compression and friction is transferred from these systems into the circulating water. The heated water injects the heat back into the reaction cycle for premix with hydrogen, and early and late state combustion/expansion zone injections. Heat that would have been lost to cooling system and friction, is about 20% and 10% percent respectively, is captured in the water and reused back in the engine cycle. This not only greatly improves the engine's brake thermal efficiency by about 30%, but the water adds a great amount of combustion chamber pressure by converting the heat into energized water vapor to improve the MEP work. The injected water also help reduce exhaust heat loses that are about 30%, cooling the combustion reaction from inside the combustion cavity results in low exhaust temperatures, but with very high velocity and high pressure. Water in the exhaust can be condensed and circulated back into the active cooling system of the engine.

Hydrogen Leaking

It is a further object of the present invention to reduce the ignition of hydrogen gas behind chamber seals in inner rotor component locations or venting out through the engine. Water from the active cooling system is sprayed into the center of the engine to cool the rotor and vanes. Much of this water is routed through zigzag cooling channels and underneath rotor seals. The water helps improve the sealing performance and prevent any hydrogen from passing by the seals. Any hydrogen that does pass by the seals is diluted by the water and collected by the active cooling system and removed from the engine in a closed loop system. Any hydrogen gas collected is used again by injecting it back into the chambers with the water injection.

Reduced NVH

It is a further object of the present invention to provide a combustion reaction that reduces the combustion power pulse vibrations over existing internal combustion engines.

By premixing hydrogen with water and injecting water into the combustion cavity, the peak combustion temperature is reduced. It transforms the peak pressure profile so that its peak pressure level is lower and is smoothly distributed over more crank angle degrees thereby increasing the mean effective pressure to perform work (MEP). This reduces the high power pulse spikes that result in harsh shocks and stresses to engine components and produces a smoother engine operation.

The sodium vapor chamber isothermalizes the combustion/expansion zone by absorbing peak combustion temperatures in the combustion zone and transferring the heat back into to combustion chambers along the expansion zone. This also stabilizes the housing temperature thus minimizing housing deformations.

It is a further object of the present invention to provide improved outer housing noise reduction system over existing internal combustion engines.

The outer engine housing along the combustion/expansion zone over the sodium vapor chamber will be covered with a thick thermal insulation blanket or foam metal to minimize heat loss and help reduce engine noise.

Intake/Exhaust Ports with Vane Seal Support Ribs

A further object of the present invention is to minimize vane and seal deformation as they pass over the intake and exhaust ports.

The intake and exhaust ports are located radially with the rotation of the rotor and vane and seals. The port openings wrap around the semi-circular housing axially. This provides the best orientation for gas exchange and allows for large port size openings. The ports are split down the center radially with the bolt-up section of the two engine halves. An additional support rib spans across the middle of each port half and is slightly angled in the port opening. The center bolt-up section and two support ribs provide support to the vane and seal as they pass over the port openings to prevent deformation. Angling the support ribs in the port distributes the contact point with the vane and seals over a larger area so it does not always occur over the same location. The port openings are angled slightly so that the vanes and seals scissor over the edges of the port. This prevents any damage if the vanes and seals were squared with the port openings and any deformation occurred and the vanes and seals collide with the port opening edges. The rotational velocity creates centrifugal gas forces that that further improve gas exhaust. The inner housing stator geometry profile narrows to no space as it passes the exhaust port. This helps to improve complete scavenging and insure that all the combustion chamber gases are exhausted through the exhaust port. The inner housing stator geometry profile opens up greatly after the intake port. This provides a venturri suction effect that greatly helps draw fresh intake air in to the combustion chamber through the intake port.

Housing Water Vapor Chambers

A further object of the present invention is to minimize housing thermal deformations over existing engine systems.

The sodium vapor chamber stabilizes the housing temperature around the combustion/expansion zone and the active water cooling system helps stabilize temperature of the other main housing sections. There is a big temperature gap between these two systems. The sodium vapor chamber operates at a temperature of 600 degrees C. and the active cooling system operates at a temperature between 25 to 98 degrees C. This temperature difference could result in housing thermal deformations that could damage internal rotor, seal and vane components. High temperature resistant alloys such as Haynes 230 that have a low coefficient of thermal expansion are preferably used for the sodium vapor chamber section. Lower temperature water and hydrogen resistant alloys such as Stainless Steel 316L or 330 are preferably used for other sections of the engine housing. A thermal barrier coating is also plasma sprayed between the two bolt-up sections to minimize heat transfer from the sodium vapor chamber section into the other sections of the engine housing. Water vapor chambers are also used in the main housing section bridge the gap between the two temperature zones. The water vapor chambers operate at 202 degrees C. and help to isothermalize or stabilize the housing temperature to minimize housing thermal deformations between the sodium vapor chamber and the main housing zone with active cooling system. Stable isothermalization of the sodium vapor chamber and main housing sections allows accurate thermal expansion models to calculate adjustment to sodium vapor chamber and main housing geometries that can take these thermal expansions into consideration to minimize housing deformations during engine operation.

Light Weight Materials, Durability, and Cost

Yet a further object of the present invention is to provide a powerful, light weight, durable and reliable hydrogen rotary vane internal combustion engines that can be manufactured economically.

With the dramatic reduction in engine volume and mass, the G-cycle engine can utilize more advanced and more expensive alloys. The G-cycle engine preferably makes use of cobalt/nickel based alloys like Haynes 230 for high temperature zone components. Stainless steel alloys like 316L, 330, and aluminum are preferably used for lower temperature components. The use of these advanced alloys further reduces engine mass and greatly improves engine strength, durability, and minimizes thermal deformations. These alloys are also resistant to hydrogen permeation and embrittlement. By wisely and strategically tailoring the benefits of the alloys to the specific key structural areas and components of the G-cycle engine, the amounts of these alloys is further reduced, minimizing costs and maximizing their material property benefits to the engine.

The engine durability gets into the use of advanced materials and component design. Super alloys like Haynes 230, can handle high temperatures and pressures with about 30,000 hour of life span. This is protected by a thermal barrier coating in critical areas. The oxide lubricants can handle millions of slides with virtually no wear. The seals are designed so that they allow for lubricant wear and dynamically adjust to maintain the sealing performance. Thermal mechanical analysis and failure analysis are an important aspect of the research. Additional studies with nano materials with these alloys and oxides will further improve their performance and durability.

Alkali Metal Thermal Electrical Converter

It is yet a further object of the present invention to provide a direct source of electricity. The present invention provides sodium vapor chamber systems for removing excess heat from along the combustion zone and transferring it along the expansion zone. The circulation heat transfer profile of the sodium working fluid is identical for using an alkali metal thermal electrical converter (AMTEC) to generate electricity. The AMTEC uses sodium as a working fluid that is heated and pressurized against a beta alumina solid electrode (BASE) where the sodium is converted from a liquid to gas and the ions of the sodium pass through the BASE generating electricity.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 9A shows and exploded detail view of FIG. 9.

DETAILED DESCRIPTION OF THE INVENTION

Engine Operation Overview

Figure 1:
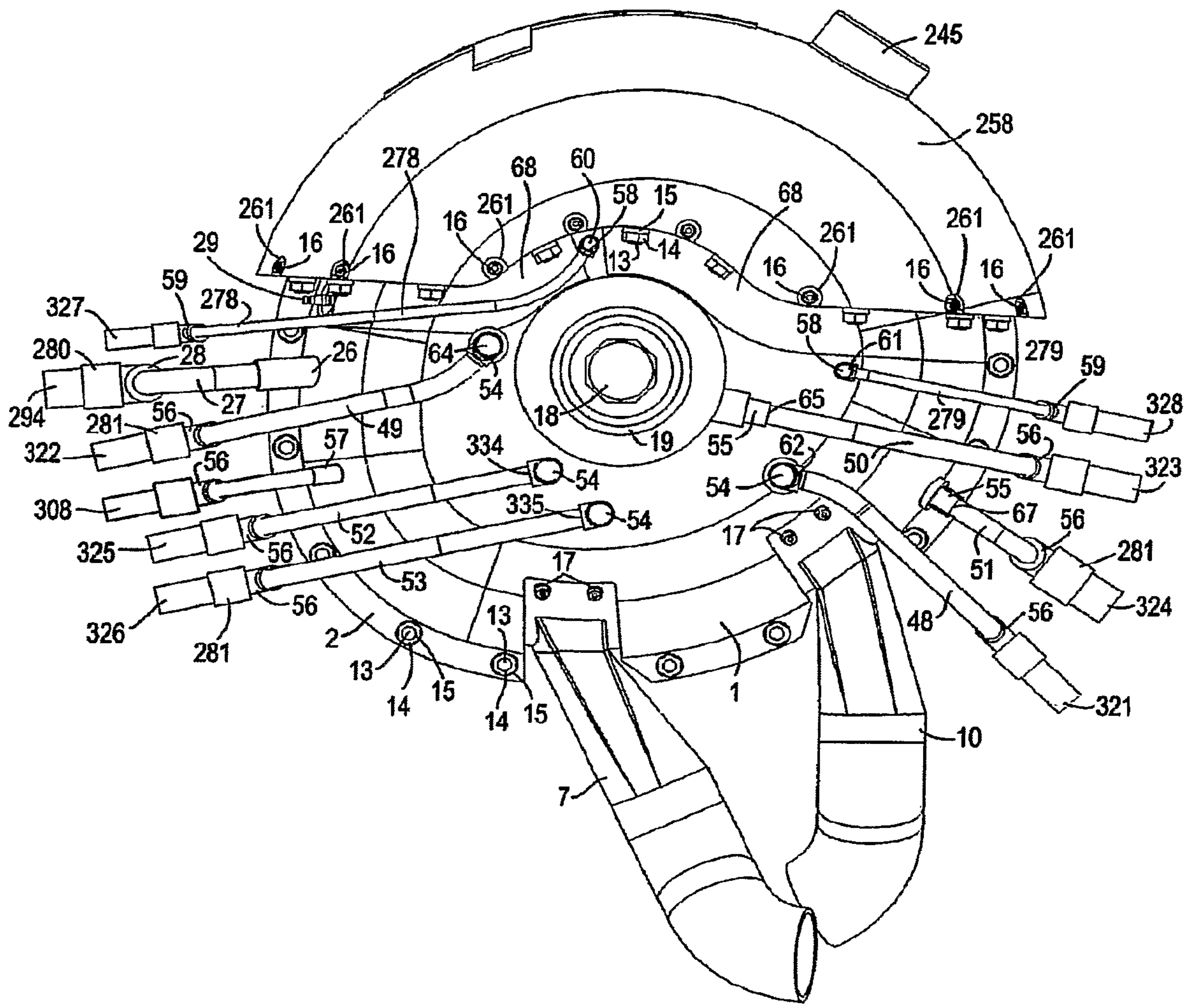
FIG. 1 is a side elevational view of the hydrogen G-cycle engine.

The G-cycle engine 1 includes an outer housing 2 having an inner housing surface 37 in the form of a distorted oval within which a rotor assembly 183 rotates clockwise. See FIGS. 3 and 4. The housing 2 includes a sodium vapor chamber 229 separate from and not in communication with the compression, combustion and expansion zones 31, 32 and 33, respectively of the engine 1. Thus the inside surface 37 of housing 2 slopes arcuately inwardly toward a driveshaft 18 about which the rotor 183 rotates from an intake port 6 at about 0° crank angle through about 105° to a circumferential location adjacent the beginning of the sodium vapor chamber 229. The inner surface 37 of the housing 2 adjacent to the beginning of the sodium vapor chamber 229 and the beginning of the expansion zone 33 arcuately moves outwardly away from the driveshaft 18 to obtain a maximum geometric distance from the center of driveshaft 18 at about 147° beyond the beginning of the expansion zone 33. From that point of maximum distance from the center of driveshaft 18, the inner surface 37 of the housing 2 gradually extends arcuately inwardly towards the center of driveshaft 18 through the remaining crank angle, i.e., through the compression zone 31. Thus, the interior shape of the housing 2 forms a distorted oval or torus with sodium vapor chamber 229 overlying the expansion zone 33 of the combustion cavity 34.

Figure 3:
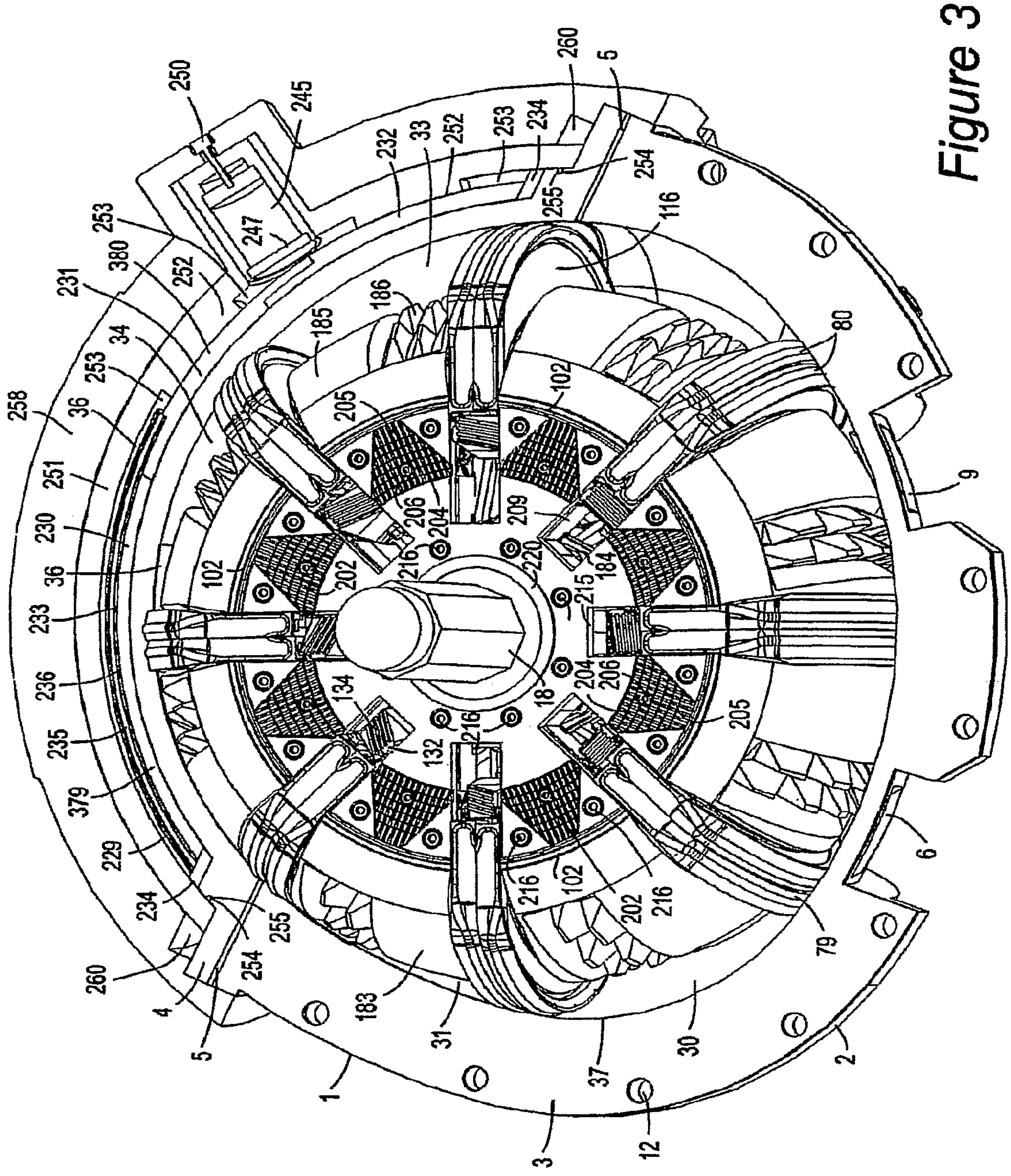
FIG. 3 is a partial cut away perspective view of the hydrogen G-cycle engine.

The rotor 183 includes, as illustrated in FIG. 3, eight rotor vanes 116 displaceable radially inwardly and outwardly for sealing contact with the interior surface 37 of the housing 2. The vanes 116 are circumferentially spaced from one another and rotor vane segments 310 extending between adjacent vanes 116. The vanes 116 have double vane seals 80 for sealing against the inner surface 37 of the housing 2 throughout the compression and expansion zones 31 and 33, respectively, and side vane face seals ill for sealing against the rotor segments 310.

The sodium vapor chamber 229 is a closed chamber containing sodium, potassium or sulphur, although sodium is preferred because it maximizes heat transfer capability. Within the chamber 229 are fine, medium and course wicking meshes 230, 231 and 232, respectively (FIG. 3) The sodium vapor chamber 229 overlies the combustion and expansion zones 32 and 33 from the beginning of the sodium vapor chamber to the point of maximum expansion of the expansion zone 33, i.e., adjacent the end of the sodium vapor chamber. The sodium vapor chamber 229, when the engine is operating, flows heat from rotor combustion cavities 186, and distributes that heat substantially evenly across the vapor chamber 229 as the sodium continuously changes phase from a liquid near the ignition point to a vapor. At the intake port 6, air is supplied into the engine 1. At speed, the air, water and hydrogen fuel are compressed and auto-ignited in a rotor combustion cavity 186 when it is in the combustion zone 32 adjacent to the beginning of the overlying sodium vapor chamber 229. As the combustion zone increases in volume at increasing crank angles, the vanes 116, under centrifugal force, engage and seal against the interior surface 37 of the housing 2. Thus, the sodium vapor chamber 229 absorbs the heat of combustion transferred across the inner housing between the sodium vapor chamber 229 and the combustion zone 32 into sodium evaporator zone 379 and in the expansion zone 33 after combustion, substantially without heat loss, i.e., heat is being put back into the combustion cavities 34 system along the sodium vapor chamber condenser zone 380. By this isothermalization, the heat is continually transferred into the sodium vapor chamber 229 and back into the combustion expansion reaction.

A vane belting system is used to reduce the centrifugal force and hence seal wear between the vanes 116 and inner surface 37 of the housing 2, as well as to balance the vanes 116 when two vanes are extending and other vanes are contracting or retracting. Because of the distorted oval nature of the housing 2, non-uniform pressure of the vane seals 80 against the housing surface 37 is averaged out by use of the belting system.

Figure 11:
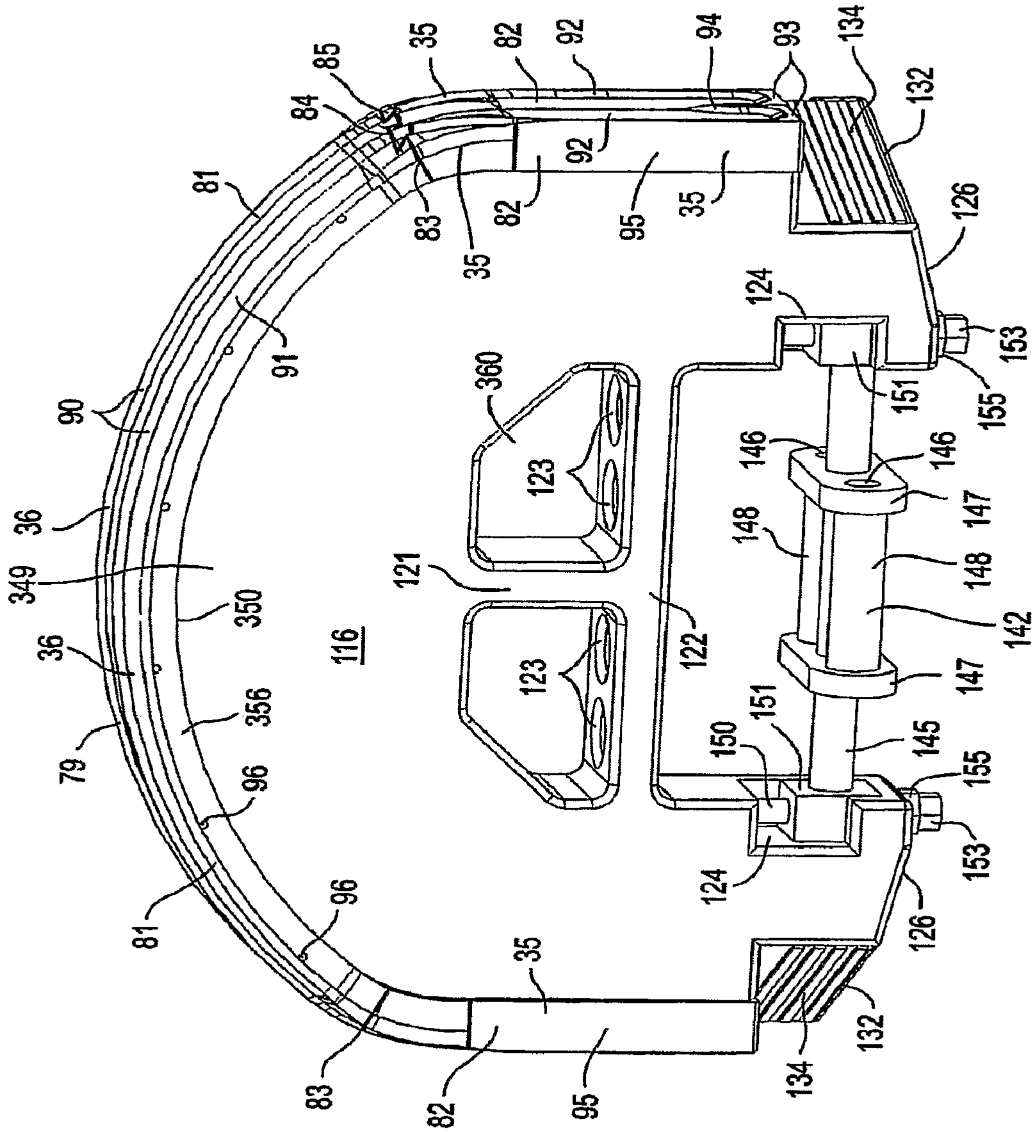
FIGS. 11 to 13 depict the front, bottom, and back sliding vane assembly with split vane seals attached.
Figure 32:
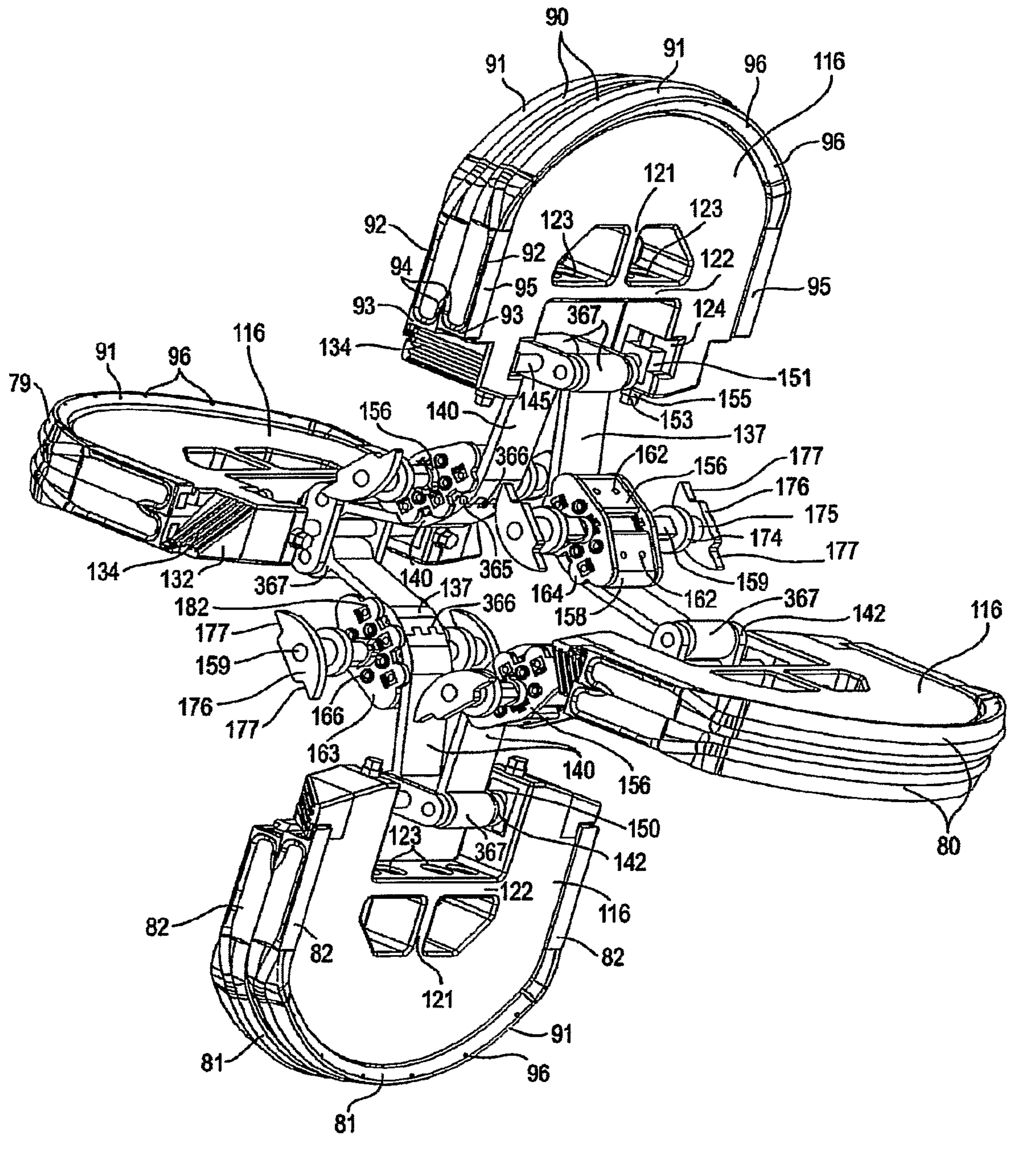
FIGS. 32 to 37 depict detailed perspective views of the sliding vane anti-centrifugal belting and belt arch system.
Figure 34:
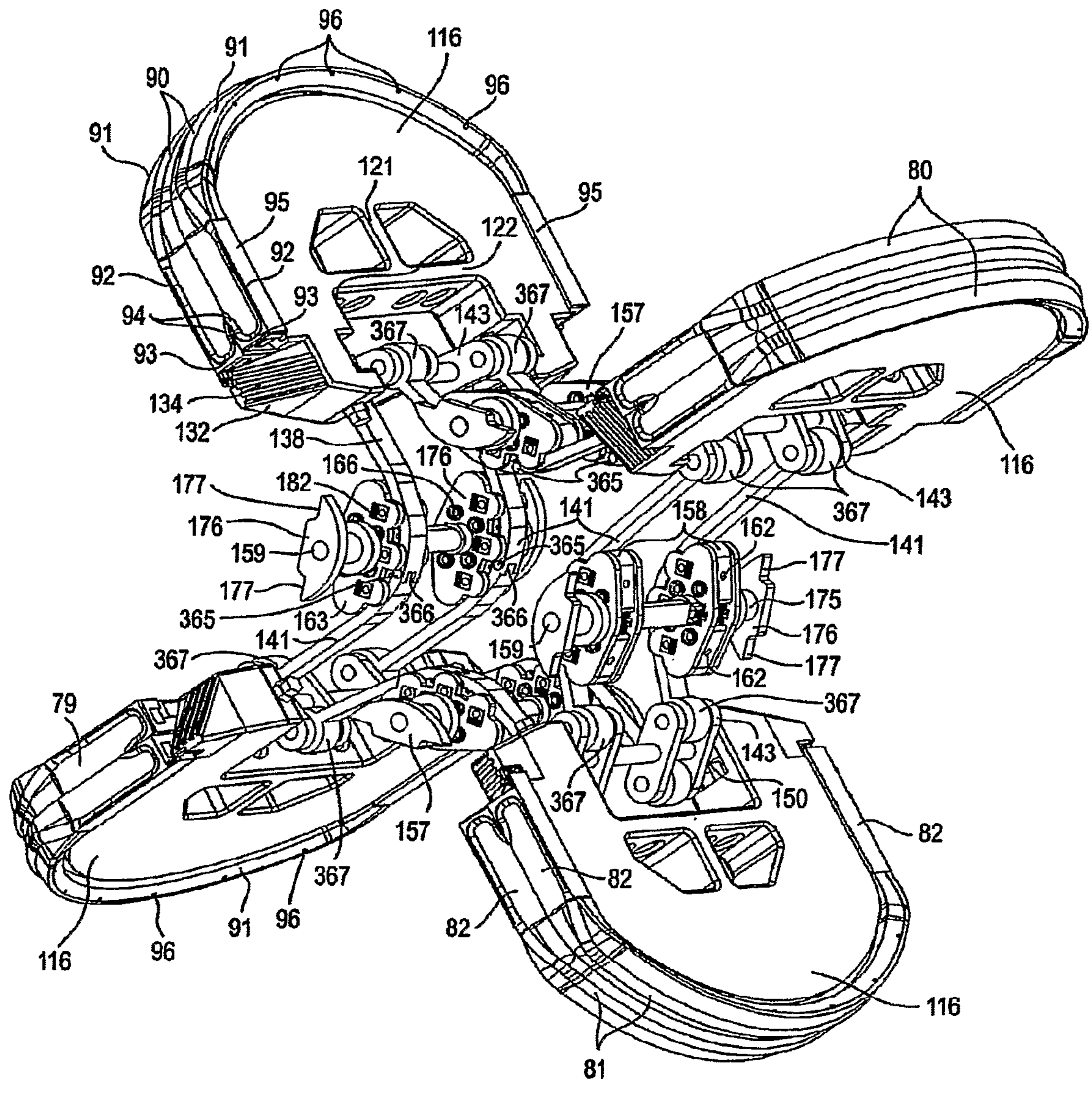

Referring to FIGS. 32 and 34, and recognizing that the rotor 183 preferably has eight vanes 116, a single vane belting system (FIG. 32) is used to minimize the centrifugal forces for a first set of four orthogonally related vanes and a double vane belting system, as illustrated in FIG. 34, is used for the second set of remaining four orthogonally related vanes. Referring to FIGS. 32 and 11, and the single vane belting system, each vane 116 includes a pair of end vane belt rod holders 151 along bifurcated inner ends thereof mounting a single toggle bar system 142 pivotally mounted between the holders 151. The toggle 142 includes a pair of vane belt bars 146 (FIG. 11) mounted in a vane belt rod 145 pivotally mounted to holders 151. As illustrated in FIG. 32, single vane belt arch bearings 156 are pivotally supported by rotor end-plates on opposite sides of the rotor 183 fixed to the rotor segments. Four single vane belts 137 are secured at opposite ends to vane belt bars 146 of adjacent vanes 116 and extend along the inner surface of the arch bearing 156 between those vanes. Consequently, the orthogonally related vanes are able to extend or retract to match the distorted oval geometry of the inner housing surface with the eccentricities of the distorted oval geometry being accommodated by the pivoted toggles and arch bearings.

Referring to FIG. 34, a double vane belt system is employed for the remaining four orthogonally related vanes 116. Each of the double belt vanes includes double toggle bar systems 143 mounted on a belt rod pivotally carried by the holders 151 of the vane 116. A pair of arch bearings 158 (FIG. 34) are axially spaced from one another and mounted for pivotal movement to the rotor end plates. A pair of vane belts 138 are secured at opposite ends to the vane belt bars 143 of the adjacent vane toggles and extend along the interior of the arch bearings 158. A similar action is achieved with respect to these four vanes as with the single vane belt system for matching the vanes to the distorted oval contour of the inner housing stator wall surface. Note that the vane belts of the single and double sets of vane belt systems are axially spaced one from the other as are the respective toggles and arch bearings.

Figure 29:
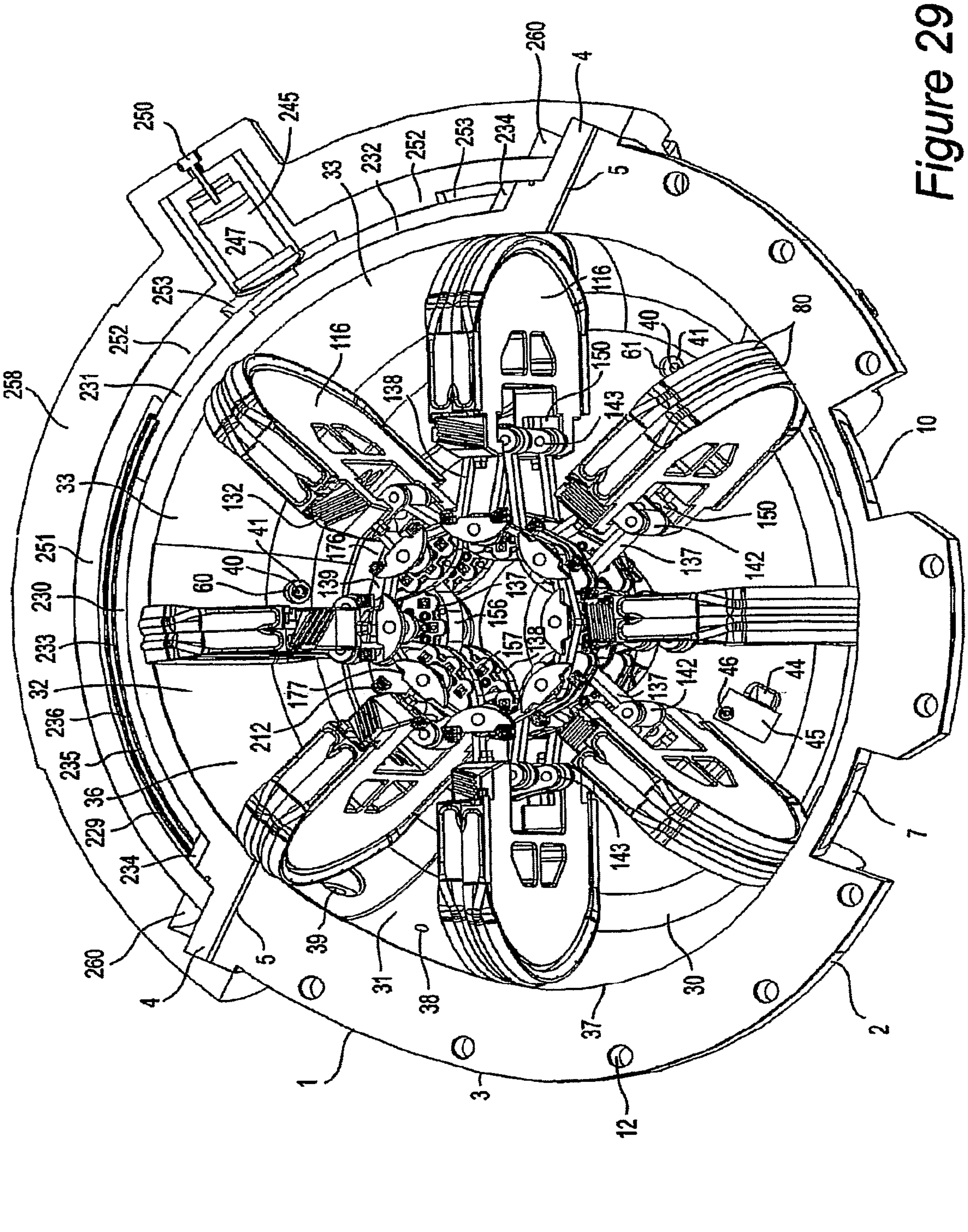
FIG. 29 depicts a cut-away perspective view of engine housing with sliding vane and anti-centrifugal belting system.
Figure 30:
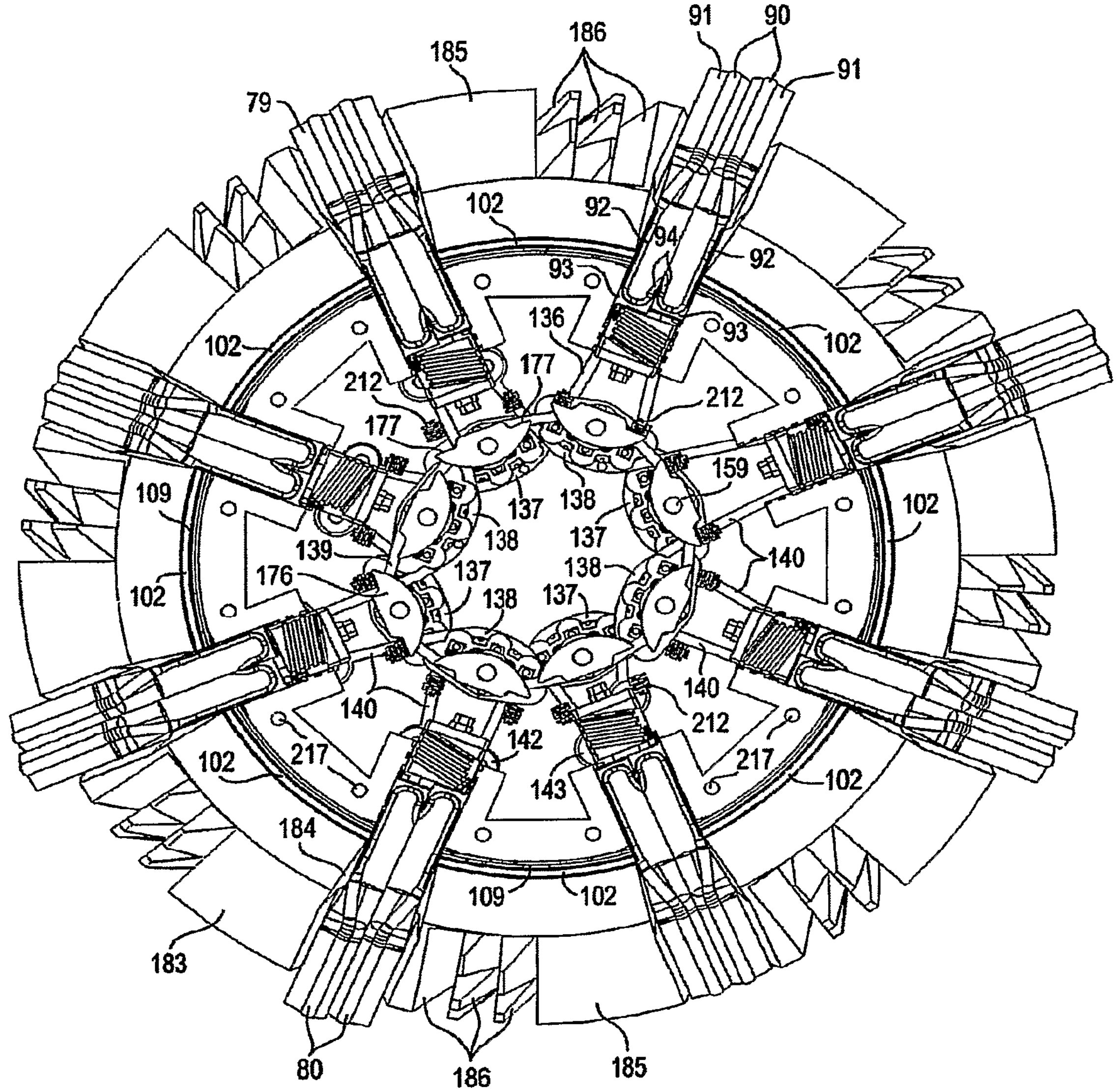
FIGS. 30 and 31 depict side perspective views of the rotor and sliding vane anti-centrifugal belting system.
Figure 31:
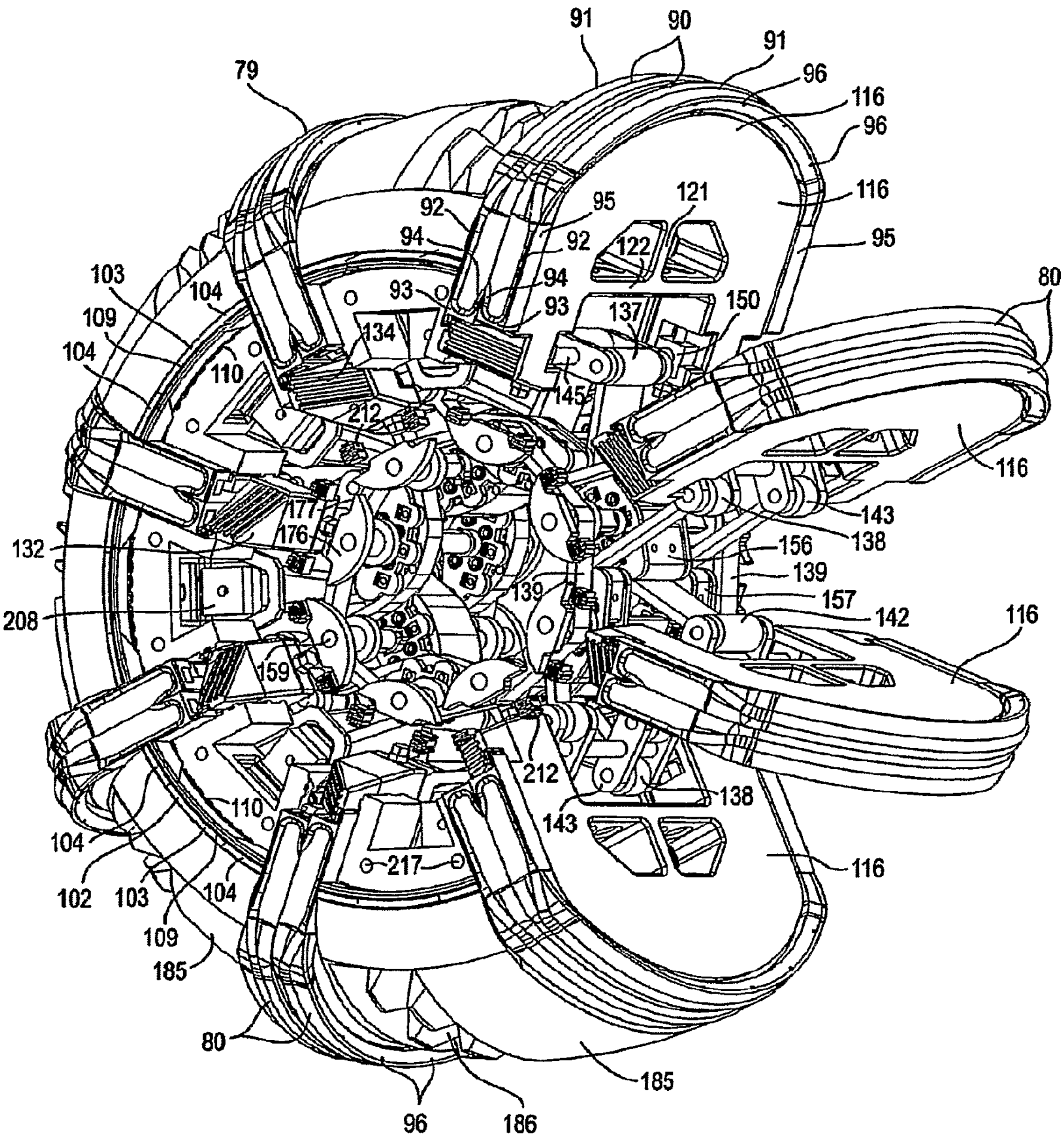
Figure 36:
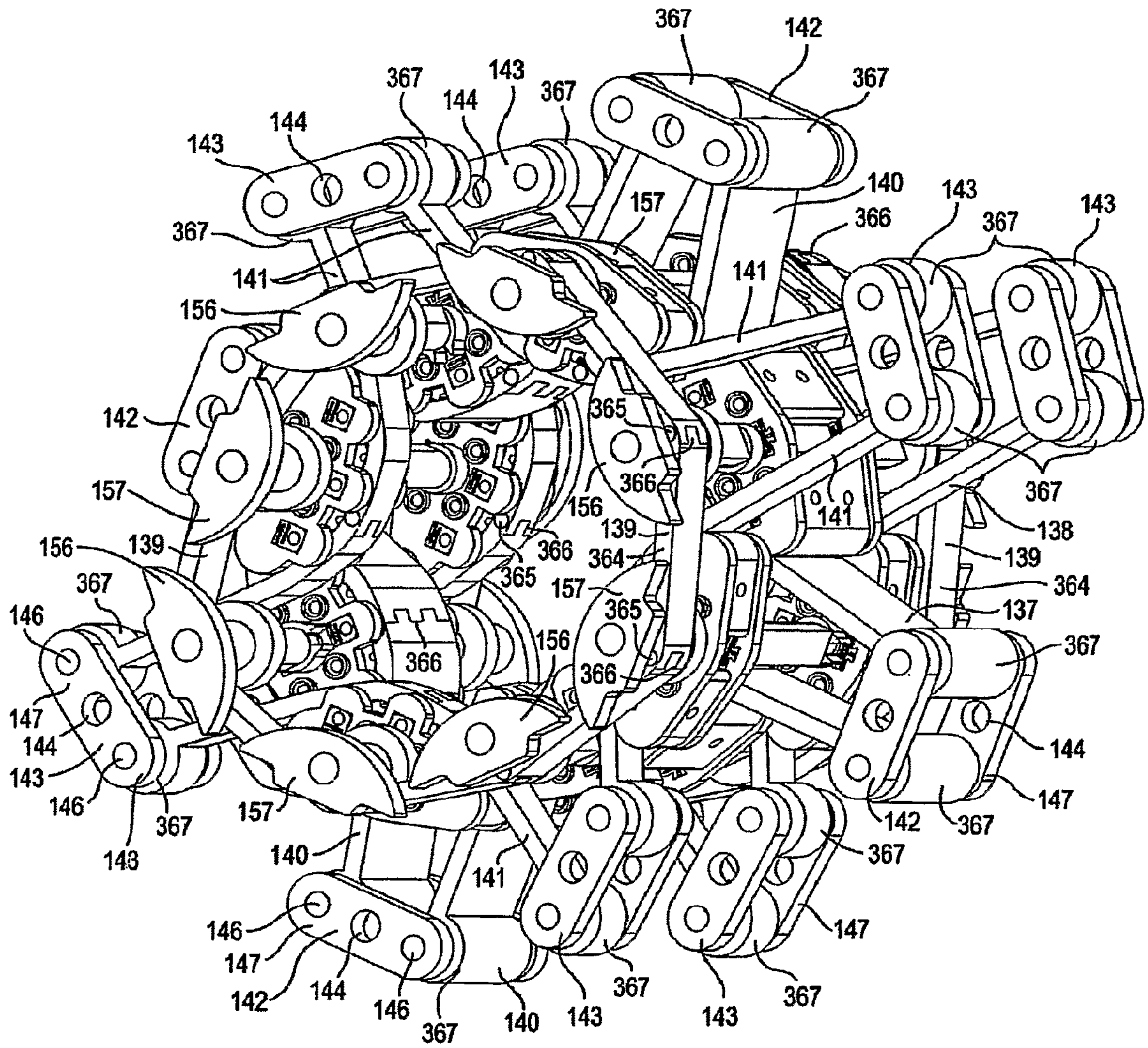

Referring to FIGS. 29 and 36, the single and double vane belting systems are tied together by a pair of profile belts 139 on axially opposite sides of the single and double vane belting systems. As best illustrated in FIG. 36, a pair of axially spaced profile belts 139 are mounted about the belt pins 365 in the single vane belting system, which mount the arch bearings 156, and pins 159, which mount the pair of arch bearings 158 in the double vane belting system. As illustrated in FIG. 36, the pair of profile belts 139 extend about the end portions of the pins 365 and 159 inside limit end plates 157. The plates 157 are secured to the rotor segments 310 between the vanes 116.

The details of the engine, including the interaction between sodium vapor chamber and the combustion chamber, as well as the belting system enabling the vane to extend and retract radially, while maintaining seals against the inner surface of the house, are disclosed hereinafter and in the drawing figures referenced in the following discussion.

Figure 2:
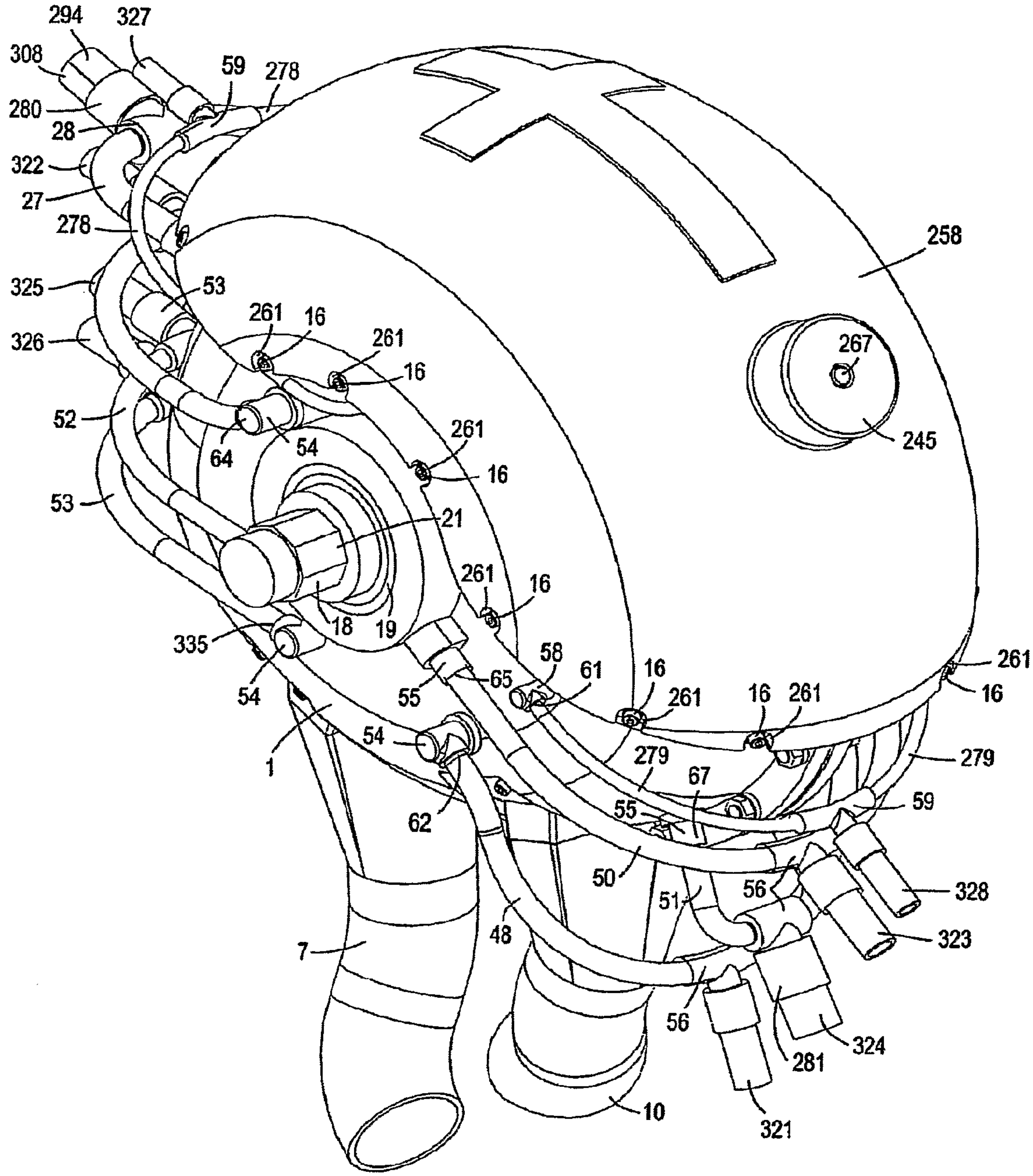
FIG. 2 is a top perspective view of the hydrogen G-cycle engine.

The hydrogen G-cycle engine 1 uses heated water and hydrogen gas injections. Referring to FIGS. 1, 2 and 3, two water injection regulators 57 will supply heated water to the engine's rotor combustion cavity 34 at the beginning of the compression zone 31. Two hydrogen injection regulators 26 supply the hydrogen to the engine's rotor combustion cavity 34 in a compression zone 31. Two spark plugs 29 ignite the hydrogen/air/water mixture. An active cooling system circulates deionized water from a cold water storage tank through the engine's 1 lower housing 2, intake 30 and compression zones 31, driveshaft bearing/expansion zone 19, and inner rotor 183 and sliding vanes 52, and into a hot water storage tank (not shown). The heated water is injected into the engine at the beginning of compression zone 31 with water injectors 57, early stage combustion/expansion combustion chamber injection 60 and cool water is injected during late stage combustion/expansion chamber cool water injection 61. All the water vapor in rotor combustion chamber 34 is exhausted from engine 1 through exhaust port 9 and exhaust pipe 10 and into an exhaust water condenser (not shown), where the water vapor is condensed from a gas to a liquid and returned to the cold water storage tank and the air is exhausted out the condenser exhaust pipe. To prevent water freezing expansion damage to the engine 1 and all its components, ethyl alcohol stored in an ethyl alcohol storage tank (not shown) is, during engine shut down, when the temperatures are less than 32 degrees F., circulated in a water/ethyl alcohol mixture throughout the engine 1. An electronic control unit (ECU) (not shown) controls all the regulators and variable speed pumps (not shown). The ECU also monitors a number of temperature and water level sensors to help control all the regulators and variable speed pump to make sure that the engine 1 is always operating properly.

Hydrogen/Water Injection

During operation of the G-cycle engine 1, water is injected into combustion cavity 34 of engine 1 through water injection regulators 57 and water tube 308. Hydrogen gas is injected into the combustion cavity 34 of engine 1 through a hydrogen injection regulator 293 and hydrogen tube 294 and into a hydrogen regulator 280. From regulator 280, the hydrogen gas passes through hydrogen tubes 28 and 27 and into hydrogen/water injection regulators 26 and into the combustion chamber 34 at injection location 38 in the compression zone 31.

As the hydrogen gas expands from high compression to lower injection pressure it absorbs heat energy which can result in freeze damage to the hydrogen injection regulator 293, hydrogen tube 294, and hydrogen regulator 280. To counteract the potential of thermal freezing, heated deionized water is pumped into tubing which coils around the hydrogen tubing 294 near the hydrogen regulator 280. Heat absorbed by the water is released and transferred into the expanding hydrogen gas in the hydrogen tubing to help prevent freeze damage to hydrogen regulator 280, and hydrogen injection regulator 26. The hydrogen regulator properly balances the mixture of hydrogen and injects the hydrogen mixture through hydrogen tubing 28 and 27 and into hydrogen injection regulators 26 and into combustion cavity 34 at injection location 38 in the compression zone 31.

Active Water Cooling System

Deionized water stored in a cold water storage tank (not shown) is used to cool the engine outer housing in the intake/compression zone 2, driveshaft bearings and expansion zone 19, and inner rotor 183 and sliding vanes 116. Deionized water is used because it is a purer form of water without contaminates that could get into the engine's 1 components and because it has a low surface tension to minimize friction forces as it is pumped through the tubes, moves inside the inner rotor cavity 363, and along the inner housing stator surface 37 of housing stators 2 and 4. For the engine 1 outer housing 2 intake 30 and compression zone 31 cooling deionized coolant water is pumped from the cold water storage tank by a variable speed water pump through water coolant tubing 321 and T-shaped tube fitting 56 and split water coolant tubing 48 and housing 90-degree fitting 54 to housing intake/compression zones coolant inlet 62 and through intake/compression zone coolant passage 63 and through intake/compression outlet 64, then housing 90-degree fitting 54, then split return coolant tubing 49, through T-shaped tube fitting 56, and through a single return coolant tubing 322 and then through a hot water filter and then into a hot water storage tank.

To cool engine l's rotor driveshaft bearing 19 and expansion zones 31, deionized coolant water is pumped from the cold water storage tank by a variable speed pump through water coolant tubing 323 and T-shaped tube fitting 56 and then split water coolant tubing 50 and housing straight fitting 55 to driveshaft bearing/expansion zone water coolant inlet 65 and through driveshaft bearing/expansion zone water coolant passage 66 and through driveshaft bearing/expansion zone water coolant passage outlet 67, then housing straight fitting 55, then split return coolant tubing 51, through T-shaped tube fitting 56 and then through a single return coolant tubing 324 and then the hot water filter and into the hot water storage tank.

Figure 5:
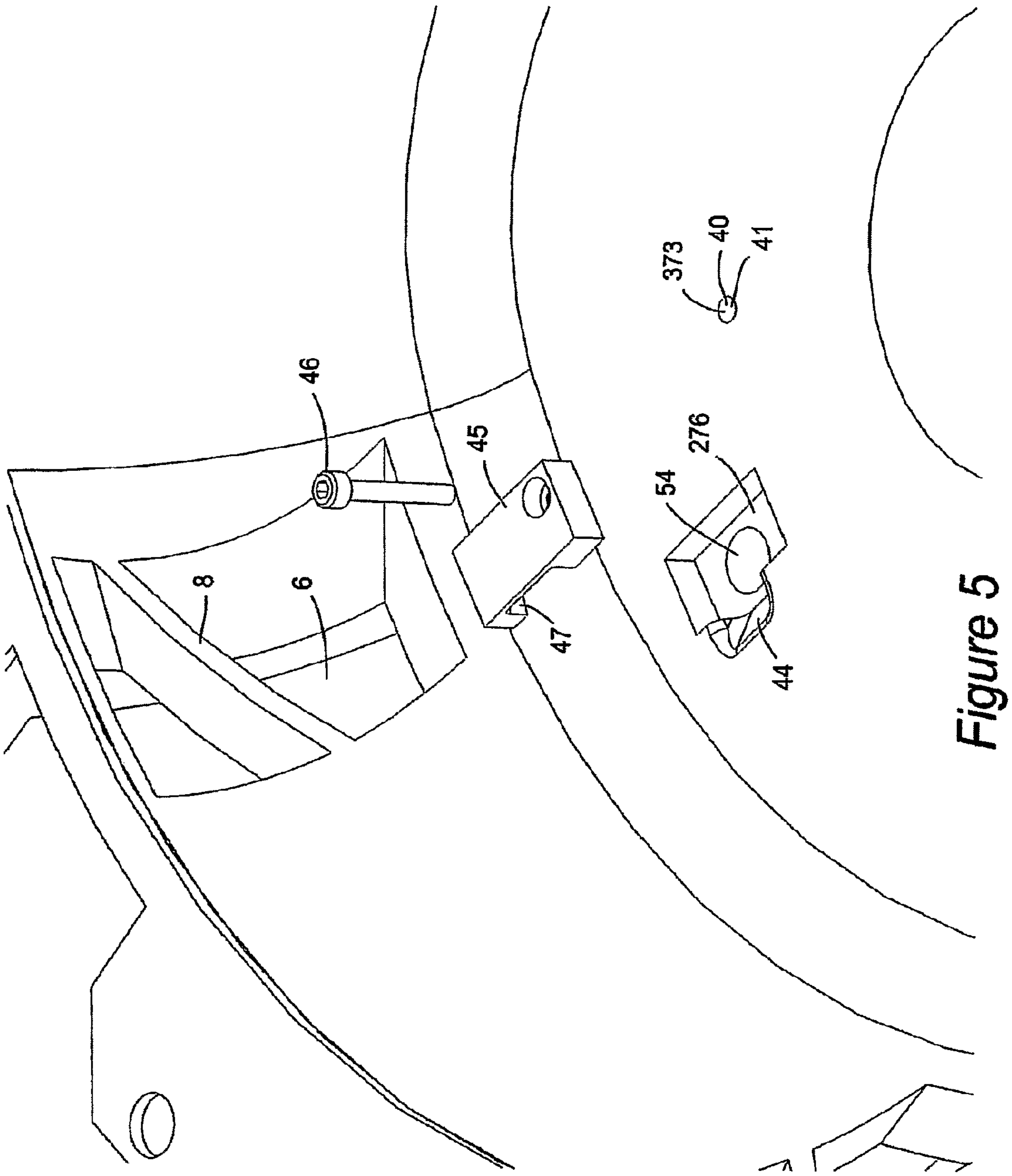
FIG. 5 depicts inner engine housing water return passage with exploded water return components.

To cool inner rotor assembly 183 and sliding vanes 116, deionized coolant water is pumped from the cold water storage tank by a variable speed pump through water coolant tubing 325 and T-shaped fitting 56 and then split water coolant injection tubing 52 and into housing 90-degree fitting 54 and through inner rotor/vane water injection inlet 334 across outer rotor condenser 202 and sliding vane condenser 132. The water is collected along the sides of the inner housing stator surface 37 by the moving sliding vanes 116 and forced through inner housing water return recess 44 and water return slot 47 in the water return cover 45 that is screwed into a water return cover recess 276 by a water return cover screw 46, as shown in FIG. 5.

The water then returns through inner rotor/vane water outlet 335 and into housing 90-degree fitting 56 and through split water coolant return tubing 53 and through T-shaped tube fitting 56 and then through a single return coolant tubing 326 and then the hot water filter and into the hot water storage tank.

The late stage combustion/expansion chamber water injection 61 uses the deionized water 320 stored in the cold water storage tank and pumped by a high pressure water pump through cold water high pressure tubing 328 and into high pressure T-shaped tube fitting 59 and into high pressure split tubing 279 and into high pressure 90-degree housing fitting 58 and out late stage cold water spray nozzle 337 into rotor combustion cavity 34 at late stage compression/expansion injection location 61.

All the variable speed pumps used in the active water cooling system are electrically controlled and regulated to use the minimum amount of electrical energy necessary to pump the water.

Hot water Injection

During engine's 1 operation, heated water is injected into the beginning of the compression zone 31 with hot water injection regulator 57 and early stage combustion/expansion combustion chamber injection 60. For hot water compression zone injection, heated deionized water 320 is pumped from the hot water storage tank by a high pressure water pump through hot water injection tubing 308 and into water injection regulator 57. The water injection regulator 57 regulates the amount of heated water to be injected into the rotor combustion cavity 34 in compression zone 31. Deionized water 320 injected in the compression zone 31 will adjust the effective compression ratio and partially mix with the injected hydrogen gas 336. For the early stage combustion/expansion hot water injection, heated deionized water is pumped from the hot water storage tank by another high pressure water pump and into hot water high pressure tubing 327 and into high pressure T-shaped tubing fitting 59 and into high pressure split tubing 278 and high pressure 90-degree housing fitting 58 and through housing hot water injection passage 42 and connection tube 43 and out early stage hot water spray nozzle 40 into rotor combustion chamber 34 at early stage compression/expansion injection location 60. At the early stage 60 combustion/expansion hot water injection in the rotor combustion chamber 34 interacts with the hydrogen combustion to help regulate the peak combustion temperature. The injected deionized water also interacts and absorbs heat from the sodium vapor chamber along the sodium vapor chamber housing stator surface 4, and also provides some lubrication and sealing qualities to the sliding vane 116 split vane seals 79 as they moves across the inner housing stator surface 37.

The deionized water vapor has a heavier mass than other combustion chamber 34 gases. The rotor's 183 rotational velocity and centrifugal forces will force the heavier deionized water vapor radially outward along the inner housing stator surface 37 and out through the radial exhaust port 9 and through exhaust pipe 10. This helps the deionized water make good contact and heat transfer with the sodium vapor chamber stator 4, and also be very beneficial in completely exhausting all the deionized water vapor through the exhaust port 9 and exhaust pipe 10.

Distorted Oval Housing Stator Geometry

Figure 4:
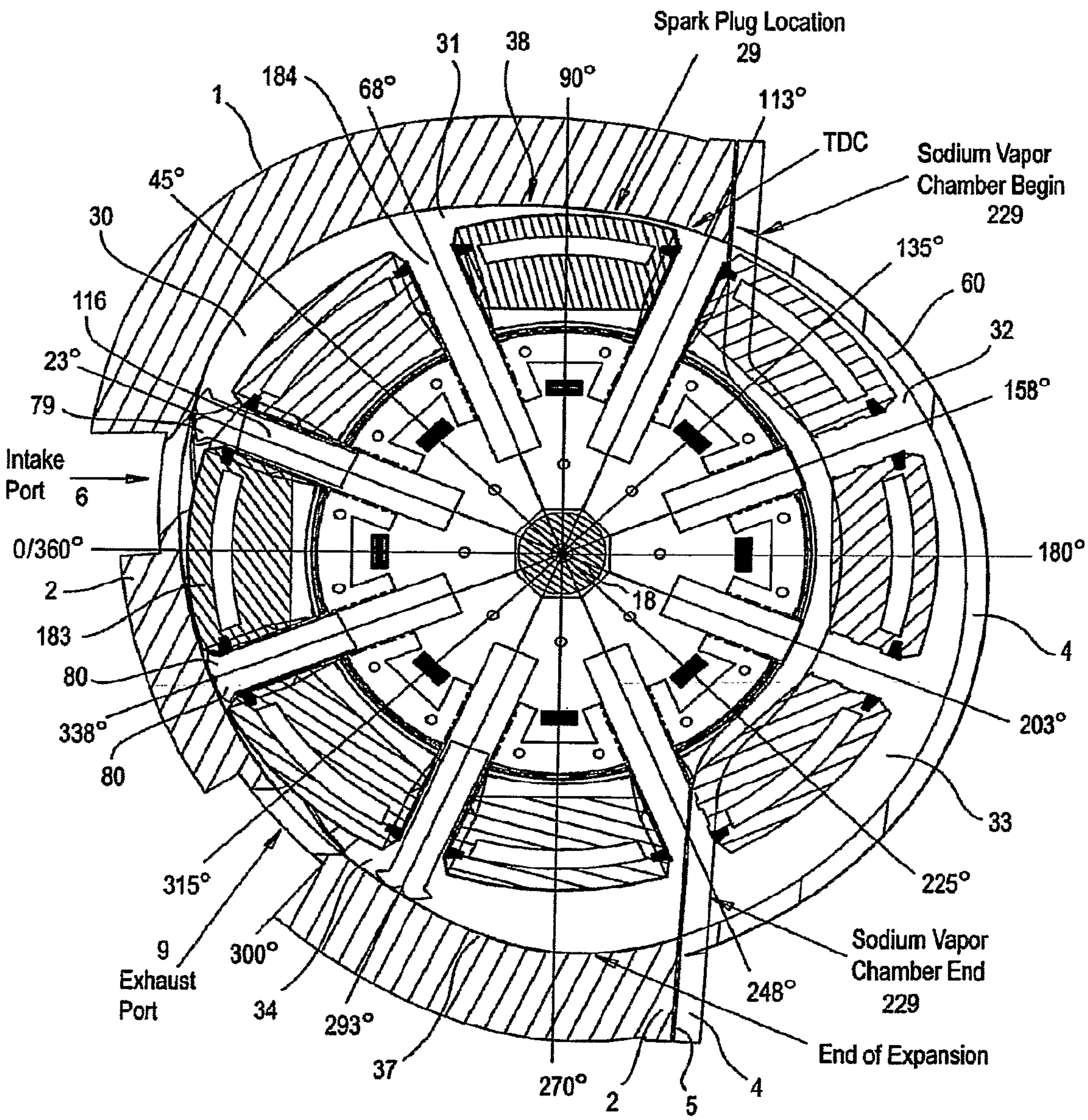
FIG. 4 is a side cross-sectional view of the G-cycle engine housing showing the rotor and engine chambers by crank angle.

FIG. 4 shows side cross-section view of the rotary vane engine 1 of the present invention. FIG. 3 depicts a cutaway perspective view of engine 1. Engine 1 includes a stator 37, a rotor 183 and a multitude of sliding vanes 116 that extend and retract from rotor vane passages 184. The lower stator housing 2 and the upper sodium vapor chamber stator 4 creates a distorted oval geometry shape that has a generally smooth inner surface 37. The lower stator housing 2 and upper vapor chamber stator housing 4 are separated by a metal gasket 5 to help insure a uniform fit and seal between the different engine housing segments. The sliding vanes 116 uses split vane seals 79 comprised of a front and back vane seal 80 to seal the sliding vanes 116 along the inner stator surfaces 37. A combustion chamber 34 is defined by two adjacent sliding vanes 116 and two rotor axial seals 102. Engine 1 also includes an intake port 6 for air intake supply. The intake zone 30 begins when the back vane seal 80 of the front combustion chamber vane 116 begins to pass over the intake port 30 at 0 crank angle degrees and continues along the axis of rotation until the front vane seal 80 finishes passing over the intake port 30 at about 60 degrees of intake crank angle of rotation. At about 60 degrees crank angle, the inner stator housing 37 is at its intake maximum distance from the rotor surface 185 and sharply slopes inward back towards the rotor surface 185 to form the compression zone 31. The compression zone 31 provides about 45 total degrees of crank angle rotation until the location of spark plug 29 at 105 crank angle degrees. Top dead center (TDC) is at 110 crank angle degrees. The combustion zone 32 runs from the spark plug location 29 until the early stage water injection 60 at about 145 crank angle degrees. The expansion zone 33 continues from this point until the back vane seal 80 of the front sliding vane 116 begins to pass over the maximum expansion point at 270 crank angle degrees, providing a total of about 160 crank angle degrees of combustion and expansion displacement. The inner housing stator 37 gradually slopes outward away from the rotor surface 185 along the combustion 32 and expansion 33 zones until it reaches its maximum distance at about 270 crank angle degrees. At this point, the inner housing stator surface 37 sharply slopes back towards the rotor surface 185 to bottom dead center (BDC) at 338 crank angle degrees. The late stage water injection 61 also occurs at about 275 crank angle degrees where the inner housing stator surface 37 is at maximum distance from the rotor surface 185. Combustion chamber 34 exhausting occurs when the back vane seal 80 of the front combustion chamber siding vane 116 begins to pass over the exhaust port 9 at about 280 crank angle degrees and continues until the front vane seal 80 of the back combustion chamber vane 116 finishes passing over the exhaust port 9 at about 360 crank angle degrees, providing a total of 80 crank angle degrees for combustion chamber 34 exhaust. Once the combustion chamber 34 has finished exhausting the chamber gases, the back vane seal 80 of the front combustion chamber vane 116 is ready to cross over the intake port 7 and begin the next cycle.

The upper sodium vapor chamber stator 4 is located along the combustion 32 and expansion zone 33 from the TDC point at 110 crank angle degrees and continues until 255 crank angle degrees. A thermal barrier coating 36 is applied to the inner housing stator surface 37 from just before the hydrogen/water injection locations at 85 crank angle degrees and continue to just past the early stage water injection 60 location at about 160 crank angle degrees.

Inner Housing Stator with Rotor and Vanes

FIG. 3 depicts the bottom half of housing stator 2. The top cross-section half of sodium vapor chamber stator 4, a mirror image of the bottom stator 2 half, is removed to show the parts located inside the housing stators 2 and 4. A rotor 183 has a generally circular disc shape with an outer surface 185 and a multitude of vane slots 184 (FIG. 4) sliced vertically along its perimeter. Each sliding vane 116 fits within a vane slot 184. The rotor 183 can have six, eight, nine or twelve vane slots 184 and sliding vanes 116, depending on the scale of engine 1. The preferred embodiment has eight vane slots 184 holding eight corresponding sliding vanes 116. This configuration creates eight separate combustion chambers 34 bounded by the outer rotor surface 185 of the rotor 183, the inner surface 37 of the housing stators 2 and 4, and the sliding vanes 116. Each sliding vane 116 has a generally flattened front and back face with an outer semi-oval shape that corresponds with the shape of the inner surface 37 of the stators 2 and 4. In operation, the rotor 183 rotates around the drive shaft 18, forcing the sliding vanes 116 to sweep along the inner surface 37 of the stators 2 and 4 in a continuous circular motion. This motion continuously rotates the combustion chambers 34 around the rotor 183. The sliding vanes 116 toggle in and out of the vane slots 184 to maintain constant surface contact between the generally circular arrangement of the sliding vanes 116 and the generally oval shape of the inner surface 37 of the housing stators 2 and 4.

Combustion Chamber Seals

Figure 7:
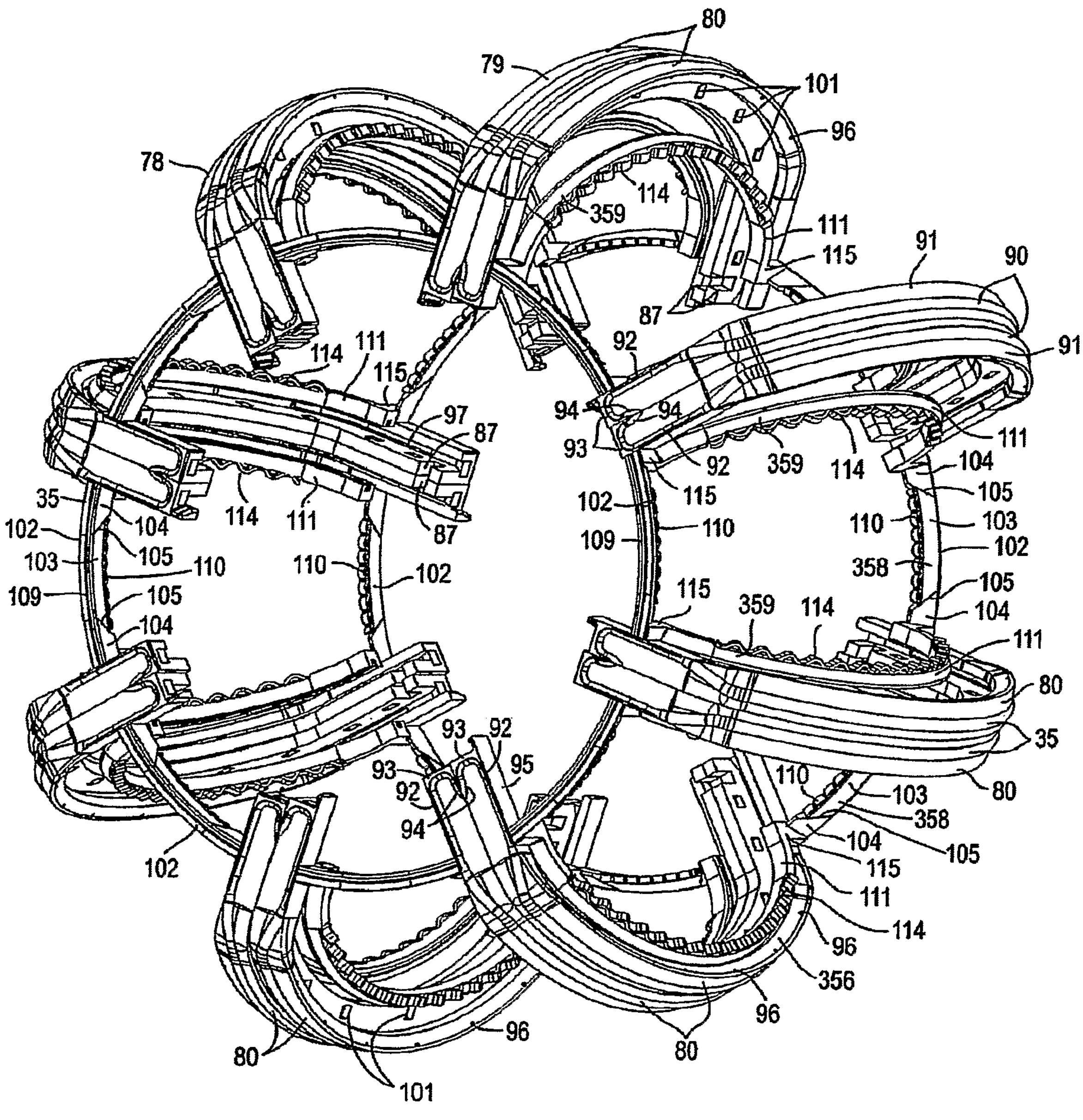
FIG. 7 depicts a perspective view of combustion chamber seals.

For engine 1 to operate effectively and efficiently, the combustion chamber 34 must maintain sealing between the rotor 183 side housing stator 37, the rotor 183 and the sliding vanes 116, and the sliding vanes and the inner housing stator surface 37. FIG. 7 shows combustion chamber seals 78 used to isolate each individual combustion chamber 34 and help maintain proper combustion gas pressures in each combustion cavity 34. The combustion chamber seals 78 include axial seals 102, vane face seals 111, and split vane seals 79.

Axial Seals

The axial seals 102 shown in FIGS. 3 and 7 ensure tight sealing between the rotor 183 and the side housing stator 37. The axial seals 102 are generally arc-shaped segments. The axial seal 102 also ensure a tight seal between the lower vane split seal segment 82 along vane seal's axial seal contact surface 95 and the rotor 183. The axial seal 102 is comprised of a center axial seal section 103 and two axial seal end sections 104 that are connected together along the axial center and end seal interface 105 where the axial center section 103 contains a tongue interface 106 and the axial end section 104 contains a groove interface 107. The axial center and end seal interface 105 is angled to the front sealing surface. This allows both the axial center segment 103 and axial end segment 104 to move freely along the interface 105 and still maintain a contiguous seal with the inner stator surface 37. The tongue interface surfaces 106 of axial center segment 103, where the adjoining groove 107 of axial end segment 104 meets, are coated with a solid lubricant 35 comprised of oxides for high temperature lubricant and durability to minimize the sliding friction along axial center and end segment interface 105 and to increase the speed of their sealing motion.

The top surface 358 of axial seal 102 is slightly tapered as it goes back from the axial seal's front sealing surface. This allows combustion chamber 34 pressurized gases to go along this top tapered surface 358 to help bias the axial seal outward, making sealing contact with the inner housing stator surface 37.

Corrugated springs 110 are located behind center axial segment 103 of axial seal 102. The corrugated springs 110 are used initially to apply pressure to the center axial seal segment 103, which applies sliding force along the center and end axial seal interface 105 to force axial seal end segment 104 axially outward against the inner housing stator surface 37 and radially against lower vane seal segment surface 95 of lower split vane seal 82. The corrugated springs 110 apply only a limited amount of force to create an initial seal between the main axial seal 102. Combustion and chamber 34 gas pressures are the dominant force determining their sealing performance to equalize the forces necessary for the axial center seal 103 and axial end seal segments 104 of axial 102 to maintain the proper sealing conditions against inner housing stator surface 37 of inner housing stators 2 and 4.

A small axial seal strip 109 is located in an axial seal strip groove 108 that runs across the full length of sealing face of both the axial center segment 103 and axial end seals 104. The axial seal strip 109 helps seal any combustion chamber gases that pass through the top axial seal lip above the axial seal trip groove 107. The top back edge of the axial seal strip 109 has a small bevel 351 running the entire length of the axial seal strip 109 that will help bias the axial seal strip 109 outward against the inner housing stator surface 37. The axial seal 102 and axial seal strip 109 contact sealing surfaces are coated with a solid lubricant comprised of oxides for high temperature operation and durability.

The axial center segment 103 and axial end segments 104 of axial seal 103, seal strip 109 and corrugated spring 110 are curved to match the profile of the rotor 183.

Vane Face Seals

Figure 8:
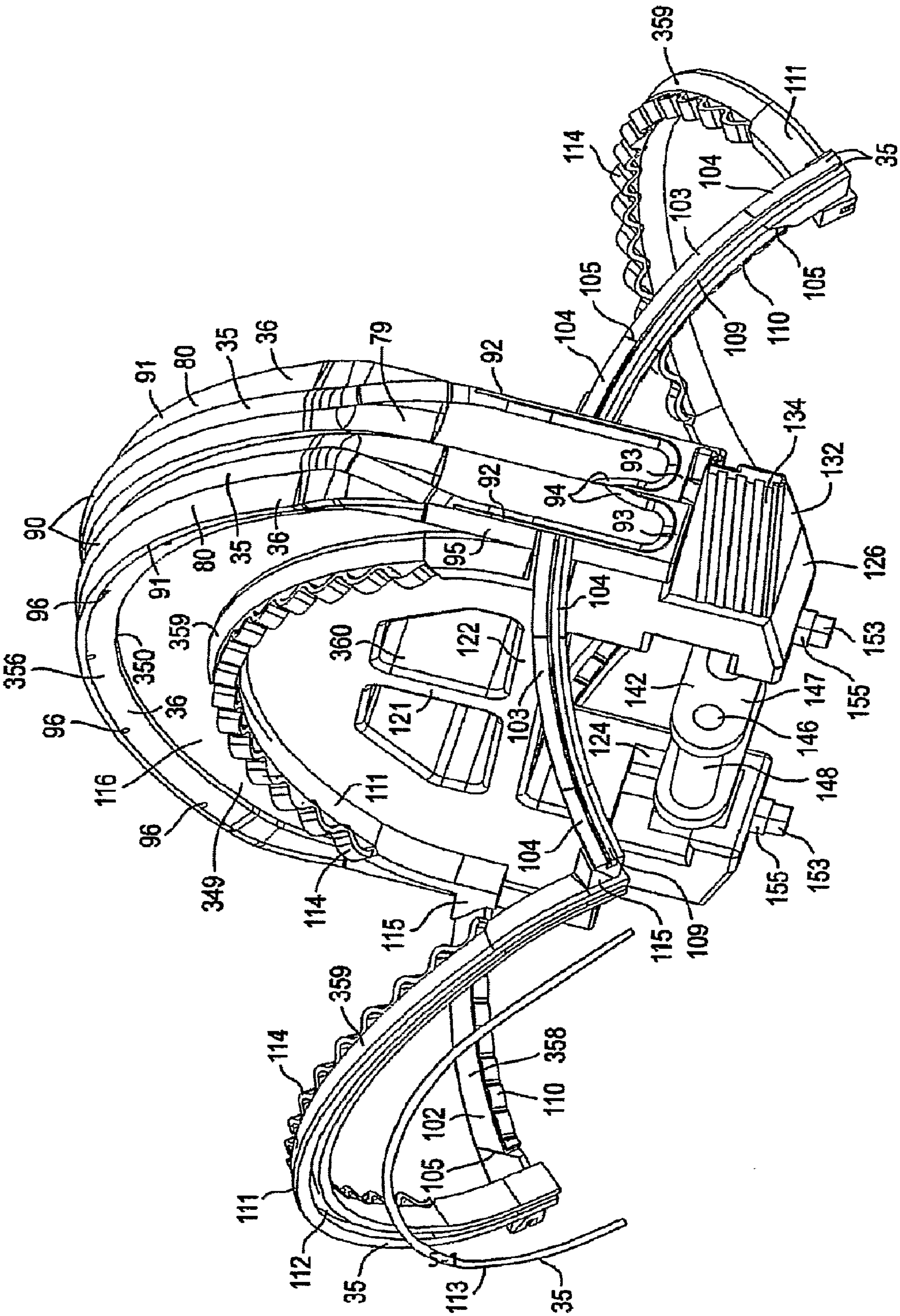
FIGS. 8 to 10 depict detailed side, top, and bottom perspective views of the combustion chamber seals.

FIG. 8 shows a side perspective view of the combustion chamber sealing system of the combustion chamber sealing system 78 with and exploded vane face seal strip 113.

The vane face seals 111 are located in the rotor vane passage 184 to ensuring tight sealing between the rotor 183 and the sliding vanes 116. The vane face seals 111 are generally semi-oval upside down U-shaped, roughly corresponding to the curved shape profile of the tips of sliding vanes 116. There are thus sixteen vane face seals 111 in the preferred embodiment, one adjacent to each side of vane face 349, of the eight sliding vanes 116. The vane face seals 111 have a slight tapered top surface 359 that runs to the back edges of seals 111. This allows combustion chamber's 34 gas pressure to help bias the vane face seals 111 outward to thereby seal against the vane face surface 349.

The vane face seal 111 is also biased outward by a corrugated spring 114 located in rotor vane face seal spring recess 189. The vane face seal 111 also contains a seal strip 113 located in small seal strip groove 112 that runs across the entire length of the vane face seal sealing surface 111 to help provide additional sealing along the vane face surface 349. The top back edge of the vane face seal strip 113 has a small bevel 352 running the entire length of the vane face seal strip 113 that helps bias the vane face seal strip 113 outward against the vane face surface 349. The contact sealing surface of the vane face seal 111 and vane face seal strip 113 are coated with a solid lubricant 35 that is comprised of lubrication oxides for high temperature lubrication and durability. The ends of the vane face seal 115 extend outward at 90-degrees from the main vane face seal 111 to help interface and seal across the lower split vane axial seal segment 82, making sealing contact with surface 95 and to fit over and help support the axial seal end piece 104.

The vane face seal 111, vane face seal strip 113 and vane face seal corrugated spring 114 are generally semi-oval upside down U-shaped, roughly corresponding to the shape of the tips of each sliding vane 116.

Split Vane Seals

Referring to FIGS. 8 and 11, one split vane seal 79 is slidably fastened along the outer perimeter 350 of each sliding vane 116. The split vane seals 79 ensure tight sealing between the sliding vanes 116 and the inner stator surface 37 of the housing stators 2 and 4. The split vane seals 79 are generally semi-oval upside down U-shaped, similar in overall shape but slightly larger than the vane face seals 111. Each split vane seal 79 has two vane seals 80 that are mirror images of each other. There are thus sixteen vane seals 80 in the preferred embodiment, two for each of the eight sliding vanes 116. By using two vane seals 80 for each sliding vane 116, double sealing performance to the combustion chamber 34 is provided and vane seal 80 blow-by losses are minimized. This also allows two adjacent combustion chambers 34 to each sliding vane 116 to have their sealing forces optimized and balanced for each chamber's specific sealing requirements to maximized engine's 1 performance and minimize excessive friction and wear.

Segmented Vane Seals

Referring to FIGS. 11 to 18, each of the two vane seals 80 within each split vane seal 87 toggles back and forth on top of the sliding vane 116 to match the profile of the inner surface 37 of housing stators 2 and 4 to maintain proper sealing conditions. However, due to a bipolar engine thermal profile with a constantly cooler intake-compression zone and a hotter combustion-expansion zone, the lower vane seal segment 82 or side straight portion of each split vane seal 87 needs to expand outward to maintain proper sealing conditions along the axial side of the sliding vane 116. To accomplish this, each split vane seal 87 is segmented into a top center segment 81 and two side lower segments 82. The top center vane seal section has two slant angled keystone interface grooves 84 at each end. Each of the lower segments 82 has a matching slant angled keystone shaped tongue interface extension 85. The top vane seal center segment 81 and two lower segments 82 of each vane seal 80 are interleaved together with a slant angled keystone tongue and groove interface 83. This slant angle vane seal segment interface 83 allows the lower segments 82 to slightly slide in and out along the slant angle vane seal interface 83, thus sealing the slightly contracting and expanding the inner stator surface 37 swept out by the sliding vane 116 as it rotates. Side gas channels 97 behind the lower vane seal segment 82 use combustion chamber 34 gas pressure to press each lower vane seal segment 82 against the inner stator surface 37. Having the vane seals 80 segmented not only helps improve sealing performance of the sliding vanes 116 from variations in the contour of the inner stator surface 37, combustion vibrations, it also improves the vane seal's 80 operational durability due to wear. As the outer surface of the lower vane seal segment may wear away due to sliding friction with the inner housing stator surface 37, the lower vane seal segment 82 is able to slide outward along the vane seal segment interface 83 to continue to make sealing contact with the inner housing stator surface 37. This greatly increases the vane seal's operational durability and reduces the potential for sealing failure.

Contoured Snub Nose Vane Seal Tip

Figure 9:
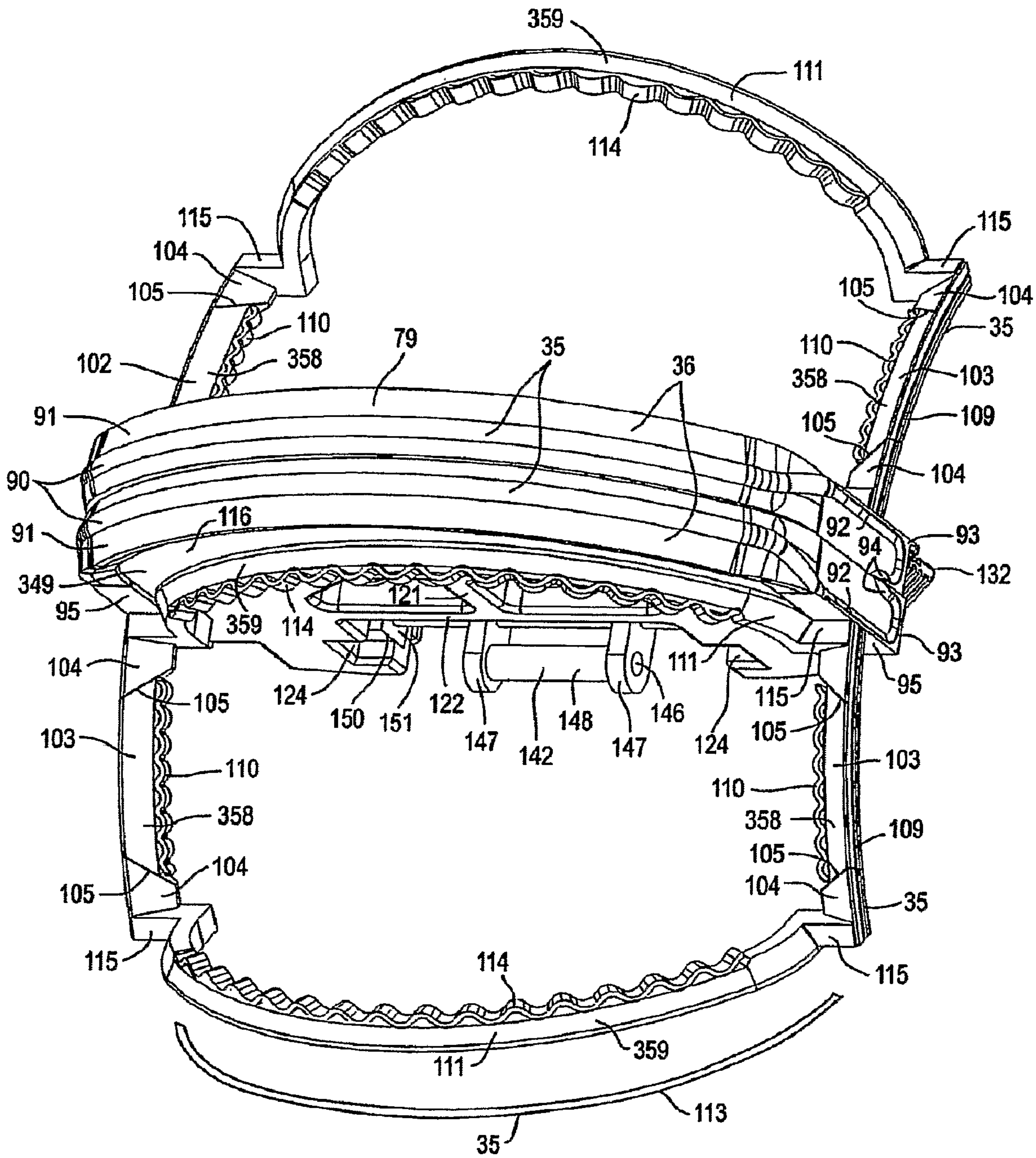
Figure 10:
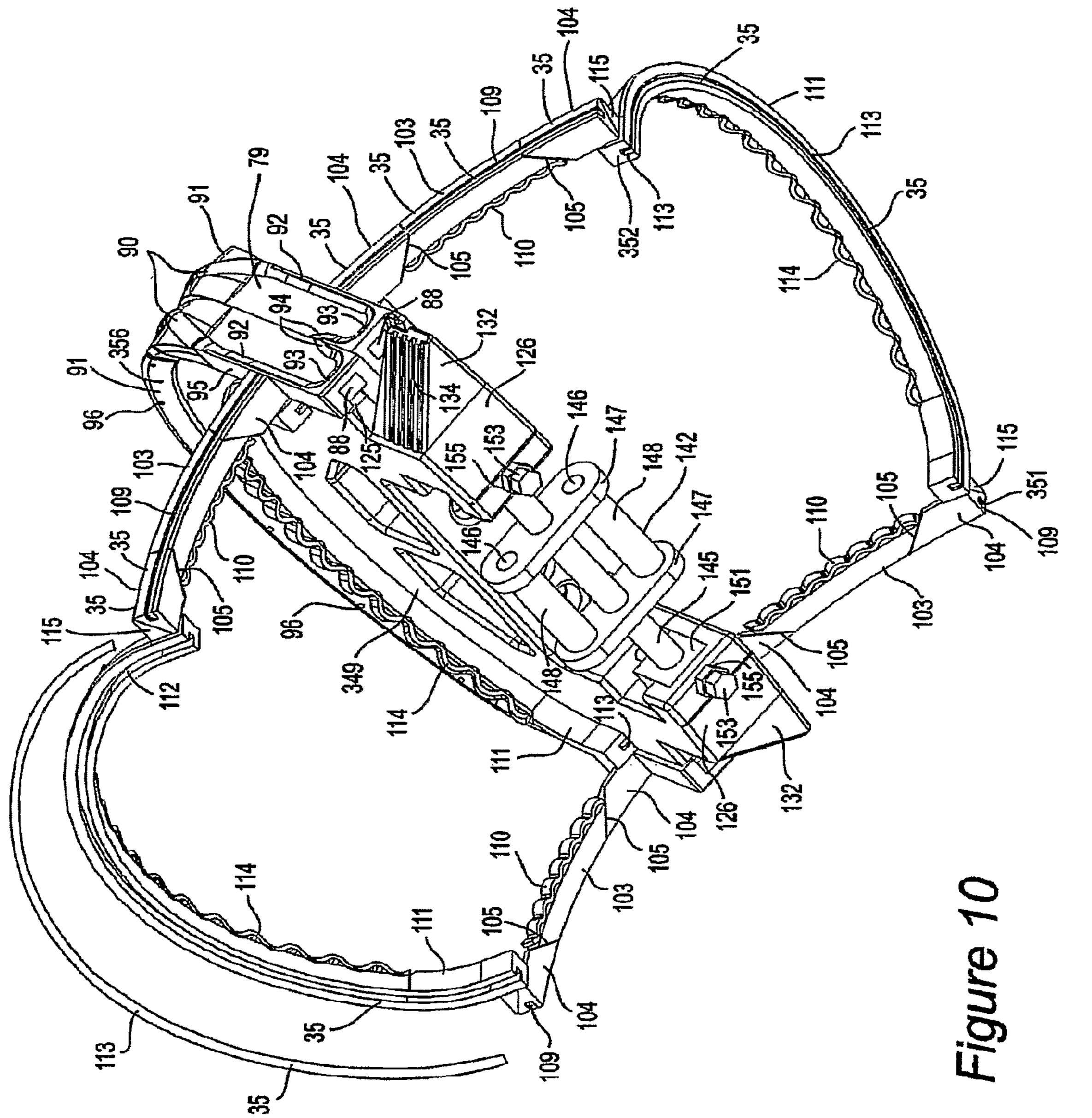
Figure 14:
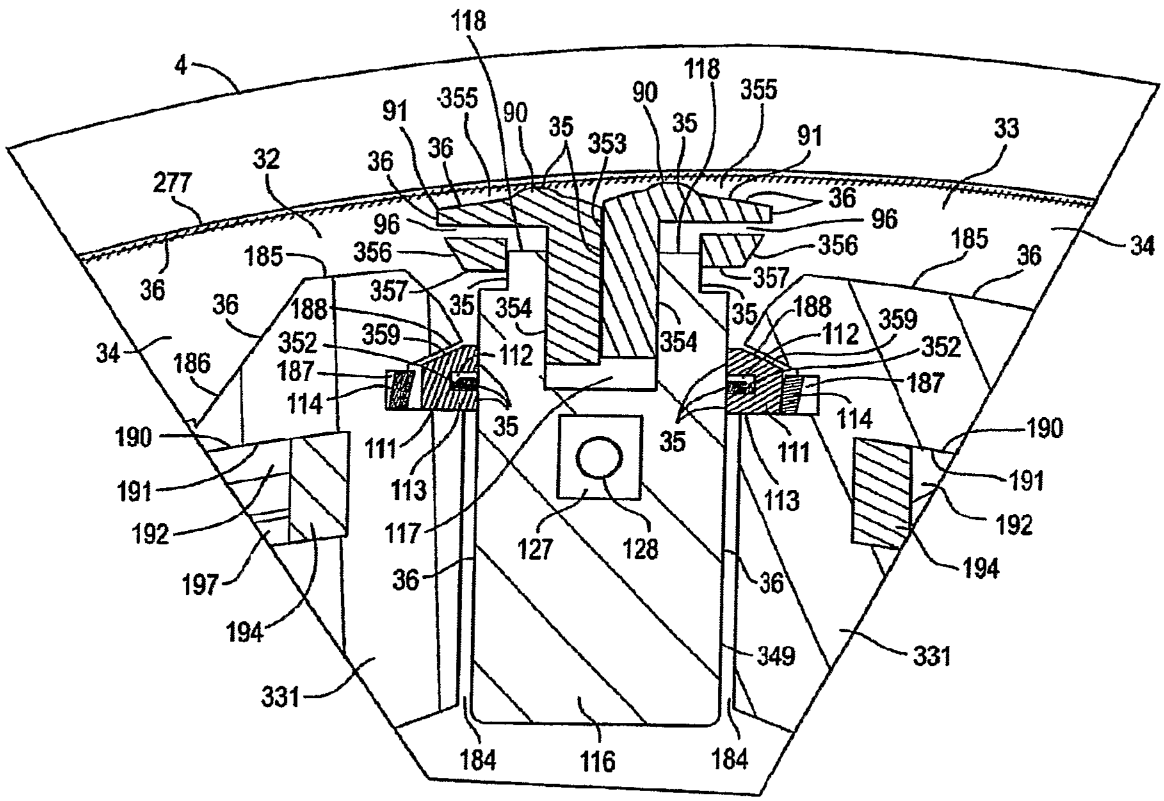
FIG. 14 depicts a side detailed cross-section breakout of split vane seals, sliding vane, and vane face seals.

Referring to FIGS. 9 and 14, the vane seal 80 tip includes a snub nose tip 90 that provides a small contoured rounded tip that can slide smoothly across profile the inner housing stator surface. The small snub nose tip 90 is more concentrated to minimize excessive surface sealing contact. During combustion, large stress and vibration forces are created. However, the snub nose seal may be vibrated off the inner housing stator surface. This action may result in chattering mark damage to the inner housing stator surface 37. However, by making the snub nose seal 90 slightly wider, the impact forces are distributed over a slightly larger surface area and are less likely to result in chattering mark damage. The curved contour of the snub nose tip 90 makes good contact with the changing angles of inner housing stator surface 37, as the sliding vanes 116 and rotor 183 revolve around the inner housing stators 2 and 4. This also distributes the contact sealing point across the curved contoured surface of the snub nose tip 90, which helps extend the operational durability of the vane seal 80 and minimize sealing failure. The snub nose seal tip 90 curves around the top center profile of center vane seal segment 81 of the vane seal 80 and transitions to the outer vane seal sides 92 along the lower vane seal section 82 of vane seal 80. The side snub nose seal 92 provides good axial sealing of the lower vane seal segment 82 and the side inner stator surface 37 of stator housing 2 and 4. It also allows the vane seal 80 to make a sealing interface with the axial seal 102 and vane face seal 111. The flat lower vane seal segment face surface 95 provides a flat contact interface surface with the axial seal end segments 104 and vane face seal interface extensions 115. To prevent gases from blow-by the snub nose seal tip 90 and go between the two vane seals 80 from going into the inner sections of the rotor 183, the snub nose seal surface will continue to wrap around the bottom edge 93 of vane seals 80. The snub nose seal surface 90 then also wraps back up along the inner vane seal edge 94 where the two vane seal 80 meet and slide together. This short inner snub nose seal edge 94 is long enough so that when the vane seals 80 toggle, they still overlap each other to prevent any inner vane seal gases from leaking out of gaps in the bottom of vane seals 80. Water from the active cooling system and water injections migrate between snub nose seal tips 90 and help provide sliding lubrication to the snub nose seals and inner housing stator surface 2 and 4. Some of the water is also converted to steam that fills and pressurizes the space between the two snub nose seals 90. This helps prevent blow-by between adjacent combustion chambers 34.

The snub nose vane top sealing tips 90, side edges 92, bottom edges 93, inner edges 94, and flat face surfaces 95 of vane seals 80 are coated with a solid lubricant 35 comprised of oxides for high temperature lubrication and durability.

Vane Seal Gas Biasing

Referring to FIG. 14, during the operation of engine 1, combustion gases in combustion chamber 34 tend to push into gas gaps 355 between the vane seals 80 and the inner stator surface 37, forcing the vane seals 80 away from the inner surface 37, thus compromising the sealing of the combustion chambers 34. To effectively counter these very strong combustion forces, each vane seal 80 is preferably gas-biased for quick utilization of the combustion gases to equalize the forces separating the vane seals 80 from the inner stator surface 37. In the preferred embodiment, this gas-biasing is achieved in two ways, by using an extended vane seal tip 91 with an angled surface 256 and bottom 257, and by using vane seal gas passages 96 of vane seals 80.

Angled Extended Vane Seal Tip

Referring again to FIG. 14, the first gas biasing method for countering gas forces in gas gaps 355 uses an a extended vane seal tip 91 with an angled outer side surface 356 and bottom surface 357 on each vane seal 80. The angled outer sides 356 increase the width of each vane seal 80 as one moves closer to the inner stator surface 37. The extended vane seal tips 91 angled outer sides 356 and bottom surface 357 thus provide surface areas that are angled outward, such that expanding combustion gases tend to push the vane seals 80 toward the inner stator surface 37 of stators 2 and 4, thereby sealing each combustion chamber 34 more effectively.

A thermal barrier coating (TBC) 36 is applied to the top surfaces of the extended vane seal tip 91 and the angled outer sides 356 of vane seals 80 to minimize split vane seal 79 thermal stresses and deformations, so as to improve the split vane seal's 79 sealing performance with the inner housing stator surface 37 and extend its operation durability lifespan.

Vane Seal Gas Passages

Figure 12:
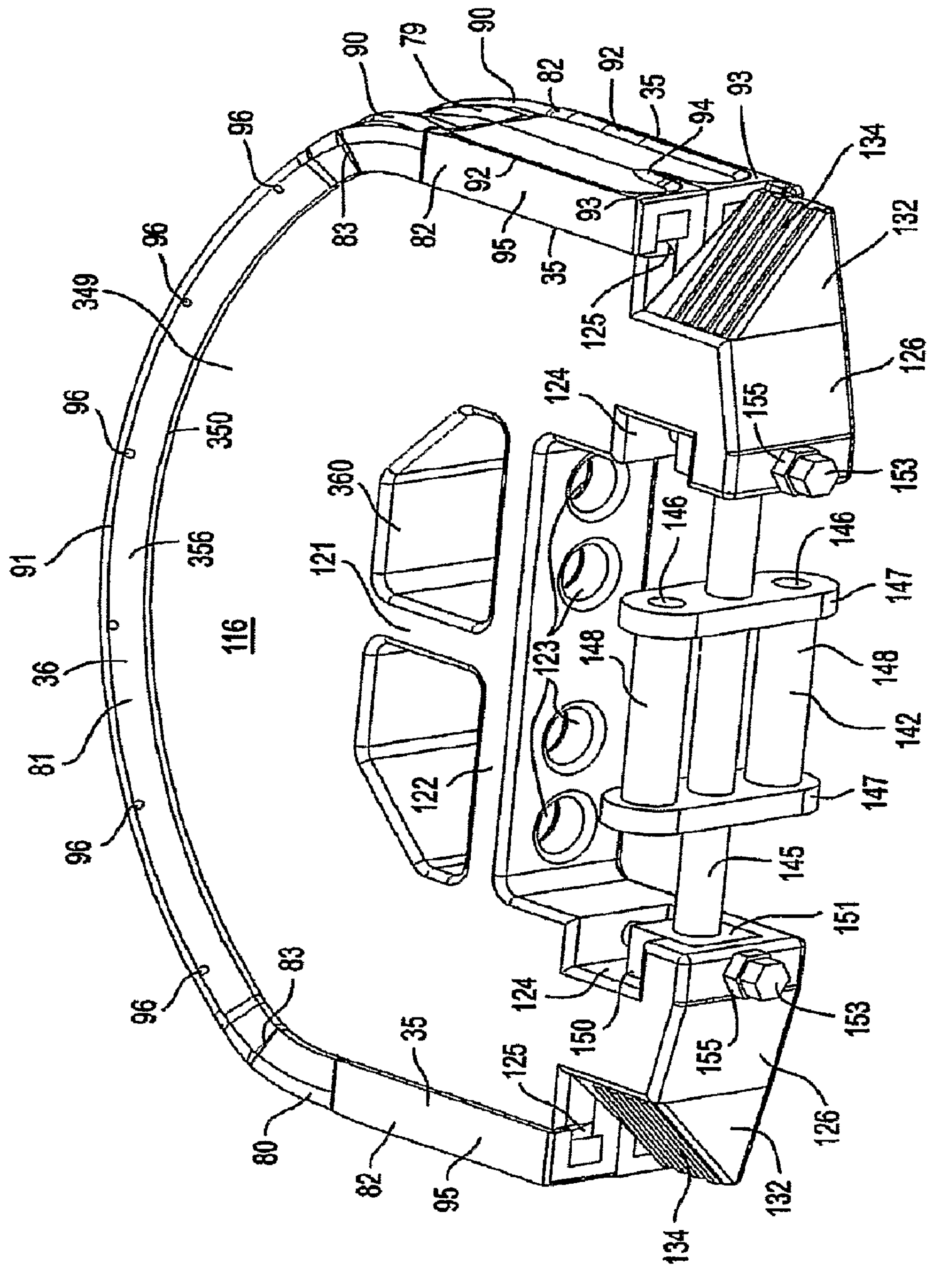
Figure 13:
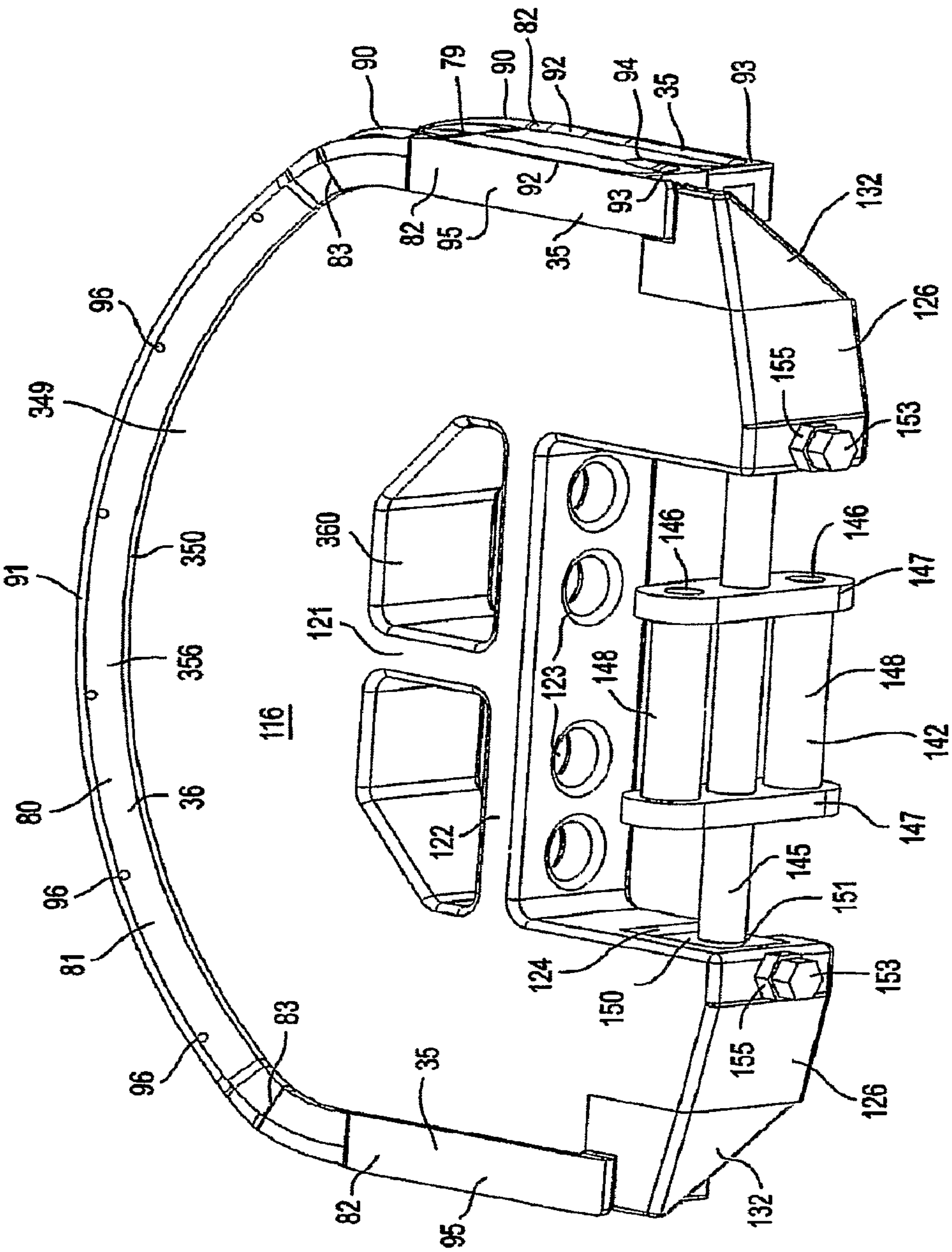

Referring further to FIG. 14, the second gas biasing method for countering the combustion gas forces in the gas gaps 355 is the use of gas passages 96. Multiple gas passages 96 pierce each vane seal 80 from the vane sealing angled surface 356 to the location where the vane seal 80 touches the inner vane seal surface 354 above support ridge 118 of the sliding vane 116. The gas passages 96 the support ledge 118 of the sliding vane 116, thus creating a surface for combustion gases to bias the vane seal 80 upward toward the inner stator surface 37, and thereby sealing the combustion chamber 34 more effectively. The gas passages 96 are distributed along the entire curved center vane seal section 81 of the vane seals 80 as shown in FIGS. 11 to 13. Either or both of these gas biasing methods may be used.

The axial gas channels 97 cut into the vane seals 80 to direct combustion gases across the top of the side of the vane support ridges 118 behind lower vane seal segment 82 of sliding vane 116. This forces the lower vane seal segment 82 outward against the side of the inner housing stator surface 37 making a tighter sealing contact between the vane seals 82 of the sliding vane 116 and the inner stator surface 37 of housing stators 2 and 4. This tighter sealing contact helps minimize combustion gas leaks through the split vane seals 87. It also creates a small amount of friction force that helps reduce the abrupt movement of the split vane seals 87 due to quick, high energy bursts from combusting gases.

A benefit of using split vane seals 87 with gas passages 96 and side gas channels 97 is that they not only provide superior sealing performance, but that they allow each vane seal 80 within a split vane seal 87 to be isolated to each adjacent combustion chamber 34 and provide a sealing force based on that individual combustion chamber's 34 pressure conditions. Thus, each of the sliding vane's 116 forward and trailing combustion chambers 34 may have different pressure and sealing requirements, and the split vane seals 87 with gas passages 96 and side gas channels 97 automatically adjust the sealing forces to match those pressure and sealing requirements. Balancing the chamber sealing forces with combustion chamber 34 gas pressures makes sure that only just enough sealing force will be applied against the inner housing stator surface 37 to properly seal the combustion chamber 34, but not too much sealing force so as to result in excessive sealing friction that can reduce the engine's 1 performance potential and increase vane seal 80 and inner housing stator surface 37 wear. The vane seal 80 gas passages 96 and axial gas channels 97 will help absorb and compensate harsh combustion ignition forces that could result in chatter marks on the inner housing stator surface 37 that could also damage vane seals 80. Gas biasing of vane seals 80 helps optimize combustion chamber 34 sealing performance with smooth sliding operation that extends the durability of the vane seal 80 and inner housing stator surface 37 of housing stators 2 and 4.

Vane Seal Toggling Action

In operation, the two vane seals 80 in each split vane seal 79 slide against each other in a reciprocating motion in relation to each other, as they toggle in and out laterally relative to the rotor 183 within the plane of the generally disc-shaped rotor 183. This toggling action complements the toggling action of the sliding vanes 116 themselves, providing additional combustion chamber 34 sealing capability by better matching the geometric profile of the inner surface 37.

Split Vane Roller Bearings

Figure 15:
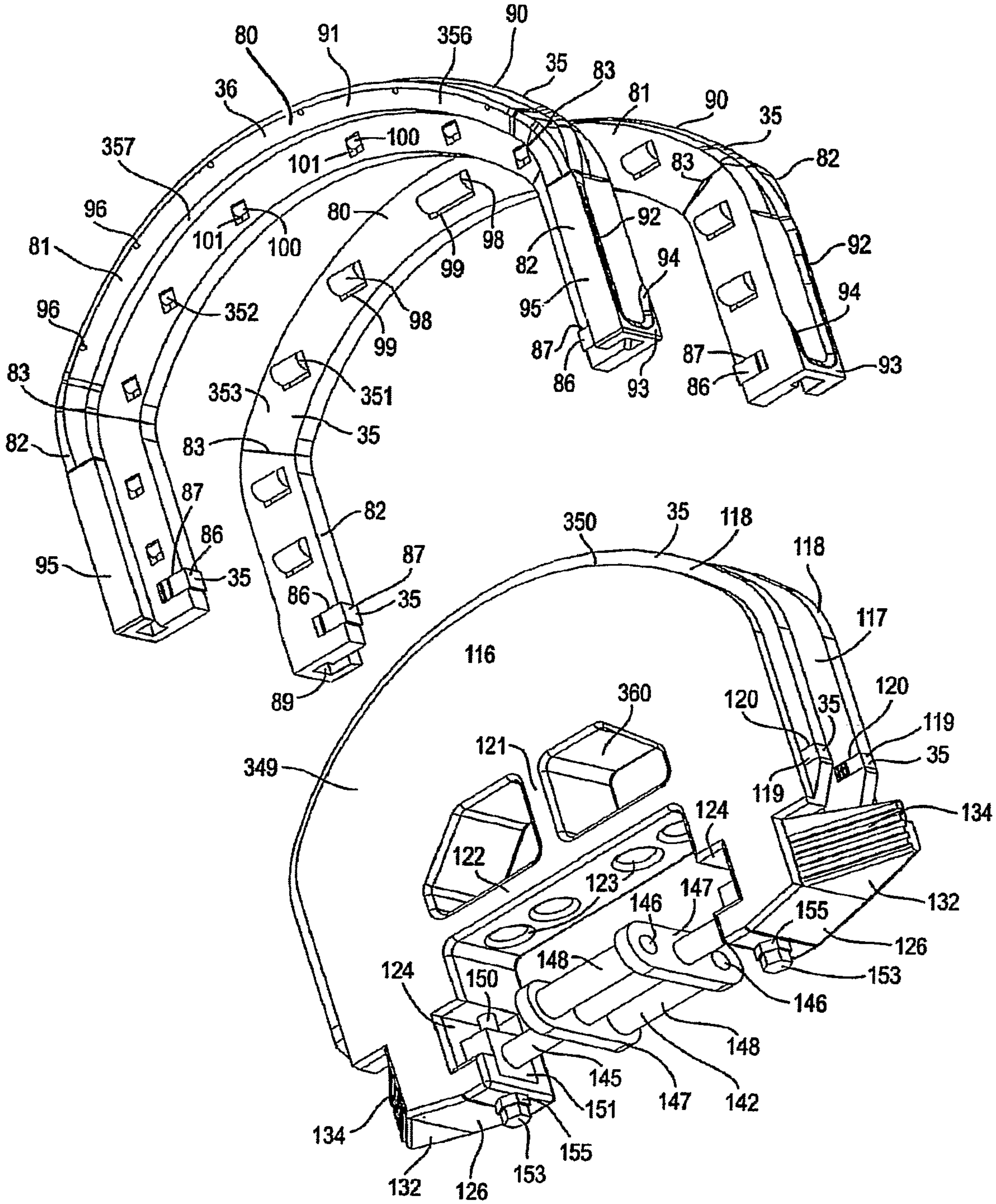
FIGS. 15 to 17 depict the front, side, and top perspective views of the sliding vane and split vane seal with two exploded vane seals.

FIG. 15 shows the sliding vane assembly 116 with vane seals 80 of the split vane seal 79 exploded, thereby showing the inner vane seal assembly 351 and outer vane seal assembly 352. To help facilitate the toggling action of the vanes 80 of the split vane seal 79 an inner vane seal bearing assembly 351 and an outer vane seal bearing assembly 352 are used. For the inner bearing, assembly 351 is comprised of small roller bearings 98 are located in inner vane seal roller bearing channels 99 embedded in split vane seals 79 along the inner vane seal surface 353 where the two vane seals 80 in each split vane seal 79 meet and toggle together. The outer vane seal bearing assembly 352 is comprised of small roller bearings 100 that are smaller than the inner roller bearing 98, and are located in outer vane seal bearing channels 101 in the split vane seals 79 along the outer vane seal surface 354 that makes contact with the inner vane groove surface 117 of the sliding vane 116.

The location of the inner roller bearings 98 and inner roller bearing channels 99 are offset from the outer roller bearings 100 and outer roller bearing channels 101 on the vane seal 80 so as not to weaken the vane seal's 80 structural strength.

The inner vane seal surfaces 353 of the vane seals 80 are coated with a solid lubricant 35 comprised of oxides for high temperature lubrication and durability. The solid lubricant 35 also assists with the toggling action of the vane seals 80 by reducing friction along their inner vane seal contact surfaces 353. The solid lubricant 35 comprised of oxides is also applied to the out side surface of the sliding vane 116 split vane seal support ridges 118 to further reduce toggling friction between the vane seals 80 and the sliding vane 116.

Vane Seal Support Ridges

Figure 16:
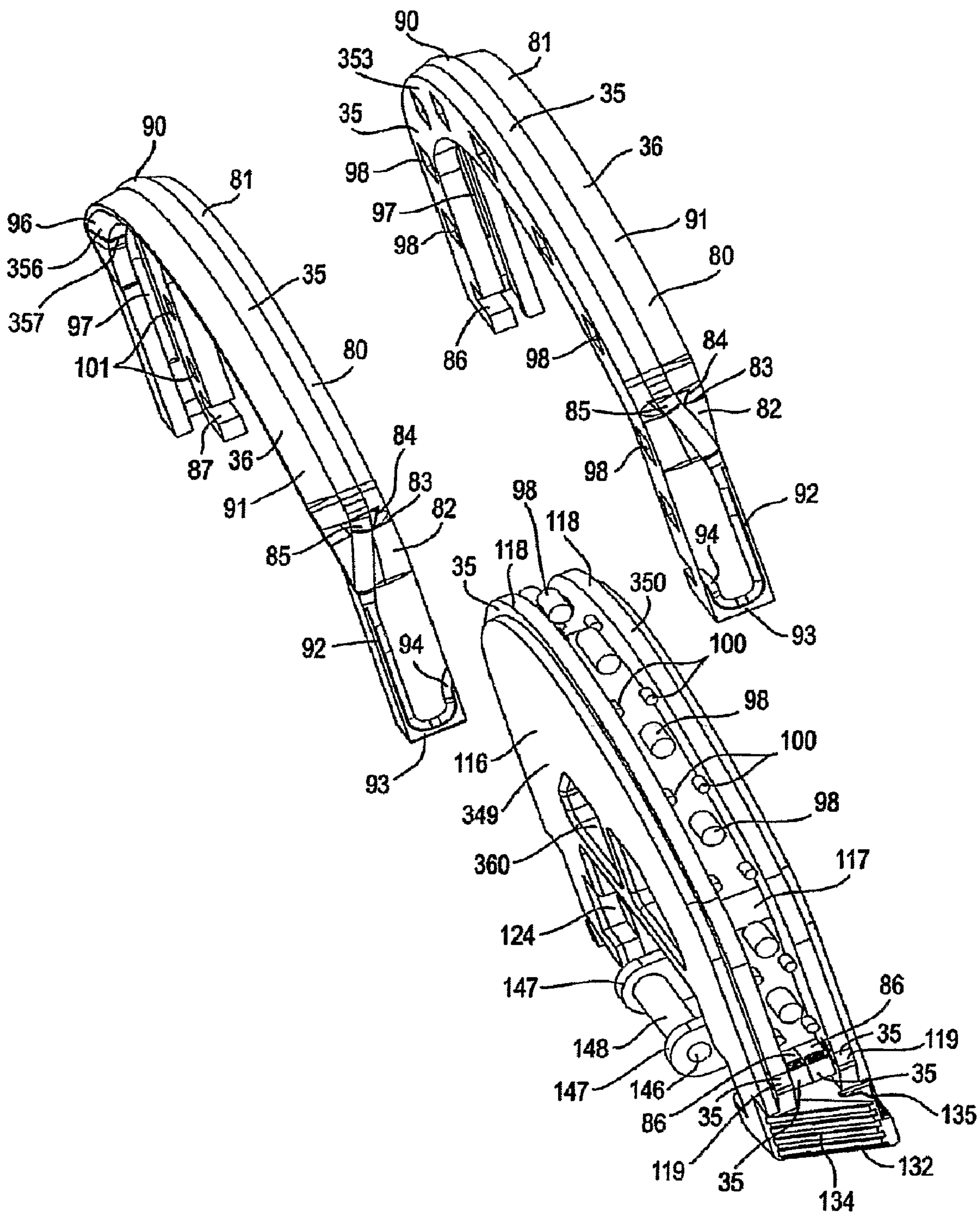
Figure 17:
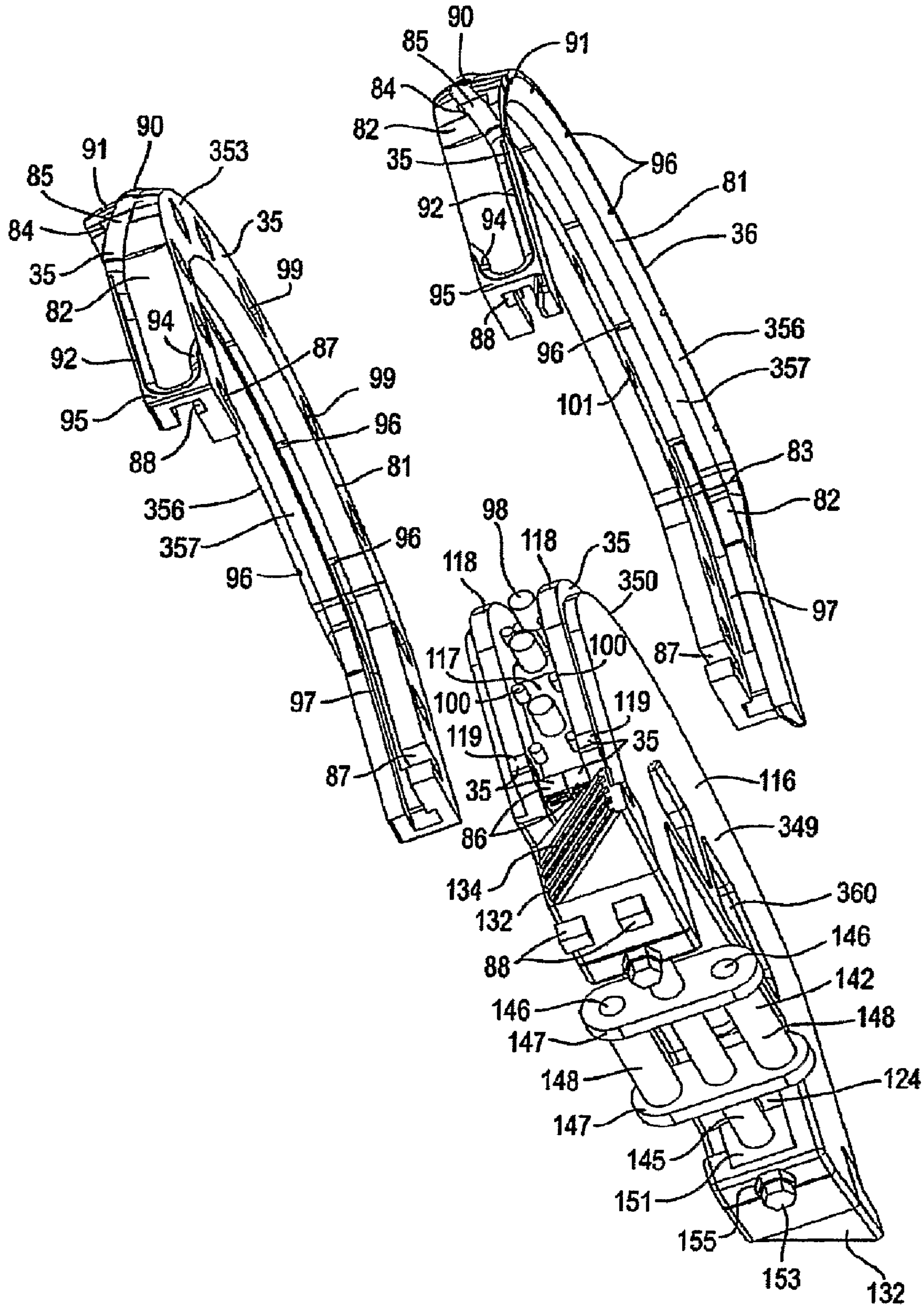

As shown in FIGS. 14, 15 and 16, two vane seal support ridges 118, separated by a split vane seal groove 117, are located along the outer perimeter 350 of each sliding vane 116. The support ridges 118 rim the entire length of the elongated semi-oval U-shaped outer perimeter 350 of each sliding vane 116, helping to keep each split vane seal 79 slidably fastened along the outer perimeter 350 of each sliding vane 116. Without support ridges 118, the split vane seal 79 would tend to torque out of position as it sweeps along the inner stator surface 37 of stator housings 2 and 4.

Vane Seal Groove and Ridge Spring Seals

Figure 22:
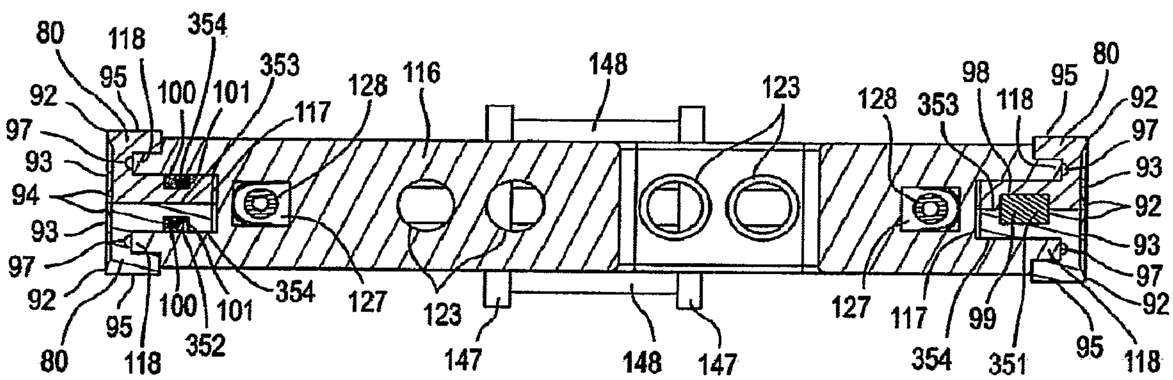
FIGS. 22 and 23 depict top cross-sectional views of the sliding vane, split vane seal, and vane belt toggle assembly.
Figure 23:
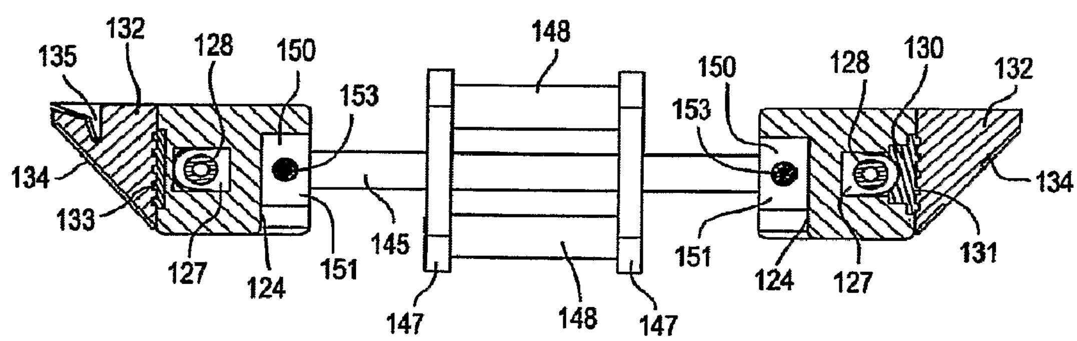
Figure 20:
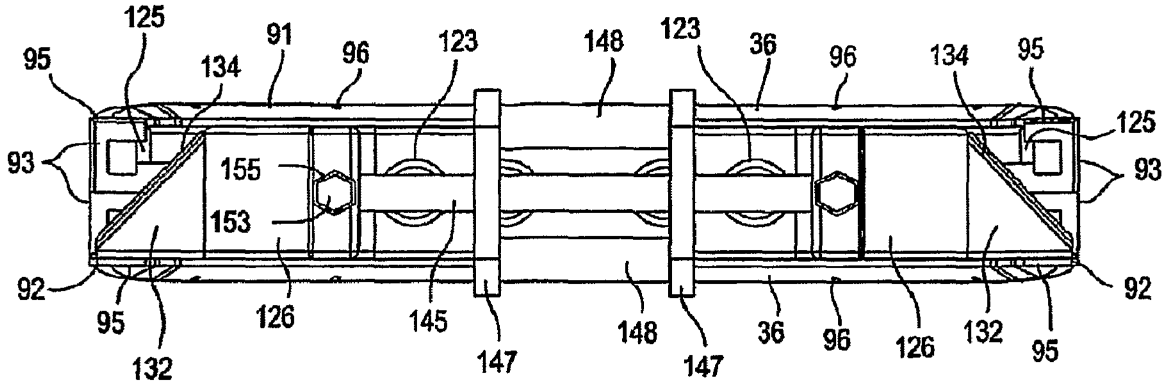
Figure 24:
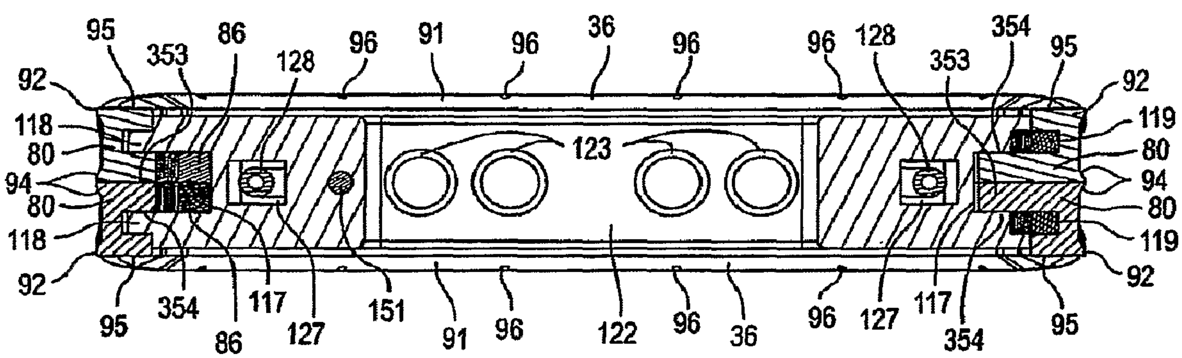
FIG. 24 depicts a bottom cross-sectional view of the sliding vane and split vane seal.
Figure 21:
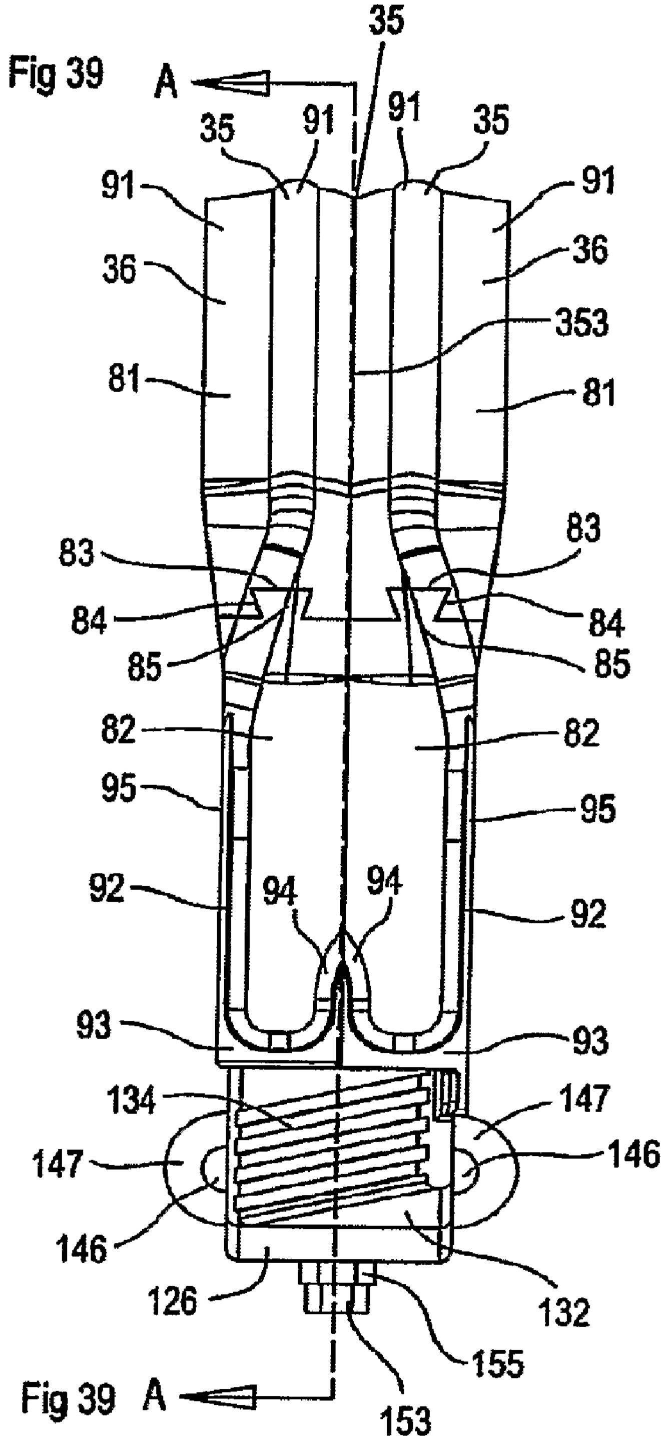
Figure 25:
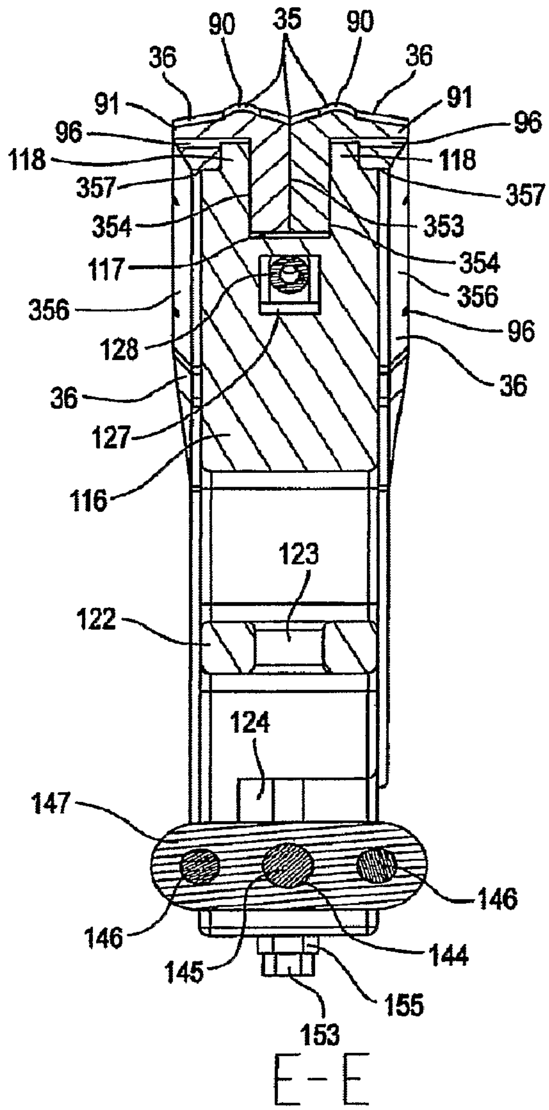
FIGS. 25 and 26 depict side cross-sectional views of the sliding vane and split vane seal.
Figure 26:
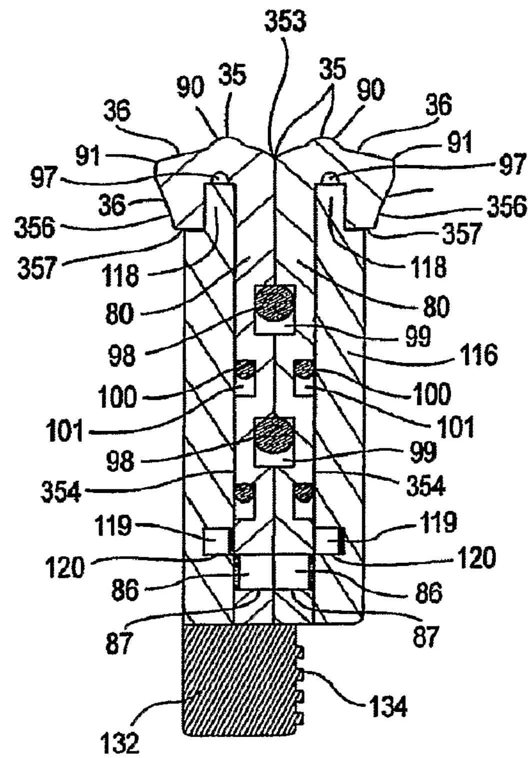
Figure 27:
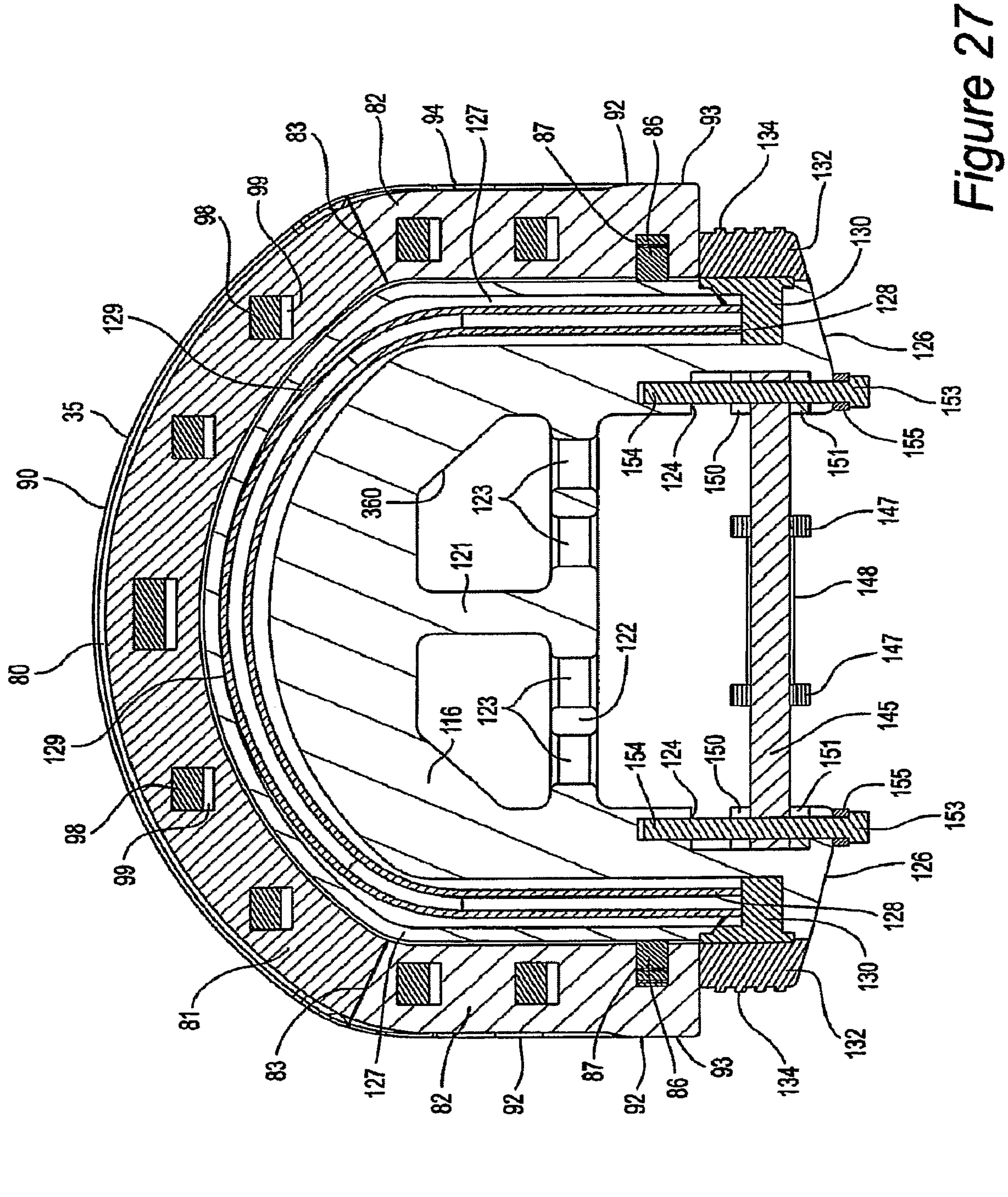
FIG. 27 depicts a front cross-sectional view of the sliding vane and split vane seal.
Figure 28:
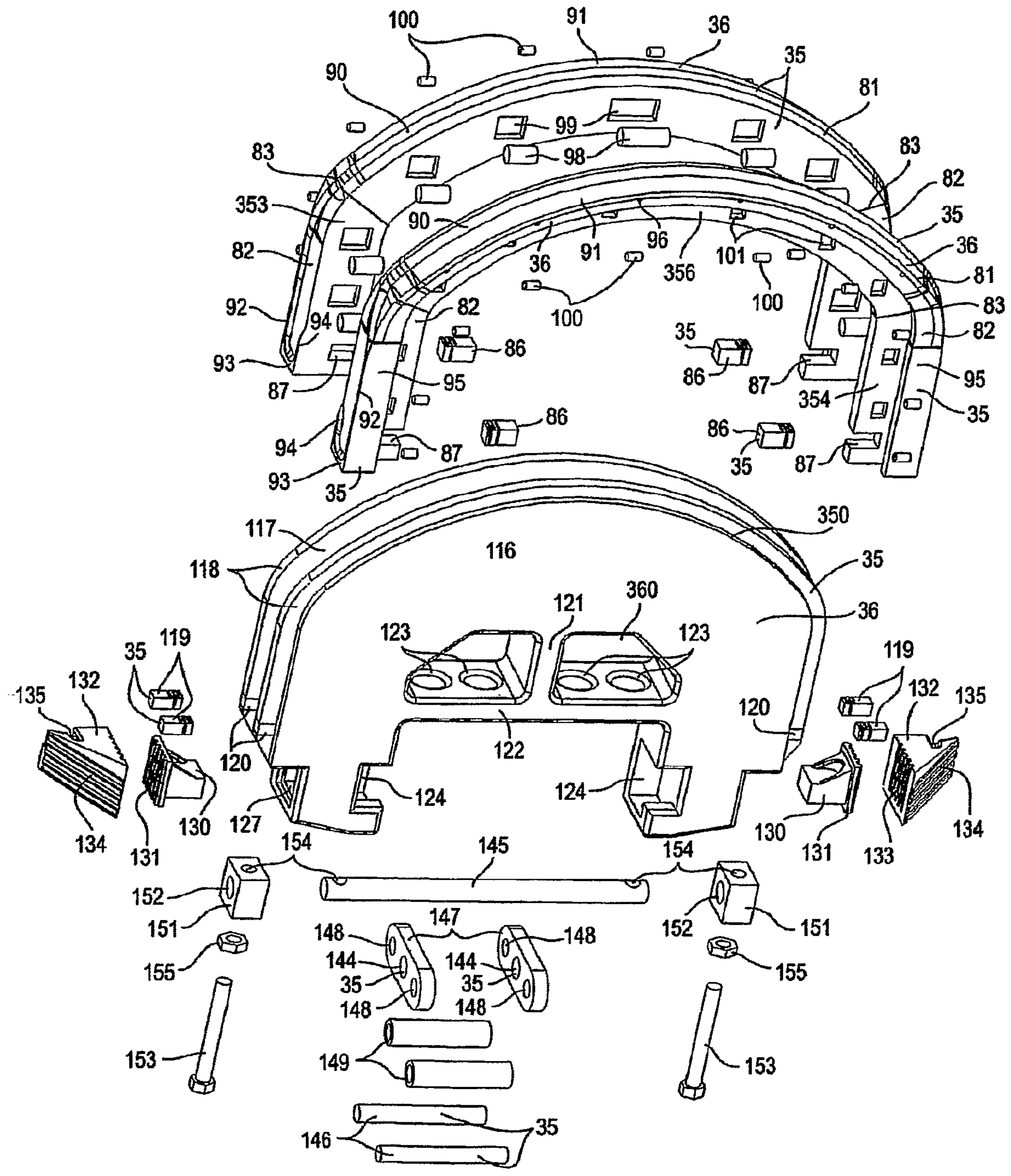
FIG. 28 depicts an exploded view of a sliding vane and split vane seal assemblies.

Referring to FIGS. 22, 24 and 27, in operation, the bottom edge of lower vane seal segment 82 of vane seals 80 must be closed off to prevent any combustion gases located underneath the vane seals 80 in the split vane groove 117 and top of the vane seal ridges 118 from penetrating deeper into the engine 1. Therefore, the bottom inner edge of lower vane seal segment 82 contains a spring seal 86 that is embedded in spring seal recess channel 87. The spring seal 86 presses inward toward the sliding vane 116 to help seal the bottom split vane groove 117. The front sealing surface of the vane groove spring seal 86 is coated with a solid lubricant 35 comprised of oxides for high temperature lubrication and durability. The bottom vane seal support ridges 118 of sliding vane 116 are sealed by ridge spring seals 119 embedded in ridge spring recesses 120 located near the bottom of the vane seal support ridges 118. The ridge spring seal 119 pushes outward from the vane ridge 118 sealing against the inner surface of the lower vane seal 82 sealing off the axial gas channel 97 to prevent combustion gases from gas channel 97 from passing out of the bottom of the lower vane seal 82 and into the inner sections of the rotor 183. The sealing surface of the ridge spring seal 119 is also coated with a solid lubricant 35 comprised of oxides for high temperature operation and durability.

Water Drain Passage

Figure 18:
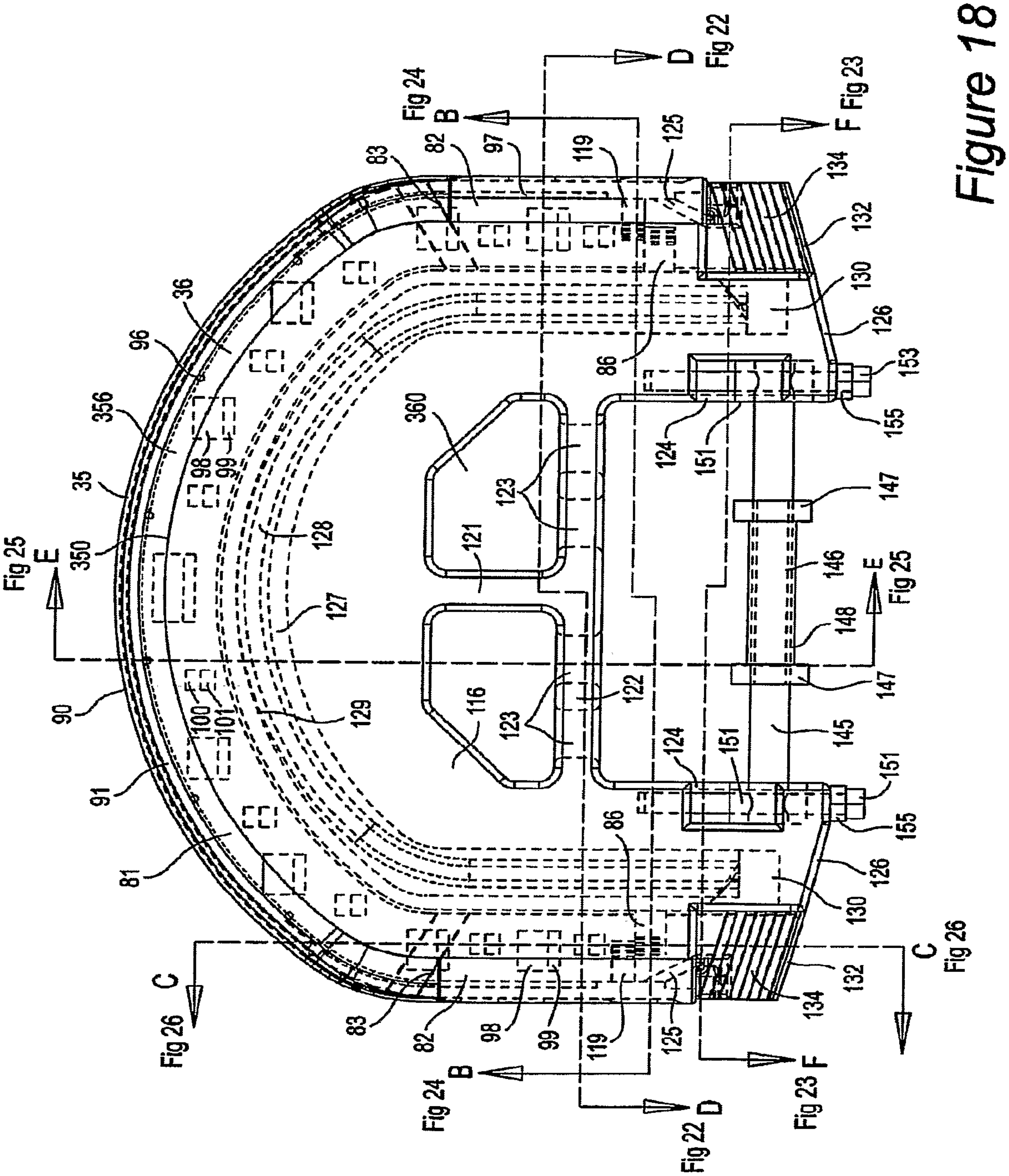
FIGS. 18 to 21 depict the front, top, bottom, and side perspective views of the sliding vane and split vane seal assembly.
Figure 19:
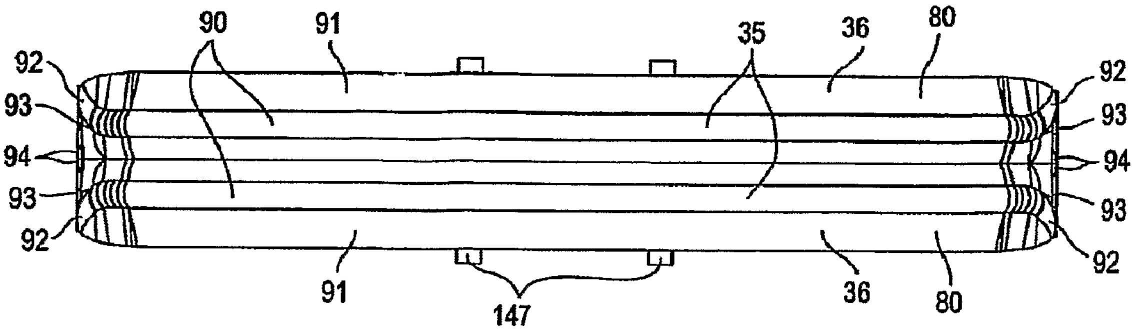

Referring to FIG. 18, the bottom edge of the sliding vanes 80 of the split vane seal 79 is angled back towards that sliding vane 116. This helps to make sure that the sliding vane seals 80 stay seated on the sliding vane 116 and do not extend off the top of the sliding vane 116. This also creates a water drain passage 125 where a small amount of deionized water 320 from the inner rotor and vane cooling area 361 of the active cooling system 362 may get underneath the bottom of the vane seals 80 along the vane support ridges 118 until it reaches the vane ridge spring seal 119 that seals combustion gas on the top surface and deionized water 320 from the bottom. The deionized water 320 from the active cooling system 362 inside the water drain passage 125 also helps dampen shocks and vibration in the vane seals 80 of split vane seals 79 from combustion forces, sliding contact with the inner housing stator surface 37 of housing stators 2 and 4, and as the vane seals toggle back an forth. This results in a smoother engine operation and improves vane seal 80 sealing performance and durability.

Solid Lubricants

Referring to FIGS. 8 to 28, solid lubricants based on oxide materials are applied to the load contact surfaces of all of the combustion chamber seals 78. This helps reduce friction between all moving parts, thus reducing heat buildup. It also provides a lubrication system that will not mix with or contaminate the combustion reaction inside the combustion chamber 34. Special binary oxides and Superhard Nanocomposite (SHNC) lubricant coating being developed at the Argonne National Laboratory may be used for this application. Preferably a plasma sprayed oxides PS 304 oxide solid lubricants may be used which have a maximum operation range of 900 degrees Celsius.

Sliding Vane Structure

Referring to FIGS. 18 to 27, the sliding vane 116 is generally semi-oval upside down U-shaped, similar in overall shape to the inner housing stator surface 37 geometry profile of inner housing stators 2 and 3. The sliding vane has a split vane groove 117 to hold sealing vanes 80 of split vane seal 79 and support vane seal support ridges 118 to help prevent vane seals 80 of split vane seal 79 from torturing and/or deforming out of proper sealing contact position with the inner housing stator surface 37 of housing stators 2 and 4.

Upside Down U-shaped Center Section

Referring to FIG. 18, the center upside down or inverted U-shaped section 360 of the sliding vane 116 is cut away to lighten the material mass of the sliding vane. As the sliding vane 116 revolves around the inner housing stator surface 37, the mass weight of the sliding vane can exert considerable centrifugal force to the split vane seals 79 and inner housing stator surface 37 that can result in excessive friction forces resulting in lower engine 1 performance, sliding vane 116 deformation and split vane seal 78 wear. Removing this center inverted U-shaped section 360 of the sliding vane 116 greatly reduces unnecessary sliding vane 116 mass weight and excessive friction forces to improve the performance of engine 1, vane 116 durability and split vane seal 78 sealing performance and durability. To insure that the sliding vane structure 116 will not deform due to the large inverted U-shaped section 360 removal, small vertical 121 and horizontal 122 support bars are placed across the inverted U-shaped opening 360 of the sliding vane structure 116. The sliding vane 116 horizontal support bar 122 has multiple holes 123 drilled through its surface to reduce the mass weight of the horizontal support structure 123 and also allow the free movement of deionized water 320 of the inner rotor and sliding vane area 361 of active water cooling system 362. The bottom ends surfaces 126 of the sliding vane are angled or sloped from the center of the sliding vane 116 outward towards the side stator housings 2 and 4 which allows deionized water 320 from the active cooling system 362 inside center of the rotor 183 to be diverted outward toward the side inner housing water return recesses 44 located on both sides of the lower inner housing stators 2 and then into the hot water storage tank (not shown).

Thermal Barrier Coating

Referring to FIGS. 18 to 28, a thermal barrier coating (TBC) 36 is applied to the front and back faces 349 of the sliding vanes 116. The TBC 36 protects the sliding vanes from high combustion gas temperatures coming from the combustion chamber 34 which can damage or soften the sliding vanes 116 and result in thermal deformations. The thermal deformations of the sliding vanes 116 can be made more sever due combustion forces from the combustion chamber 34 and from sliding vane contact with the inner housing stator surface 37 of housing stators 2 and 4. This can result in vane seals 80 being misaligned with the inner housing surface 37 and cause damage to the vane seals 80 and/or inner housing stator surface 37, or sealing failure. The TBC 36 helps protect the sliding vane 116 from high combustion temperatures that might result in thermal deformations. This helps improve the sliding vane's 116 vane seals 80 sealing of split vane seal 79 sealing performance of combustion chamber 34 along the inner housing stator surface 37 of housing stators 2 and 4.

Thermal barrier coatings 36 also help prevent the oxidation of substrate material. A low thermal conductivity thermal barrier coatings made of Yttrium Stabilized Zirconium (YSZ) doped with additional oxides that are chosen to create thermodynamically stable, highly deflective lattice structures with tailored ranges of defect-cluster sizes to reduce thermal conductivity and improve bonding adhesion with the rotor surface. The defect cluster YSZ TBC has a thermal conductivity of 1.55 to 1.65 watts per meter degree Centigrade between 400 and 1400 degrees Centigrade.

Heat Pipe Channel

Referring to FIGS. 18 to 27, each of the sliding vanes 116 contains an inner heat pipe channel 127 that is inverted U-shaped and similar to the sliding vane's perimeter 350 and located just under the vane seal groove 117. The vane inner heat pipe channel 127 is slightly filled with water as the working fluid that transfers heat from the vane heat pipe evaporator area 129 from around the sliding vane's perimeter 350 to the vane heat pipe inner condenser 130. By allowing the working fluid water to continuously change from a liquid to a gas and then back into a liquid again allows large amounts of heat to be transferred at sonic speeds. The vane heat pipe channel 127 operates between 24 and 202 degrees Centigrade, or 75 and 397 degrees Fahrenheit, and the larger the temperature difference between the vane heat pipe evaporator area 129 and the inner condenser 130 the faster the rate of heat transfer.

The heat pipe evaporator area helps absorb and transfer heat from the combustion chamber 34 that impacts the sliding vane perimeter 350 of the sliding vane 116, the vane seals 80 of split vane seals 79, vane seal ridges 118, and vane split seal groove 117. It also helps transfer heat that passes through the TBC 36 along the front and back face surfaces 349 of sliding vanes 116. Transferring heat away from these components helps prevent thermal damage and deformations that can damage the sliding vane 116 and split vane seals 78, inner housing stator surface 37, and result in sealing and component failure.

During operation of the vane heat pipe channel 127, heat from the combustion chamber 34 is absorbed by the heat pipe chamber evaporator area 129 along the top of the curved vane perimeter 350 section of the sliding vane 116 where heat from the sliding vane 116 front and back face surface 349, split vane seals 79, vane support ridges 118, and split vane seal groove 117 is transferred into the heat pipe channel 127 so that the water working fluid changes phase from a liquid to a gas along the surface of the vane heat pipe evaporator area 129. The heated gas vapor is transferred through the vane heat pipe channel to one of the two inner condensers 126 located at the bottom corners of the sliding vane 116 were the heat from the gas is transferred into the inner heat pipe condenser and the gas changes phase back into water and circulated back to the heat pipe evaporator area 129. The heat in the inner vane heat pipe condenser is transferred by conduction to an outer vane heat pipe condenser where it transfers the heat by conduction to deionized water 320 that is spayed into the inner rotor and vane area 361 from the active cooling system 362. The heated water 320 is collected in a inner housing water return channel 44 and circulated through inner rotor and vane return tubing 326 and into hot water storage tank (not shown).

Deionized water 320 is the preferred working material for inside the vane heat pipe channel 127. Heat pipes are typically operated by using gravity or a wicking system. In the gravity system, heat is absorbed in the bottom vane heat pipe channel evaporator, causing the internal working material to turn from a solid or liquid into a gas vapor that rises to the top vane heat pipe channel condenser by convection to thereby transfer and release its heat. However, in the sliding vane 116 of the present invention, the vane heat pipe channel 127 is rotating in the rotor 183 which generates strong centrifugal forces creating high G-forces that reverse the gravity operating direction of heat transfer in the vane heat pipe channel 127 so that the ideal heat transfer direction can occur from the outer perimeter or top surfaces 350 of the sliding vane 116 along vane heat pipe evaporator area 129 and towards the inner side bottom ends of the sliding vane 116 towards the vane heat pipe channel inner condensers 130 that is also towards the center of the rotor 183 above the driveshaft 18.

The vane heat pipe channel 127 wraps around the perimeter surface 349 of sliding vane 116 where strong forces from combustion and surface contact with the inner stator surface 37 can result in thermal and mechanical stresses along this perimeter surface 349. The vane heat pipe channel helps to control the thermal stresses by cooling the sliding vane 116, but it also pressurizes the vane heat pipe channel 127 to add structural strength to the sliding vane 116. As the water inside the vane heat pipe is heated, it changes its phase state to higher pressure gas, which raises the internal pressure of the vane heat pipe channel 127 to better match the exterior combustion chamber pressures 34. This allows additional mass to be further reduced from the sliding vane 116 by the inclusion of the vane heat pipe channel without loosing any structural integrity.

Inner and Outer Vane Heat Pipe Channel Condensers

Referring to FIG. 27, the inner vane channel condenser 130 is preferably constructed of highly heat conductive materials, like aluminum, that is also resistant to water and hydrogen oxidation and is braised in the ends of the vane heat pipe channels to completely seal and enclose the vane heat pipe channel system 127. The inner vane channel condenser 130 transfers the heat to the outer vane heat pipe condenser 132 by conduction. The front face surface of the outer vane heat pipe channel condenser 132 is covered with angled ridges and grooves 134. The heat is then transferred into the deionized water 320 of the active cooling system 362.

The outer vane heat pipe channel condenser is also preferably constructed of highly conductive material, such as aluminum, that is braised to the ridge and groove section 131 of the inner vane heat pipe condenser. The bottom surface of the outer vane condenser 132 is angled or sloped outward towards the sides of the inner housing stators 2 and 4. This helps divert deionized water 320 from active cooling system 362 that is inside the inner center section of the rotor 183 to be diverted towards both sides of the inner stators 2 and 4 to be collected by the housing water return recesses 44 located on the lower inner housing stators 2. This bottom angled surface of the vane heat pipe outer condenser matches the bottom angled surface 126 of the sliding vane 116 so that the deionized water 320 can be diverted smoothly across both surfaces contiguously to the two side inner housing stators 2 and 4.

Vane Heat Pipe Channel Porous Wick/Freeze Tube

Referring again to FIG. 27, placed inside the vane heat pipe channel 127 is a porous wick/freeze tube 128 that wraps around the entire length for the vane heat pipe channel 127 from one inner heat pipe condenser 130 to the other heat pipe condenser 130. The porous wick/freeze tube 128 is made from stainless steel mesh or preferably shape metal alloys (SMA) made from copper zinc aluminum (CuZnAl) alloy that are woven together and braised or spot welded into a tube shape. Since the vane heat pipe channel 127 is completely sealed with working fluid water inside it, it is prone to cold weather water freezing expansion damage when the engine 1 is exposed to temperatures of 32 degrees F and lower. To counter the water freezing expansion, the porous tube insulates some of the water working fluid inside the center of the porous wick/freeze tube 128. As the working fluid begins to freeze and expand, the unfrozen water working fluid in the center of the porous wick/freeze tube is wicked up along the porous wick/freeze tube 128. This allows the water working fluid to expand by imploding inward rather than exploding outward, and eliminates expansion pressures that could result in damage to the vane heat pipe channel 127 or sliding vane 116. By using an SMA for the porous wick/freeze tube 128 the lower section of the porous wick/freeze tube 128 can be deformed as the water working fluid expands and implodes the porous wick/freeze tube 127. Once the vane heat pipe chamber's 127 temperature rises to about 32 degrees F., and the working fluid changes phase from ice back to a liquid, the porous wick/freeze tube reforms back into its original shape.

When the rotor 183 is in a stopped position the sliding vanes 116 are oriented in various angles that pool the water working fluid in one of two locations. The first is along the bottom two vane inner heat pipe condensers 130 and the other is along the surface of the heat pipe evaporator area 129. By having the porous wick/freeze tube 129 wrap around the entire length of the vane heat pipe channel 127, the ends of the porous wick/freeze tube control any freezing working fluid that pools by the two inner vane heat pipe condensers. As the porous wick wraps around the vane heat pipe channel 127, it makes direct contact with the top or outer surface of the middle of the heat pipe evaporator area 129. This controls any freezing working fluid that pools along the heat pipe evaporator area 129 to be wicked way in two directions from the center of the porous wick/freeze tube 128 towards the two porous wick/freeze 128 tube ends. This allows freezing working fluid water that pools in any orientation angle on the rotor 183 to be controlled by the porous wick/freeze tube 128.

Vane Belt Toggle System

Referring to FIGS. 18, 25, 27, and 29, the bottom section on the sliding vane 116 U-shaped opening contains a vane belt toggle bar system 363 that can be either a single belt toggle bar system 142 for a single center vane belt 137 of vane belting system 136, or a double belt toggle bar system 143 for two outer vane belts 138 of vane belting system 136. The single 142 and double 143 toggle bar systems connect the single 137 and double 138 vane belts of the vane belt system 136 to the sliding vanes. The toggling action of the single 142 and double 143 toggle bar system provide the vane belting system 136 with a wider range of single 142 and double 143 belt extension and retraction to better match the inner geometric distorted oval shape of the inner housing surface profile 37 of housing stators 2 and 4. The vane belt toggle bar system 363 is comprised of a center support belt rod 145, which holds either a single set or double set of belt toggle links 147 through center toggle bar holes 144. The toggle links hold two smaller vane belt bars 146 attached to the toggle links 147 through vane belt bar holes 148 located at the ends of each of the toggle bar links 147. A toggle bar bushing 149 slides over vane belt bars 146. The metal bar bushing 149, rather than the belt loop interfaces 367 of the single 137 and double 138 vane belts, takes most of the toggling motion wear. The center toggle bar holes 144 and smaller vane belt bars 146 are coated with a solid lubricant, preferably which is comprised of near frictionless carbon or diamond like carbon lubricant to further improve the high speed toggling action and to reduce wear of the vane belt links 147 and rotating motion of the metal vane bar bushings 148.

Attaching single 140 and double 141 vane belts segments to the vane belt bar bushings 148 of alternating sliding vanes 116 links them together to create either a single 137 or double 138 vane belt closed loop belt system to help control the sliding vanes' 116 positions as they rotate with the rotor 183 within the inner stator surface 37. The single 142 and double 143 vane belts toggle systems allow the ends of the vane belt segments to be connected as a continuous belt system without requiring the belt to be constructed as just one belt segment. This would require that the single 137 and double 138 vane belts make a very tight bend underneath each sliding vane 116 inside the narrow rotor vane passage 184 which could result in belt stress and breakage.

Vane Belt Tension Adjustment System

Referring again to FIGS. 18, 27 and 29, to maintain the proper tension in either of the single 137 or double 138 vane belts of the vane belt system 136, the bottom side sections on the sliding vane 116 inner inverted U-shaped opening 360 contain a vane belt tension adjustment system 150 that can adjust the position of the main belt rod, and thus the tension of the connected single 136 or double 138 vane belts. The main vane belt rod 145 is connected to two end support vane belt rod holders 151 through support vane belt rod holes 152. The two vane belt rod holders 151 are seated into the bottom of the vane belt tension adjustment channels located at both sides of the inner bottom center inverted U-opening 360 of the sliding vane 116. Two tension adjustment screws 153 are inserted through tension adjustment screw holes 154 in the bottom of the sliding vane 116, vane belt rod, and end vane belt rod holders 151. The vane tension adjustment screws 155 turn freely in unthreaded sliding vane 116 screw holes 154, but use threaded screw holes 154 in the vane belt rod 145 and end vane belt rod holders 151 to adjust their position up and down inside the vane belt tension adjustment channel 124. Once the proper belt tension has been set, the tension adjustment screw 153 are locked in place with a tension screw lock nut 155. An alternative vane belt tension adjustment system would be the use of different sets of end vane belt rod holders 151 that have different set vane belt rod 145 tension positions. Small shims can be put under the belt rod holder 151 to further lock the tension in place.

Vane Anti-Centrifugal Systems

Vane Belt System

Referring to FIG. 29, the anti-centrifugal vane belting system 136 provides the ability to rotate around an asymmetrical or distorted oval geometry profile of the inner housing stator surface 37 and minimize excessive sliding vane 116 sealing centrifugal forces. Regardless of the rpm speed of engine 1, the sliding vane 116 sealing force against the inner housing stator surface 37 remain relatively constant around the entire perimeter.

Figure 44:
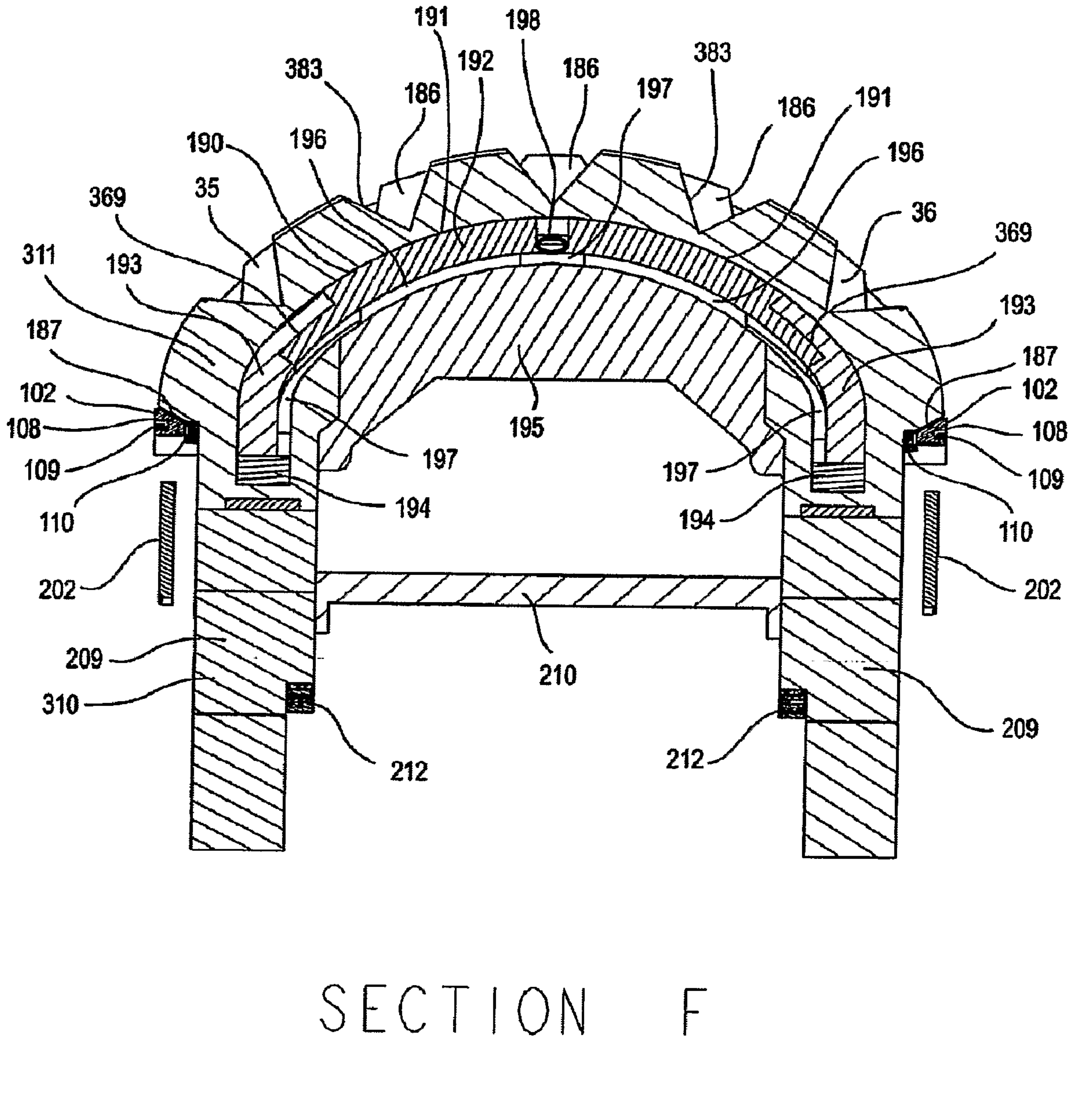
FIG. 44 depicts an off-center cross-section front view of the rotor segment assembly.
Figure 46:
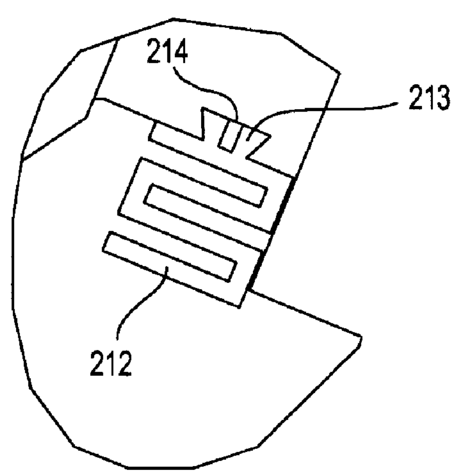
FIG. 46 depicts a detail view of the vane profile belt limit spring.

This vane belt system 136 is comprised of a single center belt 137, double outer belts 138, and profile belt 139 systems. Referring to FIG. 44, the single center vane belt 137 is connected to the vane belt bar bushings 148 of the single belt toggle systems 142 of four alternating sliding vanes 116. Referring to FIG. 46, the double outer vane belts 138 are half as wide as the single center vane belt 137 and are connected to the vane belt bar bushings 148 of the vane double belt toggle systems 143 of the other four alternating sliding vanes 116. During operation of the vane belt system 136, the single center vane belt 137 runs in the center of the rotor 183 radial rotation and the outer two vane belts 138 are operate outside both sides of the inner center vane belt 137 so that the single center vane belt 137 and the double outer vane belts 138 do not interfere with each other and maintain proper balance.

The vane belt system 136 is extremely dynamic in matching the inner housing stator surface 37 geometry rotation distorted oval profile. The vane single belt toggle 142 and vane double belt toggle 143 allow the single vane belt 137 and double vane belts 138, respectively, a wider operation range of belt extension from the rotor and help retract the vanes back into the rotor, reducing sliding vane 116 stress.

Figure 41:
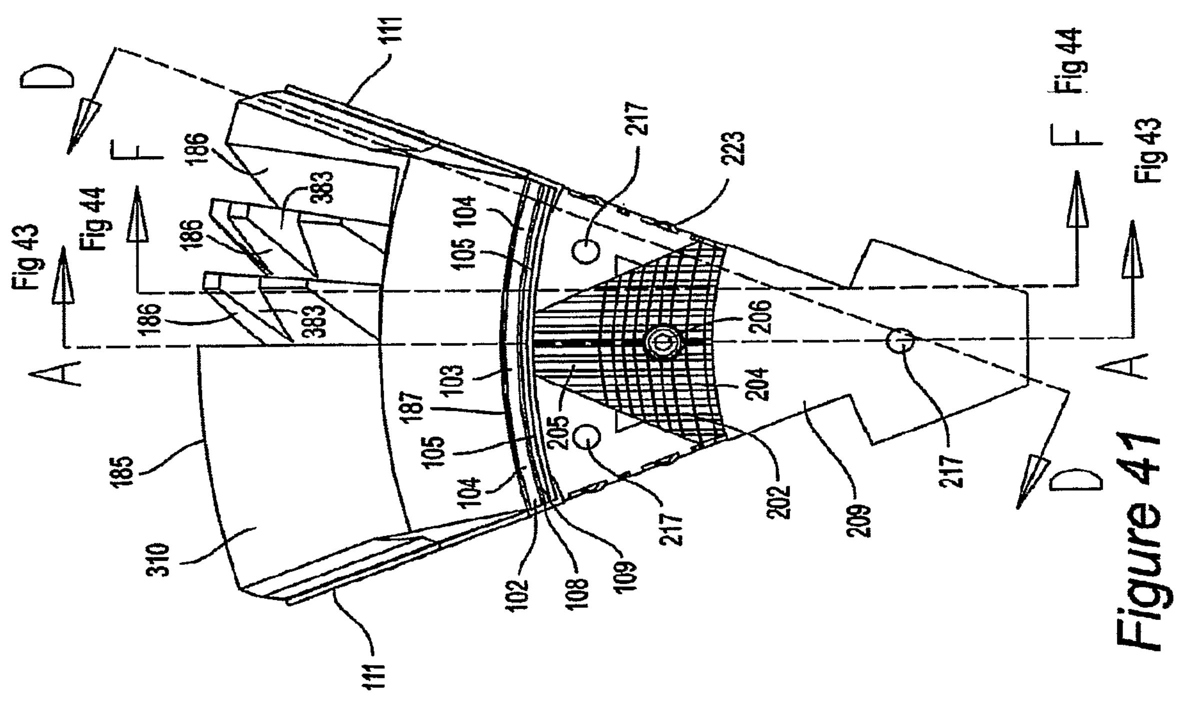
FIGS. 41 and 42 depicts side and front views of the rotor segment assembly.
Figure 48:
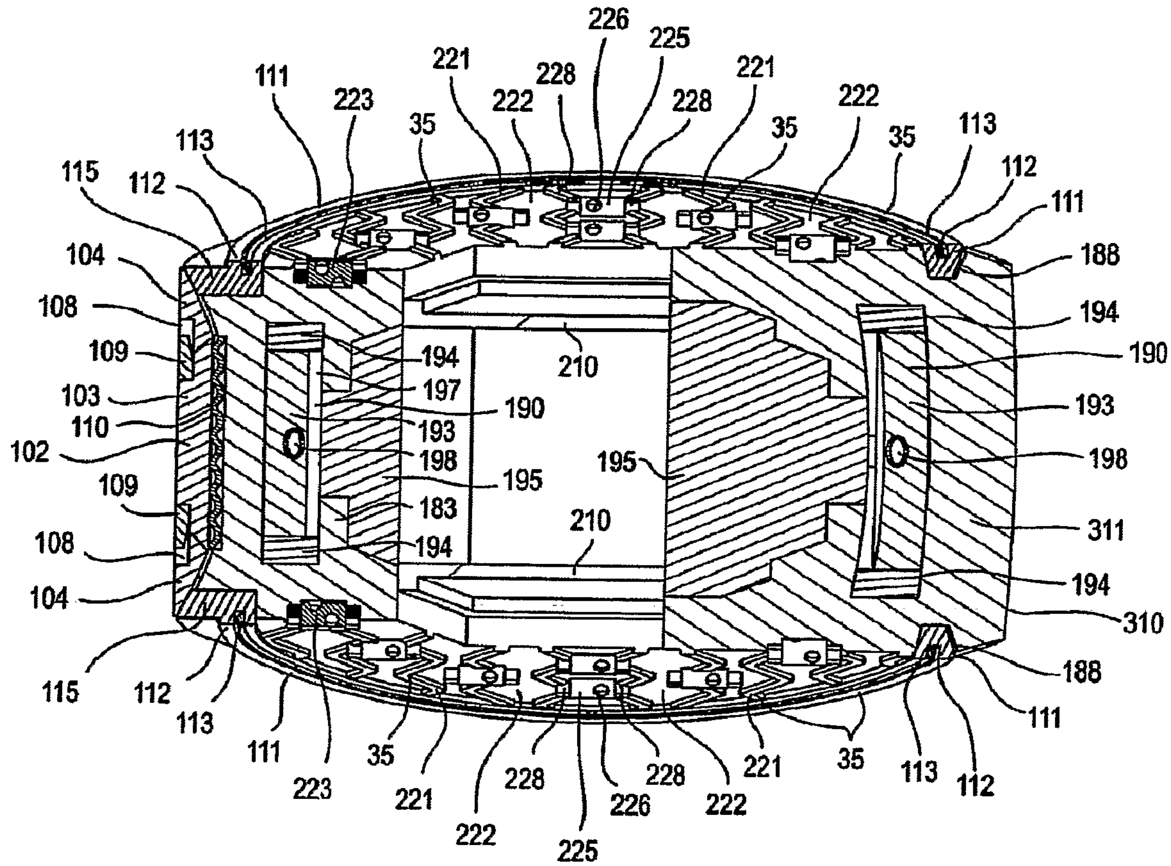
FIGS. 48 and 49 depict bottom cross-section views of the rotor segment assembly.
Figure 49:
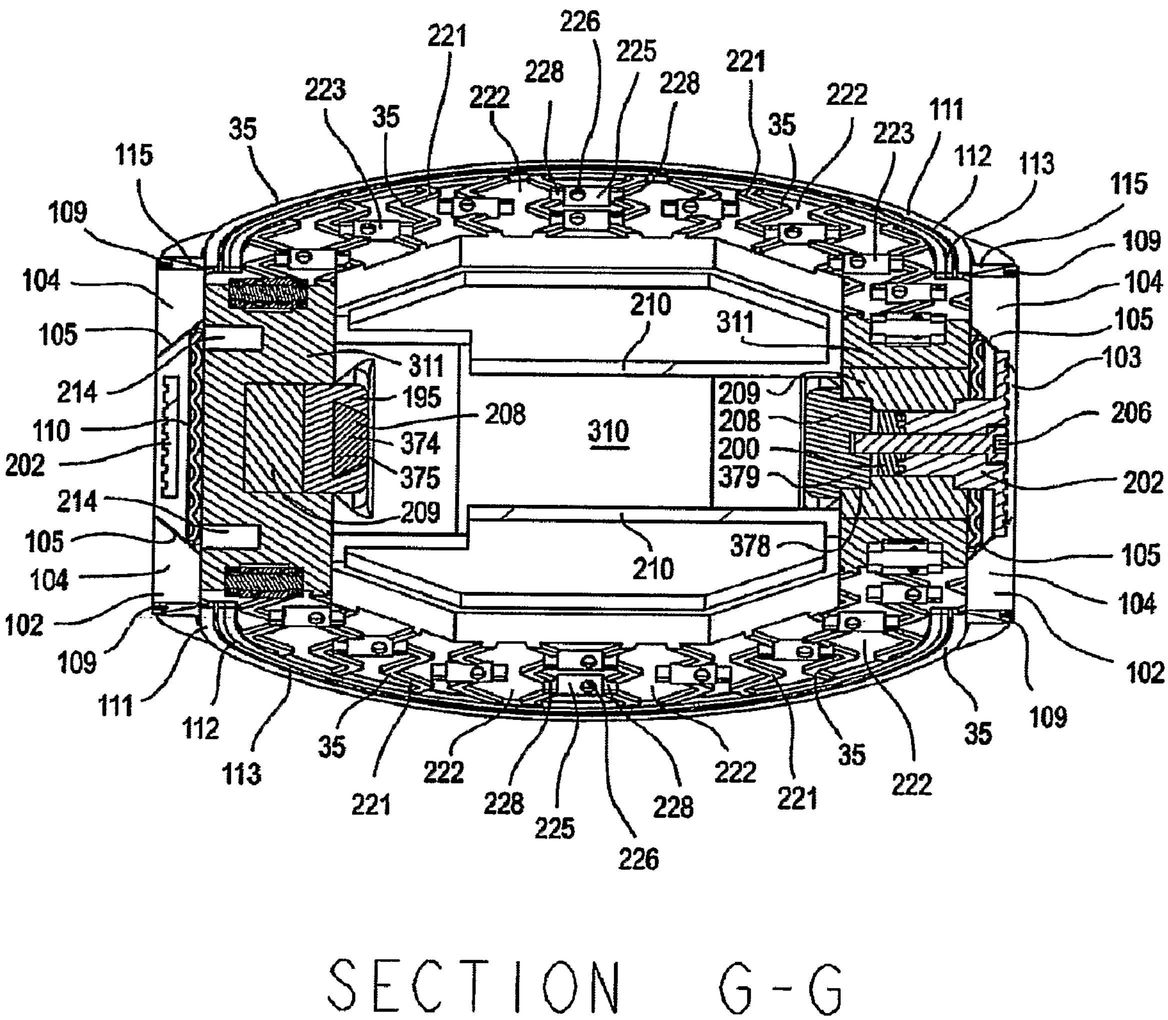

Referring to FIGS. 29 to 36, during operation of the single center belting 137 or outer double belting 138 system, as one or more of the four belt connected sliding vanes 116 extend outward from the rotor 183 center, other belt connected sliding vanes 116 are pulled back inward toward the rotor 183 center, balancing the outward centrifugal forces with inward centripetal forces of the sliding vanes 116 to obtain a relatively constant outward sealing force against the inner housing stator surface 37. However, high peak centrifugal forces may still result at the point where the siding vanes 116 are extended the furthest from the rotor 183, which occurs at the maximum expansion location 33. To help minimize this peak force point, two small profile belts 139 are attached to profile belt bearings 175 that are attached on the outer side ends of both alternating single 137 and double 138 vane belts' arch support bars 159, as shown in FIGS. 41 and 48. The two profile belts 139 link the motion of both the single vane belt 137 and double vane belt 138 system together as one unified vane belting system 136. It still allows both belts to operate independently by extending and retracting the sliding vanes 116 to match the inner housing stator surface 37, but in a more restricted or averaged way that more smoothly matches the distorted oval of the inner housing stator surface 37 profile. Instead of using just four alternating sliding vanes 116 to match the inner housing stator surface 37, the profile belts 139 are able to link and use all eight sliding vanes 116 of both the single 137 and double 138 belting systems together to better match the inner housing stator surface 37 profile. This greatly reduces the peak centrifugal force at the furthest extension location. However, the peak centrifugal forces may still be strong enough to pull and distort the entire belting system 136 into this furthest extension point. Referring to FIG. 29, to control this, belt arch limit springs 212 are embedded in the inner rotor cavity 363 that line up with the profile belt side arch 176 that is attached the ends of each of the belt arch support bars 159. The belt arch limit springs 169 are in a fixed position that corresponds to the maximum extension point of the sliding vanes 116 as they revolve and slide across the inner housing stator surface 37. Each profile belt side arch 176 has two belt arch limit springs 212 at each belt arch support bar 159 for a total of four belt arch limit springs 212 for each belt arch support bar 159. There is one belt arch support bar 159 that is oriented underneath each of the sliding vanes 116. As the rotating sliding vanes 116 reach the furthest extended point in the expansion zone 33, the two profile belt side arches 176 compress the matching four belt arch limit springs 212 to limit extension of the belt arch support bars 159 and the corresponding sliding vane 116. This keeps all of the sliding vanes 116 in balance with a constant centrifugal force that is applied evenly along the inner housing stator surface 37 of housing stators 2 and 4 throughout the entire rotor 183 rotation regardless of engine rpm speed. This constant centrifugal force significantly reduces the overall sliding friction of the siding vanes 116 with respect to the inner housing stator surface 37, which is especially useful during the later stages of combustion expansion when the gas pressures are dropping and the sliding vanes 116 are extended the furthest outward from the rotor 183 where the centrifugal forces are at their highest level.

The belt arch limit springs 212 also help absorb and dampen harsh vibration forces in the vane sliding vanes 116 and vane belting system 136.

Arched Vane Belt Support

Referring to FIGS. 32 and 34, in connecting alternating sliding vanes 116 together, the single 137 and double 138 vane belts must bend 90 degrees between two adjacent connected sliding vanes 116. One of the problems associated with the vane belting concept is that belting material needs to bend around corners at high speeds. To accomplish this single 156 and double 157 arch bearing systems are used for the single 137 and double 138 vane belting systems respectively.

Figure 38:
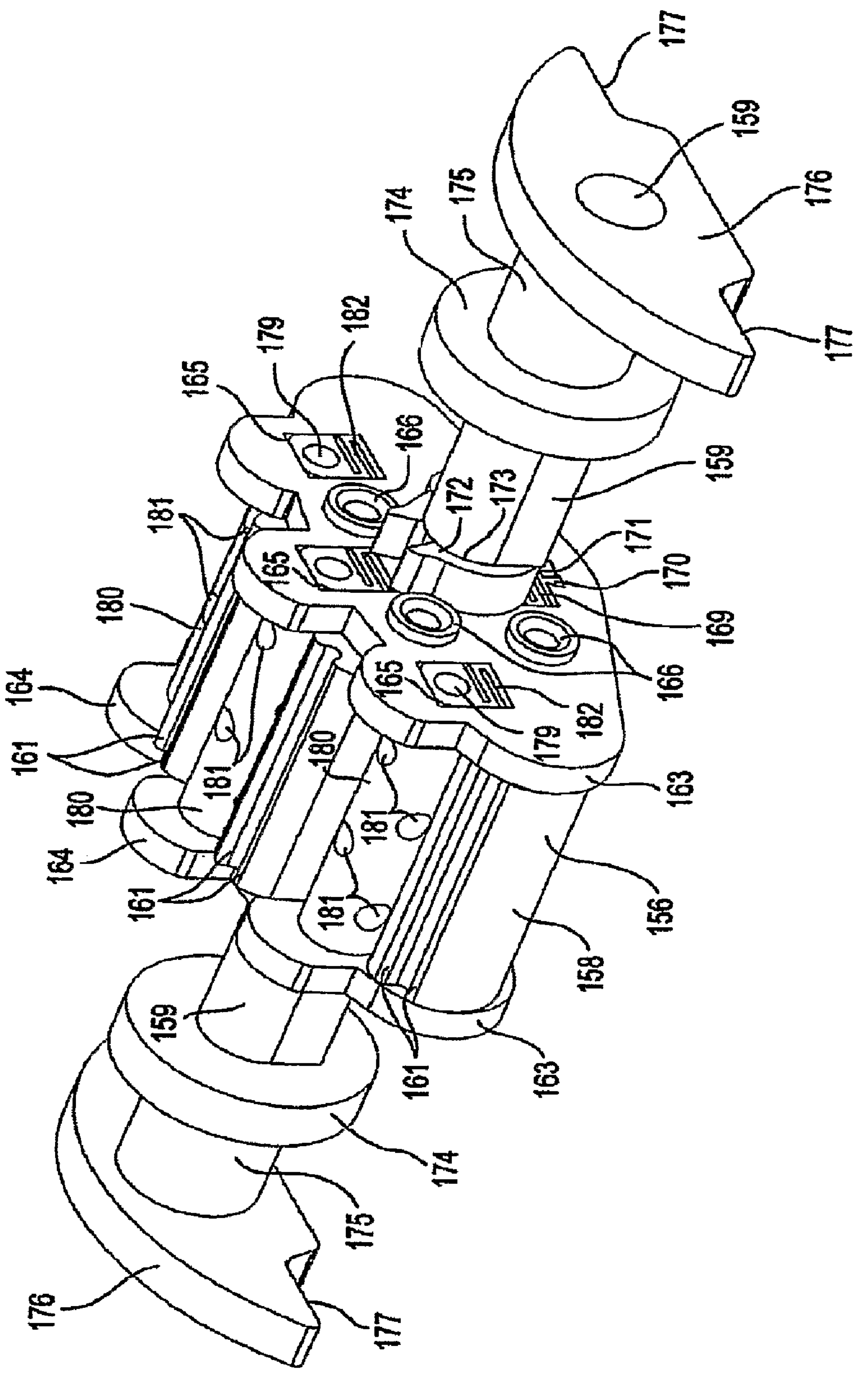
FIGS. 38 and 39 depict side perspective views of a single and double belt arch assembly.
Figure 39:
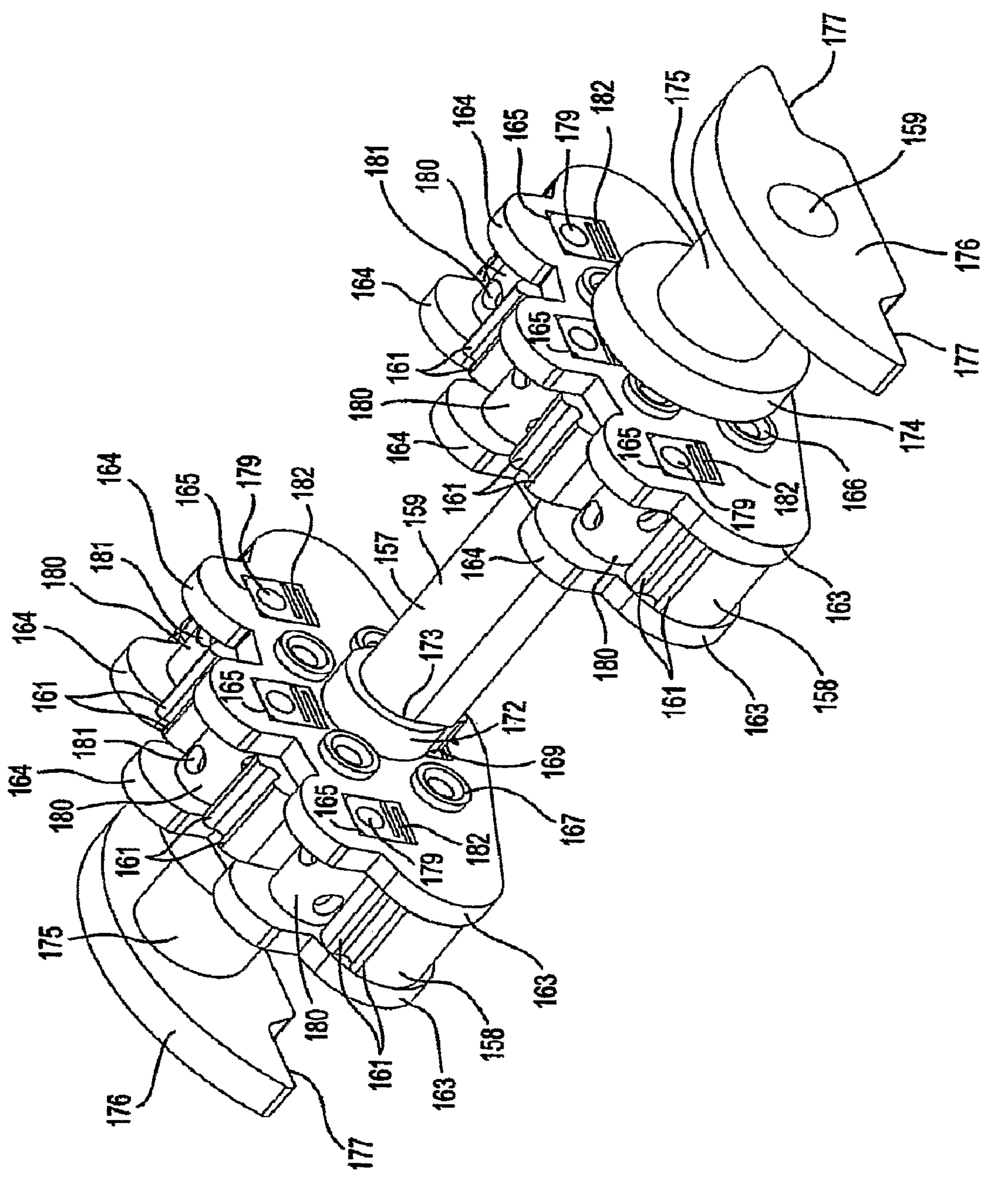
Figure 39A:
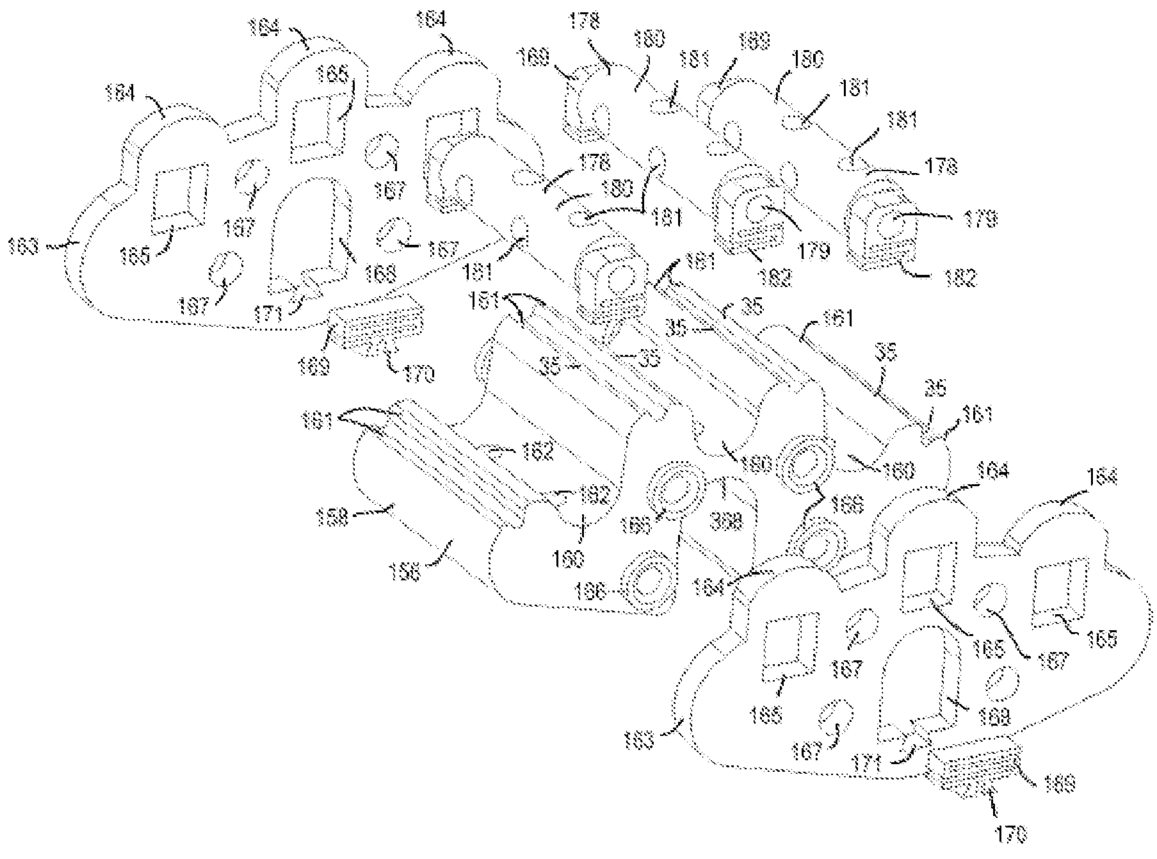
FIG. 39A shows an exploded detail view of FIG. 39.

Referring to FIGS. 38 and 39, the single 137 and double 138 arched vane belts bearing systems preferably comprises center arched vane belt support 158, a series of multiple vane belt roller bearings 178 and sliding ridges 161.

Center Arch Support

Each of the single and double vane belt arch support's 158 top surface is curved with a large arc that minimizes the sharp bending angle of the single 137 and double 138 vane belts across the 90 degree angle between the alternating sliding vanes 116. Each of the arch supports also contains three roller bearing recesses 160 that hold belt roller bearings 178 and four vane belt sliding ridges 161 between each of the roller bearings 178, and water drainage holes to drain deionized water 320 from the inner rotor cavity 363 from the active cooling system 362 to prevent the water from building up in the roller bearing recess 160. The deionized water 320 provides some lubrication and cooling to the vane belting system 136 and vane belt roller bearings. This helps reduce belt friction and increase the belts durability and strength.

Side Arch Lock Plates

Each vane belt arch support 158 has two side arch lock plates 163 that are secured to the vane belt arch support 158 by four rivets 166 running through the vane belt arch support 158. The side arch lock plates 163 and rivets 166 add structural strength to the support arch 158. The top edges of the side arch lock plates 163 are extended higher than the vane belt arch support surface 158 to form rounded vane belt prongs 164 to help keep the moving single 137 and double 138 vane belts in proper alignment position as they move across the vane belt support arches 158.

Vane Belt Arch Roller Bearings

The use of vane belt roller bearings 178 on top of the belt arch support 158 will improve the vane belts 136 motion. The vane belt roller bearings 178 are comprised of an roller bearing 180 that has small diameter that reduce mass acceleration and deceleration inertia forces to help improve the belt motion across the belt arch support 158. The outer roller bearings 180 have small holes 181 drilled through the bearing to allow deionized water 320 to help lubricate and cool the vane belt roller bearing 180 and roller bearing spindle 179. The spindle 179 is also coated with a solid lubricant 35 like near frictionless carbon or diamond like carbon lubricant. The spindle 179 ends are screwed into roller bearing spring supports 182 that are seated in bearing spring support openings 165 on side arch lock plates 163 located on each side of the vane belt arch support 158. The bearing spring support openings 165 are positioned on the side arch lock plates 163 to properly orient the roller bearings 180 properly inside the roller bearing recess 160 and to make good contact with the single 137 and double 138 vane belts.

During engine operation, at low rpm speeds of less than or equal to about 1,000 rpm, the single 137 and double 138 vane belts of the vane belting system 136 make contact with the surface of the vane belt roller bearings 180 to help improve the motion speed and reduce motion friction of single 137 and double 138 vane belts back and forth across the vane belt arch bearing supports 158. The vane belt bearing spindle spring supports 182 also help dampen any vibrations in the single 137 or double 138 vane belts for smooth operation motion.

At higher operating speeds greater than about 1,000 rpm, the roller bearing mass results in large acceleration and inertia forces that restrict the single 137 and double 138 vane belts motion. However, during higher engine operations speeds the vane belt roller bearing spindle spring supports compress due to higher centrifugal rotor 183 rotation forces and allow the single 137 and double 138 vane belts to move across the vane belt arch support 158 without making any contact with the roller bearings 180. During the high speed operation, the vane belt roller bearings 180 remain compressed inside the arch support 158 roller bearing recess 160 until the engine's operation speed slows to less than or equal to about 1,000 rpm, where the vane belt roller bearings regain dominant contact with the moving single 137 and double 138 vane belt of the vane belting system 136. To continue to improve the single 137 and double 138 vane belts' motion and reduce the friction across the vane belt arch support 158, vane belt sliding ridges 161 are used.

Vane Belt Sliding Ridges

Referring to FIGS. 38 and 39, as the single 137 and double vane belts travel at high speed over the top of the vane belt arched support 158, the vane belt roller bearings 80 are compressed in the roller bearing recesses 160 and the single 137 and double 138 vane belts move across sliding ridges 161. The sliding ridges 161 are coated with a solid lubricant 35 comprised of near frictionless carbon or diamond like carbon for lubrication, or preferably a Superhard Nanocomposite (SHNC) lubricant coating being developed at Argonne National Laboratory could be used. The sliding ridges 161 and roller bearing recesses create a turbulent air flow that, in turn, creates a cushion of air between the single 137 and double 138 vane belts and the top surface of the arched support 158. This allows the vane single 137 and double 138 vane belts to move at even higher speeds with very low contact friction across the vane belt sliding ridges 161.

Dynamic Arch Support Bar

The arch support bar 159 holds either the single 156 or double 157 vane belt arch bearings. The single 156 and double 157 vane belt arch bearings are held in proper position on the arch support bar 159 by a arch support clip 172 that is in a arch clip recess 173 located on both sides of the single 156 or double 157 vane belt arch bearing supports.

The ends of each of the arch support bars 159 hold a profile belt washer 174 to help hold the profile belts 139 in position along the inner edge of profile belt bearing 175 that allows the profile belts 139 to freely move radially over the profile belt bearing surfaces 175. A profile belt arch 176 holds the profile belts 139 in position along the outer edge of the profile belt bearing 175.

During high speed operation of engine 1, where rotor 183 rpm is equal or greater than about 1,000 rpm, the belt arch support springs 169 compresses and the arch support bar 158 moves downward in arch support bar opening 168 in the side arch support plates 163 and in arch support bar channel 368, allowing the single 156 and double 157 vane belt arch supports to extend outward to allow the vane belt siding ridges 161 to maintain proper contact with the single 137 and double 138 vane belts. When engine 1 operating speed slows to about 1,000 rpm or less, the belt arch support springs 169 expands, as well as the vane belt roller bearing support springs 182, and the arch support bar 159 moves upward in the arch support bar opening 168 in the side arch support plates 163 and in arch support bar channel 368, allowing the vane belt roller bearings 180 to make primary contact with the single 137 and double 138 vane belts. The belt arch support springs 169 also help dampen harsh operation vibration and help provide a smooth operation of the vane belting system 136.

Vane Belt Materials

Referring to FIG. 36, the vane belts 137 and 138 are preferably made of fine of high tensile strength fibers that are woven into a belt. Nextel 610 and AGY's 933-S2 glass are potential fibers that could be used. Fibers are woven into flat smooth surface belts with two loops at each ends 367 to interface with the split vane 116 toggle vane belt bushing 148 of the single belt 142 and double belt 143 toggle system. With the active cooling system 262 circulating deionized water 320 into the inner rotor cavity 363, the vane belting system 136 has a peak operating temperature is about 250 degrees F. This helps maintain fiber strength and minimize fiber thermal expansion. Alternatively, fiberglass or Kevlar fibers can be woven into belts for the vane belting system 136. These materials are lightweight and have a high tensile strength, low elongation, with a maximum continuous operating temperature of 450 degrees F.

To improve the belts' performance and durability, the vane belts 137 and 138 are preferably constructed with multiple layers of fibers and then sown together. The main top layer is the strength layer 169 that contains larger sized fibers, and as a result, has a coarser fill and wrap woven texture. This texture generates larger amounts of friction, vibration and wear as it slides across the support arch ridge structure 161. To improve the sliding performance a bottom sheer layer 171 of material is preferably sown together with the top strength layer. This bottom sheer layer preferably has a finer fiber size and resulting finer fill and wrap woven texture.

The belt fibers can also be coated with a solid lubricant such as Teflon or near frictionless carbon to further reduce their friction and wear. The Teflon PTFE coating has a coefficient of friction of 0.06. Near frictionless carbon has a coefficient of friction of 0.02.

Vane Belt Pin Hinge Seams

Referring to FIGS. 32 to 36, the arched vane belt bearing 158 creates a large flat arcing surface for the single 137 or double 138 vane belts to travel on. This greatly reduces bending stresses on the vane belt belting material. To further improve the single 137 and double 138 vane belts' and also the profile belt's flexibility, link pins 365 with hinge seams 366 can be placed in the single 140 and double 141, and profile 364 vane belts' segments. The joining pins 365 can be stainless steel or non-metallic materials. The pins can be coated with a solid lubricant of Teflon, near frictionless carbon, or diamond like carbon to reduce pin 365 wear and improve the hinges' 366 movement speed and reduce wear. To provide extra durability, the pin hinges 366 could preferably be made from stainless steel.

Figure 33:
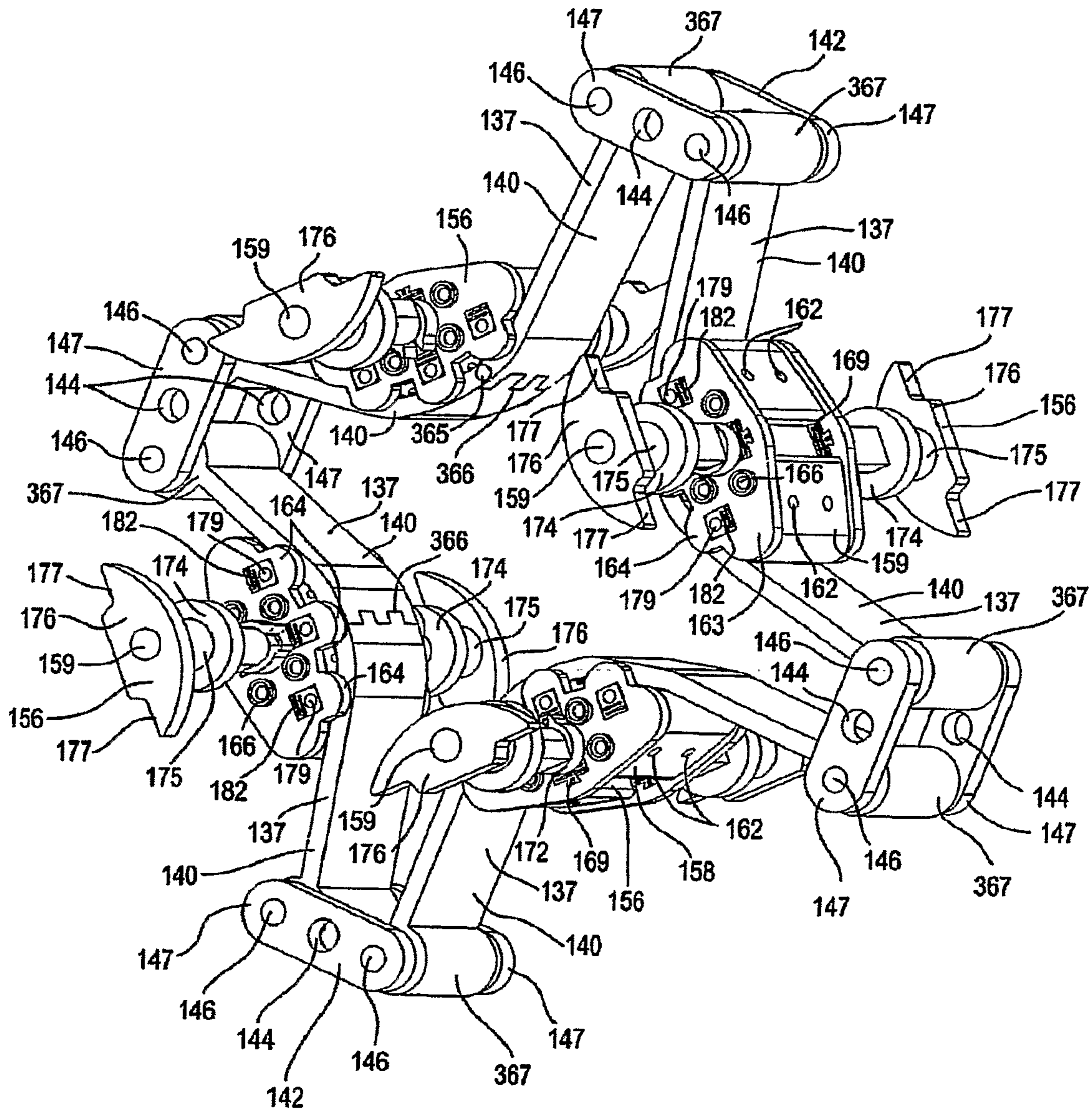
Figure 35:
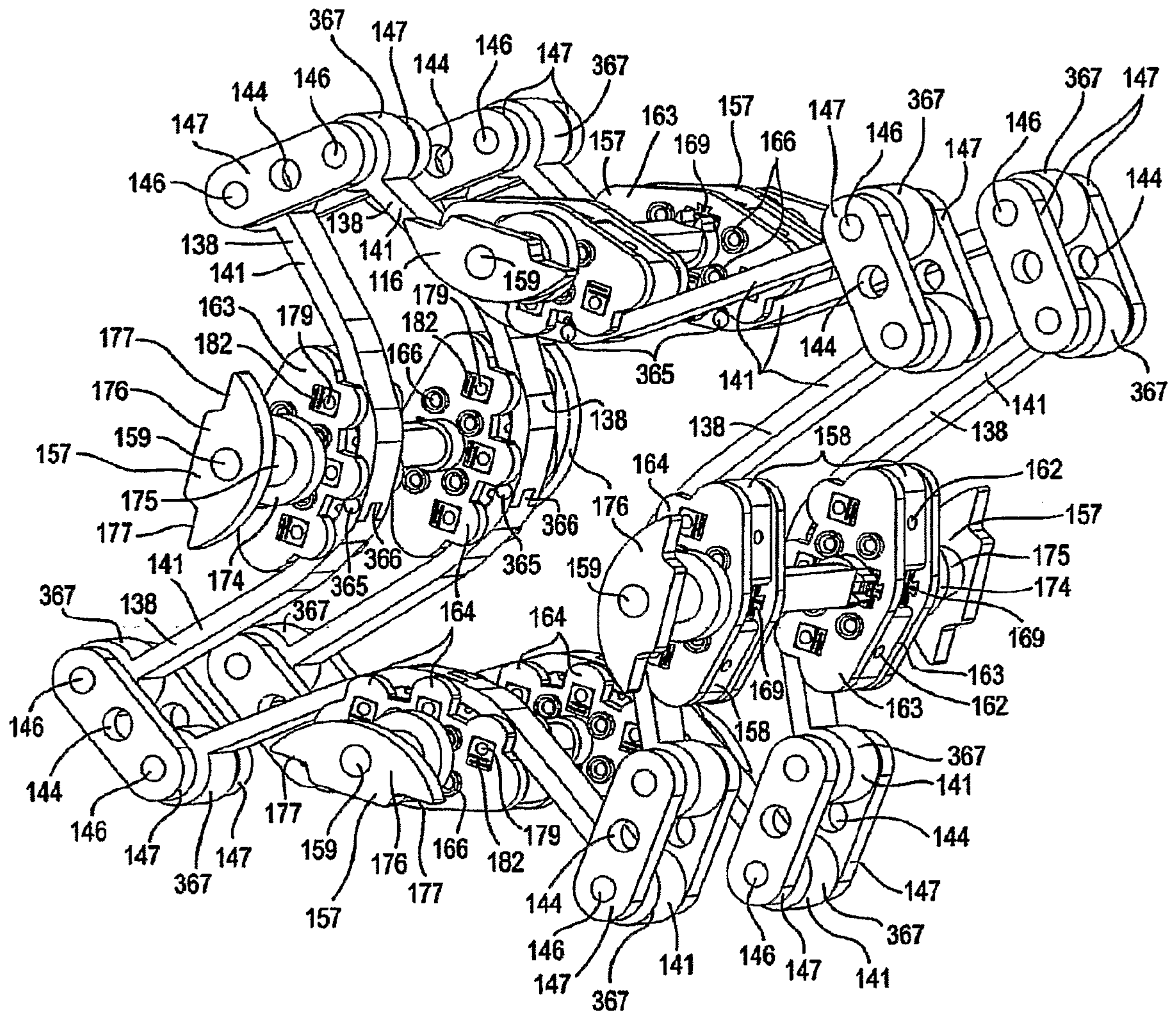
Figure 37:
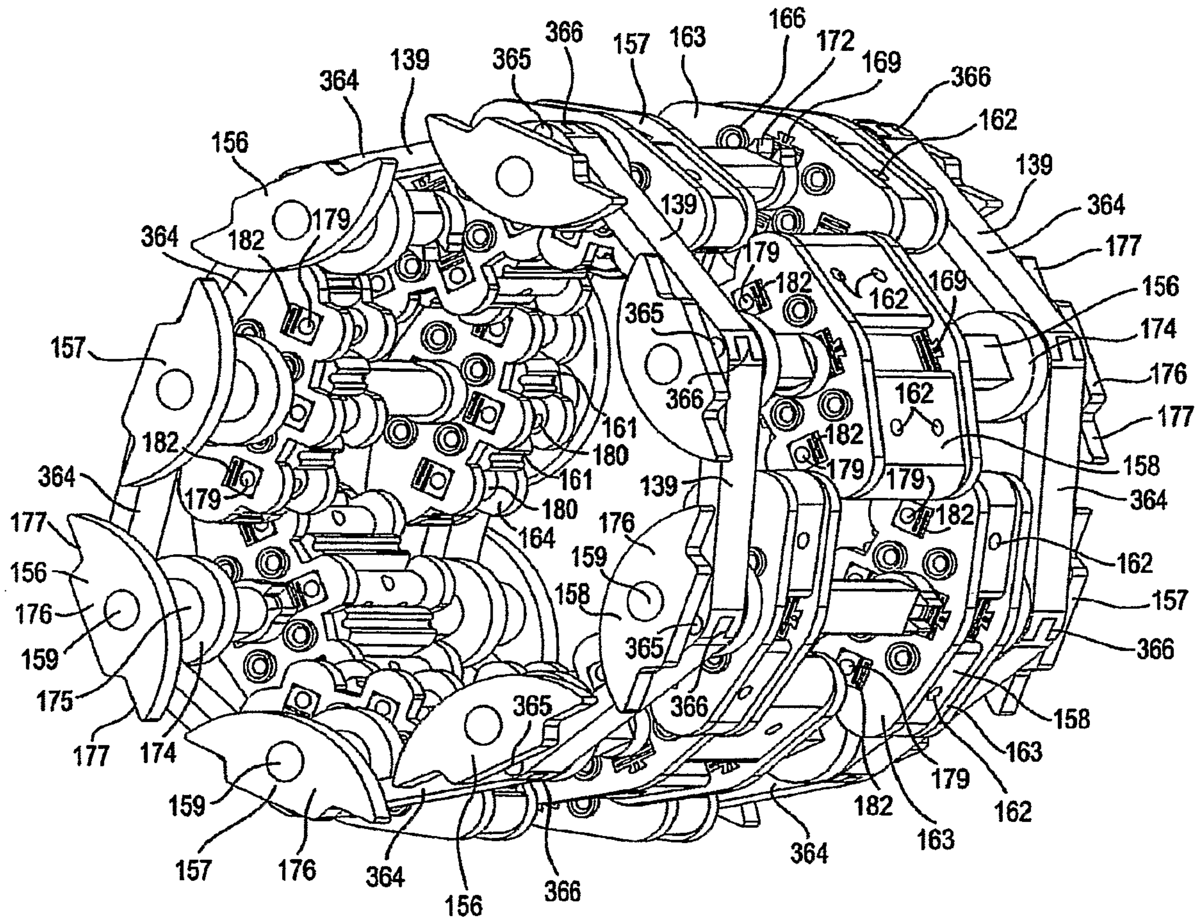

Referring to FIGS. 33, 35, and 37 when the pin hinges 366 are included on the belts, they add a small interface surface that is not flush with the belt. This interface surface can result in rough belt operation. To account for this offset, another sheer fill layer 170 can be added that matches the thickness of pin hinge 366. This can be located between the top strength layer 169 and bottom sheer layer 171 and all three layers can be sown together. This allows the bottom sheer layer to operate very smoothly across the arch support ridges 161.

Belt and Toggle Bushing Connection

To attach the single 137 and double 138 vane belts to the single 142 and double 143 toggles, the composite belts wrap around the metal roller bushing 149, and are held in place by a belt bushing lock cover 369. To minimize belt bending around the belt bushing 149, a small triangular belt bushing wedge (not shown) is inserted to make the belt attachment angle more gradual with less stress on the belts.

Rotor Structure

Referring to FIG. 3, the rotor assembly 183 is comprised of six or eight rotor segment assemblies 310, depending on the engine 1 configuration. The preferred embodiment of engine 1 is to use eight rotor segment assemblies 310. The sliding vanes 116 are positioned in between each rotor segment assembly 310 and forming a vane passage 184 for the sliding vanes 116 to move in. All the rotor segment assemblies 310 are held together by side lock plates 215 to form the rotor 183.

Rotor Segment Assembly

Figure 40:
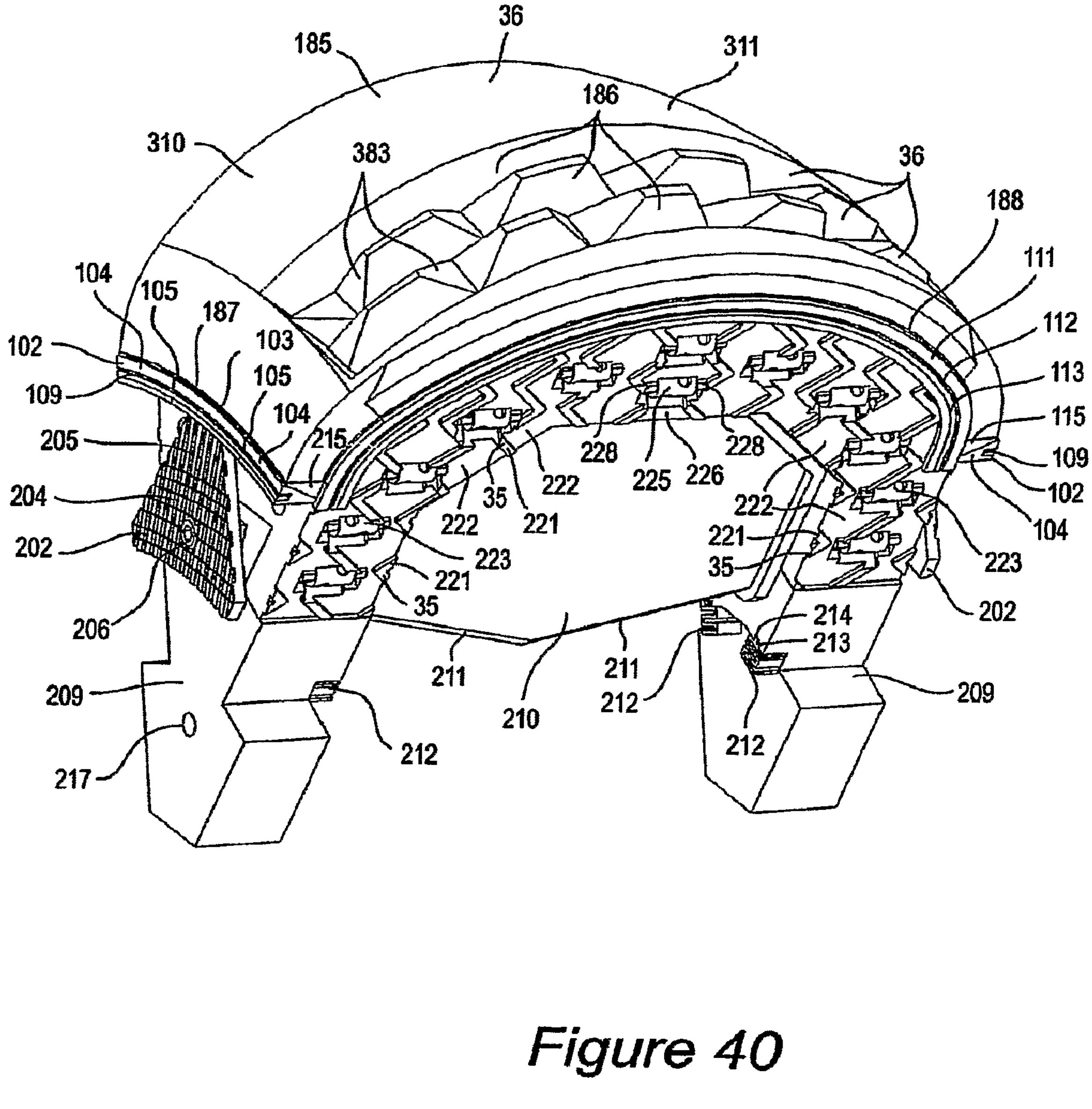
FIG. 40 depicts the side view of an assembled rotor segment.

Referring to FIG. 40, each rotor segment assemble 310 is comprised of a top rotor combustion segment 311, a rotor thermal control system, rotor side plates 209, lock tabs 208, inner plate cover 210, sliding vane 116 tangential bearings 223, vane face seals 111, rotor axial seals 102, and vane profile belt limit springs 212.

Rotor Combustion Segment

The outer surface of the rotor 185 and rotor combustion recesses 186 are also coated with a thermal barrier coating. The thermal barrier coating helps prevent the heat from combustion from penetrating into the rotor combustion segment 311, rotor water vapor chamber 190, and inner rotor cavity 363, resulting in thermal damage and deformation to the rotor 183, siding vanes 116, or sliding vane belting system 136.

Rotor Axial and Vane Face Seals

Figure 50:
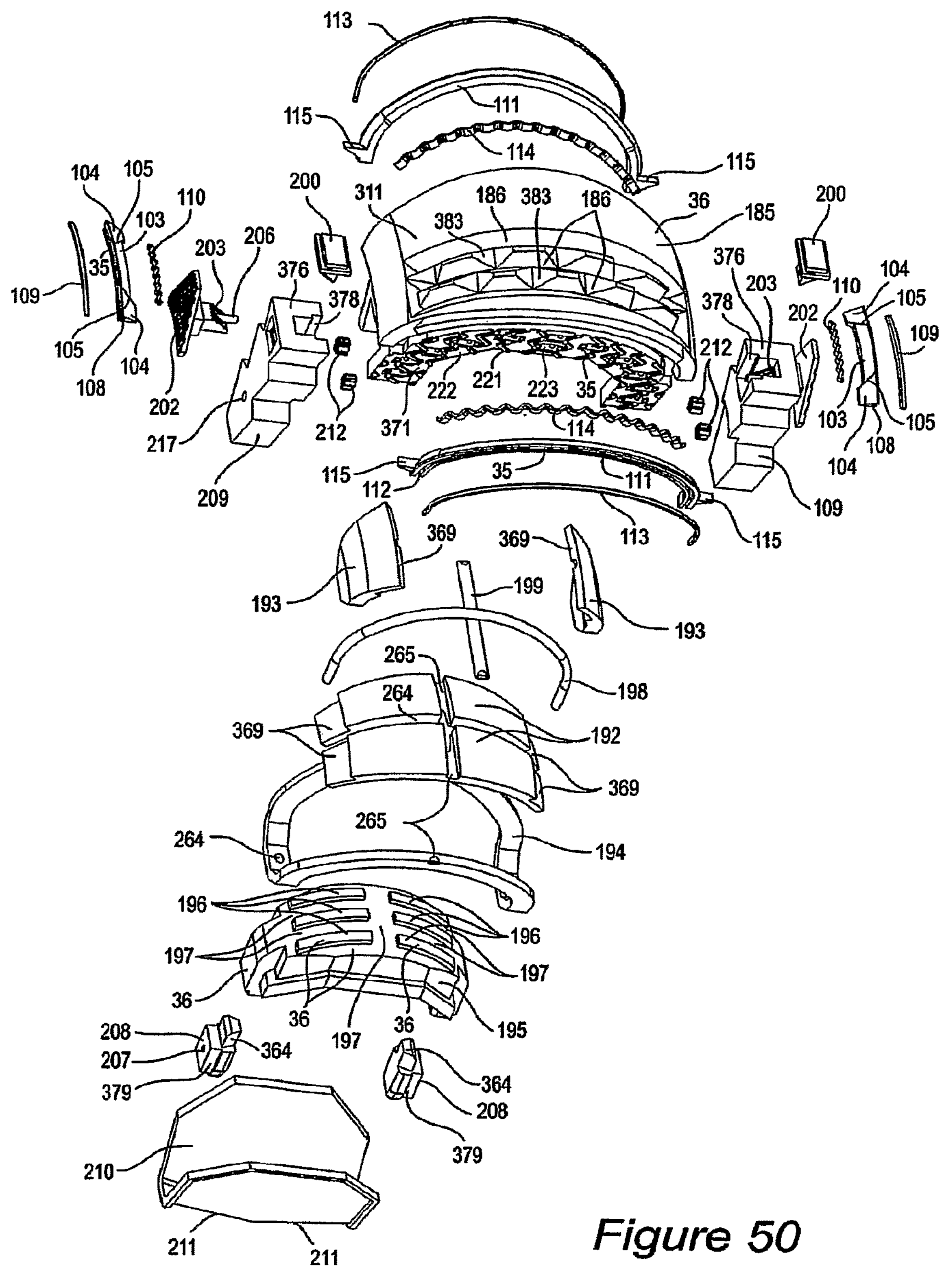
FIGS. 50 and 51 depict top and bottom exploded views of the rotor segment assembly.
Figure 51:
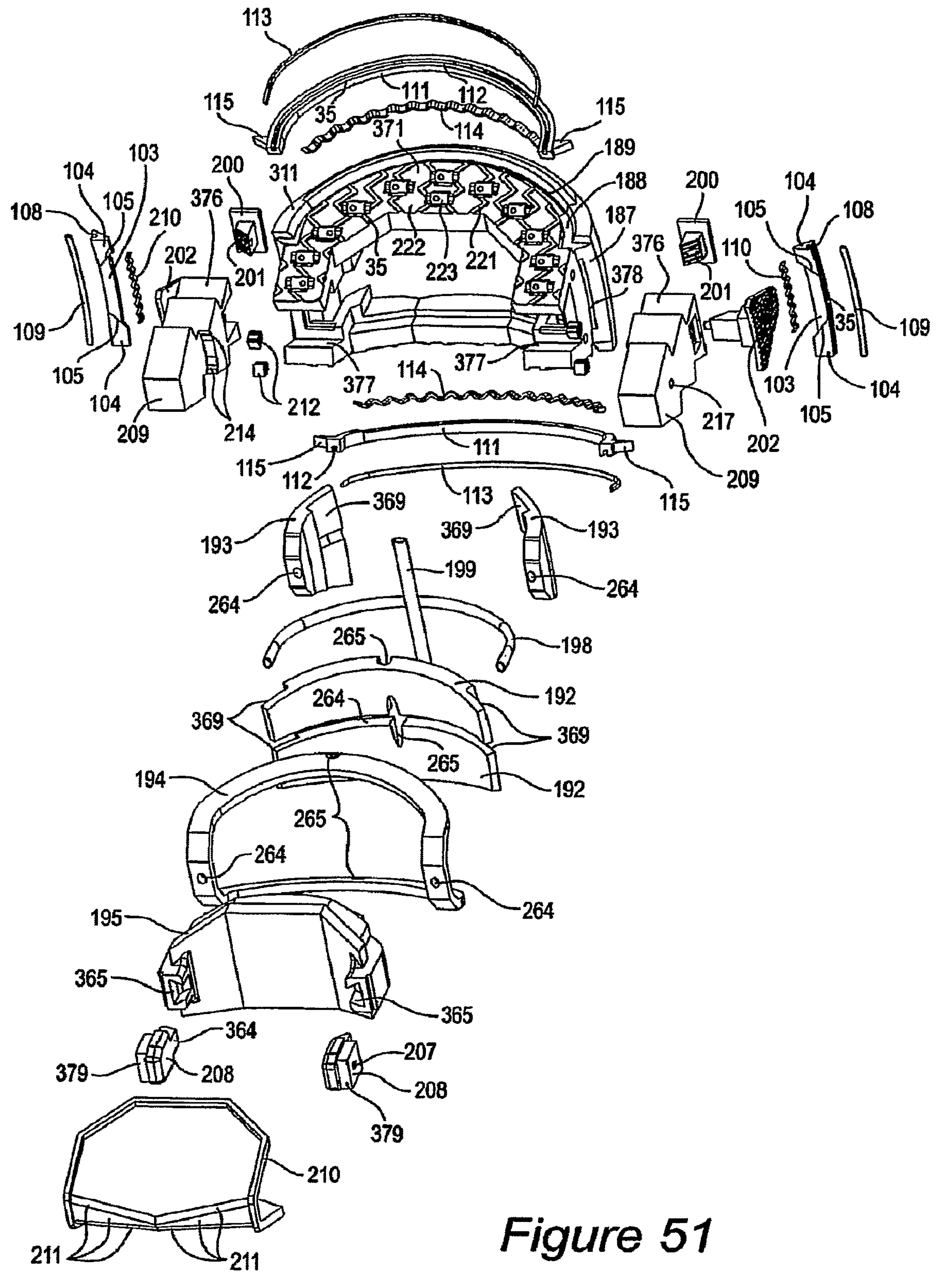
Figure 52:
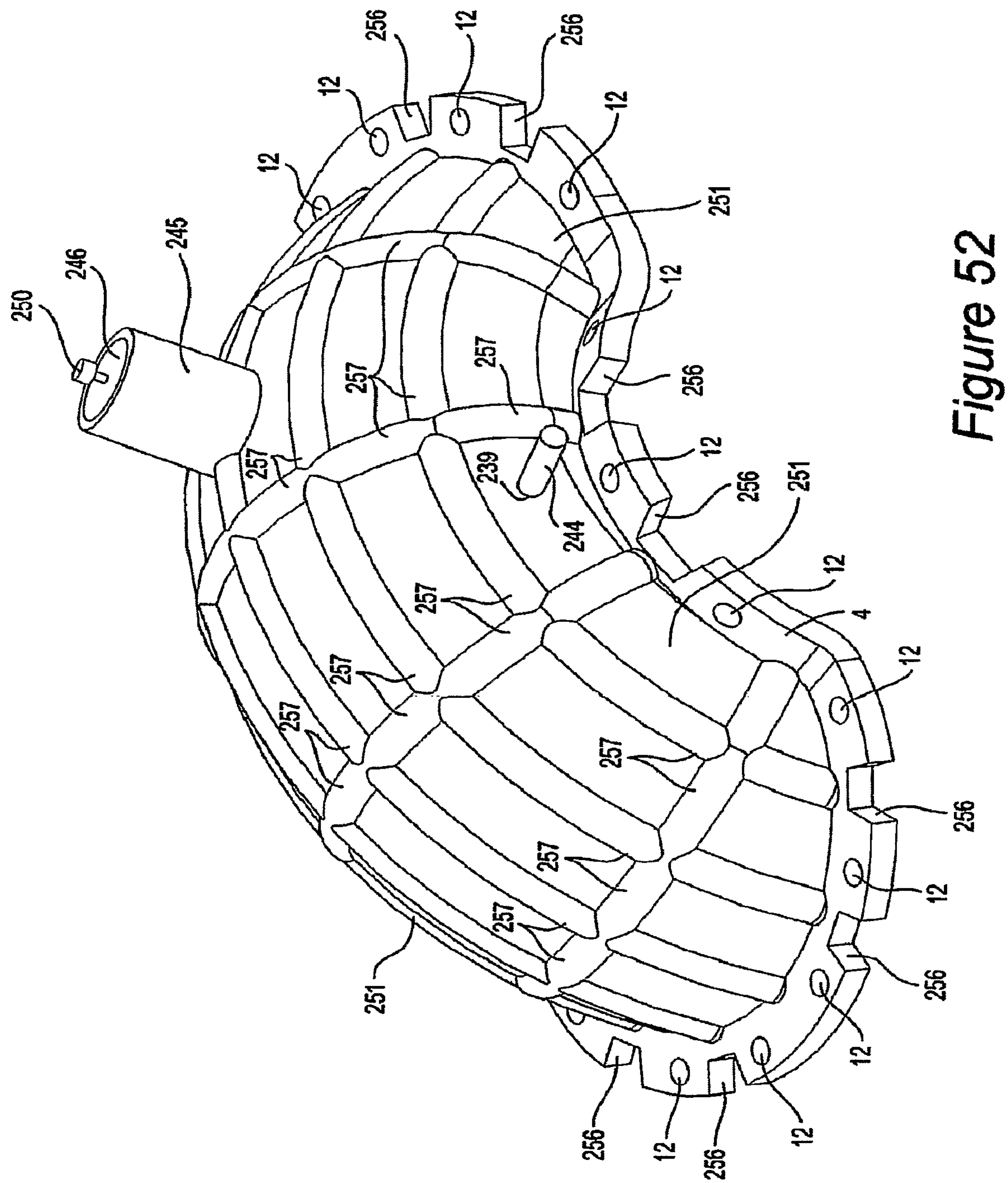
FIG. 52 depicts the top outer perspective of the sodium vapor chamber and AMTEC.

Referring to FIGS. 40 and 50, the rotor combustion segment 311 also contains an axial vane seal recess 187 and axial spring recess 378 that curves along the side surface of the rotor combustion segment 311 to hold the axial seal 102 and axial seal spring 110. A vane face seal recess 188 and vane seal spring recess 189 located on both the front and back rotor sliding vane faces 220 of the rotor combustion segment 311, hold the vane face seals 111 and vane face seal springs 114.

Sliding Vane Tangential Bearing System

Figure 47:
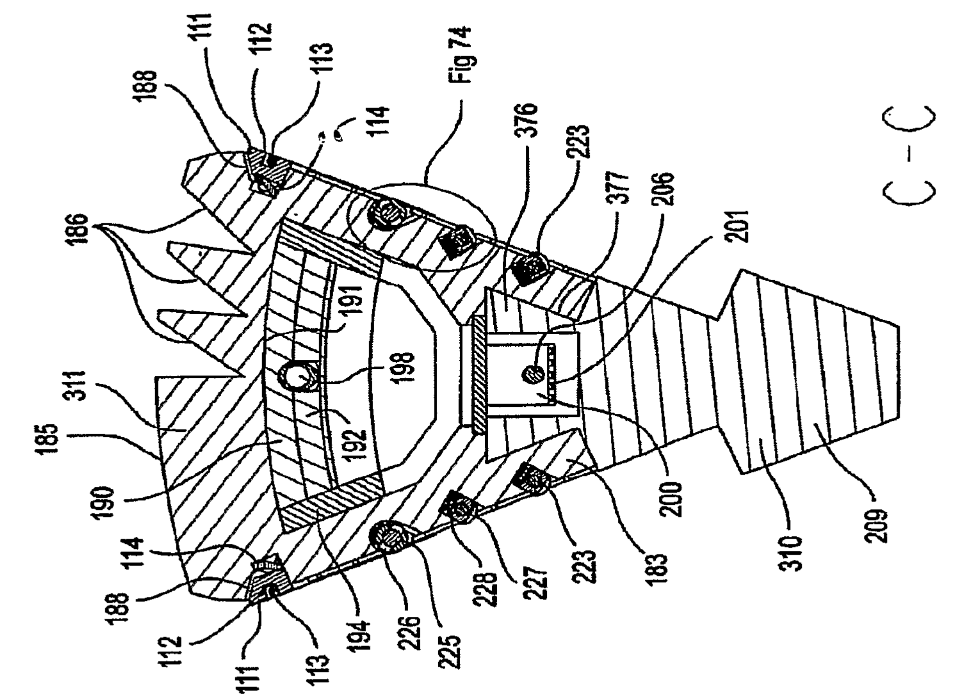
FIG. 47 depicts a side cross-section view of rotor segment assembly showing vane tangential roller bearing assembly.

Referring to FIGS. 40 and 47, to improve the "in and out" movement of the sliding vanes 116 from the rotor 183, small roller bearings 223 are embedded throughout the front and back rotor sliding vane faces 220 of the rotor combustion segments 311 that form the rotor sliding vane slots 184. Each roller bearing 223 is comprised of a roller bearing spindle 227 that is coated with a solid lubricant made from oxides for high temperature lubrication and durability. An outer roller bearing 225 is hollow and placed over the bearing spindle 227 to make direct contact and rotate with the moving front and back face surfaces 349 of the sliding vanes 116. The outer roller bearing also has small holes 226 throughout its surface so that water/steam 320 from the active cooling system 362 can help lubricate and cool the outer tangential bearing 225 and inner bearing spindle 227. The spindle 227 is preferably made from a high strength alloy and coated with an oxide lubricant. Roller bearing spindle spring supports 228 are attached to each end of the roller bearing spindle 227.

The roller bearings 223 are oriented between forty five and ninety degrees to the rotor 183 rotation, but preferably 45 degrees and can be used to help the sliding vanes 116 move back and forth in the sliding vane passage 184 of the rotor 183. During engine operation, when the rotor 183 rpm is less than or equal to about 1,000 rpm, the outer roller bearings 225 will make direct contact with the front and back face surfaces 349 of the sliding vanes 116 to reduce their sliding friction and wear as they move back and forth inside the rotor vane passage 184. During engine high speed operation, when rotor 183 rpm is greater than about 1,000 rpm, the acceleration and rotating inertia forces of the roller bearing 225 are much more significant and add more friction to the moving sliding vanes 116. However, at this point vane tangential roller bearing spring supports compress and retract the vane tangential roller bearings 223 into the vane tangential roller bearing recesses 224, breaking the outer vane tangential roller bearing

225 surface contact with the sliding vane's 116 moving face surface 349. This allows the sliding vanes 116 to move along the raised zigzag vane sliding ridges 221 in the rotor vane passage 184 at much higher speeds and with lower friction.

Zigzag Vane Sliding Ridges

Referring again to FIG. 40, to further improve the sliding vanes' 116 "in and out" motion within the vane slots 184, there are zigzag ridges 221 running vertically throughout the front and back rotor vane sliding face surfaces 220. The tops of these zigzag ridges are coated with a solid lubricant comprised of oxides for high temperature lubrication and durability. Alternatively, a Superhard Nanocomposite (SHNC) lubricant coating could be used. The oxide lubricant creates a coefficient of friction that is less than or equal to 0.2 with a very low wear rate.

Water/Steam Channels

Referring further to FIG. 40, in between the zigzag ridges are water/steam channels 222. As the sliding vane 116 moves in and out in the sliding vane passage 184 of the rotor 183, the zigzag shaped ridges 221 create high turbulence inside the water/steam channels 222 that in turn creates a cushion of air between the contact surfaces. This further enhances the sliding vanes' 116 motion and reduces their fiction. As deionized water 320 from the inner rotor and sliding vane area 361 of the active cooling system 362 enters and flows through the water/steam channels 222, it also flows against the front and back face surfaces 349 of the sliding vanes 116 that have been heated due to exposure to combustion in the combustion chamber 34, turning the deionized water 320 into steam. As the deionized water 320 helps cool the hot front and back face surfaces 349 of the sliding vanes 116, the deionized water 320 changes phase into high pressure steam. This high pressure steam further expands in the water/steam channels 222 to slightly lift up the front and back face surfaces 349 of the sliding vanes 116 off of the zigzag sliding ridges 221, allowing them to move more freely inside the sliding vane passage 184 with reduced friction and wear. The water steam 320 also helps to absorb harsh vibrations to further reduce damage and wear, providing a smoother operation of engine 1. The heated steam and or condensed steam water will be circulated to the outer sides of the rotor 183, along the inner housing stator sides 2 and 4, and forced through water/steam return recess 44 and into the hot water storage tank of the active cooling system 362.

Rotor Thermal Control Systems

During the combustion process, heat passes through the rotor surface 183 and penetrates into the rotor's combustion segment 311 and into the rotor center cavity 363, which can result in thermal damage to the vane belting system 136 and rotor assembly segment 310 components. To actively remove the excess heat from the combustion rotor segment 311 and inner rotor cavity 363, a rotor vapor chamber system 190 in conjunction with the active water cooling system 362 is used.

Rotor High Temperature Alloys

High temperature resistant alloy materials, like Haynes 230 or 188, are preferably used in the construction of the combustion rotor segment 311. These materials retain their strength properties at high temperatures and long exposure to combustion conditions over 35,000 hours at 600 degrees Centigrade. These alloys have a low coefficient of thermal expansion of around 8.2*10−6 per degree Fahrenheit. This helps minimize thermal deformations and thermal fatigue.

Rotor Thermal Barrier Coating

Thermal barrier coatings 36 also help prevent the oxidation of substrate material. Low thermal conductivity thermal barrier coatings made of YSZ doped with additional oxides that are chosen to create thermodynamically stable, highly deflective lattice structures with tailored ranges of defect-cluster sizes to reduce thermal conductivity and improve bonding adhesion with the rotor surface.

The Defecd cluster TBC of Yttrium Stabilized Zirconium (YSZ has a thermal conductivity of 1.55 to 1.65 watts per meter degree Centigrade between 400 and 1400 degrees Centigrade.

Rotor Vapor Chamber Systems

Referring to FIGS. 43, 44, 45, 47, 48, 49, 50 and 51, constructing the engine 1 components that are directly exposed to high combustion temperatures, like the rotor combustion segment 311, with high temperature alloys and coating them with thermal barrier coatings 36 greatly reduces thermal damage and slows heat from penetrating into the inner rotor cavity 363. However, it is still necessary to remove excess heat that eventually penetrates the rotor surface 183 and conducts into the inner rotor cavity 363 of the rotor segment assembly 310. A rotor water vapor chamber 190 is used within each rotor segment 310 of rotor 183. The rotor water vapor chambers 190 are located just under the top rotor surface 185 and combustion cavity recess 186 of the rotor combustion segment 311. Heat that penetrates these surfaces heats water inside the rotor water vapor chambers 190 along top or outer evaporator surface 191, which matches the shape of the top rotor surface 183 profile curves radially and axially. As the water is heated along the rotor vapor chamber evaporator surface 191, it changes phase from a liquid to a gas, absorbing large amounts of heat from the evaporator surface 191 and transferring it into the water vapor gas. Internal chamber pressures circulates the heated water vapor to inner rotor condensers located at both axial sides of the rotor segment assembly 310, where the heated water vapor transfers the heat to the inner condenser 200 and phase changes back into a liquid and circulates back to the rotor vapor chamber evaporator surface 191.

Deionized water 320 is the preferred working material for inside the rotor vapor chamber 190. By allowing the working fluid water to continuously change phase from a liquid to a gas, and then back into a liquid again, allows large amounts of heat to be transferred at sonic speeds. The rotor water vapor chamber 190 operates between 24 and 202 degrees Centigrade, or 75 and 397 degrees Fahrenheit, and the larger the temperature difference between the rotor vapor chamber evaporator area 191 and the rotor inner condenser 200, the faster the rate of heat transfer.

The rotor water vapor chamber operates just like a heat pipe where gravity or a wicking system is used to circulate the working fluid. In a gravity system, heat is absorbed along the bottom evaporator surface of the vapor chamber, causing the internal working material to turn from a solid or liquid into a gas vapor that rise to the top vapor chamber condenser by convection to transfer and release its heat. However in the rotor 183 of the present invention, the rotor vapor chamber 190 is rotating inside the rotor 183 which generates strong centrifugal forces creating high G-forces that reverse the gravity operating direction of heat transfer in the water vapor chamber 190. This heat transfer reversed direction is ideal for the engine 1 of the present invention, allowing ideal heat transfer to occur from the rotor vapor chamber's 190 top evaporator surface 191 just underneath the rotor's outer surface 185 and transfer the absorbed heat towards the lower side bottom ends of the of the rotor vapor chamber 190 to the rotor inner condenser 200. At the rotor vapor chamber inner condenser 200, the internal working water vapor changes phase from gas to a liquid as it transfers the heat into the rotor inner condenser 200. The water liquid then circulates back outward toward the rotor vapor chamber evaporator surface 191 to re-circulate again.

Referring to FIGS. 44 and 50, to improve the capillary flow of the water working fluids near the outer evaporator surface areas 191 of the rotor water vapor chamber 190, a layer of fine wicking mesh 192 is preferably used. This allows the high pressure small liquid water drops to flow easily along the outer rotor evaporator surface 191 and change phase from a liquid to a gas. A coarse wicking capillary mesh layer 193 will be used from the end rotor inner condensers 200 along the sides of the rotor vapor chamber 190 to interface with the fine mesh layer 193. This allows low pressure larger liquid water drops to easily flow to the outer fine wicking capillary mesh layer 193 of the working liquid to any location in the rotor vapor chamber 190 along the outer evaporator surface area 191. The coarse wicking mesh 193 extends slightly underneath the fine wicking mesh 192 at mesh interface 369. This allows the larger water droplets to move closer to the rotor vapor chamber evaporator surface 191. It also allows the smaller water droplets to be wicked back up closer to the rotor vapor chamber inner condenser 200. Both the fine 192 and coarse 193 wicking meshes are surrounded by a fine perimeter mesh 194. The perimeter wicking mesh 194 helps distribute the working fluid around all surfaces of the rotor water vapor chamber 190. It also helps keep working fluid along the front and back face surfaces of the rotor segment assembly 310 to help cool the heat transferred in the sliding vane passage 184 and from the vane face seals 111.

To improve the working fluid gas circulation, vapor chamber extension ridges 196 in the inner surface side of the bottom rotor vapor chamber cover 195 hold and press together the fine 192 and coarse 193 wicking mesh layers. They also create large rotor vapor chamber voids or channels 197 between the extension ridges 196 for the working fluid gases to easily flow.

The rotor water vapor chamber helps keep the rotor surface 183 and combustion cavity 184 at good operating temperatures. It also helps to isothermalize these surfaces temperature to minimize any thermal hotspots, minimizing thermal damage and stabilizing combustion reaction conditions inside the combustion chamber 34.

Inner and Outer Rotor Vapor Chamber Condensers

Figure 43:
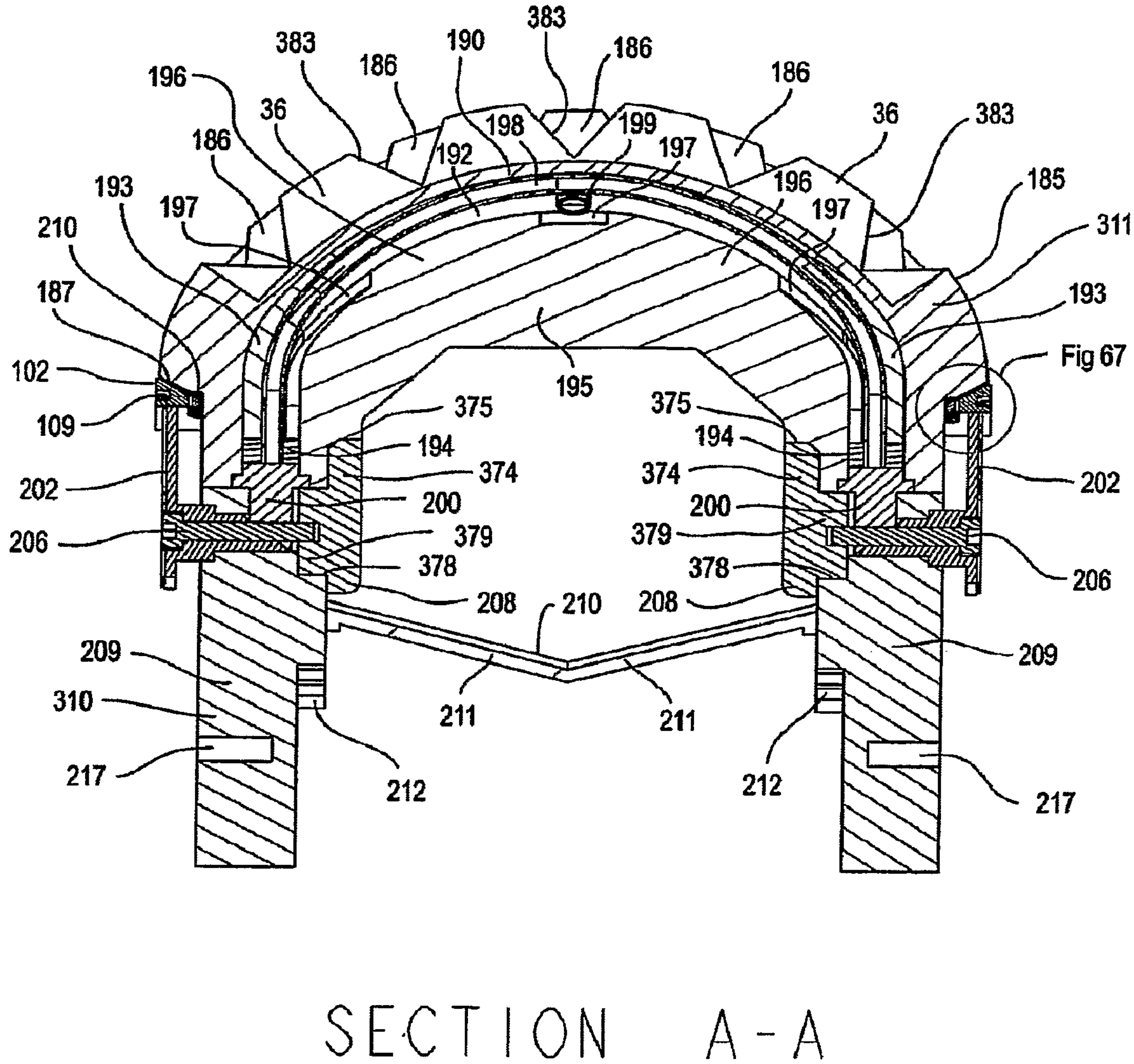
FIG. 43 depicts a front cross-sectional view of the rotor segment assembly.

Referring to FIGS. 41, 43, and 50, the inner rotor vapor chamber condenser 200 is preferably constructed from highly heat conductive materials like aluminum and braised in the ends of the rotor combustion segment 311 to completely seal and enclose the rotor water vapor chamber system 190. The outer surface of the inner rotor vapor chamber condenser 200 is also preferably constructed from highly conductive material such as aluminum, and contains vertical ridges and grooves 201 that are used to interface with ridges and grooves 203 of the outer rotor vapor chamber condenser 202. The front face surface of the outer rotor vapor chamber condenser 202 is also covered with a combination of curved ridges and grooves 204 and radial straight ridges and grooves 205. Both the curved 204 and radial straight 205 ridges and grooves increase the contact surface area for heat transfer with the deionized water 320 to absorb heat from the outer rotor vapor chamber condenser 202.

Rotor Water Vapor Chamber Porous Wick/Freeze Tube

Figure 45:
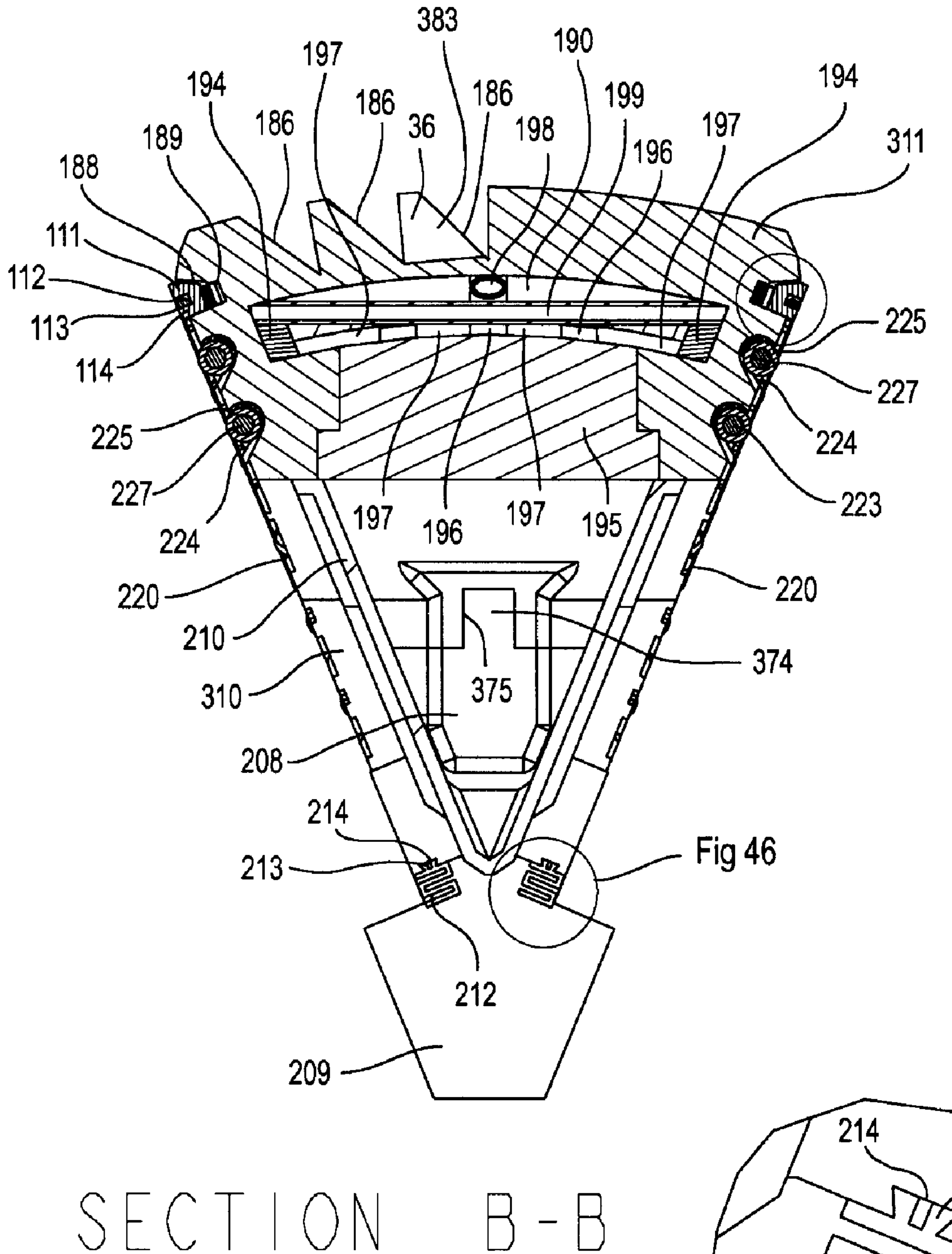
FIG. 45 depicts a side cross-section view of rotor segment assembly.

Referring to FIGS. 43 and 45, an axial 198 and radial 199 oriented porous wick/freeze tubes will be placed inside the rotor water vapor chamber 190. The axial porous wick/freeze tube wraps across the entire length for the rotor water vapor chamber 190 from one inner rotor vapor chamber condenser 200 to the other side inner rotor vapor chamber condenser 200. The radial porous wick/freeze tube 199 runs across the top center section of the inner rotor water vapor chamber 190 radially. The axial 198 and radial 199 porous wick/freeze tubes are made from stainless steel wire mesh or preferably shape metal alloys (SMA) made from copper zinc aluminum (CuZnAl) alloy that are woven together and braised or spot welded into a tube shape. The radial porous tube 199 helps wick water radially across the top surface of the rotor water vapor chamber 190. More importantly, since the rotor water vapor chamber 190 is completely sealed with working fluid water inside, it is prone to water freezing expansion damage when engine 1 is exposed to temperatures of 32 degrees F. and lower. To counter the water freezing expansion, the porous tube insulates some of the water working fluid inside the axial 198 and radial 199 porous wick/freeze tubes. As the working fluid begins to freeze and expand, the unfrozen water working fluid in the center of the porous wick/freeze tubes is wicked up along the axial 198 and radial 199 porous wick/freeze tubes. This allows the water working fluid to expand by imploding inward on the porous wick/freeze tubes rather than exploding outward, generating expansion pressures that could result in damage to the rotor water vapor chamber 190 or rotor assembly 310 of rotor 183. By using a SMA for the axial 198 and radial 199 porous wick/freeze tubes, their lower sections can be deformed as the water working fluid freezes and expands imploding the axial 198 and radial 199 porous wick/freeze tubes. Once the rotor water vapor chamber's temperature rises to about 32 degrees F., and the working fluid changes phase from ice back to a liquid, the axial 198 and radial 199 porous wick/freeze tubes reform back into their original shapes.

The axial 198 and radial 199 porous wicking/freeze tubes are placed in channel axial 264 and radial 265 openings and perforations in the fine 192, coarse 193, and perimeter 194 wicking meshes. This helps hold all the different wicking materials and tubes in their proper positions during the operation of engine 1. It also allows the axial 198 and radial 199 tubes to get all the way into the bottom corners and surfaces where the water working fluid will pool.

Rotor Water Vapor Chamber Cover

Referring to FIG. 50, the rotor water vapor chamber cover 195 fit into the bottom of the rotor combustion segment 311. The inner surface of the rotor contains ridge extensions 196 that form rotor water vapor chamber voids 197 that allow the rapid movement of water gas vapor inside the rotor water vapor chamber 190. The inner surface ridges also help hold the inner fine 192 and coarse 193 wicking meshes in place during operation of engine 1.

The inner surface of both the rotor water vapor chamber ridges 196 and channels 197 of the rotor water vapor chamber cover 195 are coated with a thermal barrier coating 36. The thermal barrier coating 36 helps keep heat inside the rotor water vapor chamber 190 and restrict heat from being transferred through the water vapor chamber cover 195 and into the inner rotor cavity area 363.

Inner Rotor Cover Plate

Figure 42:
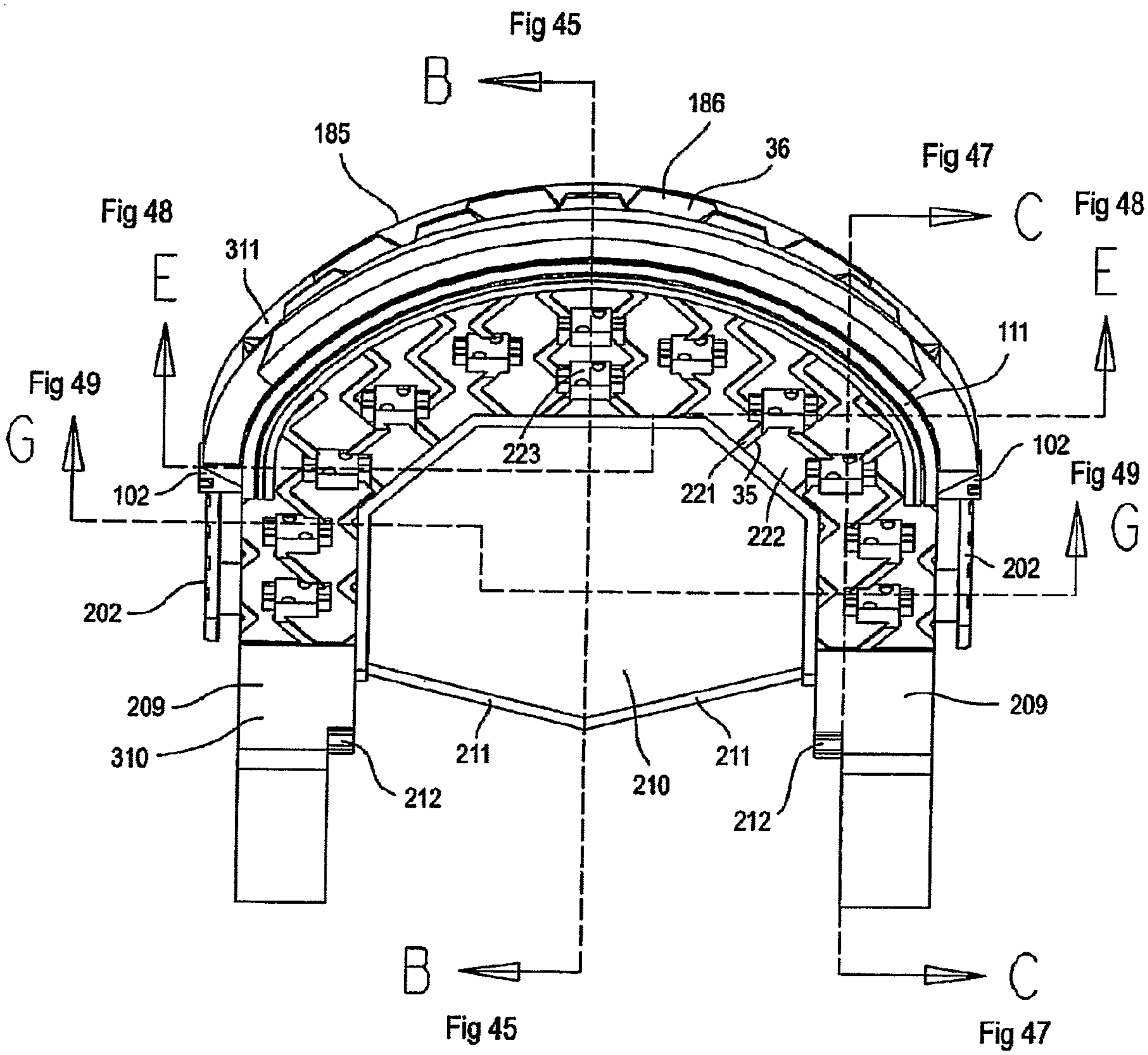
Figure 69:
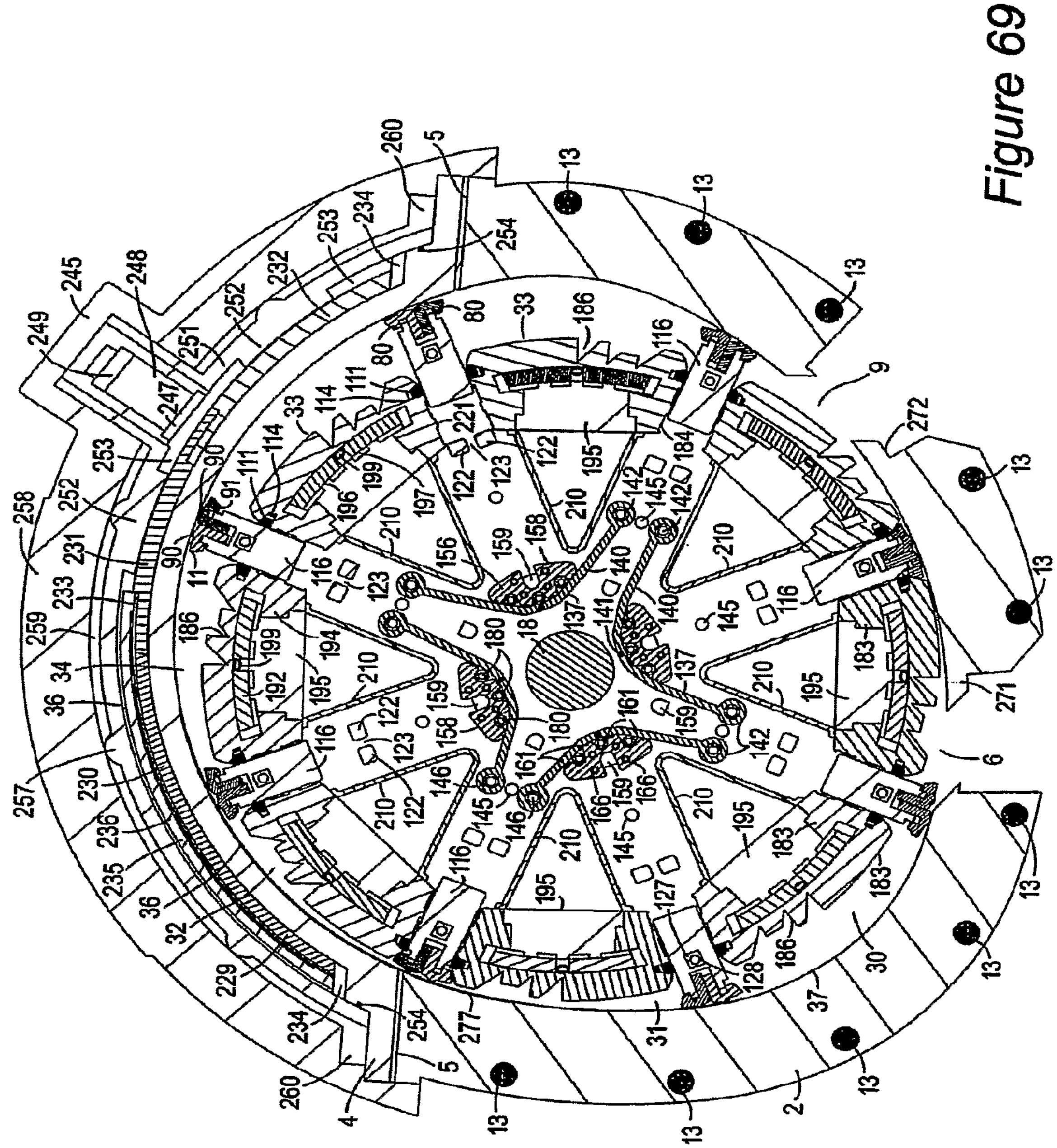
FIGS. 69 and 70 depict side and front cross-sectional views of the entire engine assembly.

Referring to FIGS. 42, 45, and 69, an inner rotor cover plate 210 is welded to the bottom of the combustion cavity segment 311 that goes over the cover of the rotor water vapor chamber 197 over the lock tab 208 and is welded along the inner surfaces of the rotor side plates 209. The rotor cover 210 adds some structural strength to the rotor segment assembly 310. It is also used to create a thermal insulation void to prevent eat from the rotor surface 185 and rotor water vapor chamber 190 from penetrating into the inner rotor cavity 363. It is also used to close off large open areas inside the inner rotor cavity 363. This helps restrict the deionized water 320 from the active cooling system 362 to key areas of the water/steam channels 222 along the front and back rotor sliding vane faces 220 of the sliding vane passages 184. It also creates strong turbulence channels inside the rotor cavity 363 from the motion of the moving sliding vanes 116 and vane belt system 136. This strong turbulence helps distribute the deionized water 320 and steam from the active cooling system 362 evenly throughout the inside of the rotor cavity 363.

The outer surfaces 211 of the inner rotor cover plate 210 will be angled from the inner rotor cavity 363 center to the outer rotor 183 sides.

Vane Profile Belt Limit Springs

Referring to FIGS. 42, 48, and 46, vane profile belt limit springs 212 have keystone extensions 213 that fit into a keystone recess 214 located on the inner rotor side plate 209 surface in the inner rotor cavity 363 area. The vane profile belt limit spring keystone extensions 213 are tack-welded in place to hold them securely in the keystone recesses 214 of the inner rotor side plates 209. The vane belt limit springs 212 limit the maximum extension of the side profile vane belt arches 176 to help keep the profile belts 139 and the rest of the vane belting system 136 and sliding vanes 116 in proper alignment with the inner housing stator surface 37 of housing stators 2 and 4.

Sodium Vapor Chamber System

Figure 6:
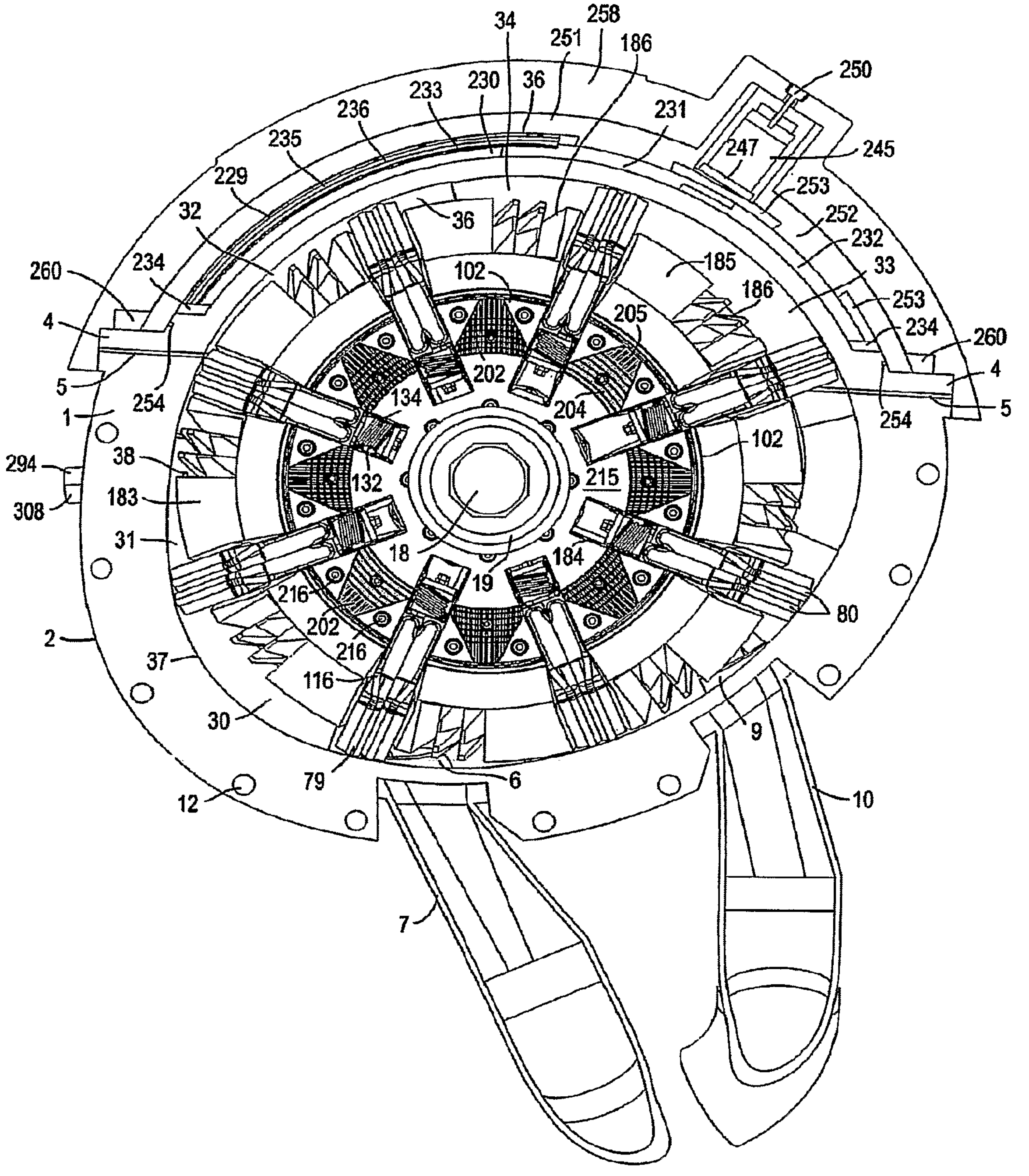
FIG. 6 depicts a cutaway plan view of Hydrogen G-cycle engine.
Figure 71:
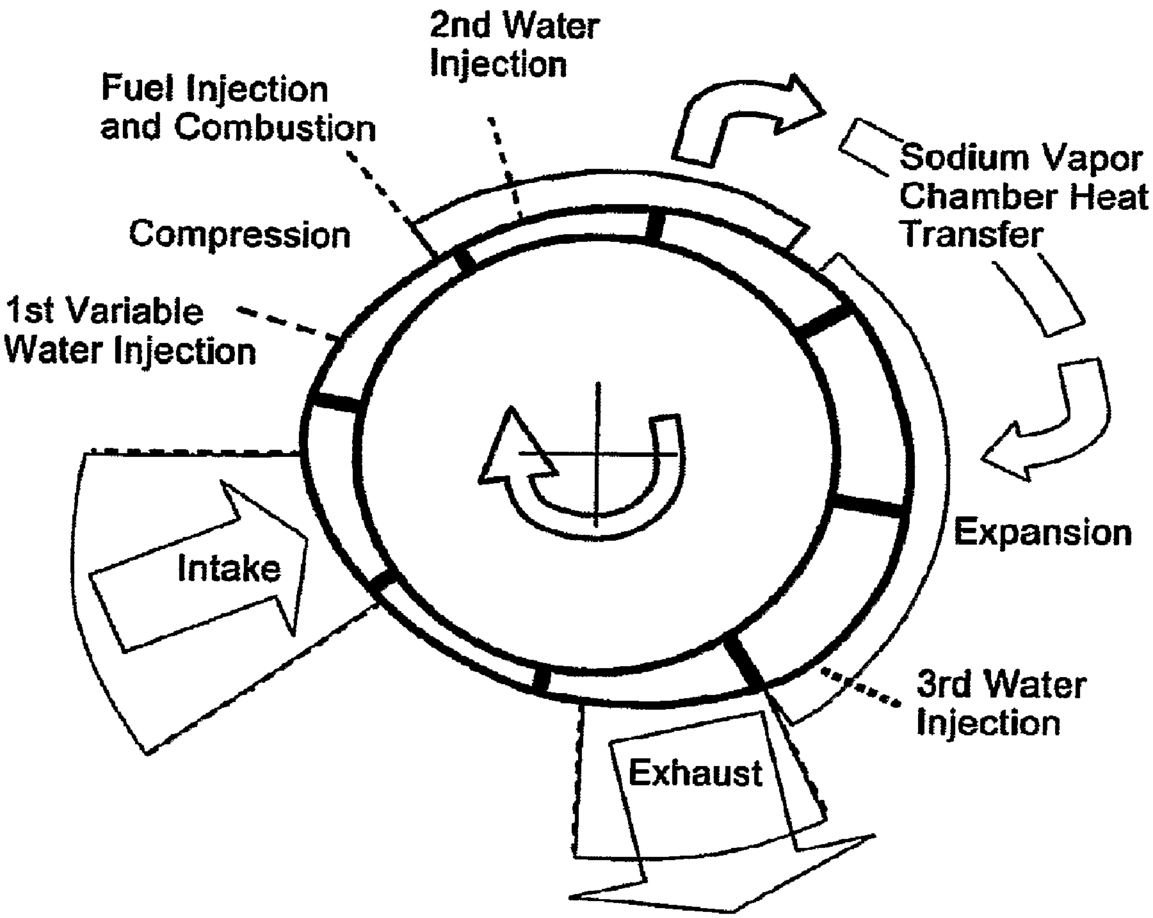
FIG. 71 depicts G-cycle rotary vane engine processes.

Referring to FIGS. 3, 6, and 71 engine 1 uses a sodium vapor chamber heat transfer system 229 to transfer heat from the high temperature combustion zones 32 to the middle and later stages of expansion zones 33. The sodium vapor chamber 229 uses sodium as a working fluid and operates between 600 to 1,100 degrees Celsius, but preferably to 900 degrees Celsius. For engine 1, the sodium vapor chamber 229 isothermalizes the temperature across the sodium vapor chamber stator 4 in the combustion 32 and expansion 33 zones to an operation temperature of about 600 degrees Celsius. During combustion, the hydrogen/water/air mixture ignites in the combustion chamber 32 and reaches a maximum temperature of about 1,800 degrees Kelvin or 1,526 degrees Celsius. A thermal barrier coating 36 is applied to a thermal barrier coating recess 277 along front inner stator surface 37 of the sodium vapor chamber stator 4 to protect the sodium vapor chamber from constant excessive heat loading temperatures. A portion of the combustion heat will passes through the thermal barrier coating 36 and sodium vapor chamber stator 4 penetrates into the sodium vapor chamber 229 along the evaporator section 379 where the sodium working fluid changes phase from a liquid to a gas. During the middle and later stages of combustion-expansion in the expansion chamber 33 zones, the expanding gas temperatures can become lower than the sodium vapor chamber's 229 temperature and the sodium working fluid changes phase from a gas to a liquid, transferring its heat from the sodium vapor chamber 229 along the condenser zone 380 through the sodium vapor chamber stator 4, and back into the combustion chamber 34 to help maintain high late stage gas pressures. The sodium liquid is then wicked back to the evaporator zone 379 through wicks and capillary pressure.

Sodium Vapor Chamber Wicking Meshes

Referring to FIGS. 57 to 62, the sodium vapor chamber system 229 uses a series of wicking meshes to help move the sodium working fluid. To improve the capillary flow of the sodium working fluid near the outer evaporator surface areas 379 of the sodium vapor chamber 229, a layer of fine wicking 200-mesh 230 is used. This allows the high pressure small liquid sodium drops to flow easily along the outer sodium vapor chamber evaporator surface 379 change phase to from a liquid to a gas. A coarse wicking capillary 100-mesh layer 232 is used at the other end of the sodium vapor chamber 229 along the condenser zone 380. This allows low pressure larger liquid sodium drops to easily flow back towards the evaporator zone 379. To yet further improve the wicking of the sodium working fluid, a medium wicking capillary 150-mesh 231 is placed between the fine 230 and coarse 232 sections of wicking mesh to provide a transition wicking mesh for medium sized liquid sodium droplets.

All three mesh sections the fine 230, medium 231, and coarse 232 wicking meshes are surrounded by a medium perimeter 150-mesh 234. The perimeter wicking mesh 234 helps distribute the working fluid throughout all surfaces of the sodium vapor chamber 229. It also helps to improve sodium freezing startup conditions by providing a small pool of liquid sodium in the evaporator zone 379. Vapor chamber startup problems and damage can occur because there is not enough working fluid in the evaporator zone resulting in dry spots that can super heat. In engine 1, the curved shape of the sodium vapor chamber 229 pools sodium working fluid near both ends of the sodium vapor chamber 229, towards the evaporator end 379 and condenser end 380. This allows some of the sodium to be readily available in the evaporator zone 379 during startup, and by using a medium wicking perimeter mesh allows some of the sodium working fluid to be distributed around the sodium vapor chamber evaporator zone 379 and make direct contact with the sodium vapor chamber stator 4.

Figure 57:
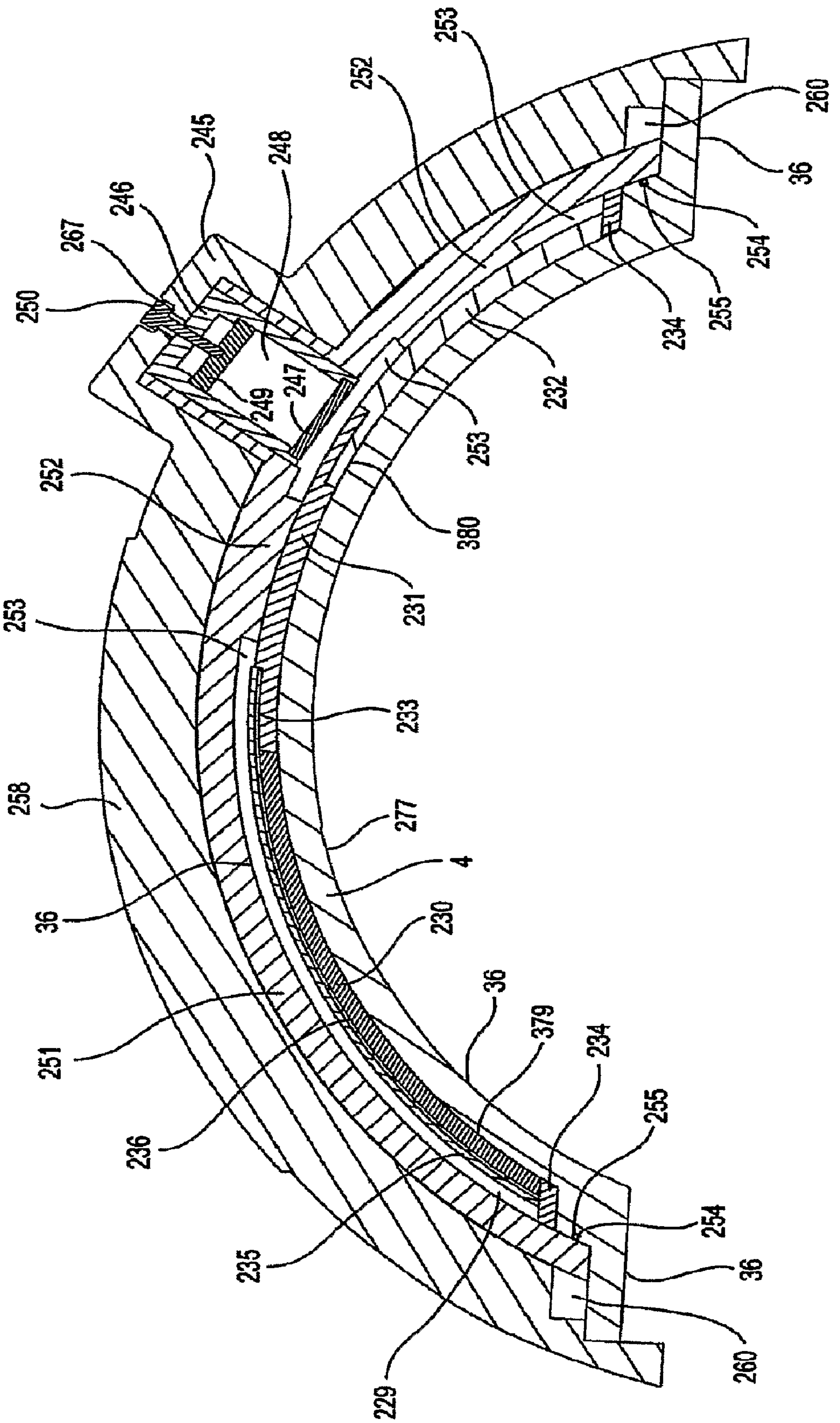
Figure 58:
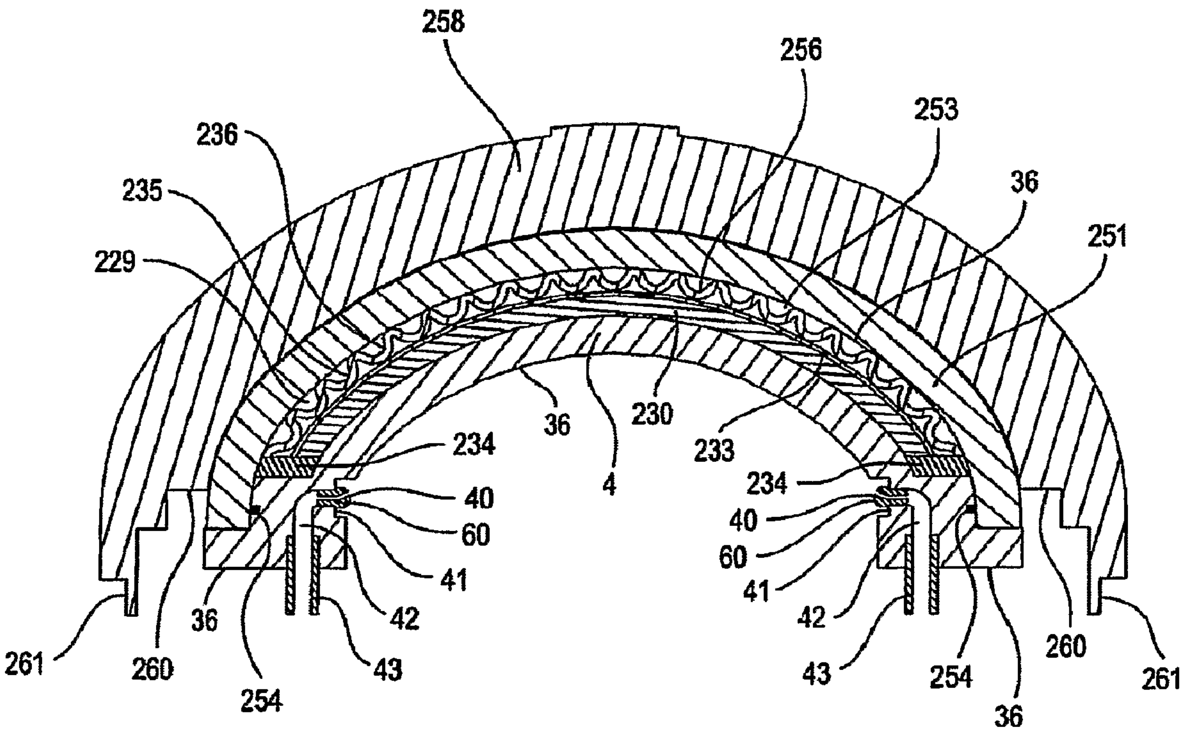
Figure 61:
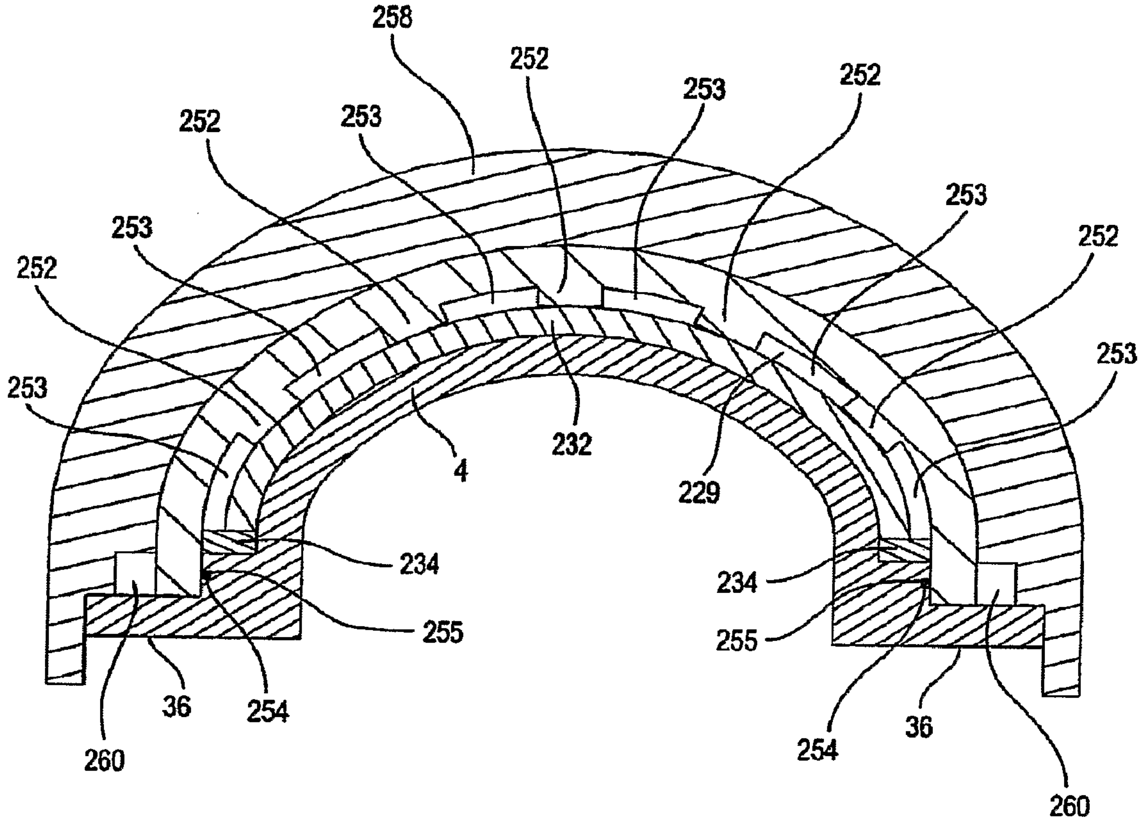
Figure 62:
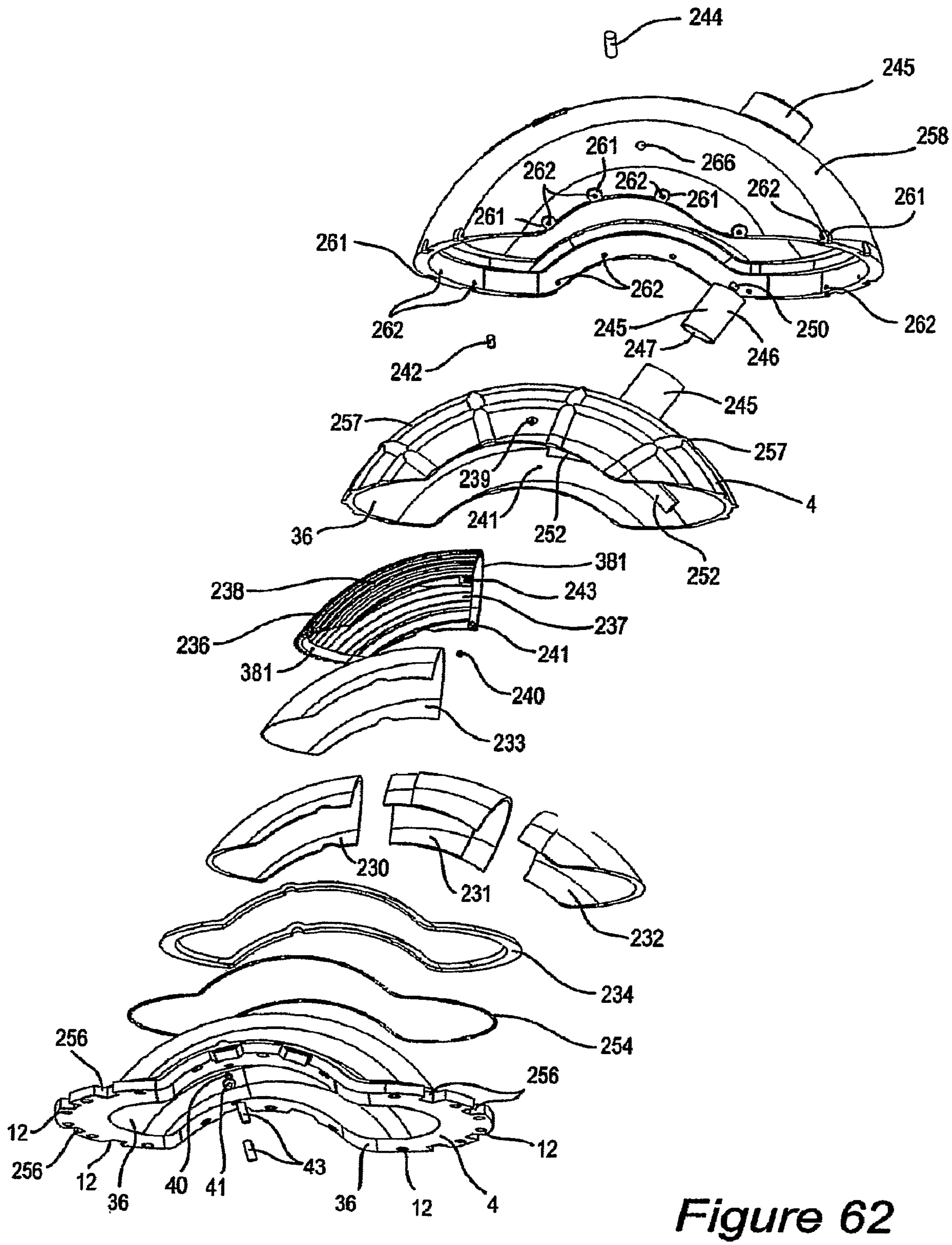
FIGS. 62 to 64 depict side, bottom, and top exploded views of the sodium vapor chamber and alkali metal thermal electrical converter assembly.

Referring to FIGS. 57, 61, and 62, to improve the sodium working fluid gas circulation, sodium vapor chamber ridges 252 extends from the inner surface side of the outer sodium vapor chamber cover 251. The sodium vapor chamber ridge extensions 252 also help to hold the fine 230, medium, 231 and coarse 232 wicking mesh sections in their proper positions inside the sodium vapor chamber 229. The ridge extensions 252 also create large sodium vapor chamber voids or channels 253 between the ridge extensions 252 for the sodium working fluid gases to easily flow.

Referring to FIGS. 52 and 59 to 64, the outer surface of the sodium vapor chamber cover 251 has a series of axial and radial support ribs 257 that add structural reinforcement strength to the outer sodium vapor chamber cover 251. The reinforcement ridges 257 also create void space between the sodium vapor chamber cover 251 and the outer insulation material 258 to further help create thermal heat block to prevent heat loss through the outer vapor chamber cover 251 of the sodium vapor chamber system 229.

Sodium Vapor Chamber Pressure adjustment Rupture Chamber

Referring to FIGS. 52, 57, 60, and 62 to 64, sodium is highly reactive with water, and when heated from the operation of engine 1, it will generate high pressure inside the sodium vapor chamber 229. To help prevent the sodium vapor chamber from rupturing from high impact from an accident, or from too much pressure inside the sodium vapor chamber 229, the outer surface of the sodium vapor chamber cover 251 includes rupture chamber system 245. This provides a safety system to relieve pressure inside the sodium vapor chamber and prevent the sodium vapor chamber 229 from rupturing and releasing the sodium. The sodium vapor chamber rupture system 245 is comprised of a rupture cylinder 246, gas chamber 248, sodium pressure adjustment disk 247, rupture signal disk 249, and rupture signal flag 250. The pressure adjustment rupture cylinder 246 is screwed into the top sodium vapor chamber cover 251 where a pressure adjustment disk 247 is exposed to the inner workings sodium vapor chamber 229. The top of the rupture cylinder 246 is closed off by a rupture signal disk 249 creating a gas space 248 between the pressure adjustment disk and the rupture signal disk 249. The gas space 248 is filled with a compressible inert gas like argon or preferably krypton. If the outer sodium vapor chamber 229 surface has a high impact, or the inner pressure become too high, it will press the pressure adjustment disk into the gas space 248 and compressing the gas. Sodium vapor gas will also enter into the pressure adjustment chamber 248 of the rupture cylinder 246, lowering the overall inner sodium vapor chamber 229 pressure to prevent a sodium rupture through the sodium vapor chamber's outer cover 251. If the gas pressure becomes to great it will force the rupture signal disk 249 outward in the middle, which will force the rupture signal flag 250 through rupture signal hole 267 in the outer insulation material 258 as a signal that the rupture disk 247 has been broken and needs to be replaced. The sodium vapor chamber 229 will still operate, but at a safer lower pressure due to the sodium access to the added volume of the vacuum chamber 248 of the rupture chamber system 245.

The sodium vapor chamber pressure adjustment system 245 will also help maintain ideal internal vapor chamber operating conditions by regulating the internal sodium vapor chamber pressure. As heat is transferred into the sodium vapor chamber 229 the temperature and pressure will rise. To maintain ideal vapor flows a lower pressure is beneficial. To accomplish this the pressure adjustment disk 247 will extend into the rupture cylinder 246 and compress the gas 248, thus reducing the relative internal working pressure of the sodium vapor chamber 229

Alkaline Metal Thermal Electrical Converter (AMTEC)

Figure 63:
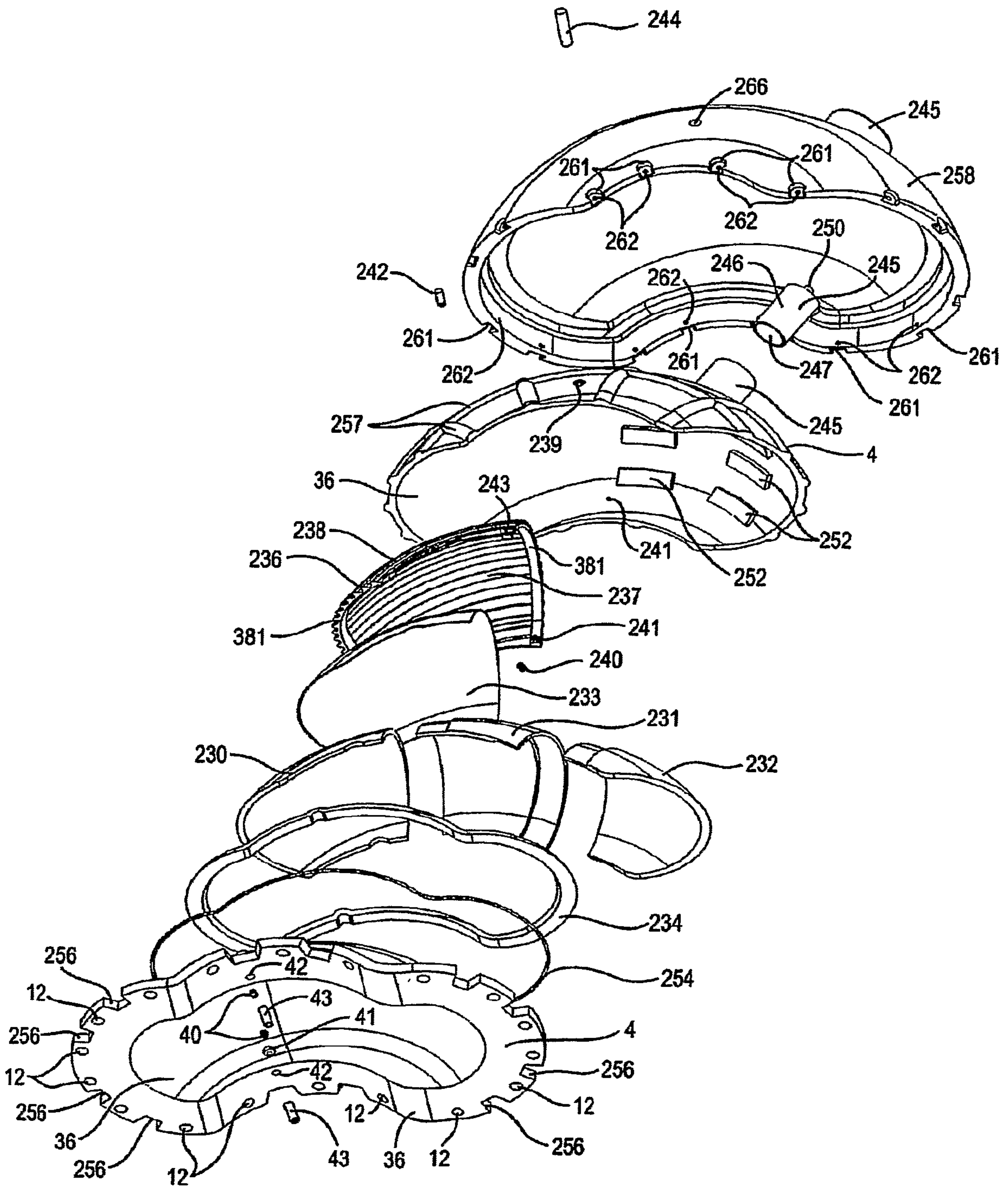
Figure 64:
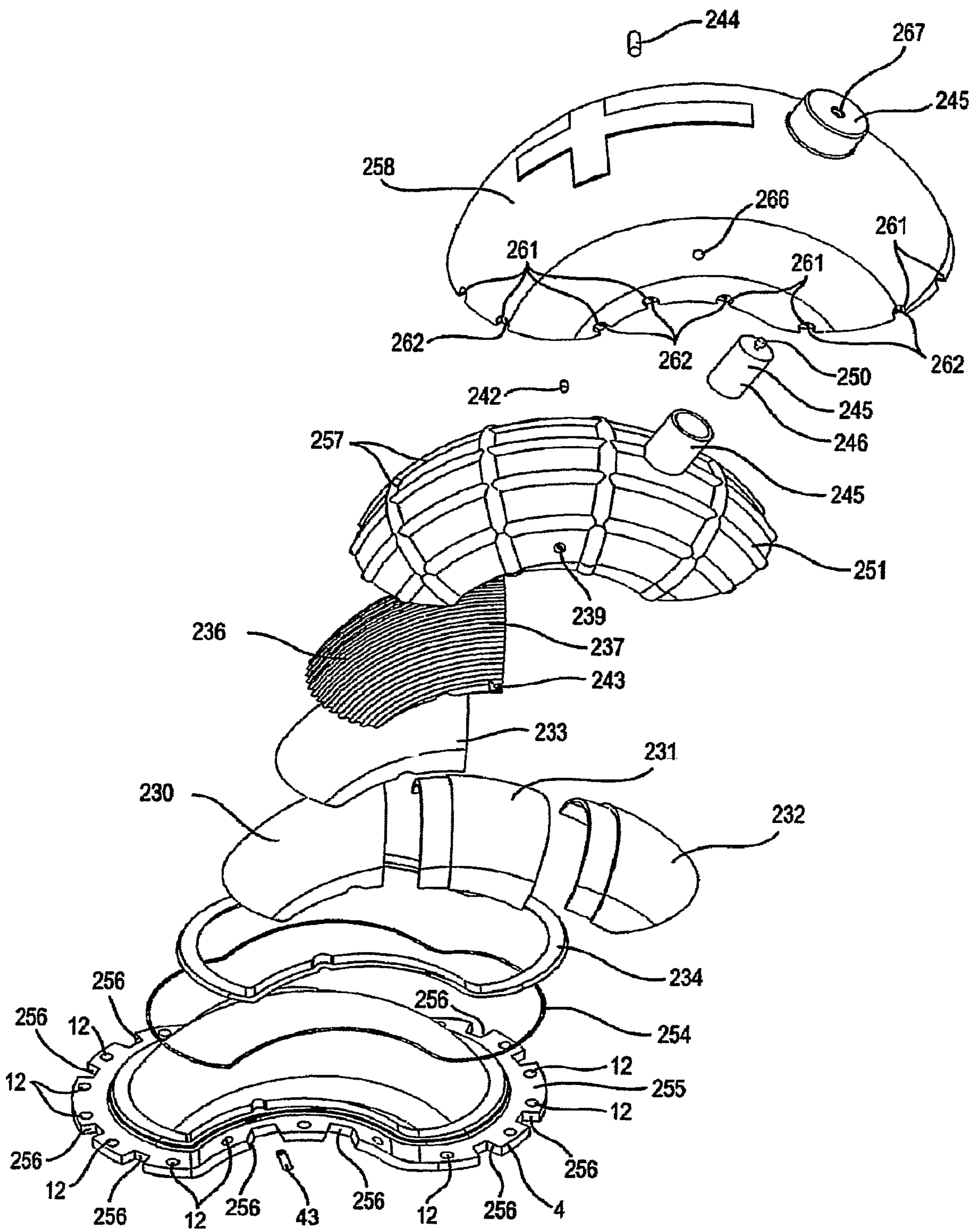

Referring to FIGS. 62 to 64, the sodium working fluid, operation temperature, and sodium circulation profile inside the sodium vapor chamber 229 is identical for the operation needed for an alkaline metal thermal electrical converter (AMTEC) 235. Sodium is a liquid metal that can change phase from a liquid to a gas and back into a liquid inside the sodium vapor chamber 229. Sodium can also pass its ions through a beta alumina solid electrode (BASE) 236 to generate electricity. The BASE 236 is a potato chip U-shaped structure with a corrugated shaped surface to increase the surface area of the BASE 236 and its capacity to generate electricity. The ends of the BASE 236 are closed off along the outer surface 381 to help contain high sodium gas pressure underneath the BASE 236 to help the sodium ions to pass through the positive bottom cathode surface 237 of the BASE 236 to the top anode surface 238 of the BASE 236. The BASE 236 is attached to the inner surface of the sodium vapor chamber cover 251 by BASE screw 241 that screws through the BASE 236 and into screw hole 241 in the sodium vapor chamber cover 251.

To electrically and ionically insulate the BASE 236, the BASE screw 241 is made of an electrical and ionic inert material like zirconium, that prevents shorting out the BASE 236. The inner surface of the sodium vapor chamber is also covered with a TBC 36 like Yttrium Stabilized Zirconium (YSZ) that also helps electrically and ionically insulate the top anode 238 surface of the BASE 236. To electrically and ionically insulate the bottom cathode 237 BASE 236 surface as thin wicking mesh made from silica fibers 233 is placed directly under the BASE 236 and over the top of the fine 230 and medium 231 wicking mesh sections. The outer perimeter wicking mesh 234 is also made from electrically and ionically inert material like silica fibers or felt to insulate the BASE 236. By electrically and ionically insulating the BASE 236, the highest amount of electrical power can be generated without loss or shorts by contact with electrical or ionic conductive material surfaces.

Figure 53:
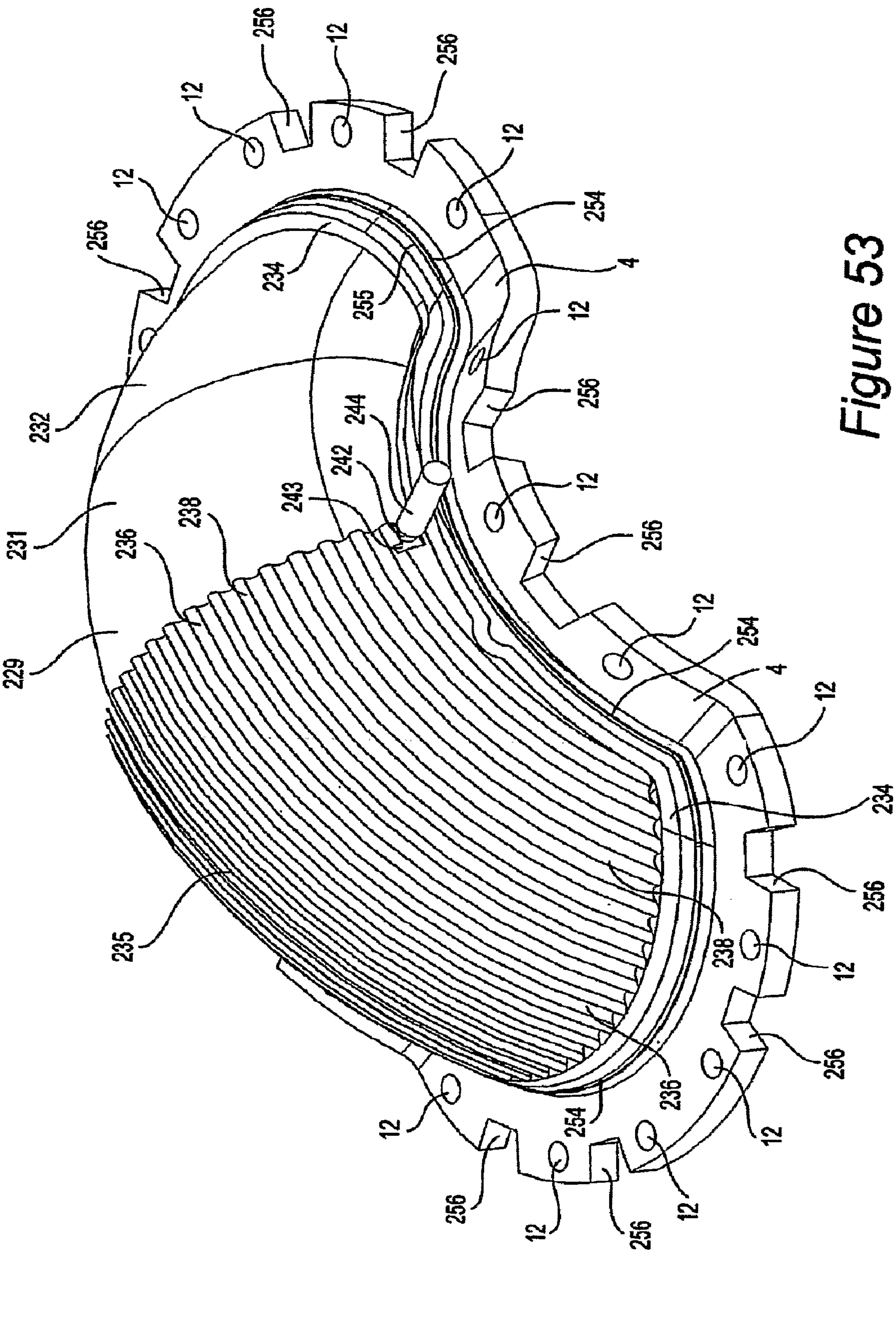
FIGS. 53 to 55 depict the inner top and side views of the sodium vapor chamber and alkali metal thermal electrical converter assembly.
Figure 54:
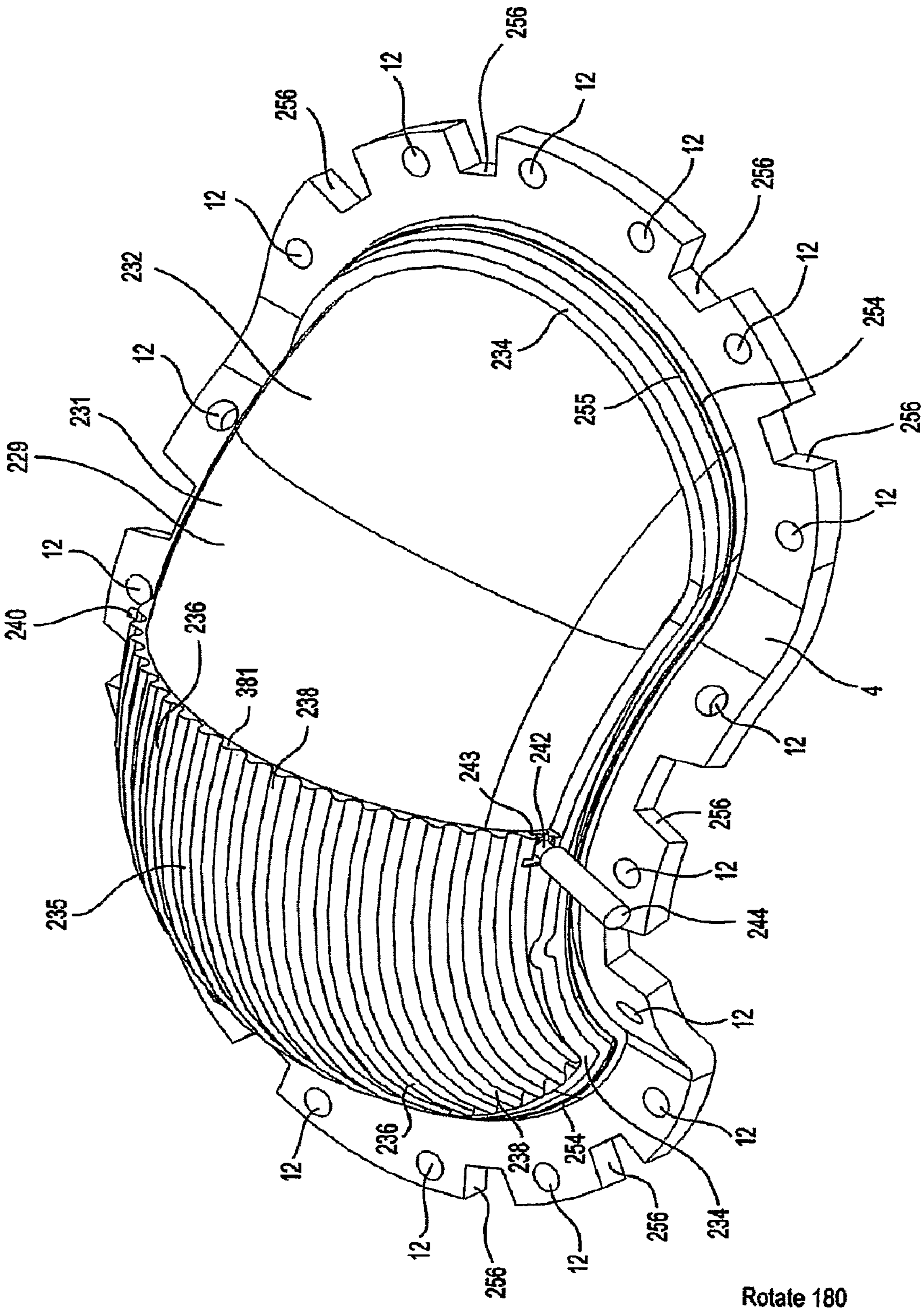
Figure 55:
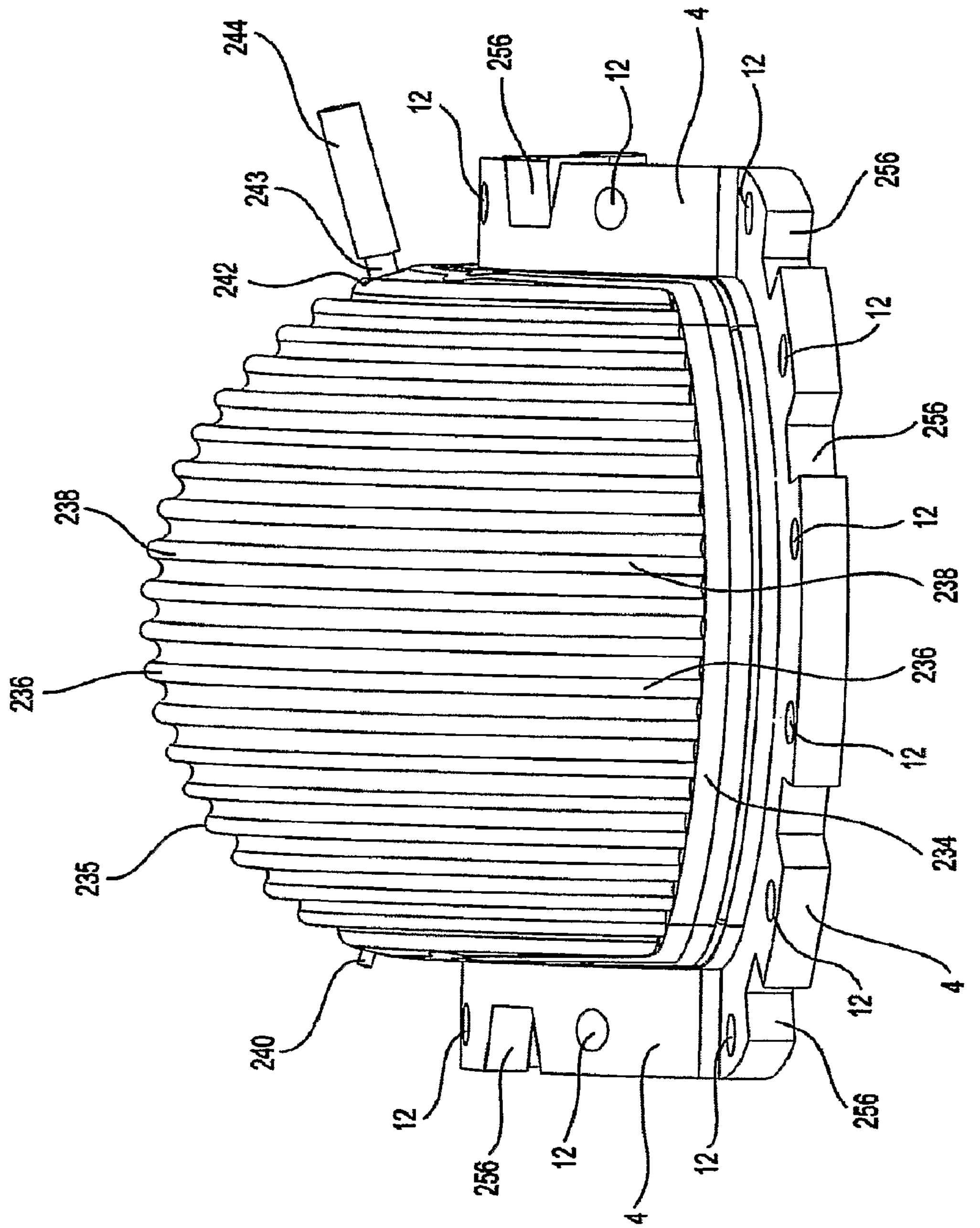
Figure 56:
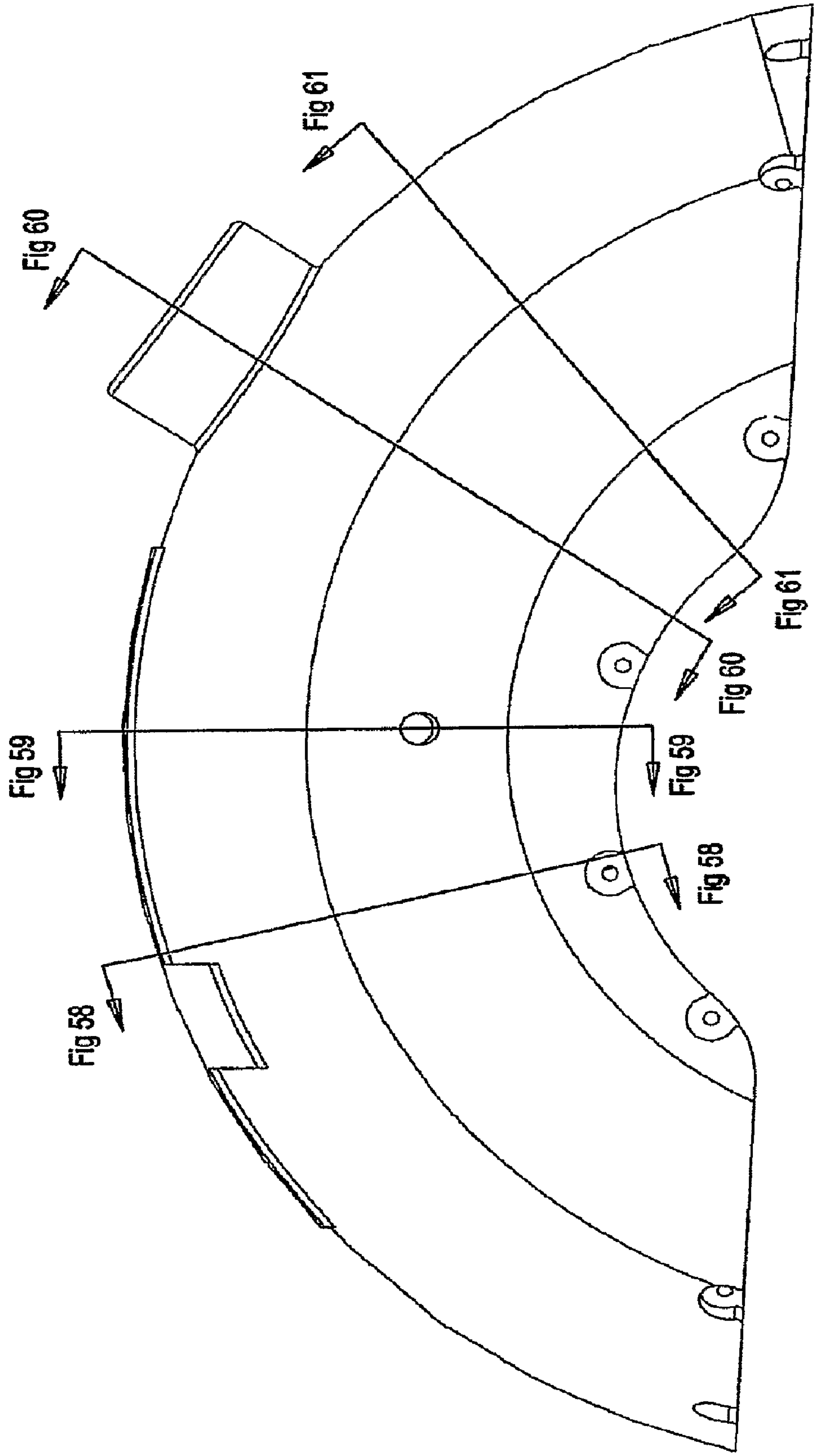
FIGS. 56 to 61 depict outer side, side cross-section, and front cross-section views of the sodium vapor chamber and alkali metal thermal electrical converter assembly.
Figure 59:
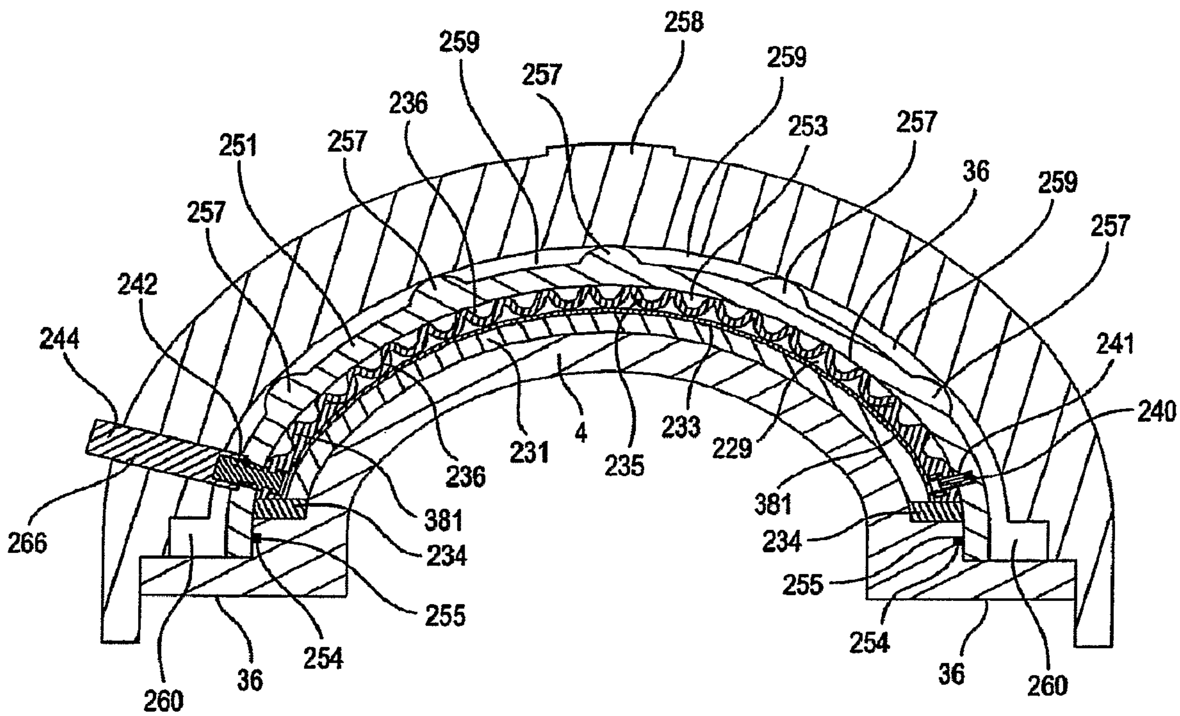
Figure 60:
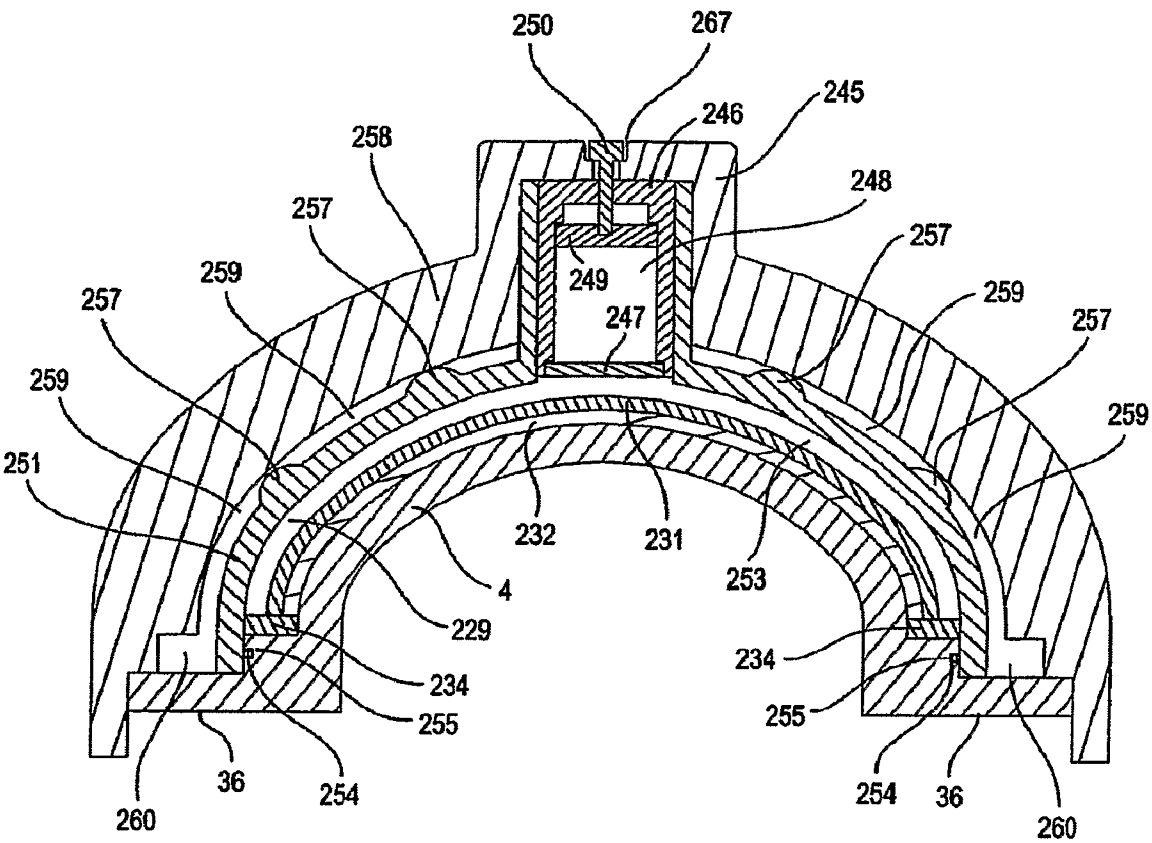

Referring to FIGS. 53, 54 and 59, an inner electrical connector 242 slides into a slot recess 244 on the outer edge 381 of the BASE 236. The bottom cathode 238 and top anode 237 layers go into the slot recess 244 and the bottom edge of the inner electrical connector 242 will make contact with the cathode layer 238 and the upper section of the inner electrical connector 242 makes contact with the anode layer 237, making an electrical circuit with the BASE 236. The inner electrical connector goes through a BASE connector hole 239 in the sodium vapor chamber cover 251, and is welded or braised in place to seal the sodium vapor chamber 229. An outer BASE electrical connecter 244 interfaces with the inner BASE electrical connector 244. The outer BASE electrical connector 244 then goes through a connector hole 266 in the outer sodium vapor chamber insulation 258. Wires are then connected to the outer BASE electrical connector to an electrical power inverter (not shown) to make a circuit with the BASE and condition the electrical power generated by the BASE 236 of the alkaline metal thermal electrical converter system 235.

Outer Sodium Vapor Chamber Cover and Insulation

Referring to FIGS. 56 to 64, to further reduce potential heat loss from the sodium vapor chamber 229 to the ambient atmosphere the inner surface of the sodium vapor chamber cover 251 along with the ridge extensions 252 and channels 253 are coated with a YSZ thermal barrier coating 35. The Zirconium will also provide a hydrogen getting action to absorb any free hydrogen that may disassociate from or pass through the housing stator 4. Additionally, the outside of the sodium vapor chamber cover 251 are covered with a thick thermal insulation material 258, such as an insulation blanket, metal or ceramic foam, or insulation balls or pellets that are contained by and outer shell. The insulation material also helps to absorb any noise and vibrations that may pass through the sodium vapor chamber cover 251.

Referring to FIGS. 53 to 64, the outer sodium vapor chamber cover 251 is welded onto the sodium vapor chamber stator 4. A small wire gasket 254 fits into a wire gasket channel 255 that runs around the outer perimeter of the sodium vapor chamber 229. The wire gasket helps prevent any sodium leaks from the sodium vapor chamber cover 251.

Outer Housing Water Vapor Chambers

Figure 67:
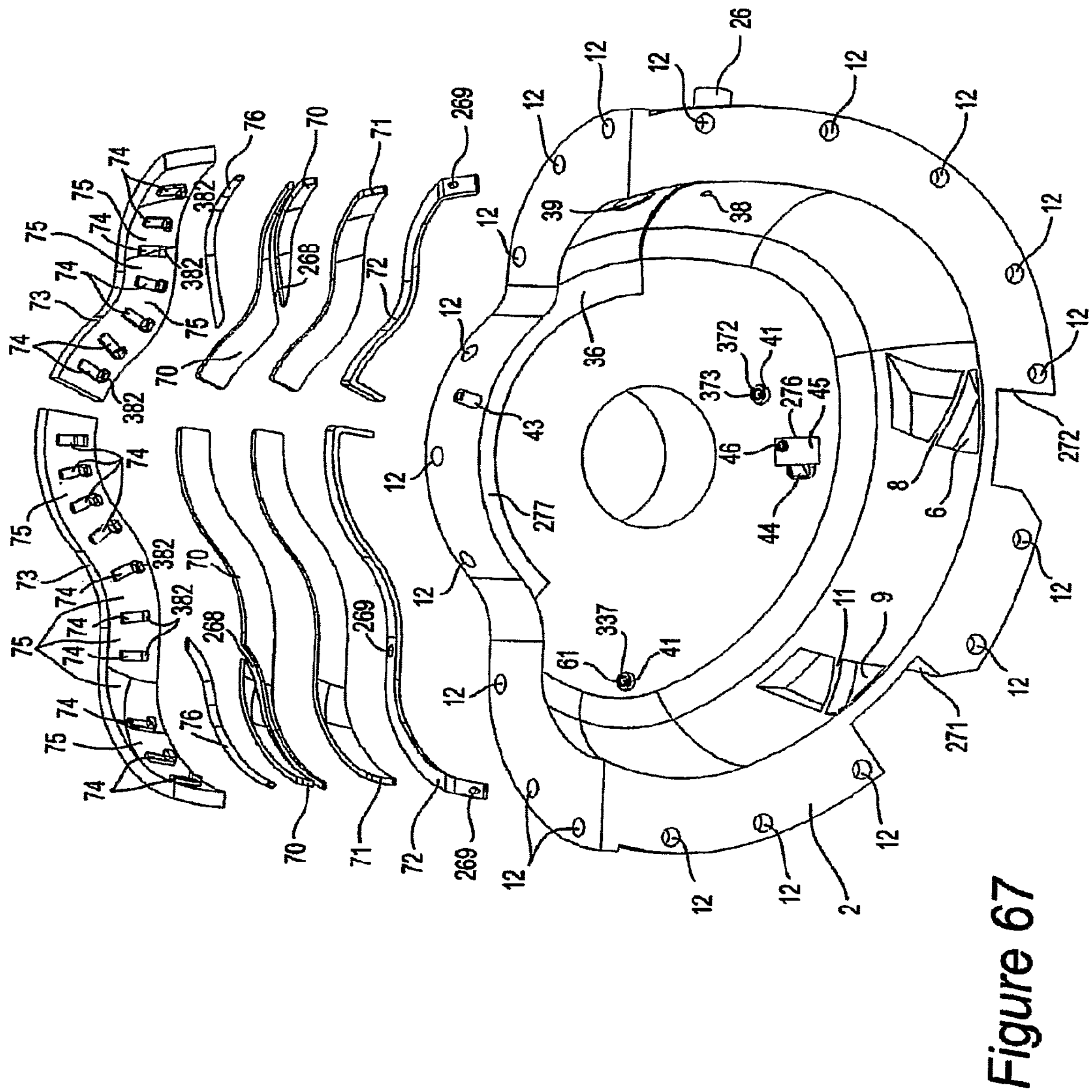
Figure 68:
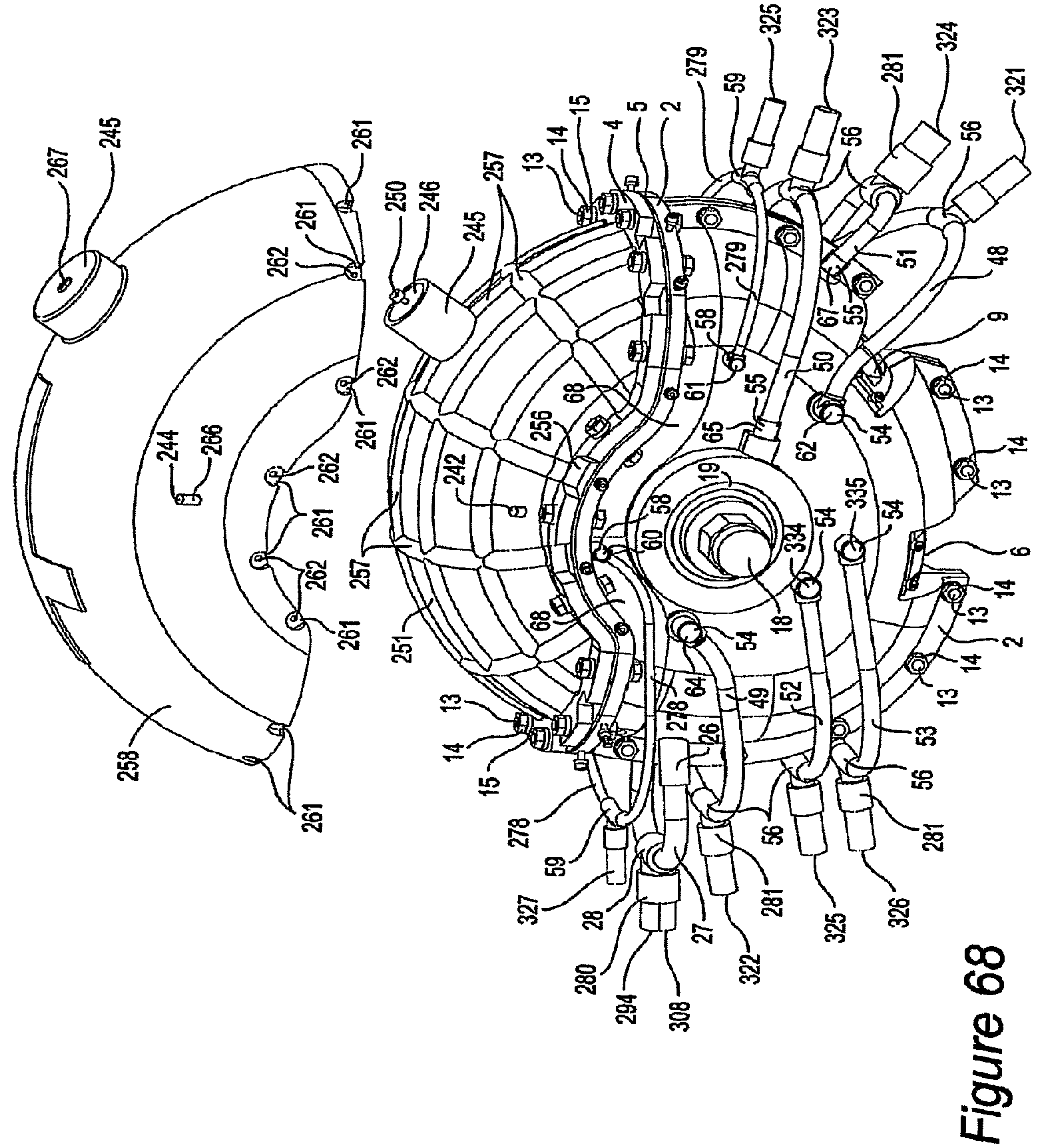
FIG. 68 depicts a side perspective view of the engine assembly with the sodium vapor chamber and alkali metal thermal electrical converter insulation cover exploded.
Figure 70:
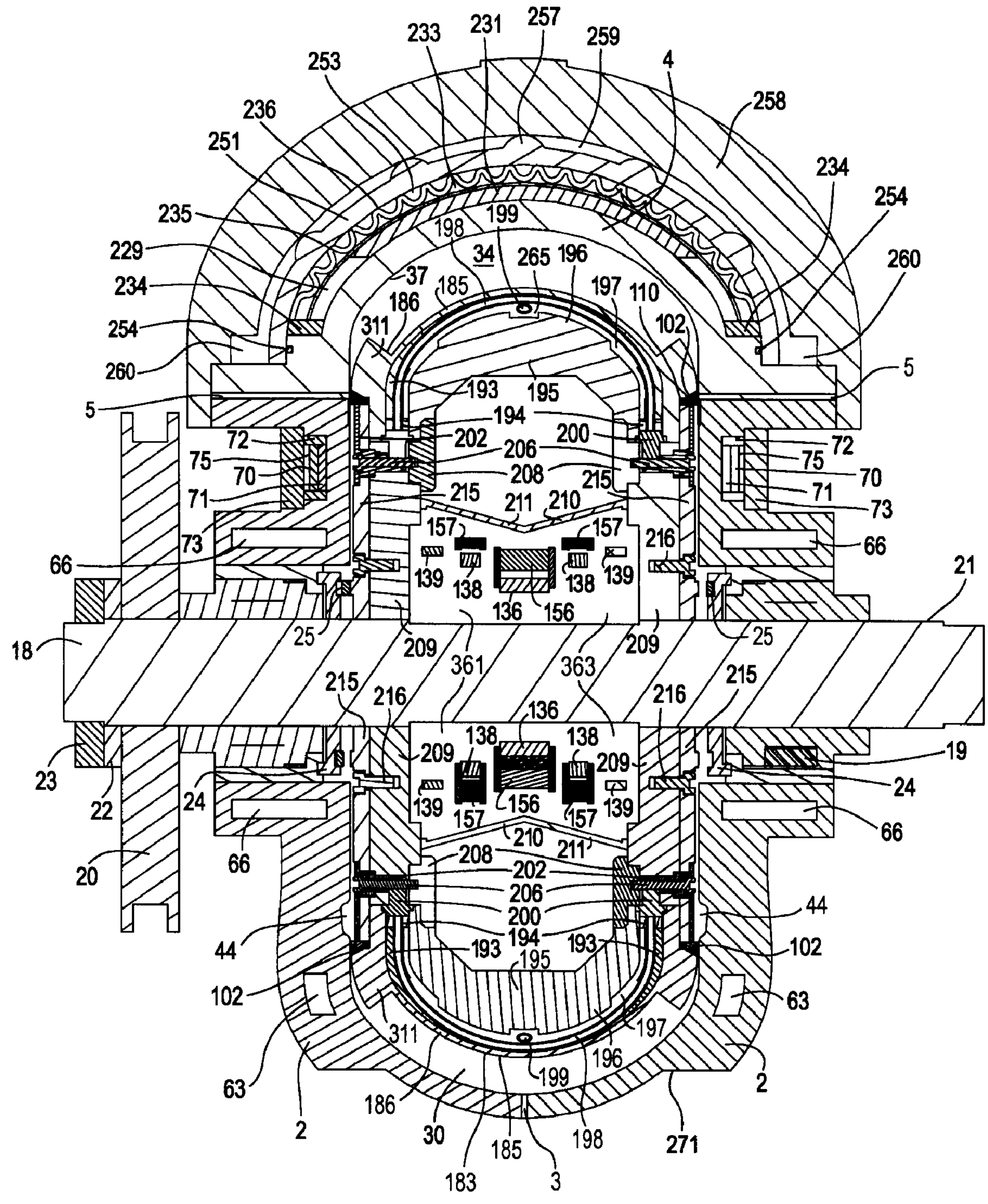

Referring to FIGS. 67 and 70, due to the segmented intake-compression and combustion-expansion zones, there is a bipolar hot/cold thermal gradient throughout the engine 1 that may result in strong thermal deformations of the housing stators 2 and 4. The upper sodium vapor chamber stator's 4 temperature operates at about 600 to 900 degrees Celsius. The lower stator housing 2 is cooled by the active cooling system and operates at a maximum temperature of 98 degrees Celsius. A thermal barrier coating is placed along the bolt up surface of the upper sodium vapor chamber stator 4 to minimize thermal heat transfer into the lower housing stator 2. To help minimize thermal deformation of the lower housing stator 2, two housing water vapor chamber systems 68 are placed in the lower stator housing 2 along the connecting surface with the upper sodium vapor chamber stator 4.

The water vapor chambers help to isothermalize the lower housing stator 2 surface along the bolt up section with the upper sodium vapor chamber stator 4. This helps to maintain a uniform temperature along the bolt up surface minimize any potential hot spots that can cause thermal deformations.

The water working fluid in the housing water vapor chamber 68 absorbs heat from along the top evaporator surface 69 that penetrates through the TBC 36 along the bolt up surface from the adjacent sodium vapor chamber stator 4 and transfers it to its bottom side condenser surface 77 that is adjacent to the intake/compression 63 and rotor bearing/expansion 66 water circulation passages of the active cooling water circulation system 262. As the water is heated along the housing vapor chamber evaporator surface 69, it changes phase from a liquid to a gas, absorbing large amounts of heat from the evaporator surface 69 and transferring it into the water vapor gas. Internal chamber pressures circulate the heated water vapor to housing water vapor chamber condenser surface 77. Where the heated water vapor transfers the heat to the condenser surface area 77, it phase changes back into a liquid and circulates back to housing water vapor chamber evaporator surface 69.

The housing water vapor chambers 68 operate at a temperature between 24 and 202 degrees Centigrade, or 75 and 397 degrees Fahrenheit. The larger the temperature difference between the water vapor chamber evaporator surface 69 along the sodium vapor chamber stator 4 and the water vapor chamber condenser surface 77 along the intake/compression 63 and rotor bearing/expansion 66 water circulation passages of the active water circulation system 262, the faster the rate of heat transfer.

The housing water vapor chambers 69 have a relatively long and narrow shape. Although it is important to transfer heat from the evaporator surface area 69 across the narrow housing water vapor chamber to the condenser surface area 77, it is also important to transfer heat along the length of the housing water vapor chamber 68 to isothermalize the lower housing stator 2 to maintain a uniform lower housing stator 2 and prevent hot spots and thermal deformations. To improve the capillary flow of the water working fluid a U-shaped perimeter wicking mesh 72 encloses fine 71 and coarse 72 layers of capillary wicking meshes. The U-shaped perimeter wicking is placed in direct contact with the housing water vapor chamber evaporator surface area 69 and along both side end surfaces of the housing water vapor chamber 68. The U-shaped perimeter wicking is made from fine mesh to allow the high pressure small liquid water drops to flow easily along the length of housing water vapor chamber evaporator surface 69 to allow the water working fluid to change phase from a liquid to a gas. A layer of fine wicking mesh 71 is used along the bottom surface of the housing water vapor chamber recess 270. This allows the high pressure small liquid water drops to flow easily along the length of housing water vapor chamber 68 and to the outer rotor evaporator surface 69 to allow the water working fluid to change phase from a liquid to a gas. A coarse wicking capillary mesh layer 70 is placed over the top of the fine wicking mesh layer 71. This allows low pressure larger liquid water drops to easily flow along the length of the housing water vapor chamber 68 and to the bottom fine wicking capillary mesh layer 71.

Referring to FIG. 67, to improve the working fluid gas circulation, housing water vapor chamber extension ridges 74 in the inner surface side of the housing vapor chamber cover 73 create housing water vapor chamber voids or channels 75 between the extension ridges 74 for the working fluid gases to easily flow. The housing vapor chamber ridges 74 also hold and press together the fine 71 and coarse 70 wicking mesh layers in position. The housing extension ridges 74 have a larger ridge extension edge 382 towards the housing water vapor chamber condenser surface side, making the total ridge extension slightly L-shaped. This larger ridge extension edge 382 also creates a void area behind the fine 71 and coarse 70 wicking mesh layers and the housing water vapor chamber condenser surface 77. This allows heated water vapor to easily make contact with the housing water vapor chamber condenser surface area 77 and release its heat and change phase from a gas vapor into a liquid.

Housing Water Vapor Chamber Wicking/Freeze Tubes

Figure 65:
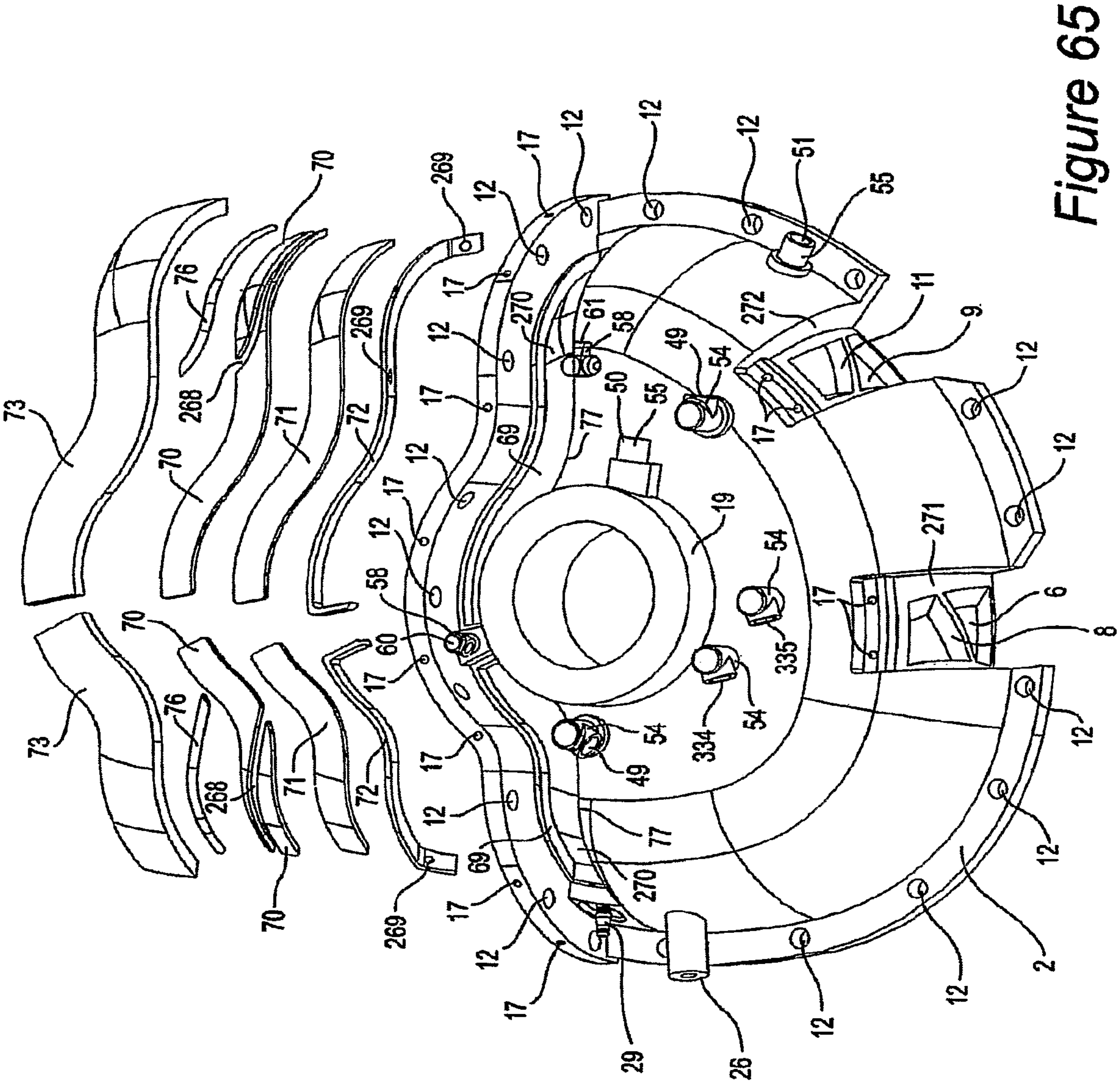
FIGS. 65 to 67 depict the top, side, and bottom view of the lower engine housing with exploded water vapor chamber components.
Figure 66:
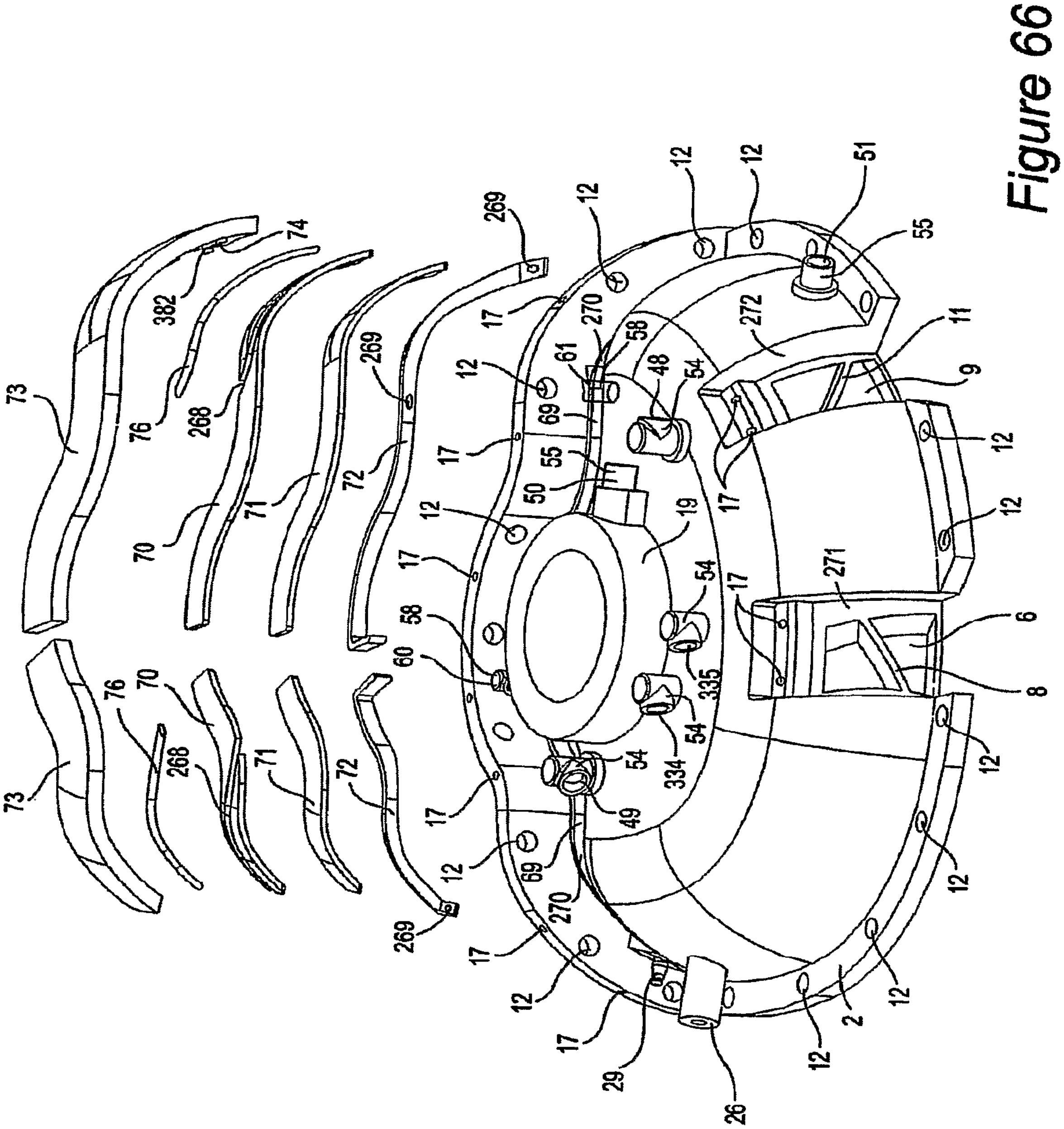

Referring to FIGS. 65 to 67, since the water vapor chamber 76 is completely sealed with working fluid water inside, it is prone to water freezing expansion damage when the engine 1 is exposed to temperatures 32 degrees F and lower. To counter the water freezing expansion, a porous wick/freeze tube 76 is placed inside the housing water vapor chamber 68. The porous wick/freeze tube 76 is made from shape metal alloys (SMA) that are woven together and wrapped into a tube shape and braised or spot welded together. The porous tube insulates some of the water working fluid inside the center of the porous wick/freeze tube 76 so that, as the working fluid begins to freeze and expand, the unfrozen water working fluid in the center of the porous wick/freeze tube is wicked up along the porous wick/freeze tube 76. This allows the water working fluid to expand by imploding inward rather than exploding outward, thus eliminates expansion pressures that could result in damage to the housing water vapor chamber 68 or lower housing stator 2. By using a SMA for the porous wick/freeze tube 76, the lower section of the porous wick/freeze tube 76 can be deformed as the water working fluid expands and implodes the porous wick/freeze tube 76. Once the housing water vapor chamber 68 temperature rises to about 32 degrees F. and the water working fluid changes phase from ice back to a liquid, the porous wick/freeze tube 76 reforms back into its original shape without any damage.

The porous wicking/freeze tubes are held in a slot openings 268 in the coarse wicking mesh 70. The coarse wicking mesh 70 is more likely to contain large water drops that will freeze and expand. The ends of the porous wicking/freeze tubes also penetrate the perimeter wicking mesh in hole perforations 269 to get closer to the bottom surface edges of the housing water vapor chamber 68 where the water working fluid may pool.

Inner Housing Thermal Barrier Coating

Referring again to FIG. 67, due to the high operating temperature inside the combustion chamber 34, a thermal barrier coating 36 is used on the inner stator surface 37 of lower housing stator 2 along edges of the combustion zone 32 and expansion zones 33 to minimize excessive heat transfer into the lower housing stator 2 and the housing water vapor chamber system 68.

The outer thermal insulation cover 258 has a small channel opening around it perimeter 260 to fit over the tops of the housing stators 2 and 4 connection bolts 13, nuts 14, and washers 15. The outer thermal insulation cover 258 is secured to the engine 1 by a series of hex screws 16 that go through screw holes 262 in the outer insulation cover 258 and into screw holes 17 along the perimeter of the two lower housing stator 2 edges. Screw recesses 261 in the outer insulation cover 258 allow the hex screws 16 to be flush with the outer insulation cover surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An internal combustion rotary engine comprising:
- a stator including an inner surface defining a distorted oval-shaped cavity including an intake zone, a compression zone, an expansion zone and an exhaust zone;
- a rotor rotatable within the cavity, and including an outer surface, and a plurality of combustion cavities and a plurality of slots located along a periphery of the rotor; and
- a plurality of radially protruding and movable vanes disposed within the slots and extending to and engaging the inner surface of the stator, so as to form a plurality of rotatable chambers within which a mixture of fuel is compressed for ignition in the plurality of rotor combustion cavities;
- a vapor chamber overlying a portion the oval-shaped cavity and including a fluid for absorbing heat from the ignition of the fuel mixture in the rotor combustion cavities and returning heat to the combustion cavities as they rotate through the expansion zone; and
- an active cooling system for protecting the rotary engine from excess heat, the cooling system comprising the stator, the plurality of vanes and a cooling/heat transfer system located within the rotor.

2. The rotary engine of claim 1 further comprising an intake port for intaking cool air into each of the plurality of rotatable chambers, the intake port preceding the intake zone along a periphery of the outer surface of the stator, and an exhaust port for exhausting combustion gas from each of the plurality of the rotatable chambers, the exhaust port following the expansion zone along the periphery of the inner surface of the stator.

3. The rotary engine of claim 2, further comprising an active cooling system for condensing, filtering, and re-circulating water contained in the exhaust gas.

4. The rotary engine of claim 2, further comprising a plurality of seals between each of the plurality of vanes and the inner surface of the stator, and wherein the intake and exhaust ports are each an opening that wraps around with the inner surface of the stator, each port being split into two halves with the rotary engine's two halves, each half including a support rib spanning across a middle of each port half and being slightly angled at the port opening to provide support to the plurality of vanes and seals as they pass over the port opening to prevent deformation.

5. The rotary engine of claim 2, further comprising a variable geometry turbo charger turbine that drives an intake compressor that boosts the air taken in by the intake port.

6. The rotary engine of claim 1 further comprising a driveshaft about which the rotor rotates.

7. The rotary engine of claim 6 further comprising an intake port, an exhaust port and wherein the vapor chamber is a sodium vapor chamber system for isothermalizing the combustion and expansion sections of the rotary engine, the sodium vapor chamber system extending along a substantial portion of the perimeter of the stator substantially opposite from the intake port and the exhaust port.

8. The rotary engine of claim 7, wherein the sodium vapor chamber comprises:
- sodium fluid contained within the stator sodium vapor chamber;
- a fine grade wick mesh layer within the evaporator section of stator sodium vapor chamber, the fine grade wick mesh layer being located towards the ignition and combustion zones of the engine;
- a coarse grade wicking mesh layer within condenser section of the stator sodium vapor chamber; the coarse grade wick mesh layer being located toward the end of expansion zone of the engine;
- a medium grade wicking mesh layered between the fine and coarse layers of the stator sodium vapor chamber; the medium grade wick mesh layer being located in the middle of the expansion section of the engine; and
- a medium grade wicking mesh lining the entire perimeter of the stator sodium vapor chamber and encasing the fine, medium, and coarse wicking meshes.

9. The rotary engine of claim 8 further comprising a outer cover of the stator sodium vapor chamber, the outer cover comprising:
- a plurality of parallel segmented extension ridges covering an inner surface of the cover and running the length of the stator sodium vapor chamber;
- a plurality of void spaces located inside the stator sodium vapor chamber between the extension ridges covering the inner surface of the outer cover; and
- a thermal barrier coating covering the inner surface of the outer cover.

10. The rotary engine of claim 7 further comprising an outer stator water vapor chamber angling around the driveshaft within the stator, the stator water vapor chamber comprising:
- water fluid contained within the stator water vapor chamber;
- a fine wick mesh lining the perimeter of the stator water vapor chamber;
- a fine wick mesh layer within the stator water vapor chamber; and
- a coarse wick mesh layer within the stator water vapor chamber; and
- a stator water chamber positioned between the stator sodium vapor chamber and the water channel of the stator active cooling system.

11. The rotary engine of claim 7, wherein fine, medium, and course wicking mesh structures are made from fibers of stainless steel or silica or preferably molybdenum that are woven together into varied densities to form the fine, medium, and coarse wicking structures.

12. The rotary engine of claim 7, wherein fine, medium, and course wicking mesh structures are made from fibers or sintered power of shape metal alloy comprised of nickel-titanium NiTi that can be formed into varied densities to form the fine, medium, and coarse wicking structures to optimize the liquid capillary flow of the sodium vapor chamber working fluid.

13. The rotary engine of claim 1, wherein the vapor chamber fluid changes phase from a liquid to a gas as it absorbs heat during ignition and from a gas to a liquid as it returns heat to the combustion cavities.

14. The rotary engine of claim 1, wherein the vapor chamber working fluid is an alkali liquid metal.

15. The rotary engine of claim 14, wherein the vapor chamber working fluid is selected from the group of alkali liquid metals consisting of sodium, potassium and sulphur.

16. The rotary engine of claim 1, wherein the inner surface the stator is substantially smooth and the plurality of vanes slidably engaging the inner surface of the stator as the rotor rotates within the stator.

17. The rotary engine of claim 1, wherein the plurality of vanes comprises a first group of alternating sliding vanes and a second group of alternating sliding vanes, each vane having a substantially flat and elongated semi-oval shape, an outer perimeter, and two faces.

18. The rotary engine of claim 17, further comprising a vane belt system comprising an outer vane belt attached to the first group of alternating sliding vanes, and an inner vane belt attached to the second group of alternating sliding vanes.

19. The rotary engine of claim 18, wherein the outer vane belt and the inner vane belt each have a plurality of bends, and wherein the vane belt system further comprises a plurality of roller bearings touching the bends.

20. The rotary engine of claim 18, wherein the vane belt system further comprises a plurality of vane belt pins attaching the outer vane belt to the first group of alternating sliding vanes and attaching the inner vane belt to the second group of alternating sliding vanes.

21. The rotary engine of claim 18, wherein the outer vane belt and the inner vane belt are each made of a plurality of high tensile strength fibers connected by pins and links.

22. The rotary engine of claim 18, wherein the rotor vapor chamber internal working fluid comprises water.

23. The rotary engine of claim 1 further comprising a plurality of seals between each of the plurality of vanes and the inner surface of the stator.

24. The rotary engine of claim 23, wherein each of the plurality of seals between the vanes and the inner surface of the stator includes a snub nose tip that is a small, contoured, rounded tip that can slide smoothly across the stator's inner surface.

25. The rotary engine of claim 24, wherein the plurality of rounded-shaped snub nose seals are coated with a near-frictionless coating.

26. The rotary engine of claim 25, wherein the plurality of raised rounded-shaped snub nose seals, wherein the near-frictionless coating is a solid lubricant like coating.

27. The rotary engine of claim 23, wherein the inner surface of the stator has a geometry that minimizes vane and seal deformations as the rotary engine is operated.

28. The rotary engine of claim 1 further comprising a vane belt system for reducing centrifugal forces on the plurality of vanes, whereby wear of the seals between the vanes and the inner surface of the stator is reduced.

29. The rotary engine of claim 28, wherein the vane belt system is comprised of first and second sets of belts for assisting the plurality of vanes in moving radially to conform to changes in a distance between a periphery of the rotor's outer surface and a periphery of the stator's inner surface.

30. The rotary engine of claim 29 further comprising an outer series of belts located on both sides of the first and second set of belts, the outer series of belts riding on small arch supports at the ends of the belt arch support bars connecting the first and second set of belts together, the outer series of belts assisting the first and second belt groups in matching the stator surface profile.

31. The rotary engine of claim 28, wherein the vane belt system comprises:

- a first plurality of vane belt segments linking together the first group of alternating sliding vanes;
- a second plurality of vane belt segments linking together the second group of alternating sliding vanes;
- a first arched vane belt plate over which the first plurality of vane belt segments slide; and
- a second arched vane belt plate over which the second plurality of vane belt segments slide.

32. The rotary engine of claim 12, further comprising extended vane bars attaching the vane belt segments to the sliding vanes.

33. The rotary engine of claim 32, wherein the vane belt segments comprise center vane belt segments and side vane belt segments.

34. The rotary engine of claim 32, wherein the vane belt segments comprise center vane belt segments having two ends and side vane belt segments having two ends, the vane belt system further comprising:

- a plurality of center toggle bars attached to the extended vane bars;
- a plurality of first vane belt bar passages cut out of the first arched vane belt plate, wherein each one of the first vane belt bar passages is aligned with a different one of the extended vane bars;
- a plurality of second vane belt bar passages cut out of the second arched vane belt plate, wherein each one of the second vane belt bar passages is aligned with a different one of the extended vane bars;
- a plurality of center vane belt bars, wherein two of the center vane belt bars are attached to each one of the center toggle bars;
- a plurality of metal roller bushings covering the center vane belt bars and the side vane belt bars, wherein each end of each one of the center vane belt segments is hooked over a different one of the metal roller bushings covering the center vane belt bars, and wherein each end of each one of the side vane belt segments is hooked over a different one of the metal roller bushings covering the side vane belt bars; and
- a plurality of thermal insulation strips attached to and thermally insulating sliding vanes from the vane belt system.

35. The rotary engine of claim 31, further comprising:

- a first spring for applying pressure to the first arched vane belt plate to dynamically urge the first arched vane belt plate inward; and
- a second spring for applying pressure to the second arched vane belt plate to dynamically urge the second arched vane belt plate inward.

36. The rotary engine of claim 31, wherein the first arched vane belt plate and the second arched vane belt plate are at least partially covered with a plurality of raised rounded-shaped ridges and coated with a near-frictionless coating.

37. The rotary engine of claim 36, wherein the plurality of raised rounded-shaped ridges extend the widths of the first arched vane belt plate and the second arched vane belt plate, and wherein the near-frictionless coating is a solid lubricant like coating.

38. The rotary engine of claim 31, wherein the first arched vane belt plate comprises a first center arched vane belt plate and at least one first side arched vane belt plate, and wherein the second arched vane belt plate comprises a second center arched vane belt plate and at least one second side arched vane belt plate.

39. The rotary engine of claim 31, further comprising:

- a plurality of spindles aligned transverse to the vane belt segments;
- a plurality of hollow segmented roller bearings placed on the spindles, such that hollow segmented roller bearings freely rotate about the spindles, the hollow segmented roller bearings touching the vane belt segments;
- a first plurality of spindle springs attached to the first arched vane belt plate; and
- a second plurality of spindle springs attached to the second arched vane belt plate, first and second spindle springs being aligned parallel to the vane belt segments, and supporting the spindles.

40. The rotary engine of claim 39, wherein the first plurality of spindle springs are spot welded into the first arched vane belt plate, and wherein the second plurality of spindle springs are spot welded into the second arched vane belt plate.

41. The rotary engine of claim 31, further comprising a plurality of seams interspersed within the vane belt segments.

42. The rotary engine of claim 41, wherein the seams are pin seams.

43. The rotary engine of claim 41, wherein the seams are hinge seams.

44. The rotary engine of claim 28, wherein each of the plurality of vanes includes a vane belt toggle bar system for allowing the vane to toggle as it moves with respect to the inner surface of the stator to provide increase sealing of its corresponding rotatable chambers with respect to the inner surface of the stator.

45. The rotary engine of claim 44, wherein the vane belt toggle bar system is a single belt toggle bar system for a single center vane belt of the vane belt system.

46. The rotary engine of claim 44, wherein the vane belt toggle bar system is a double belt toggle bar system for two outer vane belts of the vane belt system.

47. The rotary engine of claim 28, further comprising a vane belt tension adjustment system for adjusting the tension of a single vane belt or double vane belt used with the vane belt system.

48. The rotary engine of claim 1, wherein a distance from a periphery of the outer surface of the rotor to a periphery of the inner surface of the stator varies as the rotor rotates through the intake zone, the compression zone, expansion zone, and the exhaust zone, and wherein the plurality of radially protruding vanes move radially to accommodate changes in the distance and thereby continue to slidably engage the inner surface of the stator as the rotor rotates.

49. The rotary engine of claim 1 further comprising a pressure release system connected to the vapor chamber.

50. The rotary engine of claim 1 wherein the fuel mixture comprises hydrogen, water and air.

51. The rotary engine of claim 50, wherein the fuel mixture is stratified with a mixture of hydrogen and air in its front half and injected water in its back half, whereby the mixture of hydrogen and air is easily ignitied.

52. The rotary engine of claim 1 further comprising:

a first water injector for injecting into each of the plurality of rotatable chambers an amount of water that is varied for the purpose of controlling the compression ratio of the rotary engine;

a fuel injector for injecting into each of the plurality of combustion cavities the fuel ignited in the cavities;

a second water injector for injecting into each of the plurality of rotatable chambers a second amount of water to partially quench in each of the plurality of rotatable chambers a gas resulting from the ignition of the fuel in the rotor combustion cavity located within the rotatable chamber to reduce the temperature of the gas in the chamber; and a third water injector for injecting into each of the plurality of rotatable chambers a third amount of water for cooling the rotor, vanes, and seals comprising the rotatable chamber in response to heat transferred to the rotatable chamber from the vapor chamber overlying the expansion zone.

53. The rotary engine of claim 52, wherein the rotary engine uses sodium vapor heat transfer, active water cooling system heat recovery, thermal barrier coating, water injection, and an extended expansion stroke to achieve a higher brake thermodynamic efficiency.

54. The rotary engine of claim 52, wherein the cooling of the rotatable chamber by water injected by the third water injector cools the chamber surface in preparation for a next intake cycle.

55. The rotary engine of claim 54 further comprising a sodium vapor chamber pressure adjustment rupture release system comprising:

a pressure chamber filled with an inert compressible gas;

a pressure adjustment disk;

a rupture disk; and a rupture signal flag.

56. The rotary engine of claim 55, wherein the inert compressible gas is nitrogen, argon, or preferably krypton.

57. The rotary engine of claim 55, wherein the rupture release system comprises a pressure adjustment system to continuously regulate the vapor pressure inside the vapor chamber.

58. The rotary engine of claim 55, wherein chamber pressure adjustment rupture release system further comprises a pressure rupture control and rupture signal.

59. The rotary engine of claim 52, wherein the amount of water injected by the first water injector results in an effective compression ratio at which auto-ignition can occur.

60. The rotary engine of claim 52, wherein the cooling of the rotor segments, vanes and seals comprising the rotatable chamber results in centrifugal forces caused by the rotor rotating within the cavity forces cooler and heavier water droplets against the inner surface of the stator to thereby absorb heat from the vapor chamber and accelerate heat transfer from the vapor chamber back into the rotatable chamber to maintain high vapor pressure and mean effective pressure within the rotatable chamber for performing work.

61. The rotary engine of claim 1 further comprising a plurality of seals for sealing each of the rotatable chambers, the plurality of seals comprising:

first and second seals located axially along first and second sides of the rotor, the axial seals being curved to match a circular profile of the rotor's outer surface;

the axial seals being segmented into a center section and two end sections; the axial seal center section having an angled tongue extension along both ends that mates with an angled groove recess of the axial end seal segments;

the axial seal center section and end segments each having a top surface that is sloped so that chamber gas pressure will bias the axial seal toward the stator's inner surface;

an outer sealing surface of each of the axial seal center and end segments including a groove cut the entire length of the axial seal, thereby creating a recess for an axial seal strip; and a corrugated spring located behind the axial seal center segment for are also outwardly biasing the axial seals, whereby as the axial seal center segment is urged outward by gas pressure and the corrugated spring, the axial seal center segment also urge outward the axial seal end segments to provide a seal along the inner surface of stator and along the lower segment of the vane seals located above the rotor.

62. The rotary engine of claim 61 further comprising:

a plurality of vane face seals for providing a continuous seal in a substantially elongated semi-oval ring-shaped area between both a front and back face of one of the plurality of vanes and an immediately adjacent to an area of the outer surface of the rotor, and a plurality of vane seals for providing a continuous seal between an outer perimeter of one of the plurality of vanes and the inner surface of the stator.

63. The rotary engine of claim 62, wherein each of the plurality of vanes includes a curved vane sealing surface, and wherein the rotary engine further comprises:

a plurality of roller bearing channels embedded between the vane seals and between each of the vane seals and a corresponding vane, a plurality of roller bearings disposed within the roller bearing channels, wherein each of the vane seals includes angled outer sides for gas biasing the vane seal, whereby the vane seal is dynamically urged toward the inner surface of the stator during operation of the rotary engine, and a plurality of gas passages piercing the vane seals, wherein the area of each gas passage increases as the gas passage extends dynamically outwardly and radially urged towards the inner surface of the stator during operation of the rotary engine.

64. The rotary engine of claim 63 wherein each of the vanes has a substantially flat and elongated semi-oval shape, an outer perimeter and two faces, and wherein the outer perimeter of each vane is comprised of:

a vane groove extending along a center of the outer perimeter's entire length, two support ridges extending along the entire length of the outer perimeter, the vane groove being bounded by the support ridges, the support ridges protruding radially beyond the vane groove, and two support ledges extending along the entire length of the outer perimeter, the support ledges being bound by the support ledges, the support ledges protruding radially more than the vane groove but less than the support ridges.

65. The rotary engine of claim 64, wherein the plurality of side gas passages create open channels from the chambers to the support ridges.

66. The rotary engine of claim 62, wherein each of the vane seals is divided by two interfaces into a top center segment and two axially extendable side lower segments.

67. The rotary engine of claim 66, wherein the two side lower segments are axially biased so as to be urged toward the inner surface of the stator and radially biased so as to be urged toward the top center segment.

68. The rotary engine of claim 66, wherein each interface is comprised of at least one sliding keystone shaped tongue and groove connection.

69. The rotary engine of claim 61, wherein the rotor has eight vane slots, the sealing arrangement has sixteen vane face seals, and eight vane seals.

70. The rotary engine of claim 1, wherein each of the plurality of vanes has a substantially flat and elongated semi-oval shape, an outer perimeter, and two faces, and wherein the rotary engine further comprises a bearing system for facilitating radial movement of each of the vanes, the bearing system comprising:

a plurality of roller bearing channels embedded in each of the vane faces, the roller bearing channels being axially oriented, and a plurality of roller bearings disposed within the plurality of roller bearing channels.

71. The rotary engine of claim 70, wherein the bearing system further comprises a plurality of rotor vane plates, each plate being attached to one of two sides of each slot in the rotor in which the vanes are disposed, each rotor vane plate being at least partially covered with diamond-shaped ridges or zigzag ridges, and wherein each face of the plurality of vanes are at least partially covered with diamond-shaped ridges or zigzag ridges, the ridges being topped with a thermal barrier coating and an oxide lubricant.

72. The rotary engine of claim 71, wherein the bearing system further comprises:

a plurality of axially oriented center spindles, a plurality of hollow segmented roller bearings placed on the center spindles, such that the bearings freely rotate about the spindles, and a plurality of radially oriented roller bearing support springs attached to each rotor vane plate, the center spindles being attached to the roller bearing support springs.

73. The rotary engine of claim 1 further comprising a rotor heat transfer system comprising:

a plurality of rotor vapor chambers interspersed within the rotor between the vane slots;

a rotor vapor chamber water internal working fluid within the rotor vapor chambers;

a plurality of rotor vapor chambers extending radially and curving to match the outer rotor surface profile within the rotor, wherein each of the rotor vapor chamber comprises an inner evaporating zone centered underneath the outer surface of the rotor and two inner axial condensing ends;

a plurality of fine wicking mesh located throughout the evaporator section of the rotor vapor chamber;

a plurality of coarse wicking mesh located throughout both condenser sections and interface with fine wicking mesh in the plurality of rotor vapor chambers;

a plurality of perimeter medium wicking mesh located along the inner perimeter surface of the rotor vapor chamber making contact with both the evaporator fine wicking mesh and condenser coarse wicking mesh;

a plurality of ridges located along the rotor vapor chamber inner cover opposite the surface underneath the outer combustion surface oriented in a plurality of rows running axially through the rotor vapor chamber;

a plurality of rotor vapor chamber void spaces located between the rotor vapor chamber ridges;

a plurality of wicking freeze tubes that run radially through the rotor vapor chamber and perforate the evaporator fine wicking mesh and perimeter wicking mesh;

a plurality of wicking freeze tubes that run axially through the rotor vapor chamber from one condenser side to the other, perforating the condenser coarse wicking mesh and evaporator fine wicking mesh and perimeter mesh; and a plurality of rotor vapor chamber outer condensers that transfer heat from the inner rotor vapor chamber condensers to the cooling water of the active cooling system.

74. The rotary engine of claim 1 further comprising a stator heat transfer system for protecting the rotary engine from excess heat.

75. The rotary engine of claim 74, further comprising an intake port and an exhaust port, the stator heat transfer system further comprising a stator liquid cooling system, wherein the stator liquid cooling system comprises:

a stator liquid cooling tube entering the rotary engine near the intake port, meanders near the intake port, circles around the driveshaft, and then exits the rotary engine near the exhaust port;

stator liquid coolant within the housing liquid cooling tube;

a housing liquid coolant temperature monitor; and a means for adjusting the flow of the housing liquid coolant.

76. The rotary engine of claim 75, wherein the housing liquid coolant comprises water.

77. The rotary engine of claim 1, wherein the mixture of fuel is ignited by at least one spark plug.

78. The rotary engine of claim 1, wherein the mixture of fuel is ignited by auto-ignition.

79. The rotary engine of claim 1, further comprising an injector for directly injecting the hydrogen into the rotor combustion cavities.

80. The rotary engine of claim 1, wherein the combustion and expansion zones are larger than the intake and compression zones whereby combustion gases can expand and perform maximum work until pressures within the rotary engine's combustion chamber equal rotational friction loses.

81. The rotary engine of claim 1, wherein the engine includes a housing and wherein the engine includes near frictionless solid lubricants, thermal barrier coatings resistant to thermal stresses and deformations, a plurality of vapor chamber systems, and an active water cooling system to transport excess heat for isothermalization of the outer engine housing.

82. The rotary engine of claim 1, wherein the engine includes a housing fabricated from high temperature alloys, and wherein the housing is covered with a thick thermal blanket to minimize heat loss and reduce engine noise.

83. The rotary engine of claim 1, wherein the vapor chamber overlies the combustion and expansion zones, whereby the vapor chamber overlies a first plurality of rotor combustion cavities in which fuel ignition occurs and a second plurality of rotor combustion cavities to which the vapor chamber returns heat absorbed from the ignitions in the first plurality of rotor combustion cavities.

84. The rotary engine of claim 1, wherein heat absorbed by the vapor chamber ignites the fuel mixture in a first plurality of the rotor combustion cavities rotating through the combustion zone, absorbs heat from combustion resulting from the fuel mixture ignition in the first plurality of rotor combustion cavities and transfers heat back into a second plurality of rotor combustion cavities rotating through the expansion zone.

85. The rotary engine of claim 1, wherein the inner surface of the stator is coated with a peroskvite thermal barrier coating to protect the stator from constant combustion ignition and to reduce a transfer of combustion heat out of the stator.

86. The rotary engine of claim 85, wherein the thermal barrier coating is comprised of Yttrium stabilized zirconium.

87. The rotary engine of claim 86, wherein, the zirconium further will absorb hydrogen gas that penetrates through the stator from the combustion cavity and dissassociates from stator housing alloy material.

88. The rotary engine of claim 1, wherein the vapor chamber uses sodium as the fluid for absorbing heat from ignition, and wherein the liquid sodium changes phase, in an evaporator zone of the vapor chamber, to a sodium gas vapor when it absorbs heat from the combustion zone, moves at sonic speed along the vapor chamber toward a condenser zone of the vapor chamber where the sodium gas transfers heat back into the rotating rotor combustion cavities along the expansion zone and changes phase, in the condenser zone, to a sodium liquid.

89. The rotary engine of claim 88, wherein the sodium vapor chamber is further comprised of a plurality of wicking meshes which provide capillary activity to evenly wick the liquid sodium from the condenser zone to the evaporator zone of the sodium vapor chamber where the liquid sodium is available to absorb additional heat from the hot combustion zone.

90. The rotary engine of claim 1, wherein the active water cooling system and the vapor chamber transfer heat to and from each other, thereby allowing a large portion of heat produced by the rotary engine's combustion of the fuel mixture to be continually transferred back through the rotary engine to provide positive exergy work benefit.

91. The rotary engine of claim 1, wherein the rotor outer surface is covered with a thermal barrier coating for protecting the rotor from combustion heat damage and minimizing surface heat transfer into the rotor.

92. The rotary engine of claim 91, wherein the rotor further comprises a water vapor chamber located under the rotor's outer surface, the water vapor chamber absorbing heat from combustion that passes through the rotor's thermal barrier coating.

93. The rotary engine of claim 92, wherein the rotor's water vapor chamber is an evaporator zone where a water fluid absorbs heat passing through the rotor's thermal barrier coating, and thereby changes phase from a liquid to a gas and transfers the absorbed heat to condensers located at both sides of the rotor.

94. The rotary engine of claim 93, wherein the active water cooling system sprays water across the rotor condensers as the rotor rotates to absorb the condenser heat, whereby the rotor vapor chamber water cools and changes phase from gas to a liquid and then re-circulates back toward the evaporator zone by high-G centrifugal forces.

95. The rotary engine of claim 92, wherein the rotor water vapor chamber helps to isothermalize heat distribution across the entire outer surface of the rotor.

96. The rotary engine of claim 1, wherein the inner surface of the stator has a geometric profile, wherein the combustion and expansion zones are larger than the intake and compression zones so that thermodynamic cycle performance of the rotary engine is increased during operation.

97. The rotary engine of claim 1 further comprising a vane cooling heat transfer system comprising:

a plurality of vane heat pipe chambers located within each the vane;

a vane heat pipe chamber with as water internal working fluid;

a plurality of vane heat pipe chambers extending along the outer perimeter of the vane curving to match the outer vane profile, wherein each of the heat pipe chamber comprises an inner evaporating zone centered underneath the outer surface of the vane and two inner axial condensing ends located along axial sides of the rotor just below the rotor axial seals;

a plurality of wicking freeze tubes that run axially through the vane heat pipe chamber from one condenser side to the other; and a plurality of vane heat pipe chamber outer condensers that transfer heat from the inner vane heat pipe chamber condensers to the cooling water of the active cooling system.

98. The rotary engine of claim 97, wherein the vane heat pipe chamber internal working fluid comprises water.

99. The rotary engine of claim 97, wherein the vane heat pipe chamber center evaporator section the water working fluid changes phase from a liquid to a gas as it absorbs heat during ignition and combustion and in the condenser section the water working fluid changes phase from a gas to a liquid as it transfers its heat to the coolant water of the active cooling system.

100. The rotary engine of claim 1, wherein the heat absorbed by the water of the active cooling system is injected back into the rotor chambers during the first water injection in the compression zone and second water injection early state combustion/expansion zone.

101. The rotary engine of claim 1, wherein the thermal barrier coating on the rotor surface reduces heat loss into the rotor cooling system.

102. The rotary engine of claim 1 further comprising a vapor chamber comprising an alkali metal thermal electrical converter for direct generation of electricity.

103. The rotary engine of claim 102 wherein the alkali metal thermal electrical converter comprises a form of beta alumina solid electrode.

104. The rotary engine of claim 103 wherein the beta alumina solid electrode is thinly made with a high surface area form.

105. The rotary engine of claim 103 wherein the beta alumina solid electrode is coated with a cathode material on the inside surface towards the engine chamber heat source and an anode coating on the other outside surface facing the outer vapor chamber cover.

106. The rotary engine of claim 103 wherein the beta alumina solid electrode is ionically and electically insulated from the liquid sodium working fluid and any conductive direct metal contact.

107. The rotary engine of claim 103, wherein the beta alumina solid electrode is further tonically and electrically insulated by use of inert silicon or molybdenum insulation fiber mesh on its inner surface and thermal barrier coating made from Yttrium stabilized zirconium on its outer surface and insulating and inert zirconium screws that help secure the beta alumina solid electrode in place inside the sodium vapor chamber.

108. The rotary engine of claim 103, is further alkali metal thermal electrical converter electrode generates electricity electron current as heated sodium vapor ionically passes through the beta alumina solid electrode from a cathode surface to an anode surface.

109. The rotary engine of claim 103, wherein the alkali metal thermal electrical converter electrode includes an electrode connector that independently interfaces with both a cathode surface and an anode surface of the beta alumina solid electrode, thereby, creating a cathode and anode physical electrical connection circuit that passes through the outside of the sodium vapor chamber outer cover that can interface with an outer electrical connector that is connected to an electrical device, creating a direct cathode and anode electrical circuit connection between the alkali metal thermal electrical converter beta alumina electrode and the electrical device to supply a flow of electron electricity to the electrical device through the cathode circuit path and return a flow of electron electricity from the electrical device to the metal alkali thermal electrical converter beta alumina solid electro through the anode circuit path.

110. The rotary engine of claim 1, wherein the thermal barrier coating on the inside surface of vapor chamber cover reduces heat loss from the vapor chamber to the ambient atmosphere.

111. The rotary engine of claim 1, wherein the fuel type used can be of any type that can be injected into the rotor chamber and ignited to produce heat.

112. The rotary engine of claim 1, wherein the fuel is preferably hydrogen.

113. An internal combustion rotary engine comprising:

a stator including an inner surface defining a distorted oval-shaped cavity including at least a compression zone and an expansion zone;

a rotor rotatable within the cavity, and including an outer surface, and a plurality of combustion cavities and a plurality of slots located along a periphery of the rotor; and a plurality of radially movable vanes disposed within the slots and extending to and slidably engaging the inner surface of the stator, so as to form a plurality of rotatable chambers within which a mixture of fuel is compressed for ignition in the plurality of rotor combustion cavities; and a vapor chamber overlying a portion the oval-shaped cavity and including a fluid for absorbing heat from the ignition of the fuel mixture in the rotor combustion cavities and returning heat to the combustion cavities as they rotate past the expansion zone.

114. The rotary engine of claim 113 further comprising an intake port for intaking cool air into each of the plurality of rotatable chambers, and an exhaust port for exhausting combustion gas from each of the plurality of the rotatable chambers.

115. The rotary engine of claim 113, further comprising a vane belt system for assisting the plurality of vanes in moving radially to conform to changes in a distance between a periphery of the rotor's outer surface and a periphery of the stator's inner surface.

116. The rotary engine of claim 113, wherein a distance from a periphery of the outer surface of the rotor to a periphery of the inner surface of the stator varies as the rotor rotates within the engine, and wherein the plurality of radially movable vanes move radially to accommodate changes in the distance and thereby continue to slidably engage the inner surface of the stator as the rotor rotates.

117. The rotary engine of claim 113 wherein the fuel mixture includes hydrogen, water and air.

118. The rotary engine of claim 113 further comprising:

a first water injector for injecting into each of the plurality of rotatable chambers an amount of water that is varied for the purpose of controlling the compression ratio of the rotary engine;

a fuel injector for injecting into each of the plurality of combustion cavities hydrogen which is part of the fuel ignited in the cavities;

a second water injector for injecting into each of the plurality of rotatable chambers a second amount of water to partially quench in each of the plurality of rotatable chambers a gas resulting from the ignition of the fuel in the rotor combustion cavity located within the rotatable chamber to reduce the temperature of the gas in the chamber; and a third water injector for injecting into each of the plurality of rotatable chambers a third amount of water for cooling the rotor, vanes, and seals comprising the rotatable chamber in response to heat transferred to the rotatable chamber from the vapor chamber overlying the expansion zone.

119. The rotary engine of claim 113 further comprising a plurality of seals for sealing each of the rotatable chambers, the plurality of seals comprising:

first and second seals located axially along first and second sides of the rotor, the axial seals being curved to match a circular profile of the rotor's outer surface;

a plurality of vane face seals for providing a continuous seal in a substantially elongated semi-oval ring-shaped area between both a front and back face of one of the plurality of vanes and an immediately adjacent to an area of the outer surface of the rotor, and a plurality of vane seals for providing a continuous seal between an outer perimeter of one of the plurality of vanes and the inner surface of the stator.

120. The rotary engine of claim 113, further comprising a bearing system for facilitating radial movement of each of the vanes.

121. The rotary engine of claim 113, further comprising a stator heat transfer system for protecting the rotary engine from excess heat.

122. The rotary engine of claim 113, further comprising a rotor heat transfer system for protecting the rotary engine from excess heat.

123. The rotary engine of claim 113, wherein the plurality of vanes is comprised of eight vanes.

124. The rotary engine of claim 113, wherein the plurality of vanes is comprised of a number of vanes selected from the group consisting of six vanes, eight vanes, nine vanes or twelve vanes.

125. The rotary engine of claim 113, wherein the plurality of rotatable chambers is comprised of a number of chambers selected from the group consisting of six chambers, eight chambers, nine chambers or twelve chambers.

126. The rotary engine of claim 113, wherein the plurality of rotor combustion cavities is comprised of a number of rotor combustion cavities selected from the group consisting of six rotor combustion cavities, eight rotor combustion cavities, nine rotor combustion cavities or twelve rotor combustion cavities.

127. The rotary engine of claim 113, wherein the plurality of vane belts is two and three.

128. The rotary engine of claim 113, wherein the two vane belts system can be constructed with plurality of 3 or 4 vanes on each belt, resulting in an engine with 6 or 8 vanes.

129. The rotary engine of claim 113, wherein the three vane belts system can be constructed with plurality of 3 or 4 vanes on each belt, resulting in an engine with 9 or 12 vanes.

130. The rotary engine of claim 129, wherein the three vane belts system the third belt will be a second double belt, arch, and vane toggle system that will be oriented just outside the first double belt system.

131. An internal combustion rotary engine comprising:

a housing stator including an inner surface defining a distorted oval-shaped cavity including at least a compression zone and an expansion zone;

a rotor rotatable within the cavity, and including an outer surface, and a plurality of combustion cavities and a plurality of slots located along a periphery of the rotor; and a plurality of radially protruding and movable vanes disposed within the slots and extending to and slidably engaging the inner surface of the stator, so as to form a plurality of rotatable chambers within which a mixture of fuel is compressed for ignition in the plurality of rotor combustion cavities; and a vapor chamber overlying a portion the oval-shaped cavity and including a fluid for absorbing heat from the ignition of the fuel mixture in the rotor combustion cavities and returning heat to the combustion cavities as they rotate past the expansion zone.

132. An internal combustion rotary engine comprising:

a stator including an inner surface defining a distorted oval-shaped cavity including an intake zone, a compression zone, an expansion zone and an exhaust zone;

a rotor rotatable within the cavity, and including an outer surface, and a plurality of combustion cavities and a plurality of slots located along a periphery of the rotor;

a driveshaft about which the rotor rotates;

a plurality of radially protruding and movable vanes disposed within the slots and extending to and engaging the inner surface of the stator, so as to form a plurality of rotatable chambers within which a mixture of fuel including hydrogen is compressed for ignition in the plurality of rotor combustion cavities;

a vapor chamber overlying a portion the oval-shaped cavity and including a fluid for absorbing heat from the ignition of the fuel mixture in the rotor combustion cavities and returning heat to the combustion cavities as they rotate past the expansion zone;

an intake port for intaking cool air into each of the plurality of rotatable chambers, the intake port preceding the intake zone along a periphery of the outer surface of the stator;

an exhaust port for exhausting combustion gas from each of the plurality of the rotatable chambers, the exhaust port following the expansion zone along the periphery of the inner surface of the stator;

a vane belt system for reducing centrifugal forces on the plurality of vanes, whereby wear of the seals between the vanes and the inner surface of the stator is reduced;

a plurality of seals for sealing each of the rotatable chambers;

a water vapor chamber cooling/heat transfer system for rotor temperature control;

an active water cooling/heat transfer system for capturing heat from the rotary engine's outer housing, and from the inside of the engine's housing from compression stroke, the driveshaft's bearing zone, and the rotor and plurality of vanes, and returning the captured heat for re-use in the engine's cycle;

a first water injector for injecting into each of the plurality of rotatable chambers an amount of water that is varied for the purpose of controlling the compression ratio of the rotary engine;

a fuel injector for injecting into each of the plurality of combustion cavities the fuel ignited in the cavities;

a second water injector for injecting into each of the plurality of rotatable chambers a second amount of water to partially quench in each of the plurality of rotatable chambers a gas resulting from the ignition of the fuel in the rotor combustion cavity located within the rotatable chamber to reduce the temperature of the gas in the chamber; and a third water injector for injecting into each of the plurality of rotatable chambers a third amount of water for cooling the rotor, vanes, and seals comprising the rotatable chamber in response to heat transferred to the rotatable chamber from the vapor chamber overlying the expansion zone.

* * * * *